US012809582B2

(12) United States Patent
Song

(10) Patent No.: US 12,809,582 B2
(45) Date of Patent: Nov. 24, 2026

(54) ACCUMULATOR AND PROCESSING-IN-MEMORY (PIM) DEVICE INCLUDING THE ACCUMULATOR

(71) Applicant: SK hynix Inc., Icheon-si (KR)

(72) Inventor: Choung Ki Song, Yongin-si (KR)

(73) Assignee: SK hynix Inc., Icheon-si (KR)

(*) Notice: Subject to any disclaimer, the term of this patent is extended or adjusted under 35 U.S.C. 154(b) by 1084 days.

(21) Appl. No.: 17/962,334

(22) Filed: Oct. 7, 2022

(65) Prior Publication Data

US 2023/0033179 A1 Feb. 2, 2023

Related U.S. Application Data

(63) Continuation-in-part of application No. 17/225,915, filed on Apr. 8, 2021, now Pat. No. 12,504,952, which is a continuation-in-part of application No. 17/027,276, filed on Sep. 21, 2020, now Pat. No. 11,513,733.

(60) Provisional application No. 63/007,663, filed on Apr. 9, 2020, provisional application No. 62/958,226, filed on Jan. 7, 2020.

(30) Foreign Application Priority Data

Jan. 17, 2020 (KR) ........................ 10-2020-0006903

(51) Int. Cl.
*G06F 7/509* (2006.01)
*G06F 7/544* (2006.01)

(52) U.S. Cl.
CPC .......... *G06F 7/5095* (2013.01); *G06F 7/5443* (2013.01)

(58) Field of Classification Search
CPC .......... G06F 7/50; G06F 7/509; G06F 7/5095; G06F 7/5443
See application file for complete search history.

(56) References Cited

U.S. PATENT DOCUMENTS 4,215,416 A * 7/1980 Muramatsu ........... G06F 7/5443 708/670
4,872,131 A * 10/1989 Kubota ..................... G06F 7/57 708/524

(Continued)

FOREIGN PATENT DOCUMENTS

| | | | |
|---|---|---|---|
| CN | 110311676 | A | 10/2019 |
| KR | 1020000024641 | A | 5/2000 |
| KR | 1020200003661 | A | 1/2020 |

*Primary Examiner* — Matthew D Sandifer
(74) *Attorney, Agent, or Firm* — WILLIAM PARK AND ASSOCIATES LTD.

(57) ABSTRACT

An accumulator according to an embodiment of the present disclosure includes an accumulation adder configured to perform an accumulative addition operation on input data and latch data that are input through a first input terminal and a second input terminal, respectively, to generate accumulation data, and a latch circuit, including a plurality of flip-flops, each of the plurality of flip-flops configured to receive the accumulation data and capable of latching and outputting the accumulation data as the latch data, wherein one of the latch data that is output from each of the plurality of flip-flops is selected to be fed back to the accumulation adder based on a first accumulation control signal. The latch circuit is configured to latch the accumulation data in the flip-flop, among the plurality of flip-flops, selected by a second accumulation control signal.

20 Claims, 111 Drawing Sheets

(56) References Cited

U.S. PATENT DOCUMENTS

| | | | |
|---|---|---|---|
| 5,165,009 A | | 11/1992 | Watanabe et al. |
| 5,226,171 A | | 7/1993 | Hall et al. |
| 5,388,074 A | * | 2/1995 | Buckenmaier ............ G06F 5/12 365/240 |
| 8,060,549 B2 | * | 11/2011 | Purcell .................... G06F 7/485 708/670 |
| 10,042,639 B2 | | 8/2018 | Gopal et al. |
| 12,039,290 B1 | * | 7/2024 | Huang .................. G06F 7/5095 |
| 12,293,163 B1 | * | 5/2025 | Huang .................. G06F 7/5095 |
| 2003/0222879 A1 | | 12/2003 | Lin et al. |
| 2015/0088954 A1 | | 3/2015 | Bakos |
| 2017/0068717 A1 | | 3/2017 | Crawford, Jr. |
| 2018/0373902 A1 | | 12/2018 | Muralimanohar et al. |
| 2019/0114265 A1 | | 4/2019 | Chang et al. |
| 2019/0369989 A1 | | 12/2019 | Mansell et al. |
| 2020/0089472 A1 | | 3/2020 | Pareek et al. |
| 2020/0174749 A1 | | 6/2020 | Kang et al. |
| 2021/0072986 A1 | | 3/2021 | Yudanov et al. |

* cited by examiner

ACCUMULATOR AND PROCESSING-IN-MEMORY (PIM) DEVICE INCLUDING THE ACCUMULATOR

CROSS-REFERENCE TO RELATED APPLICATIONS

This is a continuation-in-part of U.S. patent application Ser. No. 17/225,915, filed Apr. 8, 2021, which is a continuation-in-part of U.S. patent application Ser. No. 17/027,276, filed Sep. 21, 2020, which claims the benefit of U.S. Provisional Application No. 62/958,226, filed on Jan. 7, 2020, and claims priority to Korean Application No. 10-2020-0006903, filed on Jan. 17, 2020, which are incorporated herein by reference in their entirety. U.S. patent application Ser. No. 17/225,915 also claims the benefit of U.S. Provisional Application No. 63/007,663, filed on Apr. 9, 2020, which is incorporated herein by reference in its entirety.

BACKGROUND

1. Technical Field

Various embodiments of the present disclosure relate to MAC operator and PIM system including the MAC operator.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

An accumulator according to an embodiment of the present disclosure may include an accumulation adder configured to perform an accumulative addition operation on input data and latch data that are input through a first input terminal and a second input terminal, respectively, to generate accumulation data, and a latch circuit, including a plurality of flip-flops, each of the plurality of flip-flops configured to receive the accumulation data and capable of latching and outputting the accumulation data as the latch data, wherein one of the latch data that is output from each of the plurality of flip-flops is selected to be fed back to the accumulation adder based on a first accumulation control signal. The latch circuit is configured to latch the accumulation data in the flip-flop, among the plurality of flip-flops, selected by a second accumulation control signal.

An accumulator according to an embodiment of the present disclosure may include a plurality of first flip-flops capable of respectively receiving input data in common, a plurality of adders capable of respectively receiving output data from the plurality of first flip-flops and configured to perform addition operations, a plurality of second flip-flops capable of receiving output data from the plurality of adders, a plurality of intermediate buffers capable of outputting output data from the plurality of second flip-flops in response to a first logic level of a MAC read control signal, an additional addition circuit configured to add the output data from the plurality of intermediate buffers to output addition data, and an output buffer capable of outputting the addition data that is output from the additional addition circuit as MAC result data in response to a first logic level of a delayed MAC read control signal that is generated by delaying the MAC read control signal.

A PIM device according to an embodiment of the present disclosure may include a plurality of memory banks configured to provide weight data, a global buffer configured to provide vector data, a plurality of MAC operators configured to perform MAC operations on the weight data and the vector data to generate MAC result data, a command decoder configured to, based on a MAC command, generate a MAC control signal for controlling the MAC operations and a MAC read control signal for controlling an output of the MAC result data, and an accumulation control signal generator configured to, based on the MAC control signal, generate a first accumulation control signal and a second accumulation control signal for controlling accumulative addition operations in the plurality of MAC operators.

BRIEF DESCRIPTION OF THE DRAWINGS

Certain features of the disclosed technology are illustrated in various embodiments with reference to the attached drawings.

DETAILED DESCRIPTION OF THE EMBODIMENTS

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

Figure 1:
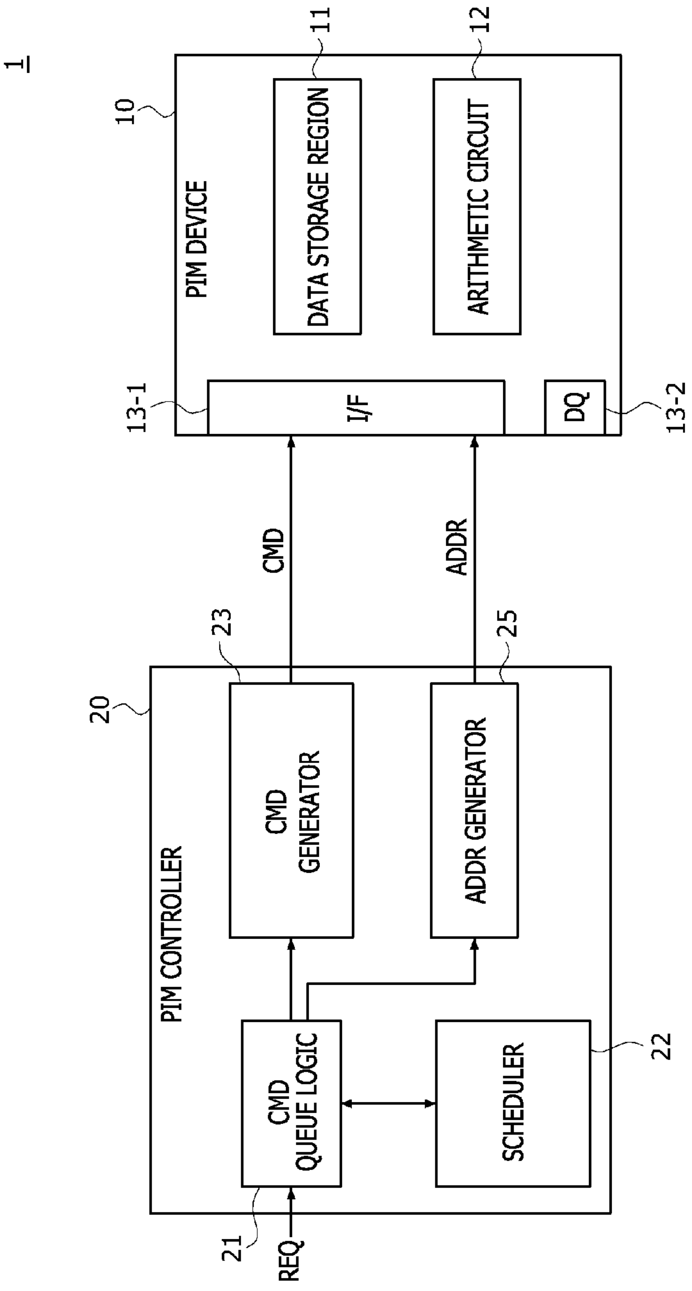
FIG. 1 is a block diagram illustrating a PIM system according to an embodiment of the present disclosure.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data outputted from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller 20 controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is outputted from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD outputted from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR outputted from the address generator 25 may be inputted to the data storage region 11 through the interface (I/F) 13-1.

Figure 2:
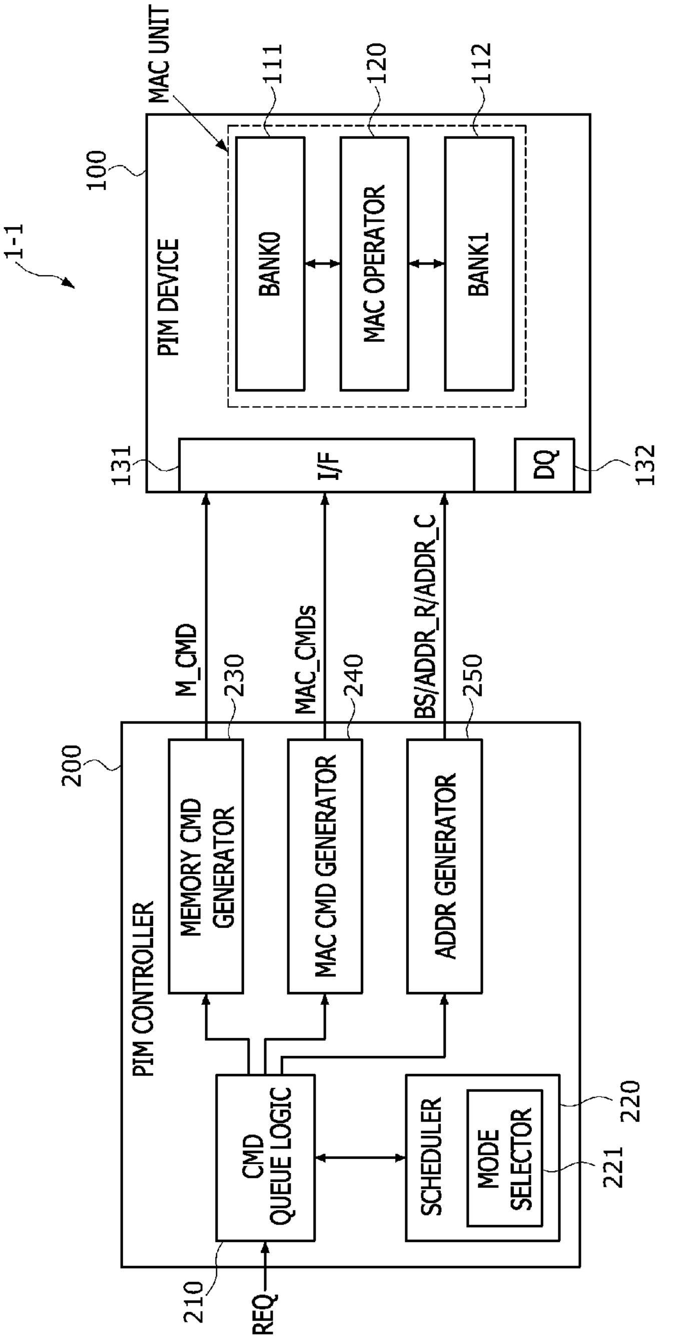
FIG. 2 is a block diagram illustrating a PIM system according to a first embodiment of the present disclosure.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132.

For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADD_R from the PIM controller 200 and may decode the row address ADD_R to select and enable one of the rows (i.e., word lines) coupled to the selected memory bank. Each of the Y-decoders/IO circuits YDEC/IOs may include a Y-decoder YDEC and an I/O circuit JO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data outputted from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue outputted from the command queue logic 210 includes command information requesting an operation in the memory mode of the PIM device 100, the command queue logic 210 may transmit the command queue to the memory command generator 230. On the other hand, when the command queue outputted from the command queue logic 210 is command information requesting an operation in the MAC mode of the PIM device 100, the command queue logic 210 may transmit the command queue to the MAC command generator 240. Information on whether the command queue relates to the memory mode or the MAC mode may be provided by the scheduler 220.

The scheduler 220 may adjust a timing of the command queue when the command queue stored in the command queue logic 210 is outputted from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue outputted from the command queue logic 210 relates to the memory mode of the PIM device 100 or relates to the MAC mode of the PIM device 100. In order to obtain the information on whether the command queue outputted from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD outputted from the memory command generator 230 may be transmitted to the PIM device 100. In an embodiment, the memory command M_CMD may include a memory read command and a memory write command. When the memory read command is outputted from the memory command generator 230, the PIM device 100 may perform the data read operation for the first memory bank 111 or the second memory bank 112. Data which are read out of the PIM device 100 may be transmitted to an external device through the data I/O pad 132. The read data outputted from the PIM device 100 may be transmitted to a host through the PIM controller 200. When the memory write command is outputted from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs outputted from the MAC command generator 240 may be transmitted to the PIM device 100. The data read operation for the first memory bank 111 and the second memory bank 112 of the PIM device 100 may be performed by the MAC commands MAC_CMDs outputted from the MAC command generator 240, and the MAC arithmetic operation of the MAC operator 120 may also be performed by the MAC commands MAC_CMDs outputted from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

Figure 3:
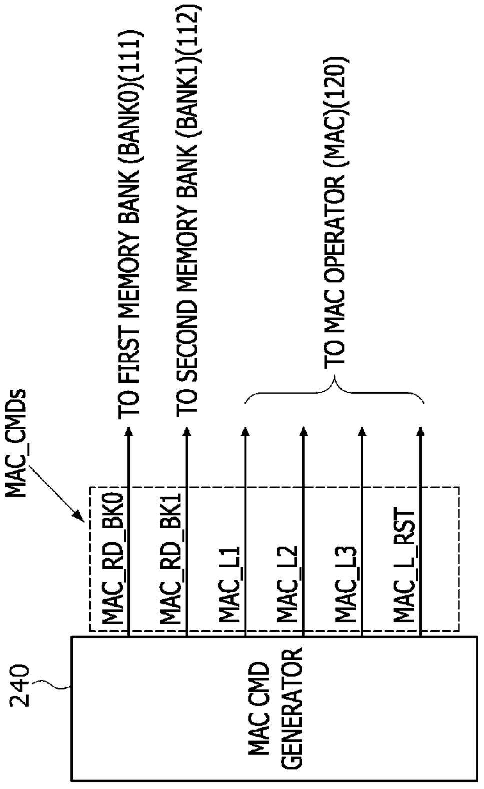
FIG. 3 illustrates MAC commands outputted from a MAC command generator of a PIM controller included in a PIM system according to a first embodiment of the present disclosure.

FIG. 3 illustrates the MAC commands MAC_CMDs outputted from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

Figure 4:
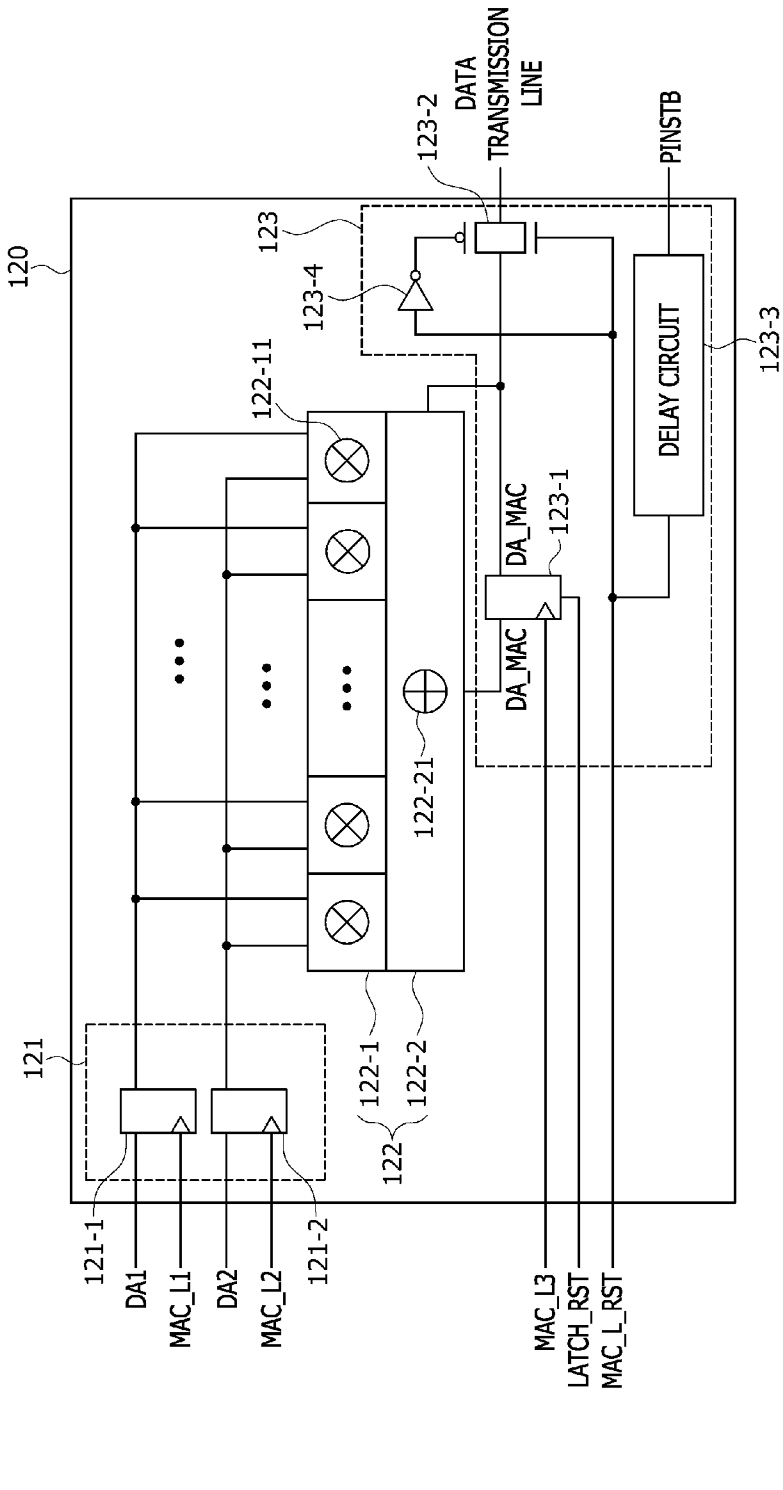
FIG. 4 is a block diagram illustrating an example of a configuration of a MAC operator of a PIM device included in a PIM system according to a first embodiment of the present disclosure.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be inputted to the MAC circuit 122 of the MAC operator 120 after the first data DA1 is inputted to the MAC circuit 122 of the MAC operator 120.

The MAC circuit 122 may perform the MAC arithmetic operation of the first data DA1 and the second data DA2 inputted through the data input circuit 121. The multiplication logic circuit 122-1 of the MAC circuit 122 may include a plurality of multipliers 122-11. Each of the multipliers 122-11 may perform a multiplying calculation of the first data DA1 outputted from the first input latch 121-1 and the second data DA2 outputted from the second input latch 121-2 and may output the result of the multiplying calculation. Bit values constituting the first data DA1 may be separately inputted to the multipliers 122-11. Similarly, bit values constituting the second data DA2 may also be separately inputted to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be inputted to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC outputted from the adder 122-21 disposed at the last stage and previous MAC result data DA_MAC stored in the output latch 123-1 of the data output circuit 123.

The data output circuit 123 may output the MAC result data DA_MAC outputted from the MAC circuit 122 to a data transmission line. Specifically, the output latch 123-1 of the data output circuit 123 may be synchronized with the MAC output latch signal MAC_L3 to latch the MAC result data DA_MAC outputted from the MAC circuit 122 and to output the latched data of the MAC result data DA_MAC. The MAC result data DA_MAC outputted from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST outputted from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

Figure 5:
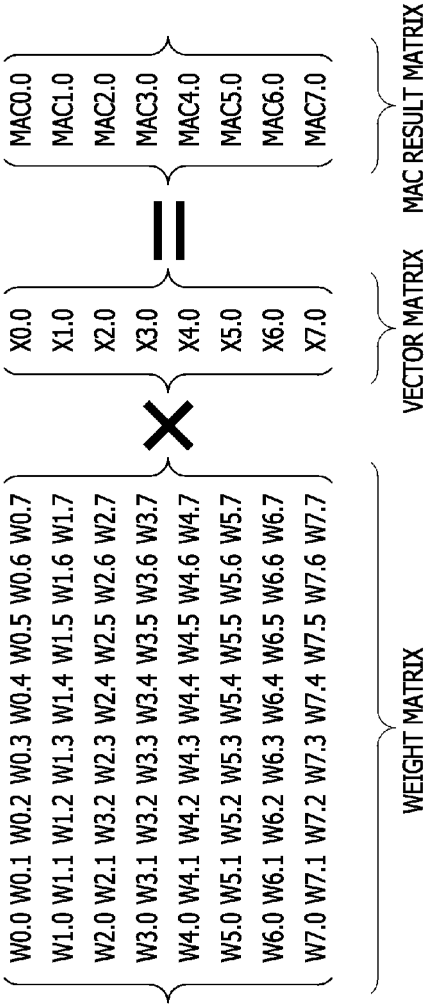
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 inputted to the MAC operator 120 from the first memory bank 111. Elements X0.0, . . . , and X7.0 constituting the vector matrix may correspond to the second data DA2 inputted to the MAC operator 120 from the second memory bank 112. Each of the elements W0.0, . . . , and W7.7 constituting the weight matrix may be represented by a binary stream having a plurality of bit values. In addition, each of the elements X0.0, . . . , and X7.0 constituting the vector matrix may also be represented by a binary stream having a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation) of the weight matrix and the vector matrix illustrated in FIG. 5 may be performed in one of the hidden layers. In a first hidden layer of the plurality of hidden layers, the MAC arithmetic operation may be performed using vector data inputted to the first hidden layer. However, in each of second to last hidden layers among the plurality of hidden layers, the MAC arithmetic operation may be performed using a calculation result of the previous hidden layer as the vector data.

Figure 6:
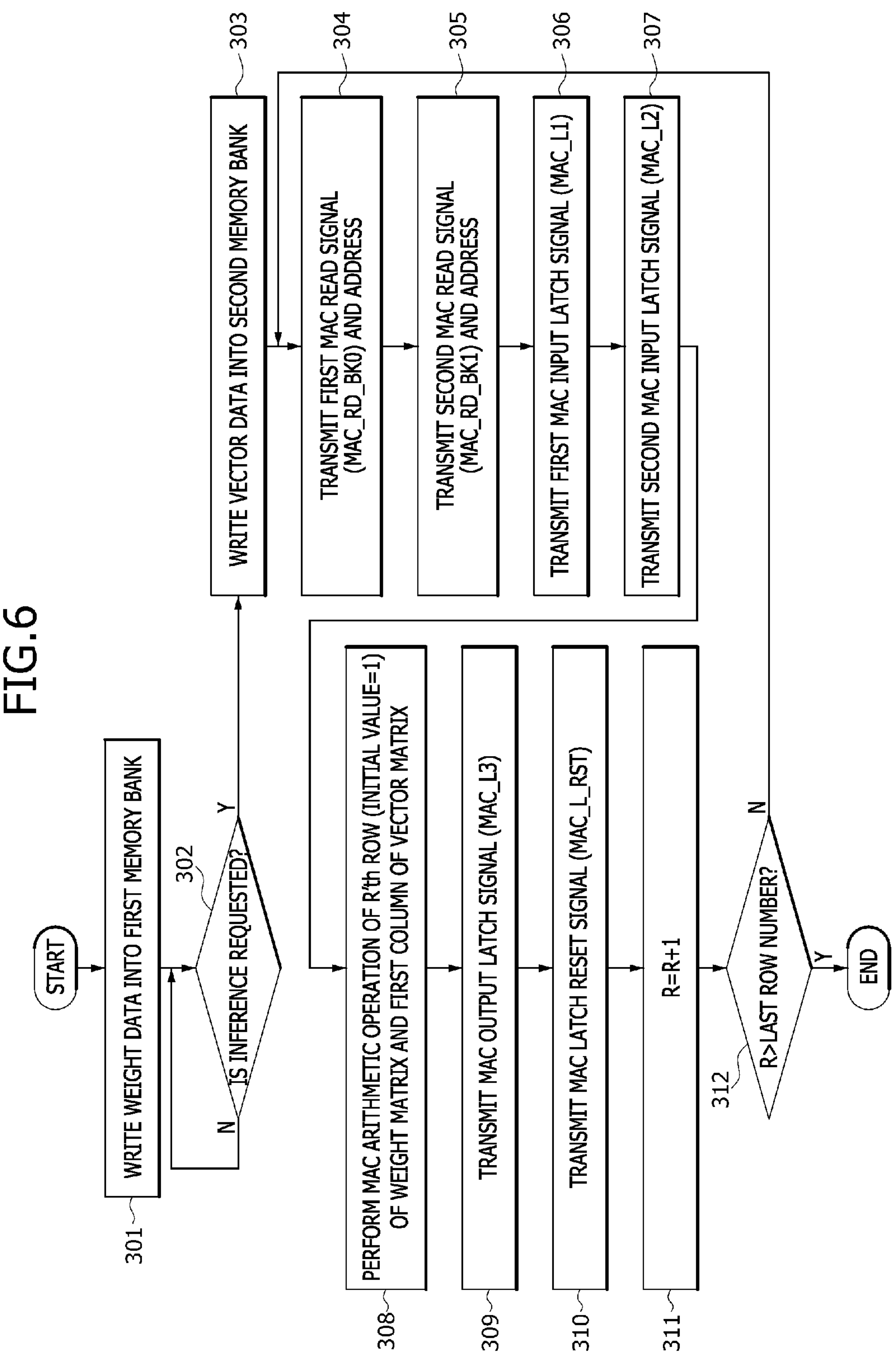
FIG. 6 is a flowchart illustrating processes of the MAC arithmetic operation illustrated in FIG. 5 in a PIM system according to a first embodiment of the present disclosure.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
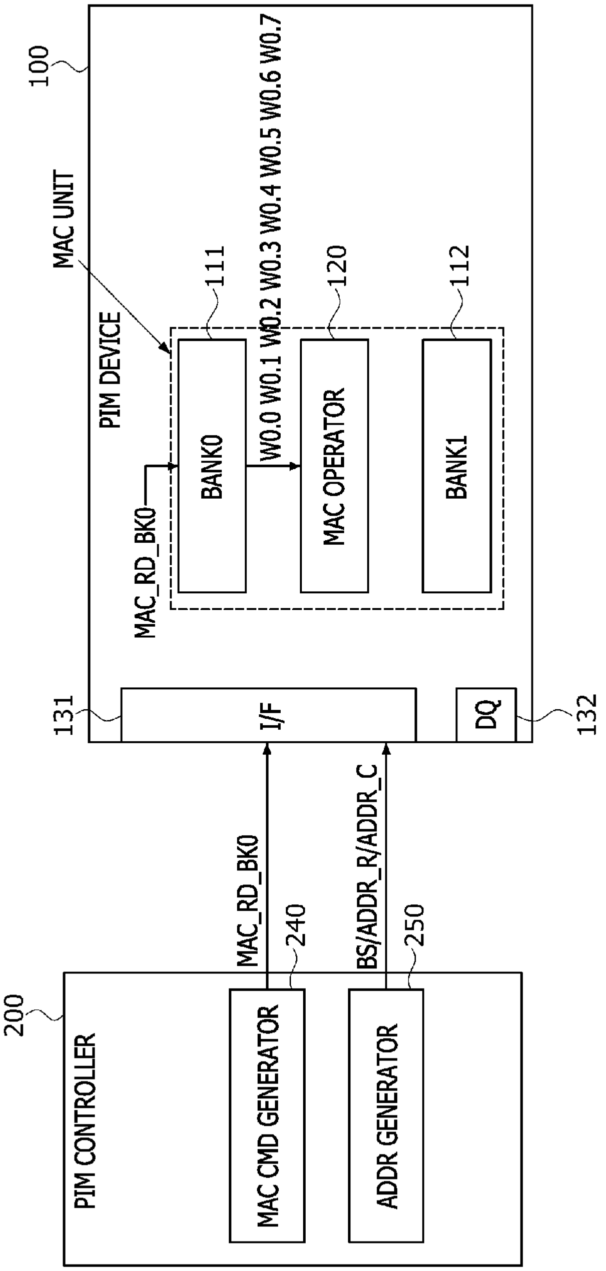
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
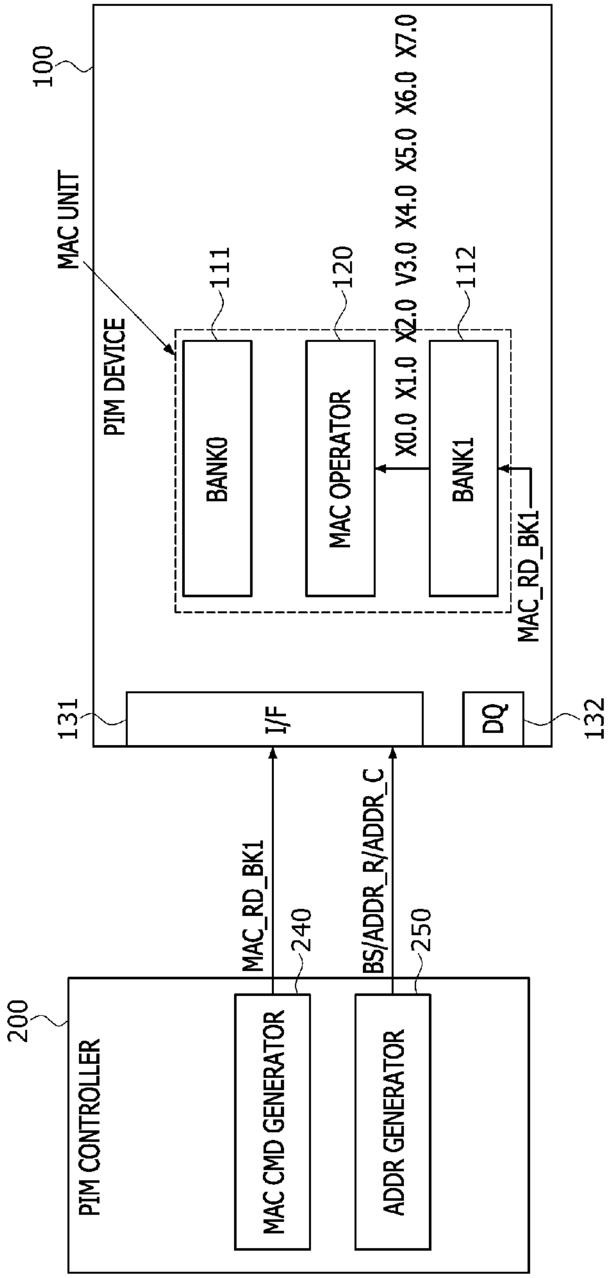

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
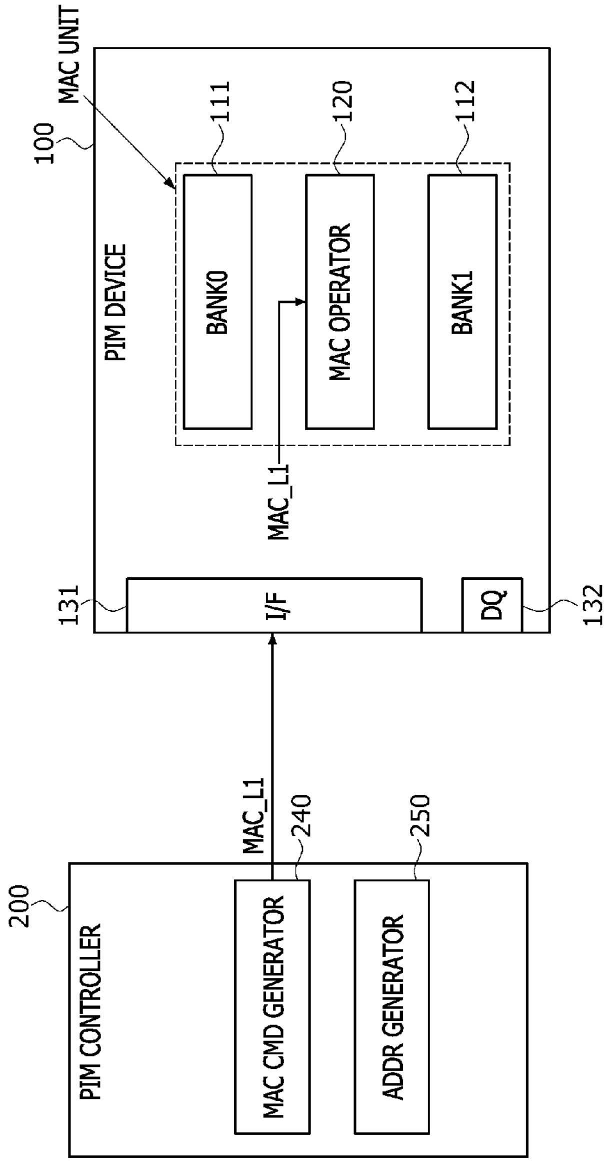
Figure 11:
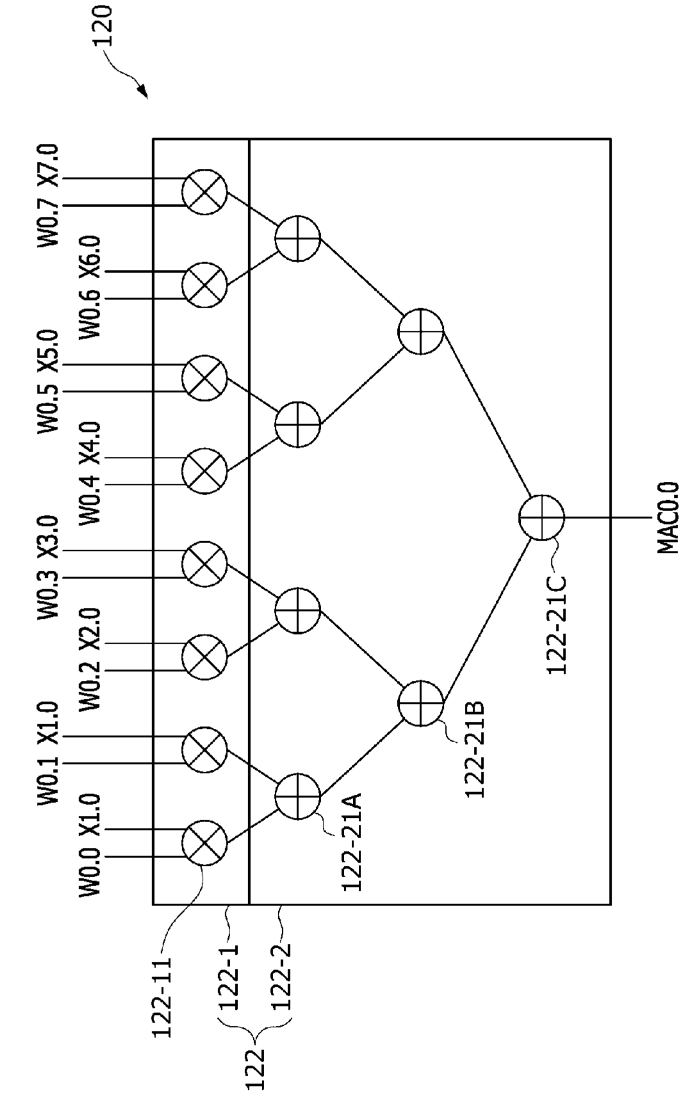

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
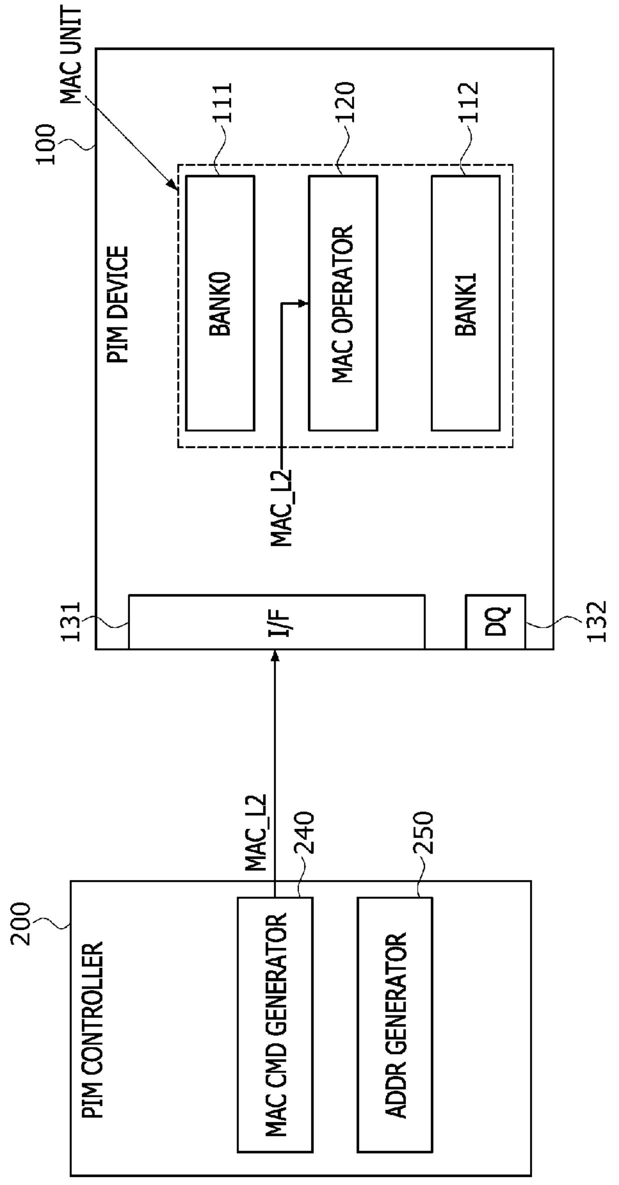

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the '11×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+W0.3*X3.0+W0.4*X4.0+W0.5*X5.0+W0.6*X6.0+W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
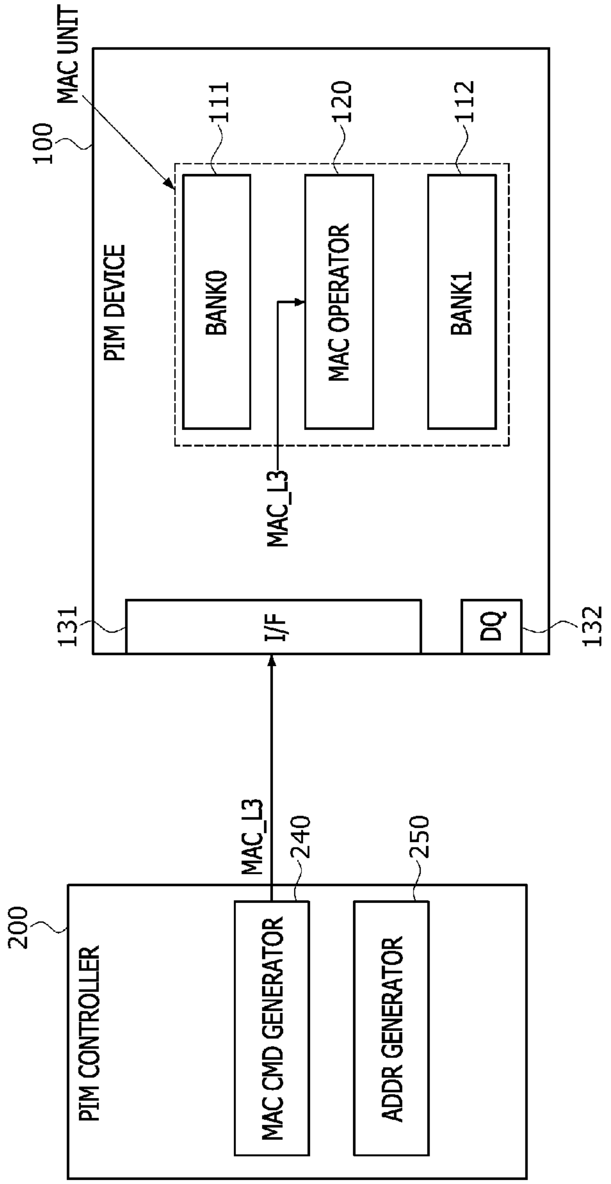

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be outputted from the output latch 123-1 in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 13:
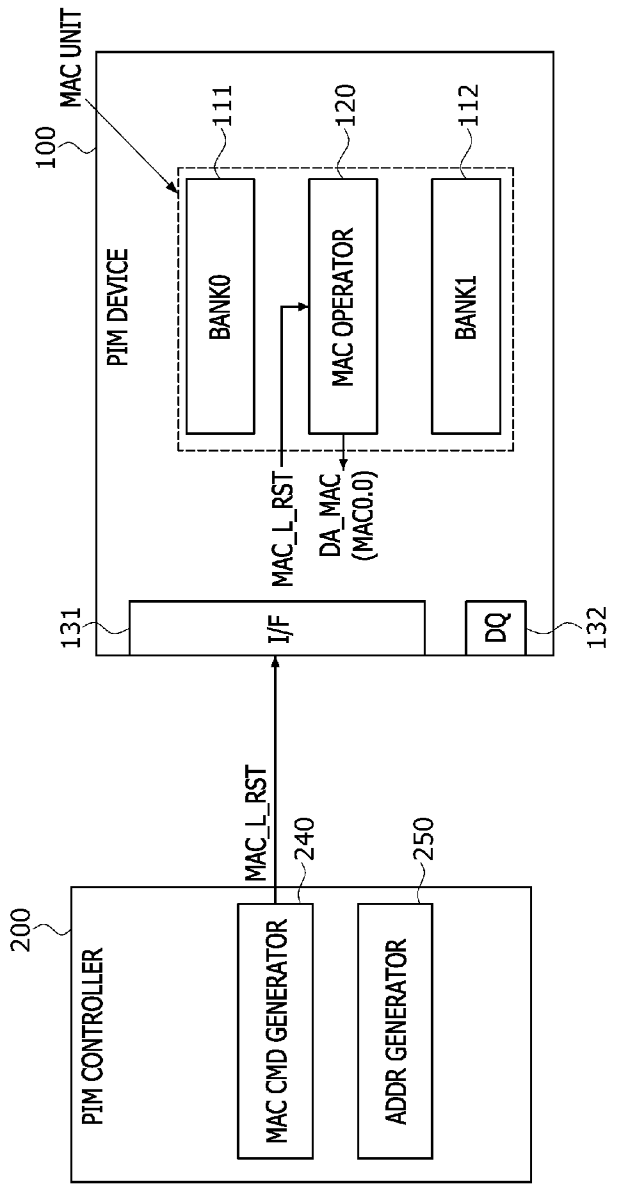

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 outputted from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
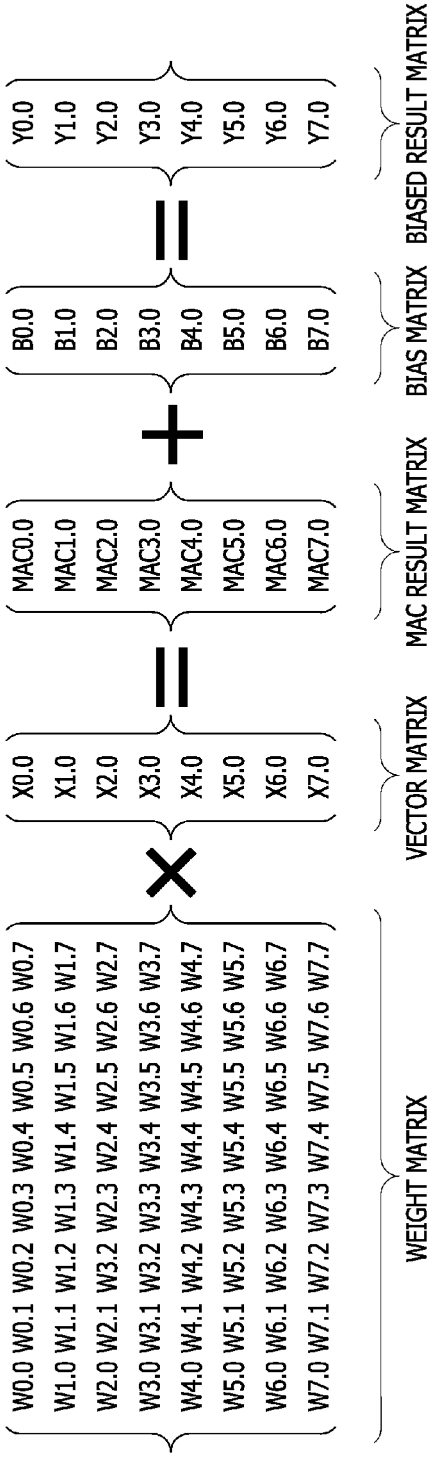
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 15:
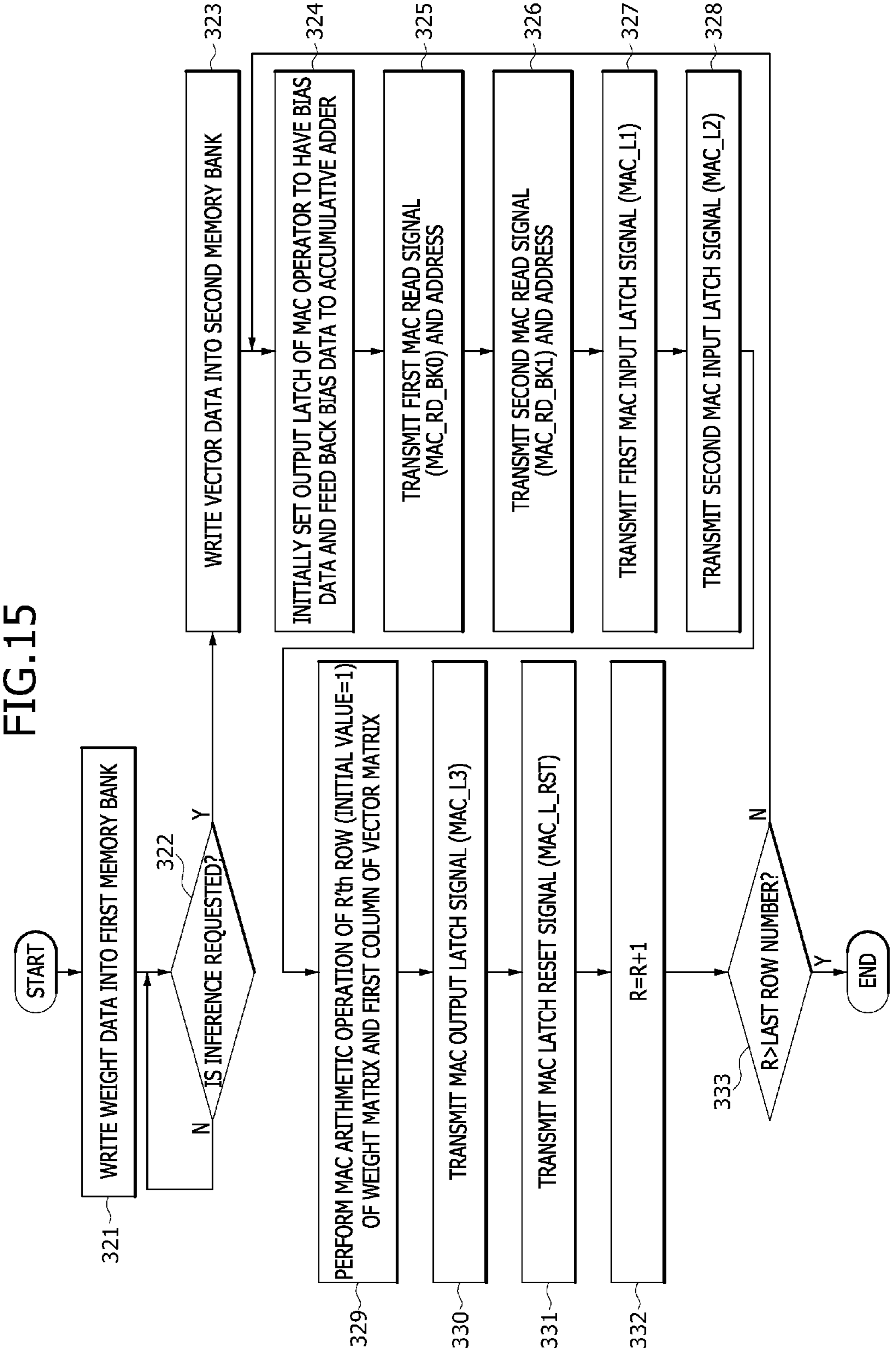
FIG. 15 is a flowchart illustrating processes of the MAC arithmetic operation illustrated in FIG. 14 in a PIM system according to a first embodiment of the present disclosure.
Figure 16:
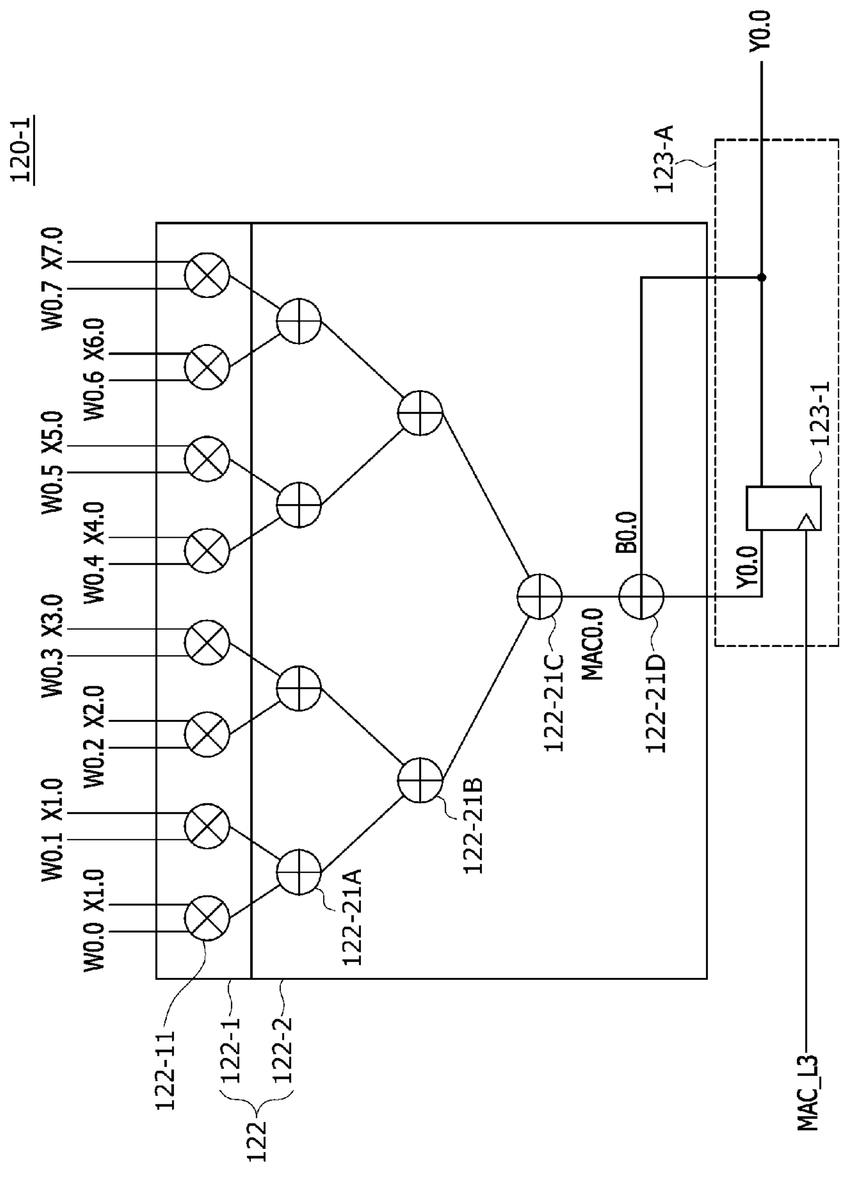
FIG. 16 illustrates an example of a configuration of a MAC operator for performing the MAC arithmetic operation of FIG. 14 in a PIM system according to a first embodiment of the present disclosure.

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 outputted from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time.

Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 outputted from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data 130.0 in the output latch 123-1 initially set at the step 324 may be changed into the bias data 131.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

Figure 17:
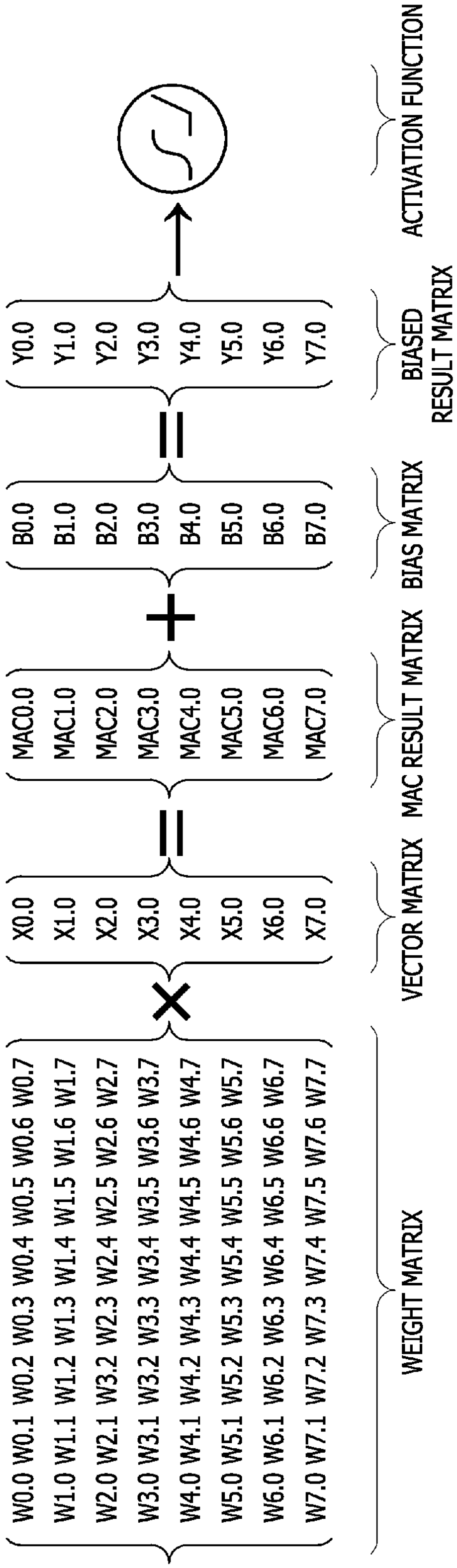
FIG. 17 illustrates yet another example of a MAC arithmetic operation performed in a PIM system according to a first embodiment of the present disclosure.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tan h) function, a rectified linear unit (ReLU) function, a leaky ReLU function, an identity function, and a maxout function.

Figure 18:
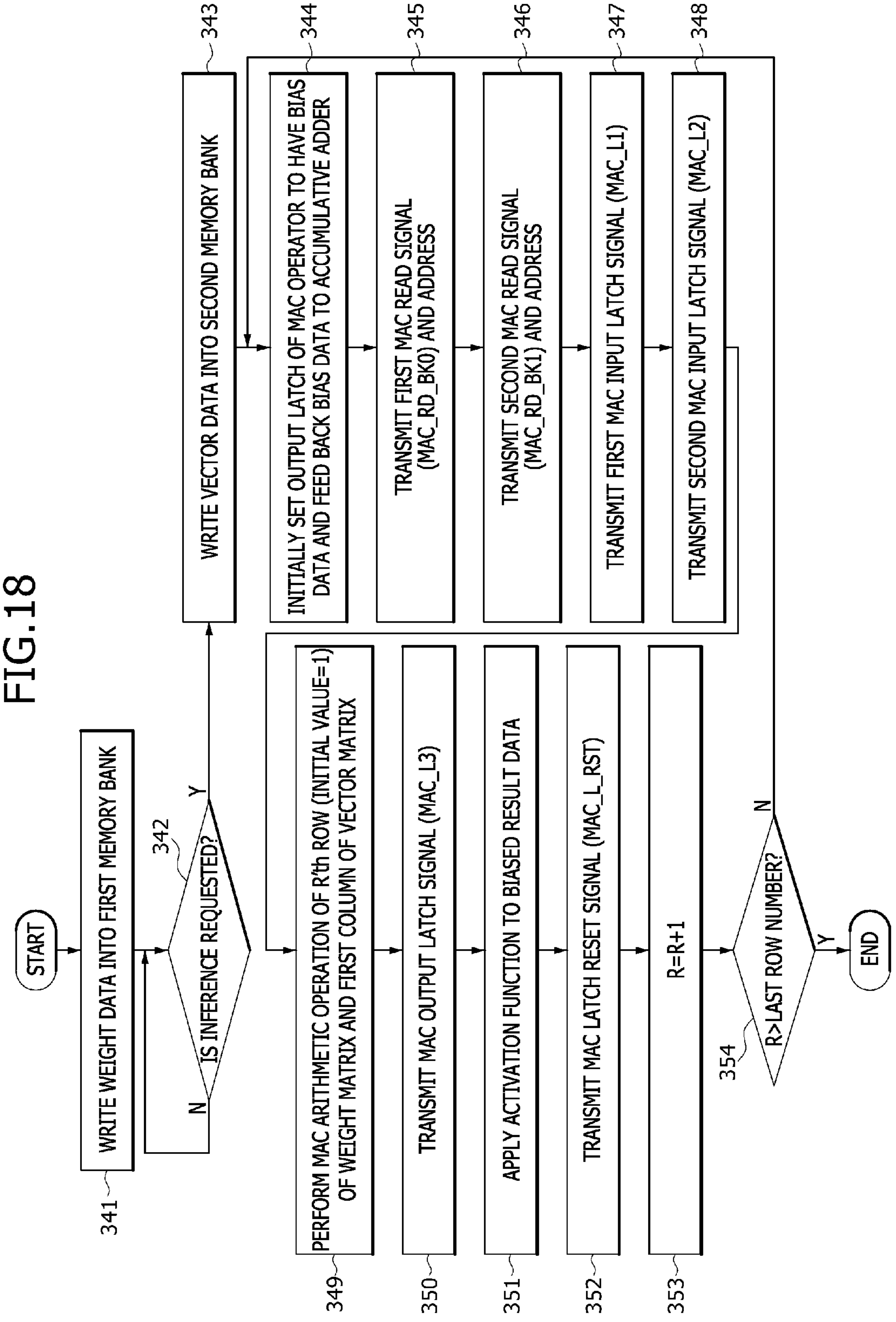
FIG. 18 is a flowchart illustrating processes of the MAC arithmetic operation illustrated in FIG. 17 in a PIM system according to a first embodiment of the present disclosure.
Figure 19:
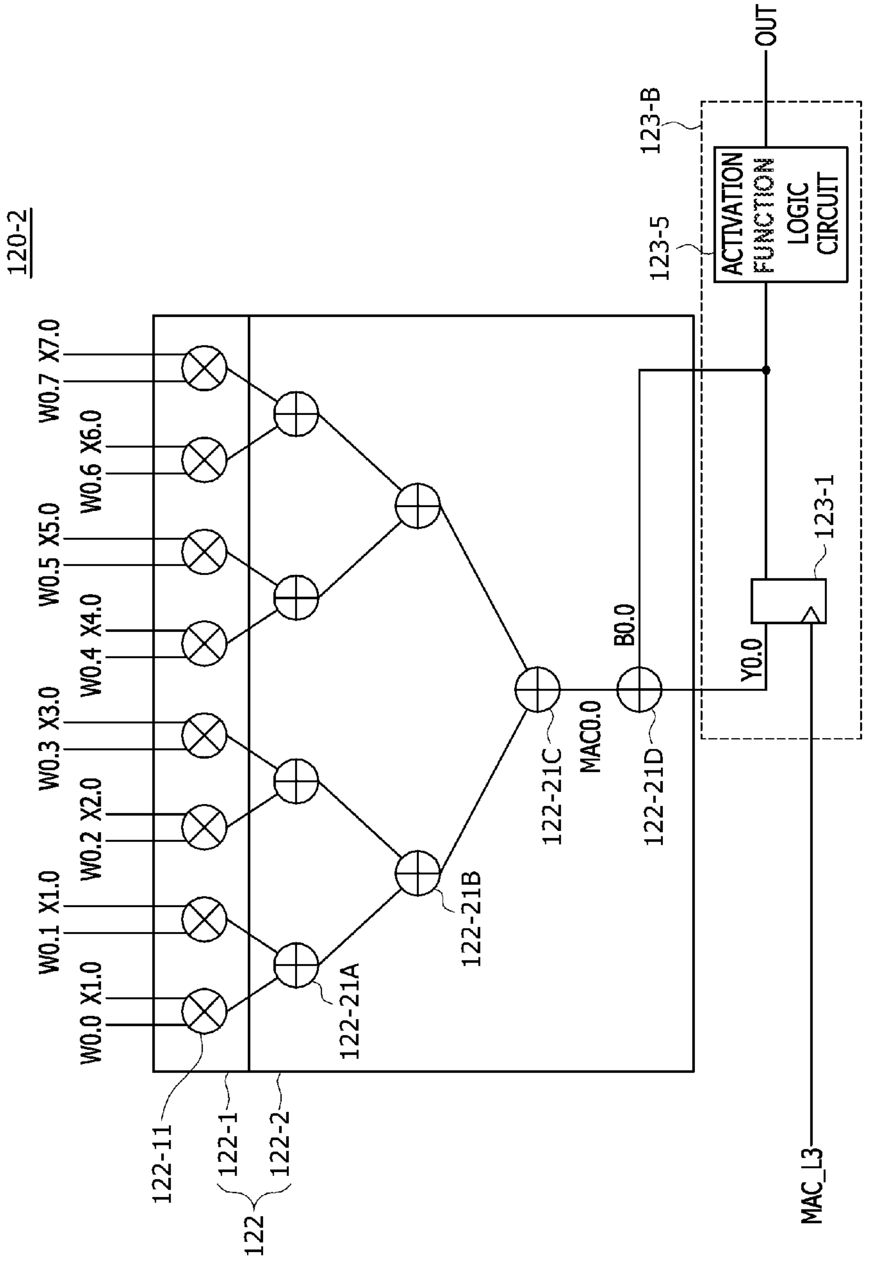
FIG. 19 illustrates an example of a configuration of a MAC operator for performing the MAC arithmetic operation of FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an Rif' row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value outputted from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
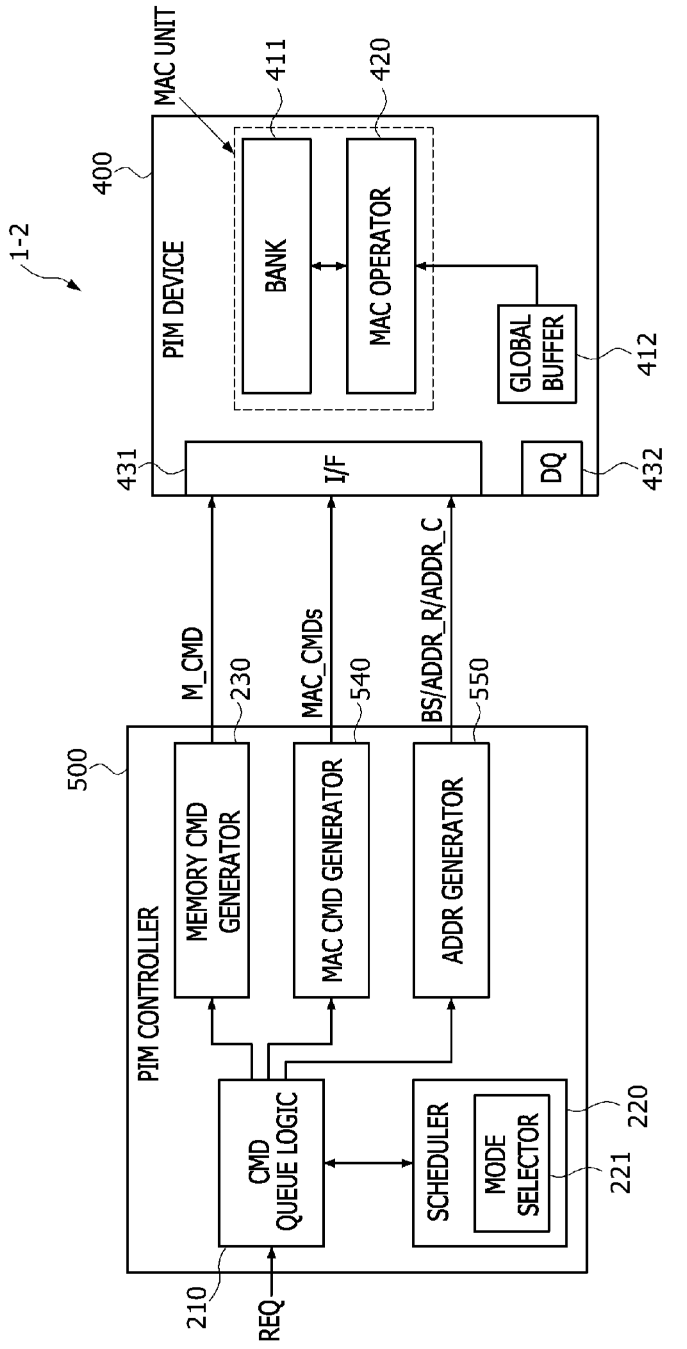
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADD_C from the PIM controller 500 and may decode the column address ADD_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data outputted from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 400 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is outputted from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs outputted from the MAC command generator 540 may be transmitted to the PIM device 400. The data read operation for the memory bank 411 of the PIM device 400 may be performed by the MAC commands MAC_CMDs outputted from the MAC command generator 540, and the MAC arithmetic operation of the MAC operator 420 may also be performed by the MAC commands MAC_CMDs outputted from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
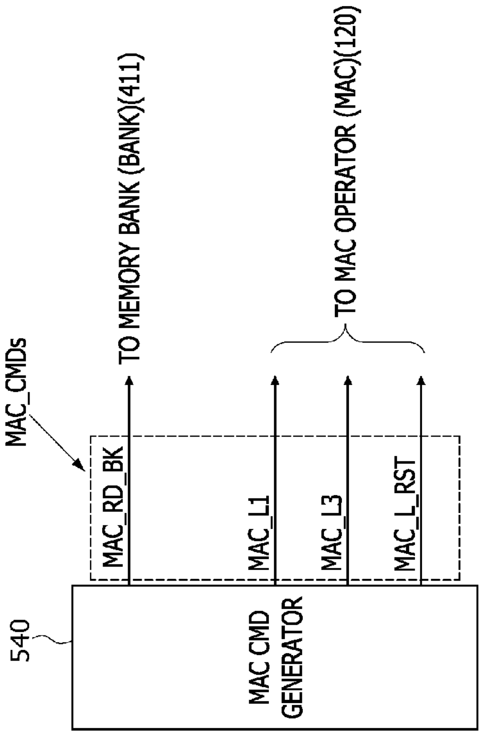
FIG. 21 illustrates MAC commands outputted from a MAC command generator of a PIM controller included in a PIM system according to a second embodiment of the present disclosure.

FIG. 21 illustrates the MAC commands MAC_CMDs outputted from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 500 with fixed time intervals corresponding to the fixed latencies.

Figure 22:
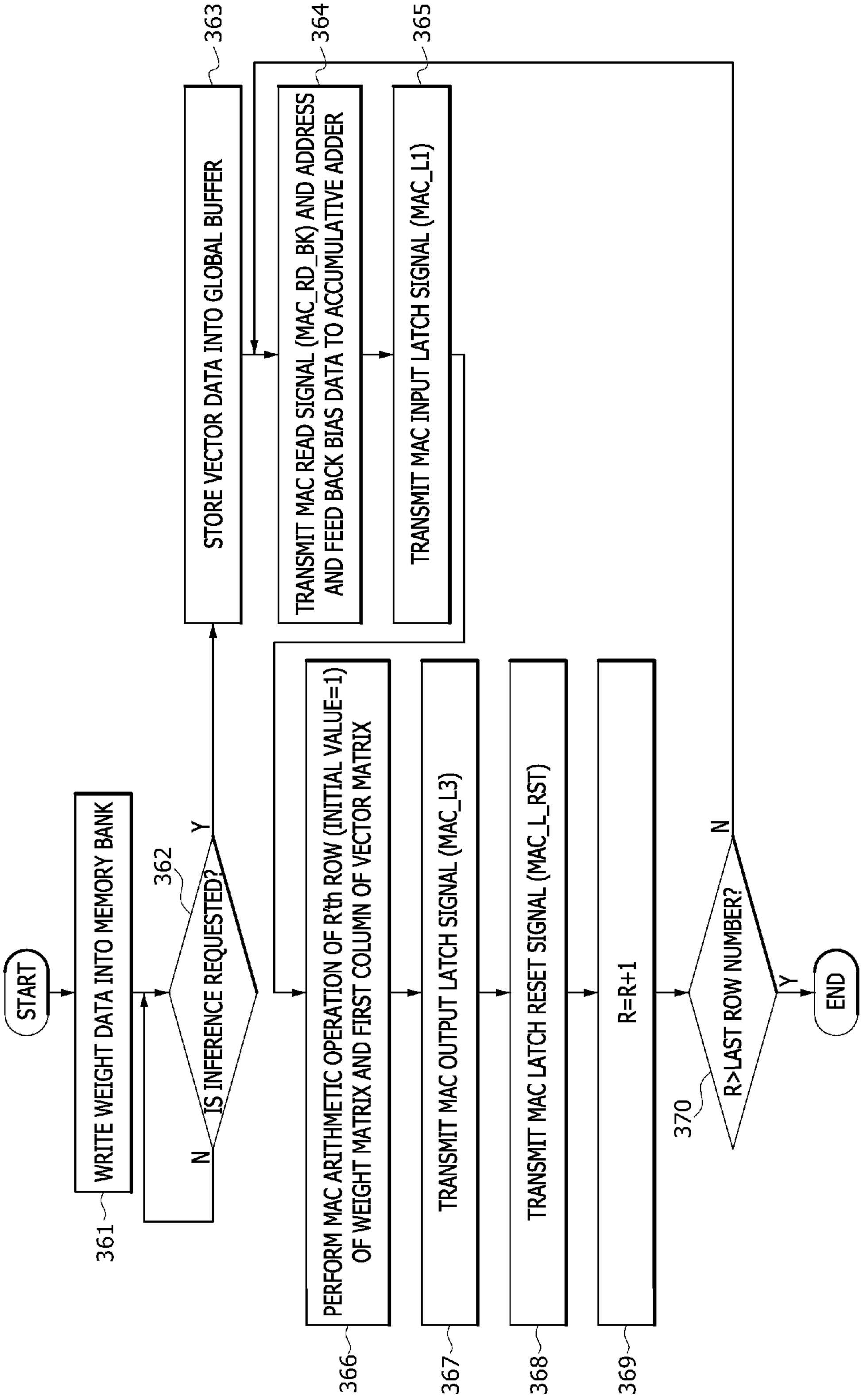
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
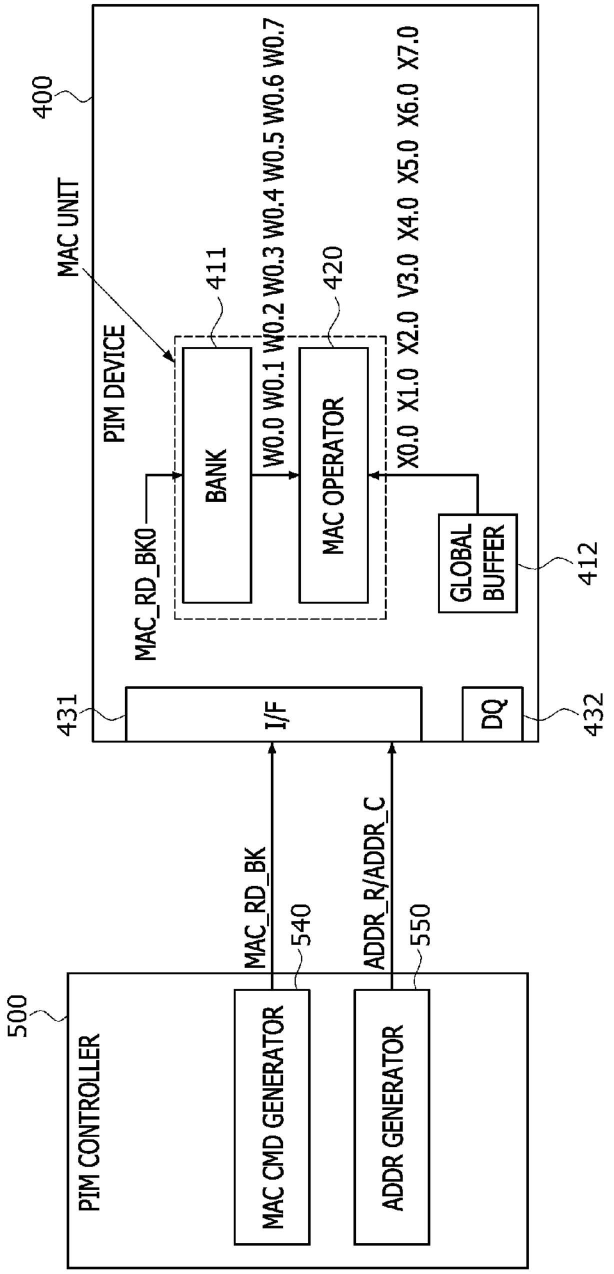
FIGS. 23 to 26 are block diagrams illustrating processes of the MAC arithmetic operation illustrated in FIG. 5 in a PIM system according to a second embodiment of the present disclosure.

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
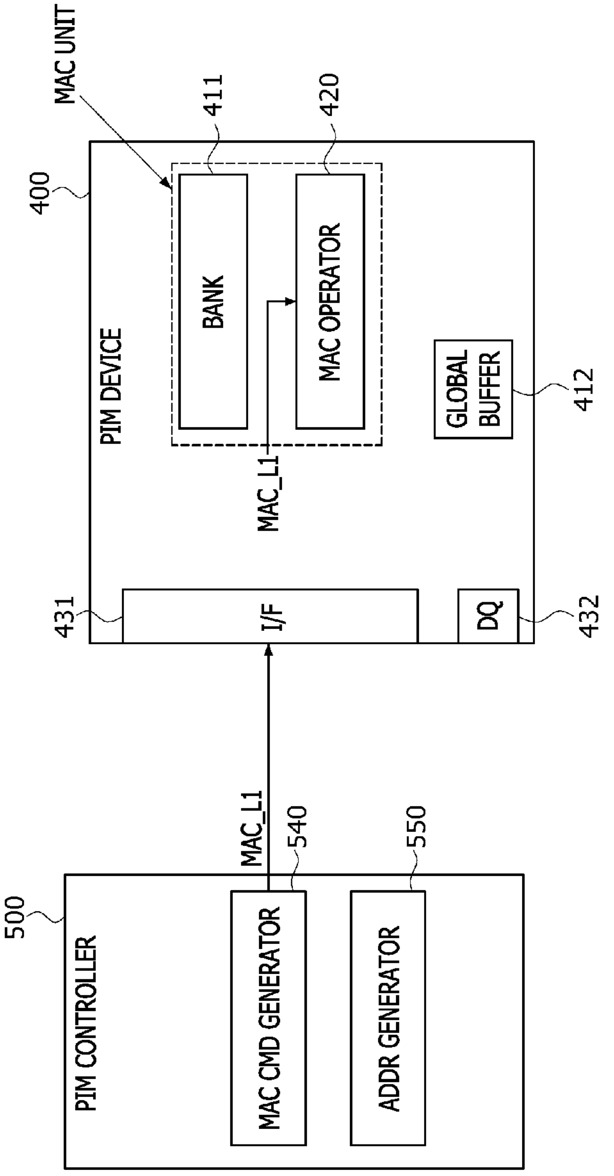

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix having the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

Figure 25:
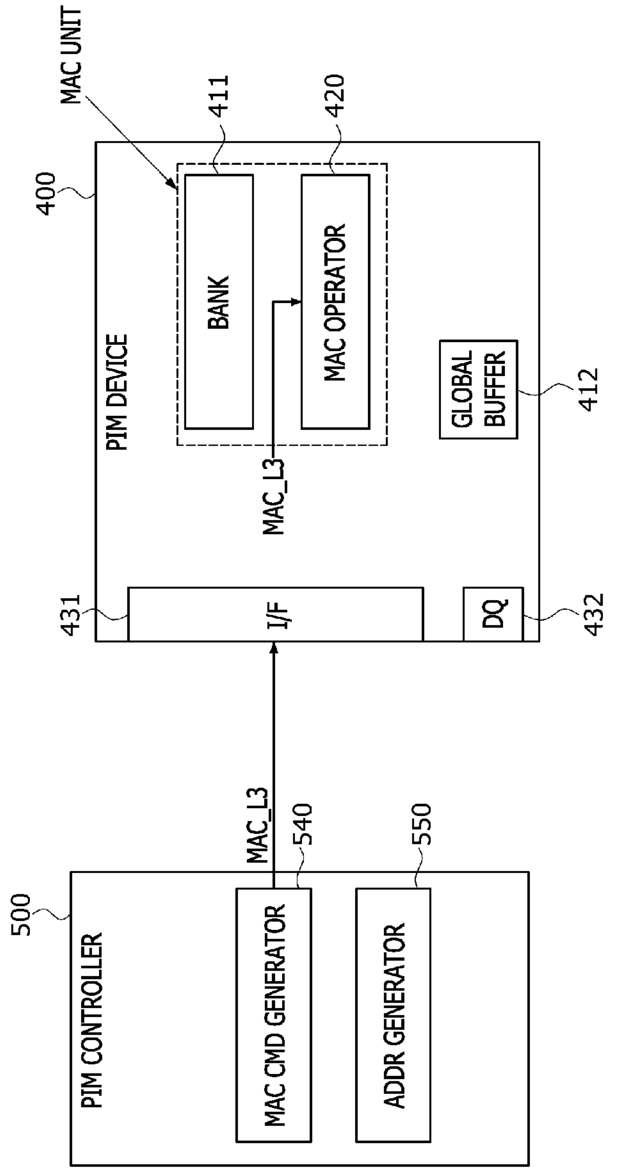

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be outputted from the output latch 123-1 by the output latch operation performed in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 26:
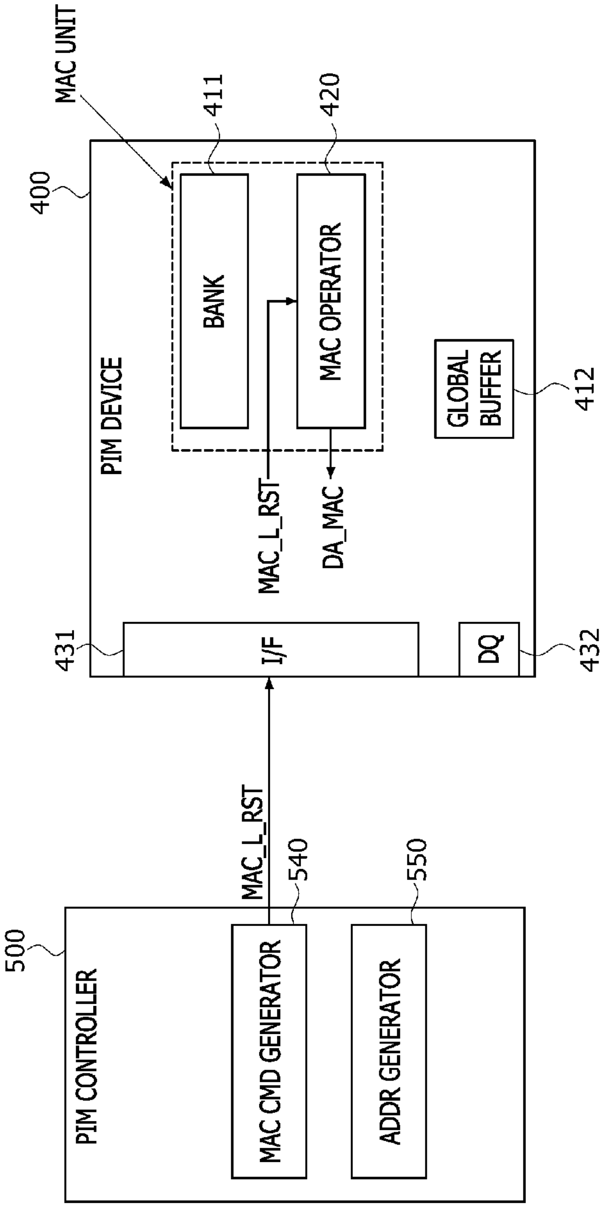

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 outputted from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
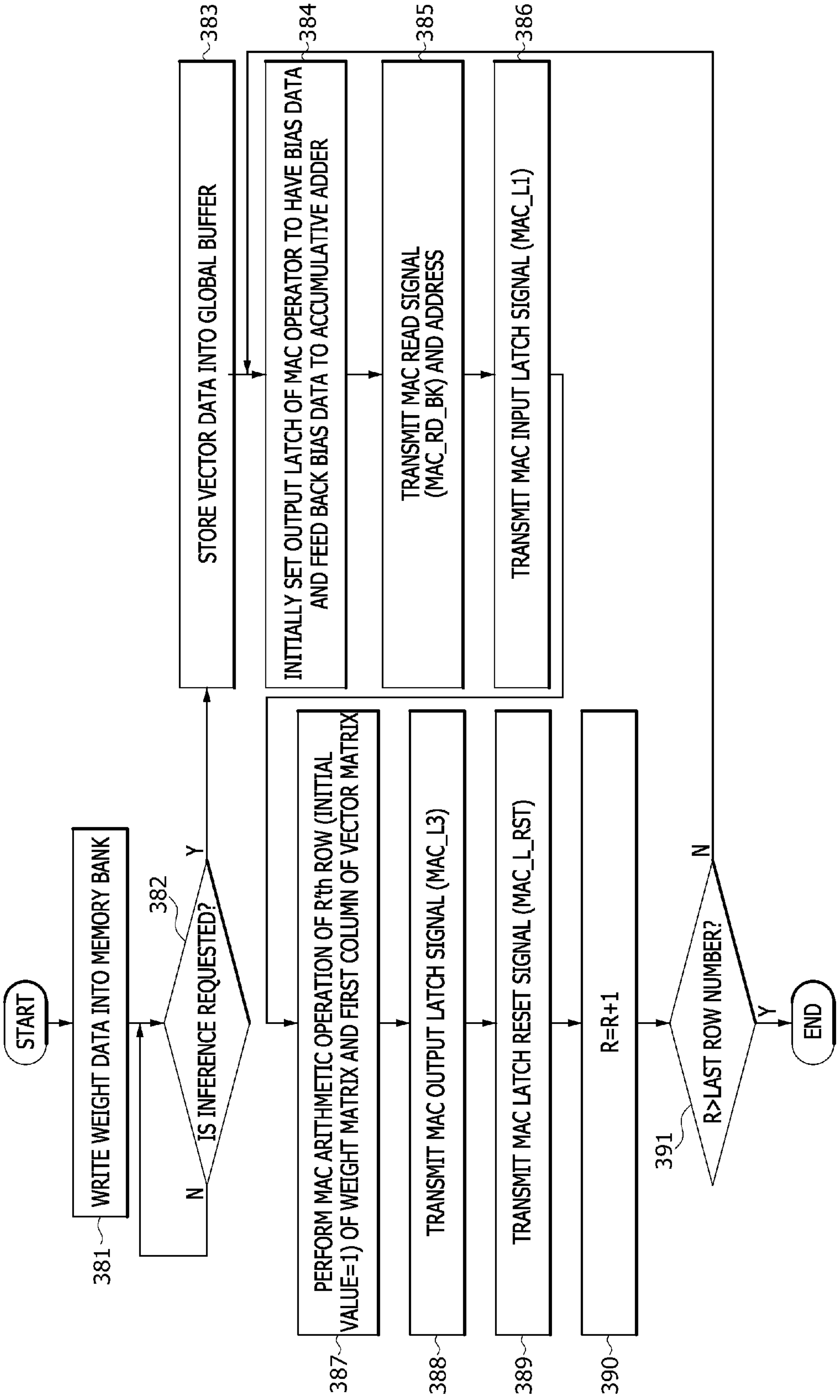
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix.

Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 outputted from the MAC operator 120 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
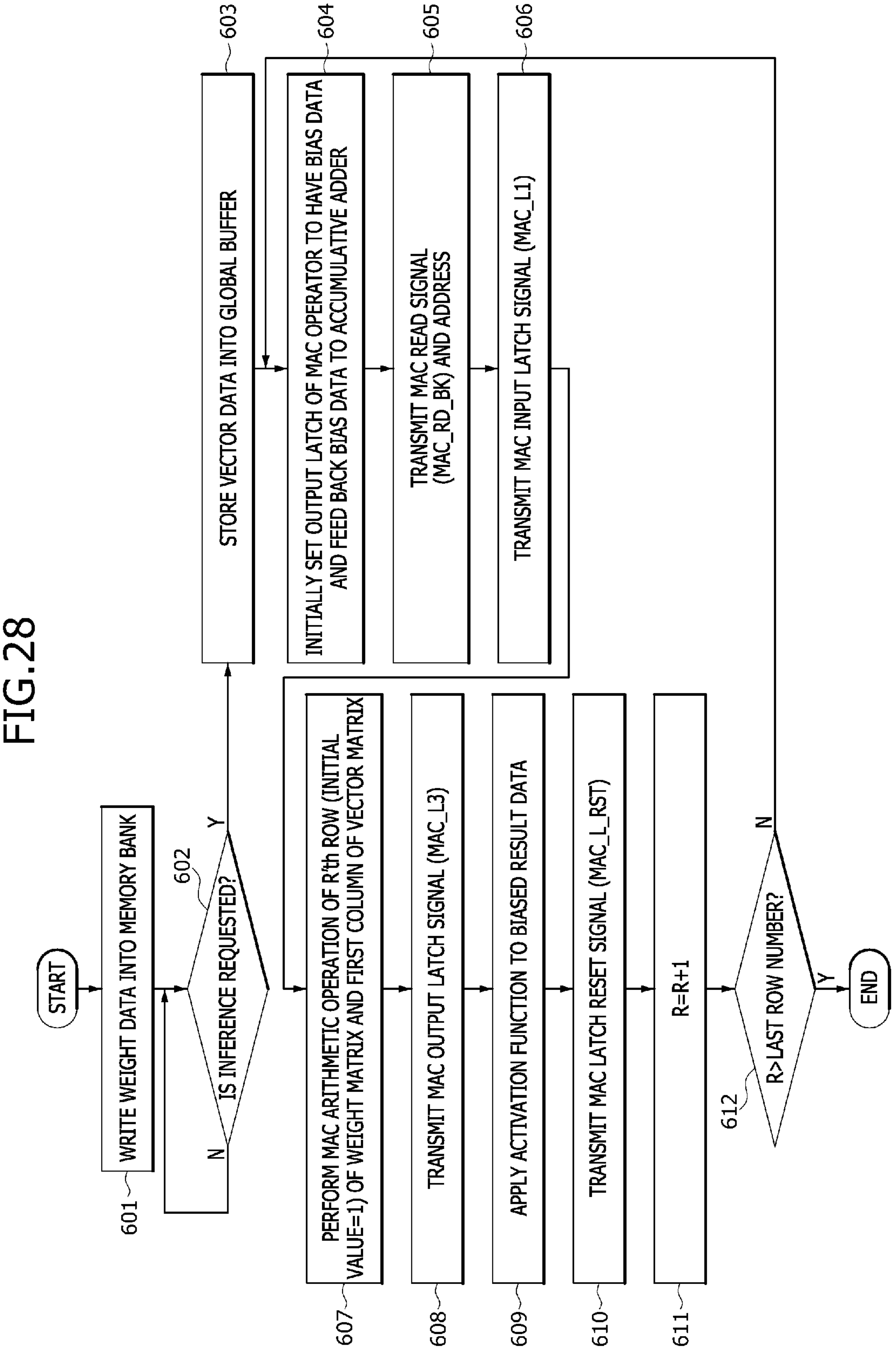
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 607, the MAC circuit 122 of the MAC operator 420 may perform the MAC arithmetic operation of an Rif' row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the activation function logic circuit 123-5, which is illustrated in FIG. 19. At a step 610, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value outputted from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

Figure 29:
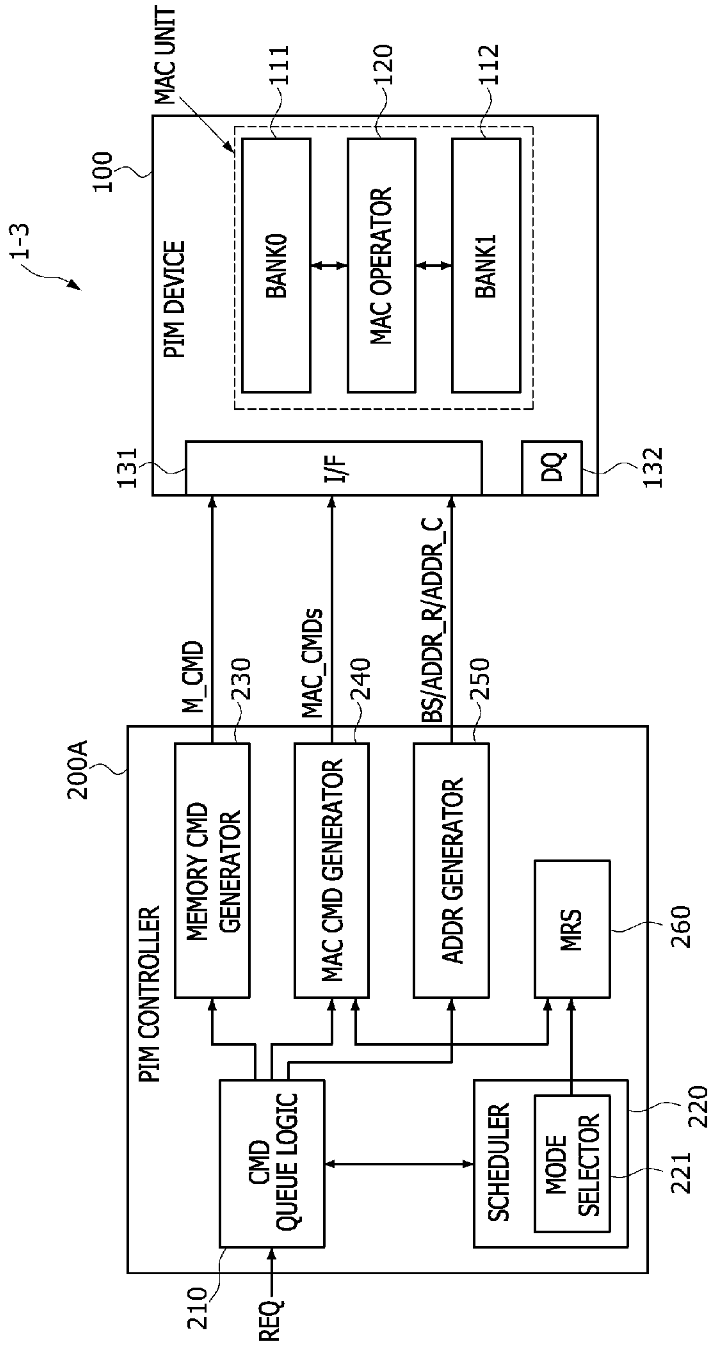
FIG. 29 is a block diagram illustrating a PIM system according to yet another embodiment of the present disclosure.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

Figure 30:
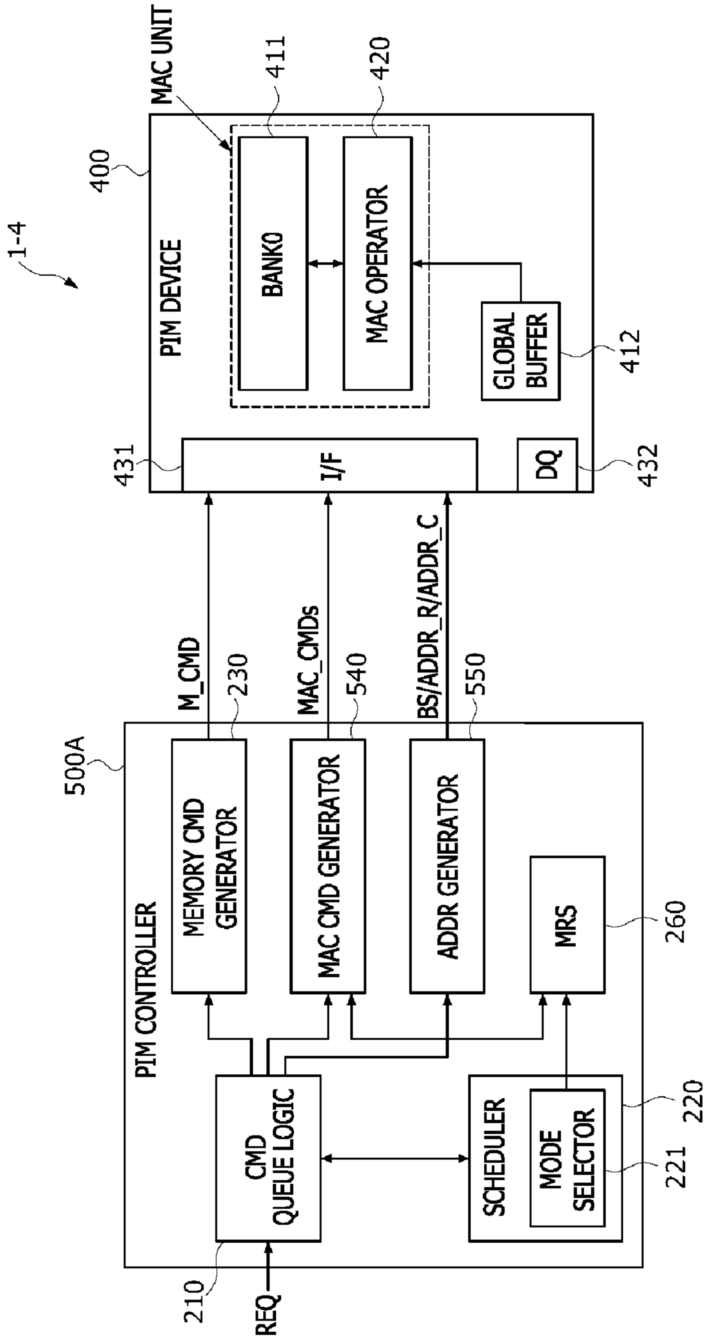
FIG. 30 is a block diagram illustrating a PIM system according to still another embodiment of the present disclosure.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

Figure 31:
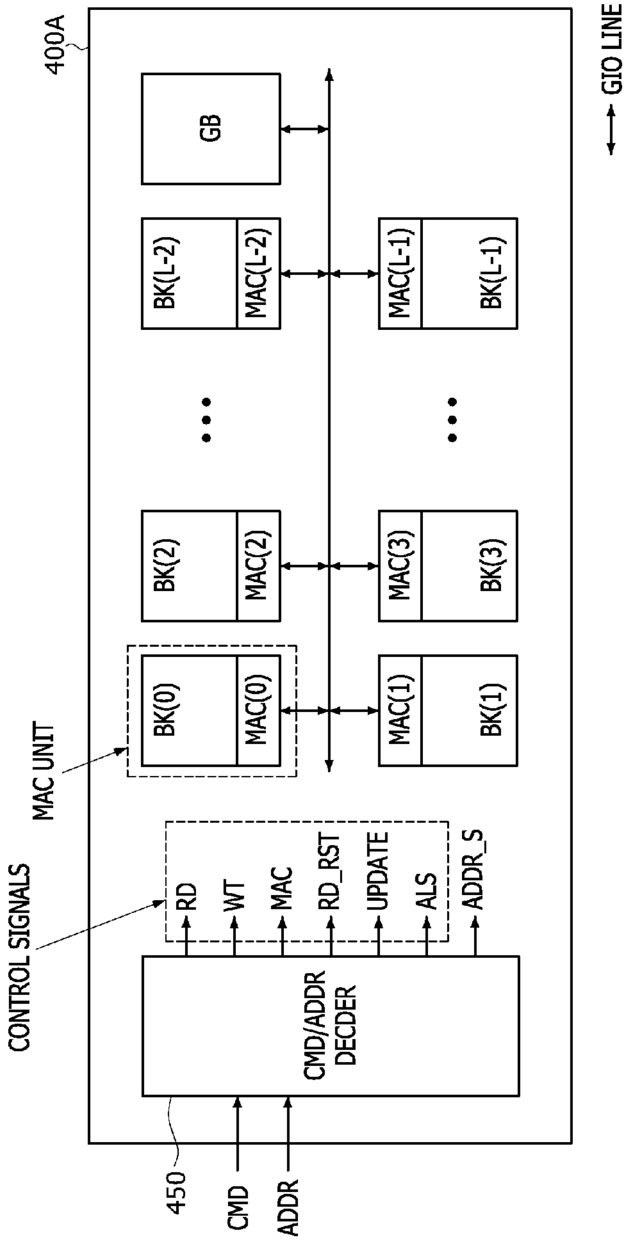
FIG. 31 is a block diagram illustrating a PIM device according to an embodiment of the present disclosure.

FIG. 31 is a block diagram illustrating a PIM device 400A according to an embodiment of the present disclosure. Referring to FIG. 31, the PIM device 400A may include "L"-number of memory banks (i.e., first to $L^{th}$ memory banks BK(0)~BK(L−1)), a global buffer GB, "L"-number of MAC operators (i.e., first to $L^{th}$ MAC operators MAC(0)~MAC(L−1)), and a command/address decoder 450 (where, "L" is a natural number which is equal to or greater than two). In an embodiment, the first to $L^{th}$ memory banks BK(0)~BK(L−1) may correspond to the first storage region of the data storage region 11 included in the PIM device 10 illustrated in FIG. 1, and the global buffer GB may correspond to the second storage region of the data storage region 11 included in the PIM device 10 illustrated in FIG. 1. The first to $L^{th}$ MAC operators MAC(0)~MAC(L−1) may constitute the MAC operator 120 of the PIM device 10 illustrated in FIG. 1.

In an embodiment, the PIM device 400 of the PIM system 1-2 described with reference to FIG. 20 may be replaced with the PIM device 400A according to the present embodiment. The first to $L^{th}$ memory banks BK(0)~BK(L−1) and the first to $L^{th}$ MAC operators MAC(0)~MAC(L−1) may constitute first to $L^{th}$ MAC units. For example, the first memory bank BK(0) and the first MAC operator MAC(0) may constitute the first MAC unit. The MAC operator MAC constituting a certain MAC unit may receive weight data used for the MAC arithmetic operation from the memory bank BK constituting the certain MAC unit. For example, the first MAC operator MAC(0) may receive the weight data from the first memory bank BK(0).

The global buffer GB may be configured to output vector data used for the MAC arithmetic operation to the first to $L^{th}$ MAC operators MAC(0)~MAC(L−1). In order that the global buffer GB outputs the vector data to the first to $L^{th}$ MAC operators MAC(0)~MAC(L−1), the global buffer GB may receive the vector data through a controller according to a request outputted from a host and may store the vector data therein. In an embodiment, the vector data may be transmitted from the global buffer GB to the MAC operators MAC(0)~MAC(L−1) through a global input/output (GIO) line. The vector data outputted from the global buffer GB may be transmitted to all of the MAC operators MAC(0)~MAC(L−1).

The command/address decoder 450 may receive a command CMD and an address ADDR from an external device such as a controller. The command/address decoder 450 may decode the command CMD and the address ADDR to generate and output control signals for controlling operations of the memory banks BK(0)~BK(L−1), the global buffer GB, and the MAC operators MAC(0)~MAC(L−1) as well as an address signal ADDR_S. The control signals may include a read signal RD, a write signal WT, a MAC signal MAC, a result read signal RD_RST, an update signal UPDATE, and an accumulation latch selection signal ALS. The read signal RD may control a read operation of the memory banks BK(0)~BK(L−1) and the global buffer GB, and the write signal WT may control a write operation of the memory banks BK(0)~BK(L−1) and the global buffer GB. The MAC signal MAC may control the MAC arithmetic operation of the MAC operators MAC(0)~MAC(L−1). The result read signal RD_RST may control an operation for outputting MAC result data of the MAC operators MAC(0)~MAC(L−1). The update signal UPDATE and the accumulation latch selection signal ALS may control a latch operation of an accumulator included in each of the MAC operators MAC(0)~MAC(L−1).

Figure 32:
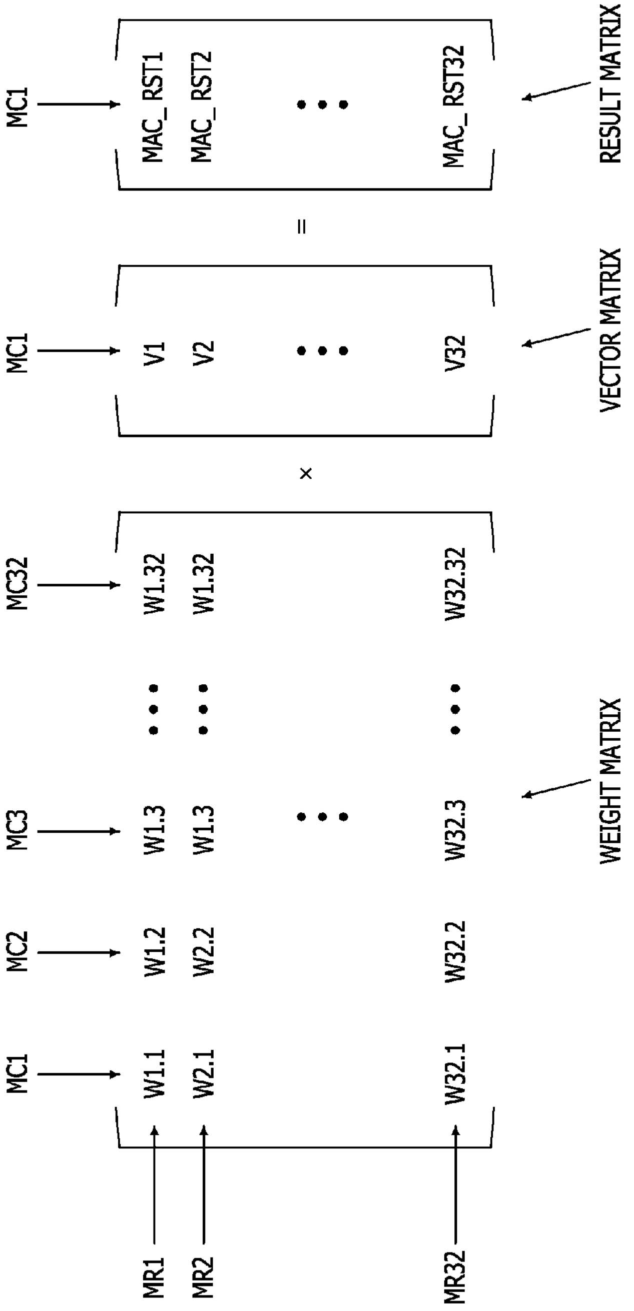
FIG. 32 illustrates an example of a matrix multiplying calculation executed by the PIM device illustrated in FIG. 31.

FIG. 32 illustrates an example of a matrix multiplying calculation executed by the PIM device 400A illustrated in FIG. 31. The matrix multiplying calculation according to the present embodiment may be different from the matrix multiplying calculation described with reference to FIG. 5 in terms of the number of MAC operators executing the matrix multiplying calculation. However, fundamentally, the matrix multiplying calculation described with reference to FIG. 5 may be equally applicable to the matrix multiplying calculation according to the present embodiment.

Specifically, referring to FIG. 32, the MAC operators MAC(0)~MAC(L−1) may perform the matrix multiplying calculation of a weight matrix and a vector matrix to generate a result matrix corresponding to a result of the MAC arithmetic operation. Hereinafter, it may be assumed that the weight matrix has 32 rows and 32 columns. That is, the weight matrix may have 32 matrix rows (i.e., first to $32^{nd}$ matrix rows MR1~MR32) and 32 matrix columns (i.e., first to $32^{nd}$ matrix columns MC1~MC32). Accordingly, the weight matrix have "32×32"-number of elements W1.1, . . . , W1.32, . . . , W32.1, . . . , and W32.32. The elements W1.1, . . . , W1.32, . . . , W32.1, . . . , and W32.32 of the weight matrix may correspond to weight data. The vector matrix may have 32 elements V1, . . . , and V32. The elements V1, . . . , and V32 of the vector matrix may correspond to vector data. The result matrix may have 32 elements MAC_RST1, . . . , and MAC_RST32. The elements MAC_RST1, . . . , and MAC_RST32 of the result matrix may correspond to MAC result data. Hereinafter, it may be assumed that the terms "elements of the weight matrix", "elements of the vector matrix", and "elements of the result matrix" have the same meanings, respectively, as the terms "weight data", "vector data", and "MAC result data". In an embodiment, each of the weight data W1.1~W32.32 and the vector data V1~V32 may be a multibit binary stream, for example, a 16-bit binary stream.

Figure 33:
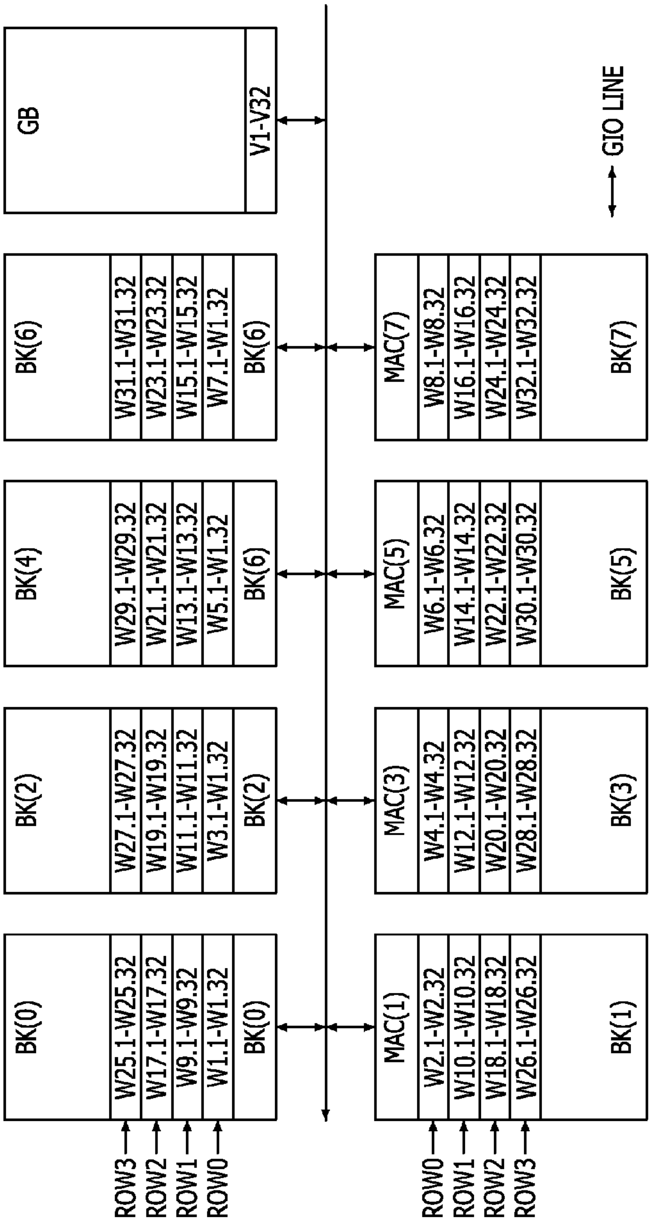
FIG. 33 illustrates an example of an operation for storing weight data included in a weight matrix illustrated in FIG. 32 into memory banks of the PIM device illustrated in FIG. 31.

FIG. 33 illustrates a process for storing the weight data W1.1~W32.32 included in the weight matrix illustrated in FIG. 32 into the memory banks BK(0)~BK(7) of the PIM device 400A illustrated in FIG. 31. Hereinafter, it may be assumed that the PIM device 400A includes eight memory banks, for example, first to eighth memory banks BK(0)~BK(7). Referring to FIGS. 32 and 33, the weight data W1.1~W32.32 may be stored into the first to eighth memory banks BK(0)~BK(7) in units of matrix rows MR. In the present embodiment, the weight data arrayed in one of the first to $32^{nd}$ matrix rows MR1~MR32 may be stored into any one of rows ROW in the first to eighth memory banks BK(0)~BK(7). However, the present embodiment may be merely an example of the present disclosure, and the present disclosure is not limited to the present embodiment. Accordingly, in some other embodiments, the weight data arrayed in two or more rows of the first to $32^{nd}$ matrix rows MR1~MR32 may be stored into any one of rows ROW in the first to eighth memory banks BK(0)~BK(7).

Specifically, the weight data W1.1~W1.32, . . . , and W8.1~W8.32 arrayed in respective ones of the first to eighth matrix rows MR1~MR8 may be stored into first rows ROW0 of the first to eighth memory banks BK(0)~BK(7), respectively. For example, the weight data W1.1~W1.32 in the first matrix row MR1 may be stored into the first row ROW0 of the first memory bank BK(0), and the weight data W2.1~W2.32 in the second matrix row MR2 may be stored into the first row ROW0 of the second memory bank BK(1). In addition, the weight data W3.1~W3.32 in the third matrix row MR3 may be stored into the first row ROW0 of the third memory bank BK(2), and the weight data W4.1~W4.32 in the fourth matrix row MR4 may be stored into the first row ROW0 of the fourth memory bank BK(3). Similarly, the weight data W8.1~W8.32 in the eighth matrix row MR8 may be stored into the first row ROW0 of the eighth memory bank BK(7).

The weight data W9.1~W32.32 arrayed in the ninth to $32^{nd}$ matrix rows MR9~MR32 of the weight matrix may also be stored into the first to eighth memory banks BK(0)~BK(7) in the same way as the weight data W1.1~W8.32 are stored into the first to eighth memory banks BK(0)~BK(7). Thus, the weight data W9.1~W9.32, . . . , and W16.1~W16.32 arrayed in the ninth to sixteenth matrix rows MR9~MR16 of the weight matrix may be stored into second rows ROW1 of the first to eighth memory banks BK(0)~BK(7), and the weight data W17.1~W17.32, . . . , and W24.1~W24.32 arrayed in the $17^{th}$ to $24^{th}$ matrix rows MR17~MR24 of the weight matrix may be stored into third rows ROW2 of the first to eighth memory banks BK(0)~BK(7). In addition, the weight data W25.1~W25.32, . . . , and W32.1~W32.32 arrayed in the $25^{th}$ to $32^{nd}$ matrix rows MR25~MR32 of the weight matrix may be stored into fourth rows ROW3 of the first to eighth memory banks BK(0)~BK(7).

The MAC arithmetic operation performed by each of the first to eighth MAC operators MAC(0)~MAC(7) of the PIM device 400A may include the multiplying calculations performed by the multipliers 122-11 included in FIG. 4. Thus, a size of the weight data which are capable of being transmitted from the first to eighth memory banks BK(0)~BK(7) to the first to eighth MAC operators MAC(0)~MAC(7) may be limited by a unit MAC arithmetic amount of each of the first to eighth MAC operators MAC(0)~MAC(7). Similarly, a size of the vector data which are capable of being transmitted from the global buffer GB to the first to eighth MAC operators MAC(0)~MAC(7) may also be limited by the unit MAC arithmetic amount of each of the first to eighth MAC operators MAC(0)~MAC(7). The term "unit MAC arithmetic amount" may be defined as a size (i.e., the number of bits) of the weight data (or the vector data) which are capable of being processed by the multipliers included in each of the MAC operators BK(0)~BK(7). The unit MAC arithmetic amount may be less than the total number of bits of all of the weight data stored in any one of the rows included in each of the memory banks BK(0)~BK(7). In such a case, the MAC arithmetic operation for the weight data stored in first, second, third, or fourth rows ROW0, ROW1, ROW2, or ROW3) of the first to eighth memory banks BK(0)~BK(7) cannot be performed by a single MAC calculation. That is, in order to complete the MAC arithmetic operation for the weight data stored in first, second, third, or fourth rows ROW0, ROW1, ROW2, or ROW3) of the first to eighth memory banks BK(0)~BK(7), it may be necessary to successively perform a plurality of MAC calculations. Hereinafter, it may be assumed that the unit MAC arithmetic amount is 256 bits (corresponding to 16 sets of 16-bit weight data). In such a case, each of the first to eighth MAC operators MAC(0)~MAC(7) may include 16 multipliers, and each of the multipliers may perform a multiplying calculation of 16-bit weight data (one set of weight data) and 16-bit vector data (one set of vector data).

Figure 34:
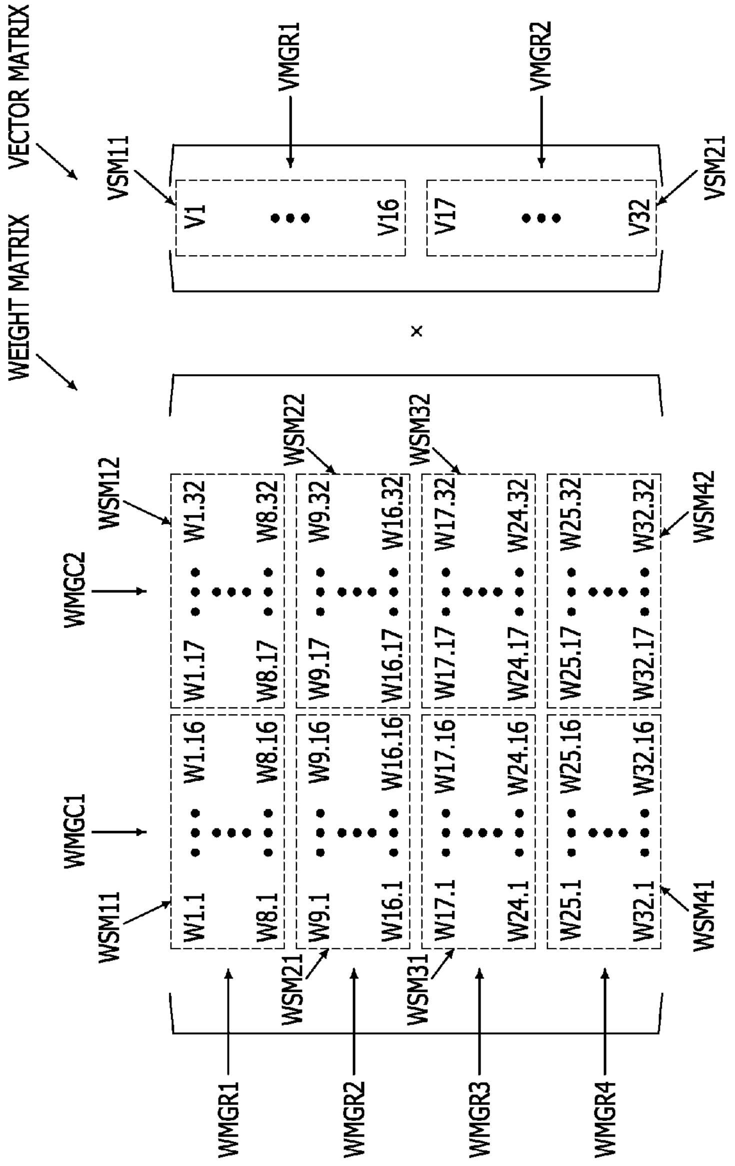
FIG. 34 illustrates a process for dividing a weight matrix and a vector matrix illustrated in FIG. 32 into a plurality of weight sub-matrixes and a plurality of vector sub-matrixes.

FIG. 34 illustrates a process for dividing the weight matrix and the vector matrix illustrated in FIG. 32 into a plurality of weight sub-matrixes WSMs and a plurality of vector sub-matrixes VSMs. Referring to FIG. 34, the weight matrix and the vector matrix, which are used for the MAC calculation of the PIM device 400A, may be divided into the plurality of weight sub-matrixes WSMs and the plurality of vector sub-matrixes VSMs according to the number of the memory banks BKs and the unit MAC arithmetic amount. That is, the weight matrix may be configured to employ the plurality of weight sub-matrixes WSMs as its elements, and the vector matrix may be configured to employ the plurality of vector sub-matrixes VSMs as its elements. In such a case, the weight matrix may have a plurality of weight matrix group rows WMGRs and a plurality of weight matrix group columns WMGCs. Meanwhile, the vector matrix may have only a plurality of vector matrix group rows VMGRs.

The number of the plurality of weight matrix group rows WMGRs in the weight matrix may be determined by the number of memory banks BKs. Meanwhile, the number of the plurality of weight matrix group columns WMGCs in the weight matrix may be determined by the unit MAC arithmetic amount. In an embodiment, the number of the plurality of weight matrix group rows WMGRs in the weight matrix may be determined by dividing the number of the matrix rows MRs of the weight matrix into the number of the memory banks BKs. The number of the plurality of weight matrix group columns WMGCs in the weight matrix may be determined by dividing the number of the matrix columns MCs of the weight matrix into the number of sets of the weight data corresponding to the unit MAC arithmetic amount. When the number of the matrix rows MR1~MR32 of the weight matrix is 32 and the number of the memory banks BK(0)~BK(7) is 8 as in the present embodiment, the weight matrix may have four (32/8) weight matrix group rows (i.e., first to fourth weight matrix group rows WMGR1~WMGR4). In addition, when the number of the matrix columns MC1~MC32 of the weight matrix is 32 and the number of the sets of the weight data corresponding to the unit MAC arithmetic amount is 16 as in the present embodiment, the weight matrix may have two (32/16) weight matrix group columns (i.e., first and second weight matrix group columns WMGC1 and WMGC2).

Two weight sub-matrixes WSM11 and WSM12 belonging to the first weight matrix group row WMGR1 may include the weight data W1.1~W1.32, . . . , and W8.1~W8.32 arrayed in the first to eighth matrix rows MR1~MR8 of the weight matrix. As described with reference to FIG. 33, the weight data W1.1~W1.32, . . . , and W8.1~W8.32 arrayed in first to eighth rows of the weight sub-matrixes WSM11 and WSM12 may be stored into the first rows ROW0 of the first to eighth memory banks BK(0)~BK(7). Two weight sub-matrixes WSM21 and WSM22 belonging to the second weight matrix group row WMGR2 may include the weight data W9.1~W9.32, . . . , and W16.1~W16.32 arrayed in the ninth to sixteenth matrix rows MR9~MR16 of the weight matrix. As described with reference to FIG. 33, the weight data W9.1~W9.32, . . . , and W16.1~W16.32 arrayed in first to eighth rows of the weight sub-matrixes WSM21 and WSM22 may be stored into the second rows ROW1 of the first to eighth memory banks BK(0)~BK(7).

Two weight sub-matrixes WSM31 and WSM32 belonging to the third weight matrix group row WMGR3 may include the weight data W17.1~W17.32, . . . , and W24.1~W24.32 arrayed in the seventeenth to twenty fourth matrix rows MR17~MR24 of the weight matrix. The weight data W17.1~W17.32, . . . , and W24.1~W24.32 arrayed in first to eighth rows of the weight sub-matrixes WSM31 and WSM32 may be stored into the third rows ROW2 of the first to eighth memory banks BK(0)~BK(7). Two weight sub-matrixes WSM41 and WSM42 belonging to the fourth weight matrix group row WMGR4 may include the weight data W25.1~W25.32, . . . , and W32.1~W32.32 arrayed in the 25$^{th}$ to 32$^{nd}$ matrix rows MR25~MR32 of the weight matrix. The weight data W25.1~W25.32, . . . , and W32.1~W32.32 arrayed in first to eighth rows of the weight sub-matrixes WSM41 and WSM42 may be stored into the fourth rows ROW3 of the first to eighth memory banks BK(0)~BK(7).

The four weight sub-matrixes WSM11, WSM21, WSM31, and WSM41 belonging to the first weight matrix group column WMGC1 may include the weight data W1.1~W1.16, . . . , and W32.1~W32.16 arrayed in the first to sixteenth matrix columns MC1~MC16 of the weight matrix. The four weight sub-matrixes WSM12, WSM22, WSM32, and WSM42 belonging to the second weight matrix group column WMGC2 may include the weight data W1.17~W1.32, . . . , and W32.17~W32.32 arrayed in the seventeenth to 32$^{nd}$ matrix columns MC17~MC32 of the weight matrix.

The weight data W1.1~W1.32, . . . , and W8.1~W8.32 arrayed in the first to eighth rows of the two weight sub-matrixes WSM11 and WSM12 belonging to the first weight matrix group row WMGR1 may be used for first MAC arithmetic operations of the first to eighth MAC operators MAC(0)~MAC(7), as described with reference to FIG. 33. Specifically, the weight data W1.1~W1.32, which are arrayed in the first matrix row MR1, among the weight data W1.1~W1.32, . . . , and W8.1~W8.32 may be used for performing the first MAC arithmetic operation of the first MAC operator MAC(0). The weight data W2.1~W2.32, which are arrayed in the second matrix row MR2, among the weight data W1.1~W1.32, . . . , and W8.1~W8.32 may be used for performing the first MAC arithmetic operation of the second MAC operator MAC(1). Similarly, the weight data W8.1~W8.32, which are arrayed in the eighth matrix row MR8, among the weight data W1.1~W1.32, . . . , and W8.1~W8.32 may be used for performing the first MAC arithmetic operation of the eighth MAC operator MAC(7).

The weight data W9.1~W9.32, . . . , and W16.1~W16.32 included in the two weight sub-matrixes WSM21 and WSM22 belonging to the second weight matrix group row WMGR2 may be used for second MAC arithmetic operations of the first to eighth MAC operators MAC(0)~MAC(7), as described with reference to FIG. 33. Specifically, the weight data W9.1~W9.32, which are arrayed in the ninth matrix row MR9, among the weight data W9.1~W9.32, . . . , and W16.1~W16.32 may be used for performing the second MAC arithmetic operation of the first MAC operator MAC(0). The weight data W10.1~W10.32, which are arrayed in the tenth matrix row MR10, among the weight data W9.1~W9.32, . . . , and W16.1~W16.32 may be used for performing the second MAC arithmetic operation of the second MAC operator MAC(1). Similarly, the weight data W16.1~W16.32, which are arrayed in the sixteenth matrix row MR16, among the weight data W9.1~W9.32, . . . , and W16.1~W16.32 may be used for performing the second MAC arithmetic operation of the eighth MAC operator MAC(7).

Moreover, the weight data W17.1~W17.32, . . . , and W24.1~W24.32 included in the two weight sub-matrixes WSM31 and WSM32 belonging to the third weight matrix group row WMGR3 may be used for third MAC arithmetic operations of the first to eighth MAC operators MAC(0)~MAC(7). Furthermore, the weight data W25.1~W25.32, . . . , and W32.1~W32.32 included in the two weight sub-matrixes WSM41 and WSM42 belonging to the fourth weight matrix group row WMGR4 may be used for fourth MAC arithmetic operations of the first to eighth MAC operators MAC(0)~MAC(7).

The number of the vector matrix group rows VMGRs in the vector matrix may be determined by dividing the dividing the number of the matrix rows MRs of the vector matrix into the number of sets of the vector data corresponding to the unit MAC arithmetic amount. When the number of the matrix rows MR1~MR32 of the vector matrix is 32 and the number of the sets of the vector data corresponding to the unit MAC arithmetic amount is 16 as in the present embodiment, the vector matrix may have two vector matrix group rows (i.e., first and second vector matrix group rows VMGR1 and VMGR2). That is, the vector matrix may be configured to employ a first vector sub-matrix VSM11 in the first vector matrix group row VMGR1 and a second vector sub-matrix VSM21 in the second vector matrix group row VMGR2 as its elements. The number of the vector matrix group rows VMGRs may be equal to the number of the weight matrix group columns WMGCs. The first vector sub-matrix VSM11 of the vector matrix may include the vector data V1~V16 arrayed in first to sixteenth rows of the first vector sub-matrix VSM11 (i.e., the first to sixteenth matrix rows MR1~MR16 of the vector matrix). The second vector sub-matrix VSM21 of the vector matrix may include the vector data V17~V32 arrayed in first to sixteenth rows of the second vector sub-matrix VSM21 (i.e., the seventeenth to $32^{nd}$ matrix rows MR17~MR32 of the vector matrix).

The first to eighth MAC operators MAC(0)~MAC(7) of the PIM device 400A according to the present disclosure may perform the MAC arithmetic operations by executing the matrix multiplying calculations for the weight sub-matrixes WSMs of the weight matrix and the vector sub-matrixes VSMs of the vector matrix. In an embodiment, the first to eighth MAC operators MAC(0)~MAC(7) may perform the first MAC arithmetic operations in units of matrix group columns by executing the matrix multiplying calculations for the weight sub-matrixes WSM11, WSM21, WSM31, and WSM41 in the first weight matrix group column WMGC1 and the vector sub-matrix VSM11 in the first vector matrix group row VMGR1. Next, the first to eighth MAC operators MAC(0)~MAC(7) may perform the second MAC arithmetic operations in units of matrix group columns by executing the matrix multiplying calculations for the weight sub-matrixes WSM12, WSM22, WSM32, and WSM42 in the second weight matrix group column WMGC2 and the vector sub-matrix VSM21 in the second vector matrix group row VMGR2.

Specifically, the first to eighth MAC operators MAC(0)~MAC(7) may perform a first MAC arithmetic operation of a first matrix group column unit for the weight sub-matrix WSM11, which is located at a cross point of the first weight matrix group row WMGR1 and the first weight matrix group column WMGC1, and the vector sub-matrix VSM11 located in the first vector matrix group row VMGR1. Next, the first to eighth MAC operators MAC(0)~MAC(7) may perform a first MAC arithmetic operation of a second matrix group column unit for the weight sub-matrix WSM21, which is located at a cross point of the second weight matrix group row WMGR2 and the first weight matrix group column WMGC1, and the vector sub-matrix VSM11 located in the first vector matrix group row VMGR1.

Subsequently, the first to eighth MAC operators MAC(0)~MAC(7) may perform a first MAC arithmetic operation of a third matrix group column unit for the weight sub-matrix WSM31, which is located at a cross point of the third weight matrix group row WMGR3 and the first weight matrix group column WMGC1, and the vector sub-matrix VSM11 located in the first vector matrix group row VMGR1. Next, the first to eighth MAC operators MAC(0)~MAC(7) may perform a first MAC arithmetic operation of a fourth matrix group column unit for the weight sub-matrix WSM41, which is located at a cross point of the fourth weight matrix group row WMGR4 and the first weight matrix group column WMGC1, and the vector sub-matrix VSM11 located in the first vector matrix group row VMGR1. As such, the first MAC arithmetic operations of the matrix group column unit may be completed by sequentially performing the first MAC arithmetic operations of the first to fourth matrix group column units. While the first MAC arithmetic operations of the matrix group column unit are performed, the first MAC arithmetic operations may be performed using different weight sub-matrixes and the same vector sub-matrix VSM11.

After the first MAC arithmetic operations of the matrix group column unit are completed, the first to eighth MAC operators MAC(0)~MAC(7) may perform a second MAC arithmetic operation of the first matrix group column unit for the weight sub-matrix WSM12, which is located at a cross point of the first weight matrix group row WMGR1 and the second weight matrix group column WMGC2, and the vector sub-matrix VSM21 located in the second vector matrix group row VMGR2. Next, the first to eighth MAC operators MAC(0)~MAC(7) may perform a second MAC arithmetic operation of the second matrix group column unit for the weight sub-matrix WSM22, which is located at a cross point of the second weight matrix group row WMGR2 and the second weight matrix group column WMGC2, and the vector sub-matrix VSM21 located in the second vector matrix group row VMGR2.

Subsequently, the first to eighth MAC operators MAC(0)~MAC(7) may perform a second MAC arithmetic operation of the third matrix group column unit for the weight sub-matrix WSM32, which is located at a cross point of the third weight matrix group row WMGR3 and the second weight matrix group column WMGC2, and the vector sub-matrix VSM21 located in the second vector matrix group row VMGR2. Next, the first to eighth MAC operators MAC(0)~MAC(7) may perform a second MAC arithmetic operation of the fourth matrix group column unit for the weight sub-matrix WSM42, which is located at a cross point of the fourth weight matrix group row WMGR4 and the second weight matrix group column WMGC2, and the vector sub-matrix VSM21 located in the second vector matrix group row VMGR2. As such, the second MAC arithmetic operations of the matrix group column unit may be completed by sequentially performing the second MAC arithmetic operations of the first to fourth matrix group column units. While the second MAC arithmetic operations of the matrix group column unit are performed, the second MAC arithmetic operations may be performed using different weight sub-matrixes and the same vector sub-matrix VSM21. That is, while all of the MAC arithmetic operations are performed, the vector sub-matrix VSM may be changed only when the MAC arithmetic operation is shifted from the first MAC arithmetic operation to the second MAC arithmetic operation or vice versa.

Figure 35:
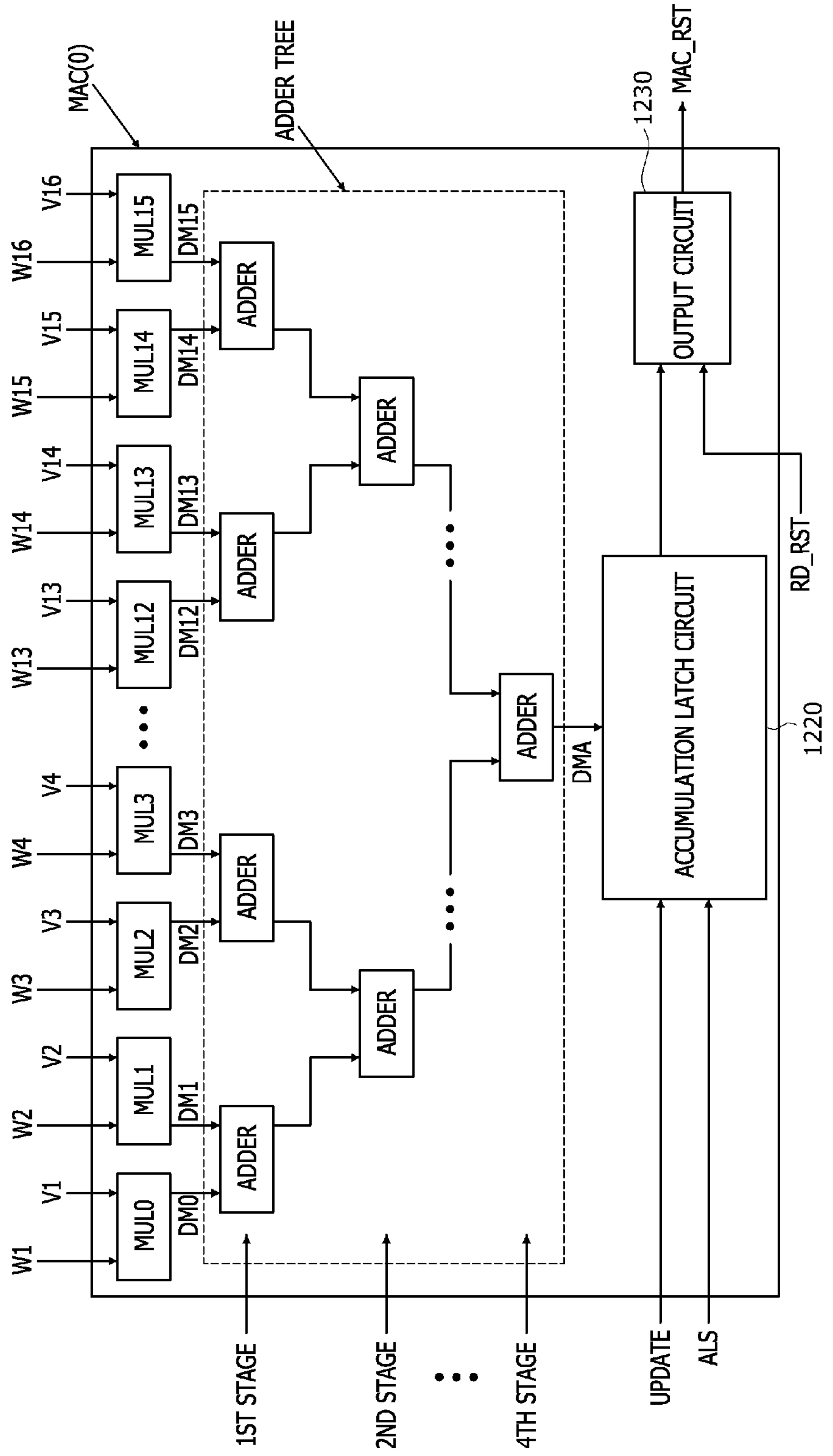
FIG. 35 is a block diagram illustrating an example of a configuration of a first MAC operator included in the PIM device illustrated in FIG. 31.

FIG. 35 is a block diagram illustrating an example of a configuration of the first MAC operator MAC(0) included in the PIM device 400A illustrated in FIG. 31. The configuration of the first MAC operator MAC(0) may be equally applicable to each of the second to eighth MAC operators MAC(1)~MAC(7). Referring to FIG. 35, the first MAC operator MAC(0) may include a plurality of multipliers (e.g., first to sixteenth multipliers MUL0~MUL15), an adder tree including a plurality of adders, an accumulator 1220, and an output circuit 1230.

Each of the first to sixteenth multipliers MUL0~MUL15 may receive one of weight data W1~W16 (corresponding to the weight data W1.1~W1.16 of the weight sub-matrix WSM11 illustrated in FIG. 34) from the first memory bank BK(0) and may also receive one of the vector data V1~V16 included in the vector sub-matrix VSM11 illustrated in FIG. 34 from the global buffer GB. Each of the first to sixteenth multipliers MUL0~MUL15 may perform a multiplying calculation of the weight data W and the vector data V to generate and output multiplication result data DM. For example, the first multiplier MUL0 may perform a multiplying calculation of the weight data W1 and the vector data V1 to generate and output first multiplication result data DM0, and the second multiplier MUL1 may perform a multiplying calculation of the weight data W2 and the vector data V2 to generate and output second multiplication result data DM1. Similarly, the sixteenth multiplier MUL15 may perform a multiplying calculation of the weight data W16 and the vector data V16 to generate and output sixteenth multiplication result data DM15.

The adder tree may include a plurality of adders which are arrayed to have a hierarchical structure such as a tree structure. In the present embodiment, the adder tree may include half-adders. However, the present embodiment may be merely an example of the present disclosure. Thus, in some other embodiments, the adder tree may include full-adders. In the present embodiment, eight adders may be disposed in a first stage located at a highest level of the adder tree, and four adders may be disposed in a second stage located at a second highest level of the adder tree. In addition, two adders may be disposed in a third stage located at a third highest level of the adder tree, and one adder may be disposed in a fourth stage located at a lowest level of the adder tree.

Each of the adders disposed in the first stage may perform an adding calculation of two sets of multiplication result data DMs which are outputted from two multipliers among the first to sixteenth multipliers MUL0~MUL15, thereby generating and outputting addition result data. For example, a first adder of the eight adders in the first stage may perform an adding calculation of the first multiplication result data DM0 outputted from the first multiplier MUL0 and the second multiplication result data DM1 outputted from the second multiplier MUL1, thereby generating and outputting addition result data. In addition, each of the adders disposed in the second stage may perform an adding calculation of two sets of addition result data which are outputted from two adders among the eight adders disposed in the first stage, thereby generating and outputting addition result data. In the same way, the adder disposed in the fourth stage may perform an adding calculation of two sets of addition result data which are outputted from the two adders disposed in the third stage, thereby generating and outputting addition result data DMA of the adder tree.

The accumulator 1220 may receive the addition result data DMA from the adder tree to perform an accumulative adding calculation. In order to perform the accumulative adding calculation of the accumulator 1220, the accumulator 1220 may include an accumulative adder and a latch circuit. The accumulative adder may perform an accumulative adding calculation of the addition result data DMA outputted from the adder tree and feedback data outputted from the latch circuit. The latch circuit may latch output data of the accumulative adder. The latched data of the latch circuit may be fed back to the accumulative adder to be used as the feedback data. In addition, the latched data of the latch circuit may be transmitted to the output circuit 1230. An operation of the latch circuit included in the accumulator 1220 may be controlled by the update signal UPDATE and the accumulation latch selection signal ALS which are outputted from the command/address decoder (450 of FIG. 31). The accumulator 1220 will be described in more detail with reference to FIG. 36 later.

The output circuit 1230 may receive the output data of the latch circuit included in the accumulator 1220. The output circuit 1230 may output the output data of the accumulator 1220 as MAC result data MAC_RST which is transmitted to an external device of the first MAC operator MAC(0). In an embodiment, the MAC result data MAC_RST outputted from the output circuit 1230 may be transmitted to the memory banks BK(0)~BK(7) or the global buffer GB. In another embodiment, the MAC result data MAC_RST outputted from the output circuit 1230 may be transmitted to a host through an external device (e.g., a controller) coupled to the PIM device 400A. An operation for outputting the MAC result data MAC_RST from the output circuit 1230 may be performed in response to the result read signal RD_RST which is outputted from the command/address decoder (450 of FIG. 31).

Figure 36:
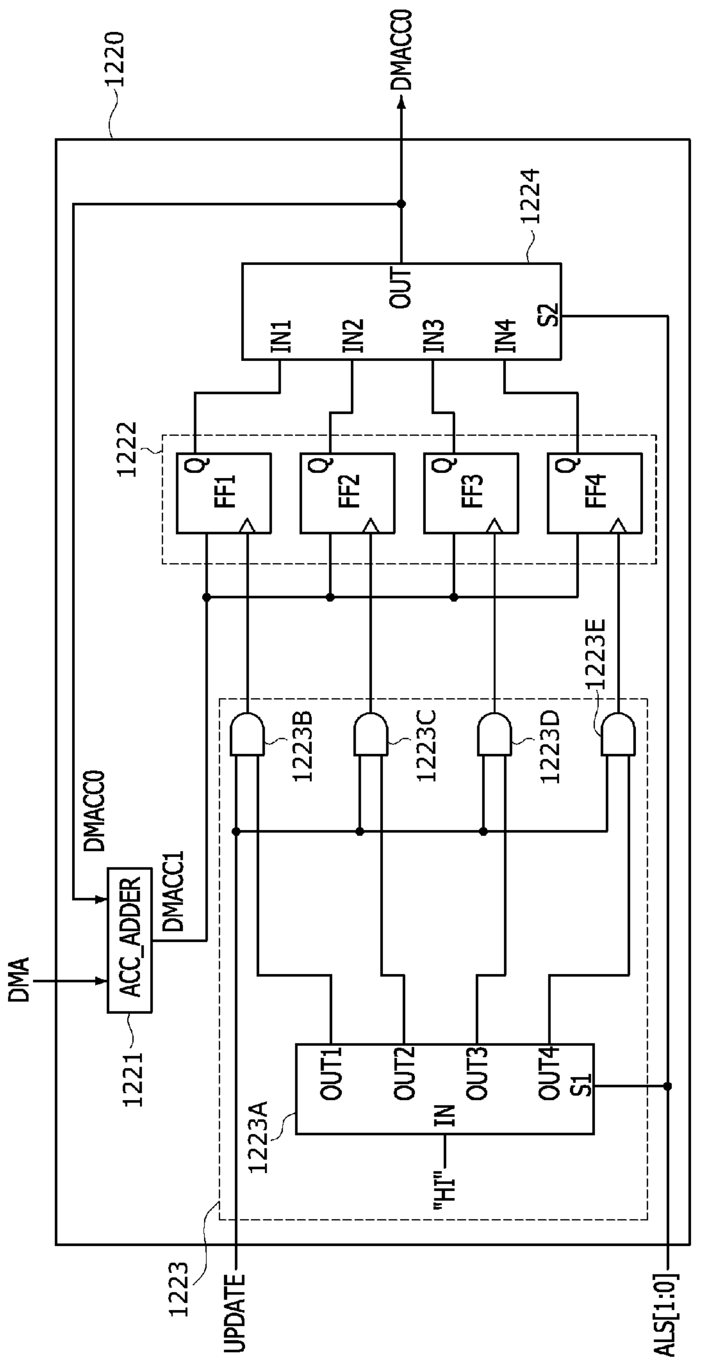
FIG. 36 is a circuit diagram illustrating an example of a configuration of an accumulator included in the first MAC operator illustrated in FIG. 35.

FIG. 36 is a circuit diagram illustrating an example of a configuration of the accumulator 1220 included in the first MAC operator MAC(0) illustrated in FIG. 35. Referring to FIG. 36, the accumulator 1220 may include an accumulative adder 1221, a latch circuit 1222, a latch circuit selector 1223, and an input selector 1224. The accumulative adder 1221 may have a first input terminal, a second input terminal, and an output terminal. The accumulative adder 1221 may receive the addition result data DMA from the adder tree through the first input terminal. The accumulative adder 1221 may receive the feedback data from the input selector 1224 through the second input terminal. That is, the accumulative adder 1221 may receive previous accumulated addition data DMACC0, which are outputted from the latch circuit 1222, through the second input terminal. The accumulative adder 1221 may perform an adding calculation of the addition result data DMA and the previous accumulated addition data DMACC0 to generate and output the addition result as current accumulated addition data DMACC1 through the output terminal. The current accumulated addition data DMACC1 outputted from the accumulative adder 1221 may be transmitted to the latch circuit 1222.

The latch circuit 1222 may include a plurality of latch circuits, for example, first to fourth latch circuits FF1~FF4. The number of the latch circuits may be equal to the number of the weight matrix group rows WMGR1~WMGR4 described with reference to FIG. 34. In an embodiment, each of the first to fourth latch circuits FF1~FF4 may be realized using a flip-flop having a latch function. All of input terminals of the first to fourth latch circuits FF1~FF4 may be coupled to the output terminal of the accumulative adder 1221. Thus, the current accumulated addition data DMACC1 outputted from the accumulative adder 1221 may be transmitted to all of the first to fourth latch circuits FF1~FF4. One of the first to fourth latch circuits FF1~FF4 may latch the current accumulated addition data DMACC1, which are outputted from the accumulative adder 1221, in response to a first logic level signal having a logic "high" level inputted to a clock terminal and may output the latched data of the current accumulated addition data DMACC1 through an output terminal Q. Selecting one of the first to fourth latch circuits FF1~FF4 to latch and output the current accumulated addition data DMACC1 may be achieved by output signals of the latch circuit selector 1223.

The latch circuit selector 1223 may include an output selector 1223A and first to fourth AND gates 1223B-1223E. The output selector 1223A may have an input terminal IN, first to fourth output terminals OUT1~OUT4, and a selection control terminal S1. In an embodiment, the output selector 1223A may be realized using a 1-to-4 demultiplexer. A logic high level signal HI may be inputted to the input terminal IN of the output selector 1223A. The accumulation latch selection signal ALS[1:0] corresponding to a selection control signal may be inputted to the selection control terminal S1 of the output selector 1223A. In such a case, the output selector 1223A may output the logic high level signal HI through one of the first to fourth output terminals OUT1~OUT4, which is selected by the accumulation latch selection signal ALS[1:0], and the output selector 1223A may output a logic low level signal LO through the remaining non-selected output terminals. In an embodiment, the output selector 1223A may output the logic high level signal HI through the first output terminal OUT1 when the accumulation latch selection signal ALS[1:0] has a logic level combination of "00", and the output selector 1223A may output the logic high level signal HI through the second output terminal OUT2 when the accumulation latch selection signal ALS[1:0] has a logic level combination of "01". Moreover, the output selector 1223A may output the logic high level signal HI through the third output terminal OUT3 when the accumulation latch selection signal ALS[1:0] has a logic level combination of "10", and the output selector 1223A may output the logic high level signal HI through the fourth output terminal OUT4 when the accumulation latch selection signal ALS[1:0] has a logic level combination of "11".

The update signal UPDATE may be transmitted from the command/address decoder 450 to first input terminals of the first to fourth AND gates 1223B-1223E. A second input terminal of the first AND gate 1223B may be coupled to the first output terminal OUT1 of the output selector 1223A, and an output terminal of the first AND gate 1223B may be coupled to the clock terminal of the first latch circuit FF1. A second input terminal of the second AND gate 1223C may be coupled to the second output terminal OUT2 of the output selector 1223A, and an output terminal of the second AND gate 1223C may be coupled to the clock terminal of the second latch circuit FF2. A second input terminal of the third AND gate 1223D may be coupled to the third output terminal OUT3 of the output selector 1223A, and an output terminal of the third AND gate 1223D may be coupled to the clock terminal of the third latch circuit FF3. A second input terminal of the fourth AND gate 1223E may be coupled to the fourth output terminal OUT4 of the output selector 1223A, and an output terminal of the fourth AND gate 1223E may be coupled to the clock terminal of the fourth latch circuit FF4.

The first AND gate 1223B may perform a logical AND operation of the update signal UPDATE and an output signal outputted through the first output terminal OUT1 of the output selector 1223A to generate a first clock signal. The first clock signal generated by the logical AND operation of the first AND gate 1223B may be transmitted to a clock terminal of the first latch circuit FF1. The second AND gate 1223C may perform a logical AND operation of the update signal UPDATE and an output signal outputted through the second output terminal OUT2 of the output selector 1223A to generate a second clock signal. The second clock signal generated by the logical AND operation of the second AND gate 1223C may be transmitted to a clock terminal of the second latch circuit FF2. The third AND gate 1223D may perform a logical AND operation of the update signal UPDATE and an output signal outputted through the third output terminal OUT3 of the output selector 1223A to generate a third clock signal. The third clock signal generated by the logical AND operation of the third AND gate 1223D may be transmitted to a clock terminal of the third latch circuit FF3. The fourth AND gate 1223E may perform a logical AND operation of the update signal UPDATE and an output signal outputted through the fourth output terminal OUT4 of the output selector 1223A to generate a fourth clock signal. The fourth clock signal generated by the logical AND operation of the fourth AND gate 1223E may be transmitted to a clock terminal of the fourth latch circuit FF4.

The input selector 1224 may have first to fourth input terminals IN1~IN4, an output terminal OUT, and a selection control terminal S2. In an embodiment, the input selector 1224 may be realized using a 4-to-1 multiplexer. The first input terminal IN1 of the input selector 1224 may be coupled to an output terminal Q of the first latch circuit FF1. The second input terminal IN2 of the input selector 1224 may be coupled to an output terminal Q of the second latch circuit FF2. The third input terminal IN3 of the input selector 1224 may be coupled to an output terminal Q of the third latch circuit FF3. The fourth input terminal IN4 of the input selector 1224 may be coupled to an output terminal Q of the fourth latch circuit FF4. The output terminal OUT of the input selector 1224 may be coupled to the second input terminal of the accumulative adder 1221. In addition, the output terminal OUT of the input selector 1224 may also be coupled to the output circuit (1230 of FIG. 35), as described with reference to FIG. 35.

The accumulation latch selection signal ALS[1:0] corresponding to a selection control signal may be inputted to the selection control terminal S2 of the input selector 1224. The input selector 1224 may output the data inputted to one of the first to fourth input terminals IN1~IN4, which is selected by the accumulation latch selection signal ALS[1:0], through the output terminal OUT. In an embodiment, the data inputted to the first input terminal IN1 (i.e., the data outputted from the first latch circuit FF1) may be outputted through the output terminal OUT of the input selector 1224 when the accumulation latch selection signal ALS[1:0] has a logic level combination of "00", and the data inputted to the second input terminal IN2 (i.e., the data outputted from the second latch circuit FF2) may be outputted through the output terminal OUT of the input selector 1224 when the accumulation latch selection signal ALS[1:0] has a logic level combination of "01". Moreover, the data inputted to the third input terminal IN3 (i.e., the data outputted from the third latch circuit FF3) may be outputted through the output terminal OUT of the input selector 1224 when the accumulation latch selection signal ALS[1:0] has a logic level combination of "10", and the data inputted to the fourth input terminal IN4 (i.e., the data outputted from the fourth latch circuit FF4) may be outputted through the output terminal OUT of the input selector 1224 when the accumulation latch selection signal ALS[1:0] has a logic level combination of "11".

Figure 37:
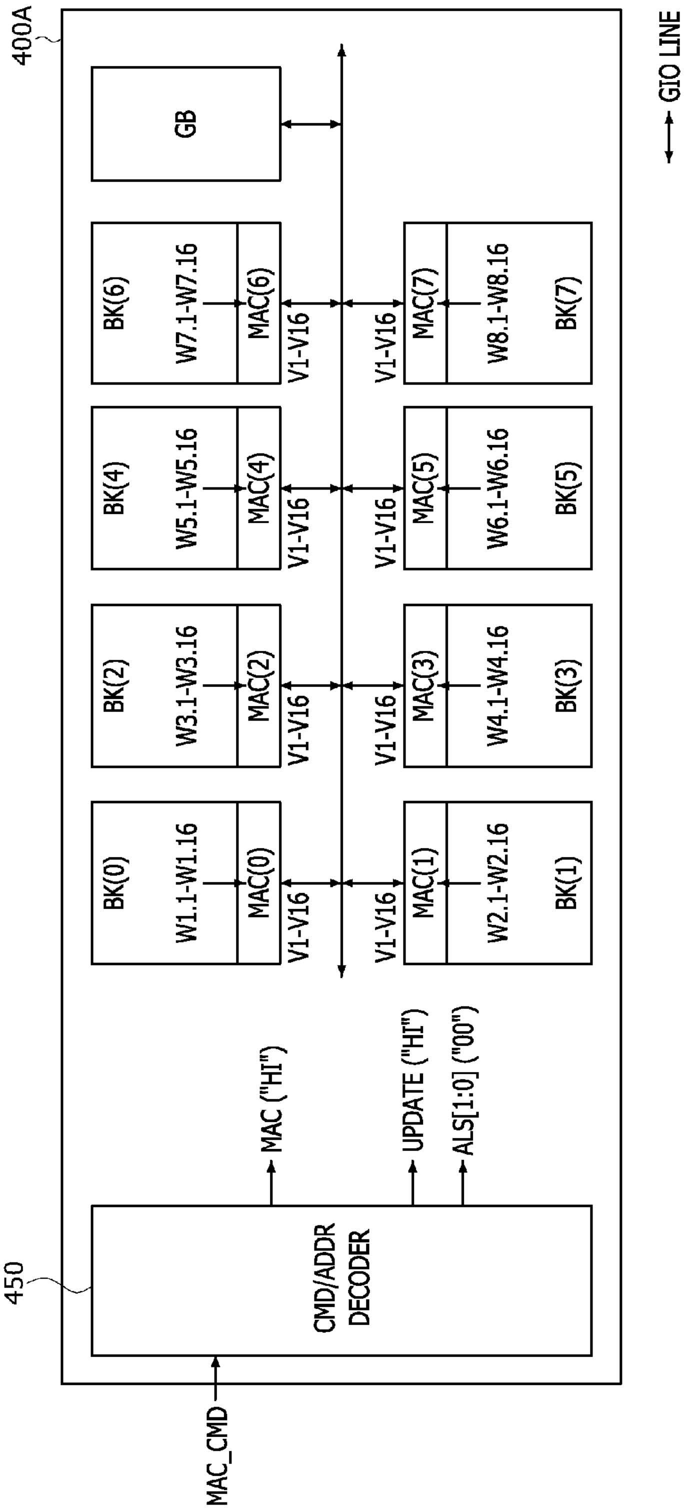
FIG. 37 illustrates a first MAC arithmetic operation performed in units of columns of a first matrix group included in the PIM device illustrated in FIG. 31.

FIG. 37 illustrates a first MAC arithmetic operation of a first matrix group column unit of the PIM device 400A illustrated in FIG. 31. The first MAC arithmetic operation of the first matrix group column unit of the PIM device 400A may be performed by the matrix multiplying calculation of the weight sub-matrix WSM11 and the vector sub-matrix VSM11, as described with reference to FIG. 34. Referring to FIG. 37, when a MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when a certain amount of time elapses from a point in time when the MAC signal MAC having a logic "high" level is outputted. In an embodiment, the certain amount of time may be set as an interval of time from a point in time when the MAC signal MAC having a logic "high" level is outputted from the command/address decoder 450 until a point in time when the accumulative adding calculations are executed by the accumulators of the first to eighth MAC operators MAC(0)~MAC(7). The command/address decoder 450 may output the accumulation latch selection signal ALS[1:0] having a logic level combination of "00".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W1.1~W1.16, . . . , and W8.1~W8.16, which are arrayed in respective ones of the first to eight rows of the weight sub-matrix WSM11, from the first to eighth memory banks BK(0)~BK(7), respectively. For example, the first MAC operator MAC(0) may receive the weight data W1.1~W1.16, which are arrayed in the first row of the weight sub-matrix WSM11, from the first memory bank BK(0); and the second MAC operator MAC(1) may receive the weight data W2.1~W2.16, which are arrayed in the second row of the weight sub-matrix WSM11, from the second memory bank BK(1). Similarly, the eighth MAC operator MAC(7) may receive the weight data W8.1~W8.16, which are arrayed in the eighth row of the weight sub-matrix WSM11, from the eighth memory bank BK(7). Each of the first to eighth MAC operators MAC(0)~MAC(7) may receive the vector data V1~V16 arrayed in the vector sub-matrix VSM11 from the global buffer GB.

Figure 38:
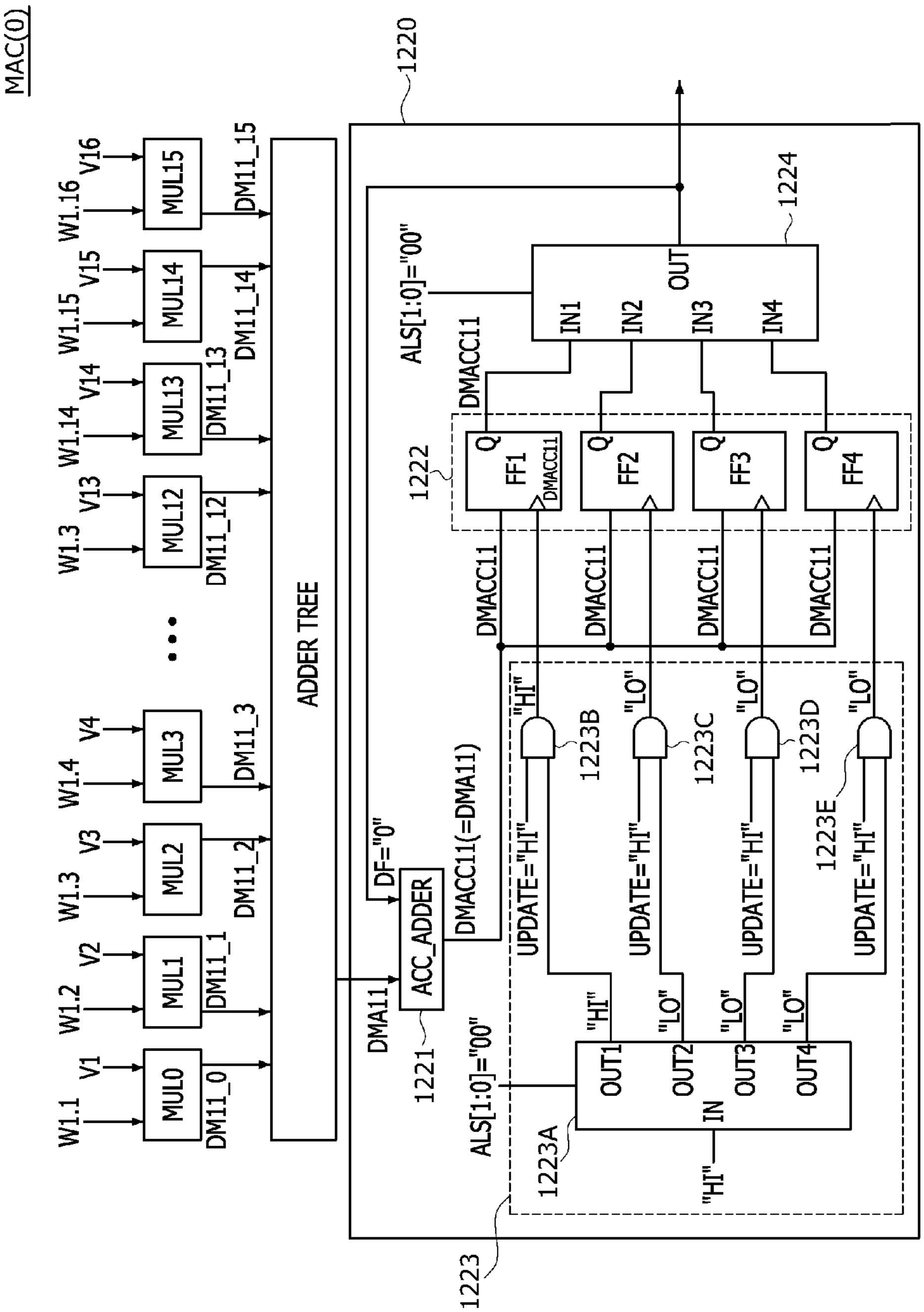
FIG. 38 illustrates an operation of a first MAC operator during the first MAC arithmetic operation illustrated in FIG. 37.

FIG. 38 illustrates an operation performed by the first MAC operator MAC(0) during the first MAC arithmetic operation of the first matrix group column unit of the PIM device 400A illustrated in FIG. 37. The operation of the first MAC operator MAC(0) described hereinafter may be equally applicable to each of the second to eighth MAC operators MAC(1)~MAC(7) except alteration of the weight data. Referring to FIG. 38, the first to sixteenth multipliers MUL0~MUL15 of the first MAC operator MAC(0) may perform multiplying calculations of the weight data W1.1~W1.16 and the vector data V1~V16. The first to sixteenth multipliers MUL0~MUL15 may output first to sixteenth multiplication data DM11_0~DM11_15 generated by the multiplying calculations, respectively. The adder tree may perform adding calculations of the first to sixteenth multiplication data DM11_0~DM11_15 outputted from the first to sixteenth multipliers MUL0~MUL15, thereby generating and outputting addition result data DMA11. The addition result data DMA11 outputted from the adder tree may be transmitted to the accumulative adder 1221 of the accumulator 1220.

The accumulative adder 1221 of the accumulator 1220 may perform an adding calculation of the addition result data DMA11 outputted from the adder tree and feedback data DF outputted from the input selector 1224, thereby generating and outputting accumulated addition data DMACC11. Because the first latch circuit FF1 of the latch circuit 1222 has an initialized status, the feedback data DF transmitted from the input selector 1224 to the accumulative adder 1221 may have a value of zero. Thus, the accumulated addition data DMACC11 outputted from the accumulative adder 1221 may have the same value as the addition result data DMA11 outputted from the adder tree. The accumulated addition data DMACC11 outputted from the accumulative adder 1221 may be transmitted to each of the input terminals of the first to fourth latch circuits FF1~FF4.

The output selector 1223A of the latch circuit selector 1223 may output a logic high level signal HI through the first output terminal OUT1 in response to the accumulation latch selection signal ALS[1:0] having a logic level combination of "00". Thus, the logic high level signal HI may be inputted to the second input terminal of the first AND gate 1223B. In such a case, the output selector 1223A may output a logic low level signal LO through the second, third, and fourth output terminals OUT2, OUT3, and OUT4. Thus, the logic low level signal LO may be inputted to the second input terminals of the second to fourth AND gates 1223C, 1223D, and 1223E. The update signal UPDATE having a logic "high" level may be transmitted from the command/address decoder 450 to the first input terminals of the first to fourth AND gates 1223B-1223E. Accordingly, the first AND gate 1223B may output the logic high level signal HI to the clock terminal of the first latch circuit FF1 while the second to fourth AND gates 1223C-1223E output the logic low level signal LO to the clock terminals of the second to fourth latch circuits FF2, FF3, and FF4. The first latch circuit FF1 may latch the accumulated addition data DMACC11 outputted from the accumulative adder 1221 in response to the logic high level signal HI outputted from the first AND gate 1223B and may output the latched data of the accumulated addition data DMACC11 to the first input terminal IN1 of the input selector 1224.

Figure 39:
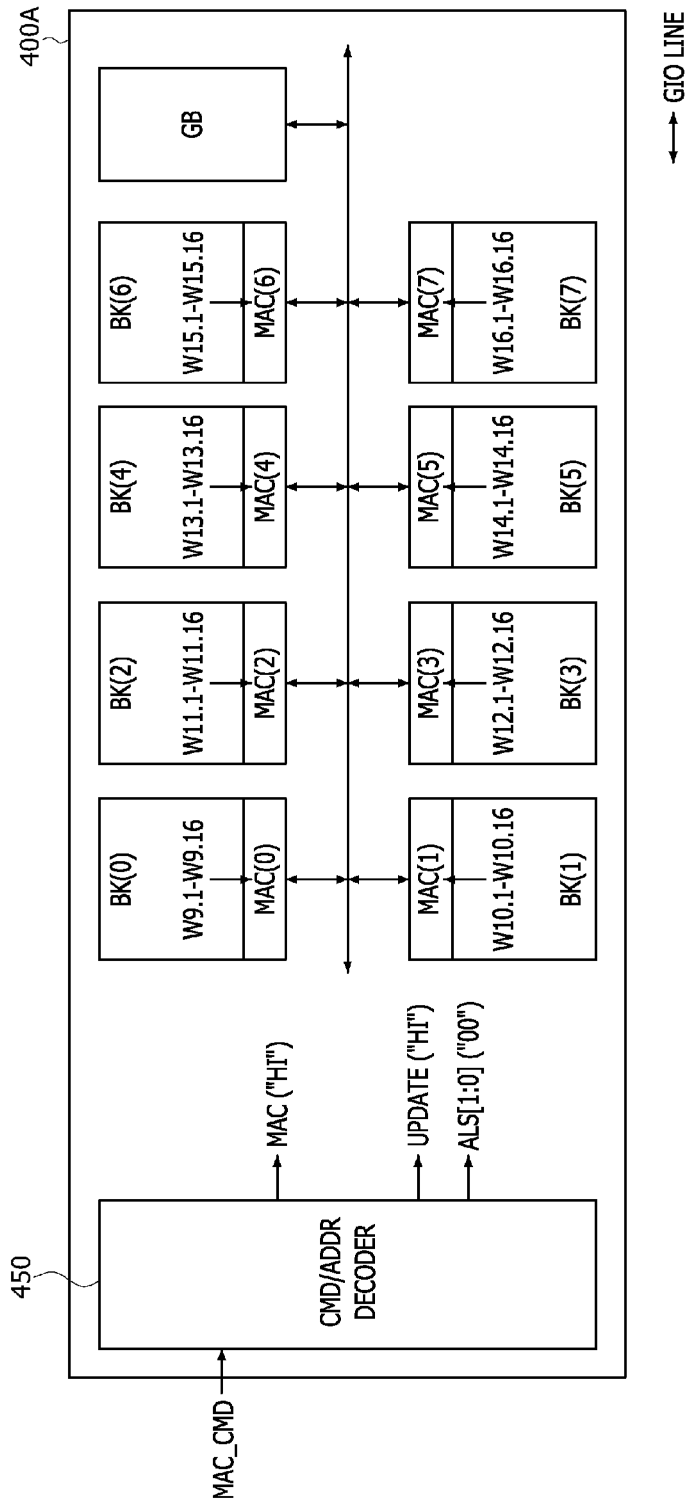
FIG. 39 illustrates a first MAC arithmetic operation performed in units of columns of a second matrix group included in the PIM device illustrated in FIG. 31.

FIG. 39 illustrates a first MAC arithmetic operation of a second matrix group column unit of the PIM device 400A illustrated in FIG. 31. The first MAC arithmetic operation of the second matrix group column unit of the PIM device 400A may be performed by the matrix multiplying calculation of the weight sub-matrix WSM21 and the vector sub-matrix VSM11, as described with reference to FIG. 34. Referring to FIG. 39, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when the certain amount of time elapses from a point in time when the MAC signal MAC having a logic "high" level is outputted. The command/address decoder 450 may output the accumulation latch selection signal ALS[1:0] having a logic level combination of "01".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W9.1~W9.16, . . . , and W16.1~W16.16, which are arrayed in respective ones of the first to eight rows of the weight sub-matrix WSM21, from the first to eighth memory banks BK(0)~BK(7), respectively. For example, the first MAC operator MAC(0) may receive the weight data W9.1~W9.16, which are arrayed in the first row of the weight sub-matrix WSM21, from the first memory bank BK(0); and the second MAC operator MAC(1) may receive the weight data W10.1~W10.16, which are arrayed in the second row of the weight sub-matrix WSM21, from the second memory bank BK(1). Similarly, the eighth MAC operator MAC(7) may receive the weight data W16.1~W16.16, which are arrayed in the eighth row of the weight sub-matrix WSM21, from the eighth memory bank BK(7). Meanwhile, the vector data V1~V16 previously transmitted to each of the first to eighth MAC operators MAC(0)~MAC(7) are not changed during the first MAC arithmetic operation of the second matrix group column unit of the PIM device 400A.

Figure 40:
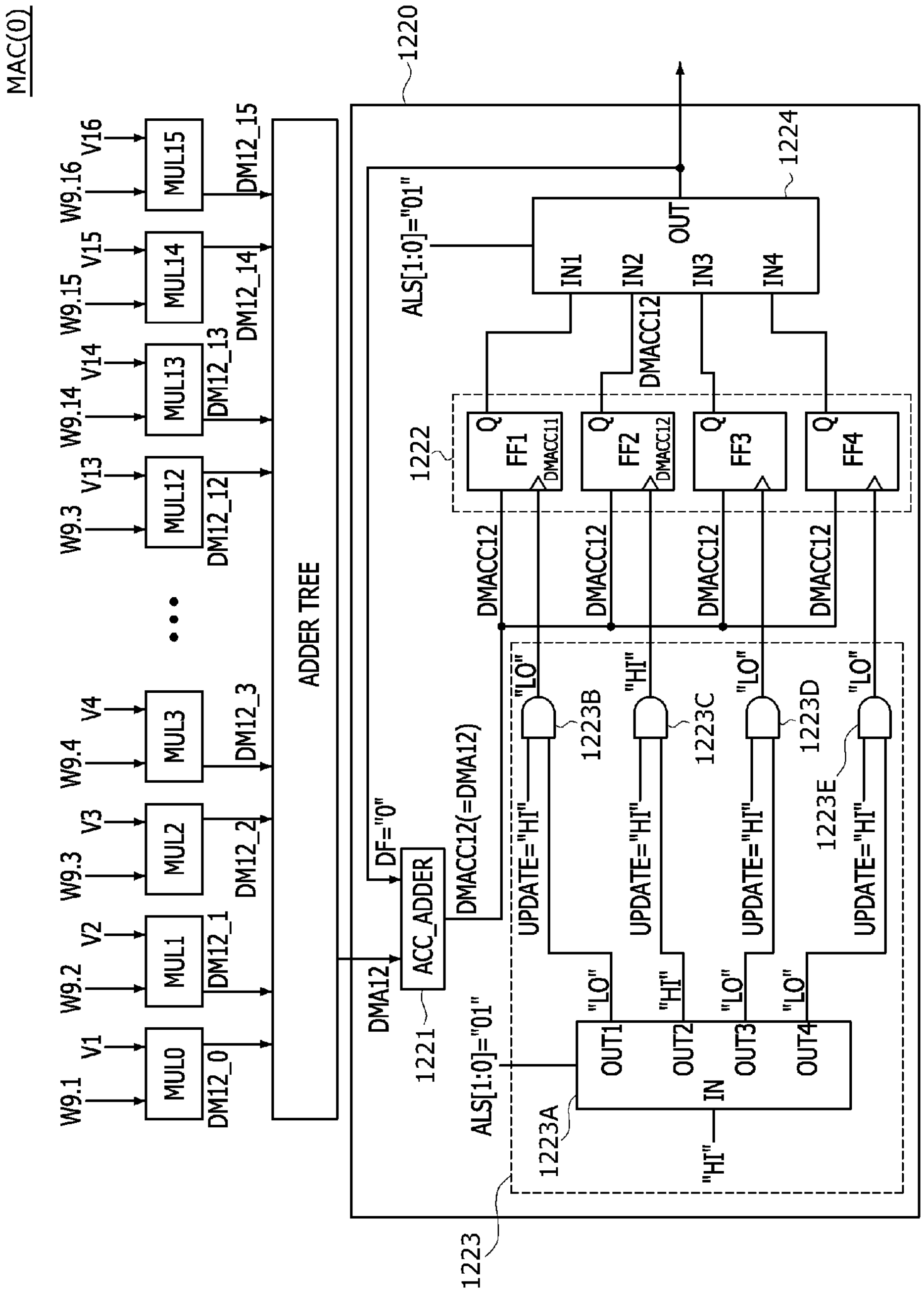
FIG. 40 illustrates an operation of a first MAC operator during the first MAC arithmetic operation illustrated in FIG. 39.

FIG. 40 illustrates an operation performed by the first MAC operator MAC(0) during the first MAC arithmetic operation of the second matrix group column unit of the PIM device 400A illustrated in FIG. 39. The operation of the first MAC operator MAC(0) described hereinafter may be equally applicable to each of the second to eighth MAC operators MAC(1)~MAC(7) except alteration of the weight data. Referring to FIG. 40, the first to sixteenth multipliers MUL0~MUL15 of the first MAC operator MAC(0) may perform multiplying calculations of the weight data W9.1~W9.16 and the vector data V1~V16. The first to sixteenth multipliers MUL0~MUL15 may output first to sixteenth multiplication data DM12_0~DM12_15 generated by the multiplying calculations, respectively. The adder tree may perform adding calculations of the first to sixteenth multiplication data DM12_0~DM12_15 outputted from the first to sixteenth multipliers MUL0~MUL15, thereby generating and outputting addition result data DMA12. The addition result data DMA12 outputted from the adder tree may be transmitted to the accumulative adder 1221 of the accumulator 1220.

The accumulative adder 1221 of the accumulator 1220 may perform an adding calculation of the addition result data DMA12 outputted from the adder tree and the feedback data DF outputted from the input selector 1224, thereby generating and outputting accumulated addition data DMACC12. Because the second latch circuit FF2 of the latch circuit 1222 has an initialized status, the feedback data DF transmitted from the input selector 1224 to the accumulative adder 1221 may have a value of zero. Thus, the accumulated addition data DMACC12 outputted from the accumulative adder 1221 may have the same value as the addition result data DMA12 outputted from the adder tree. The accumulated addition data DMACC12 outputted from the accumulative adder 1221 may be transmitted to each of the input terminals of the first to fourth latch circuits FF1~FF4.

The output selector 1223A of the latch circuit selector 1223 may output a logic high level signal HI through the second output terminal OUT2 in response to the accumulation latch selection signal ALS[1:0] having a logic level combination of “01”. Thus, the logic high level signal HI may be inputted to the second input terminal of the second AND gate 1223C. In such a case, the output selector 1223A may output a logic low level signal LO through the first, third, and fourth output terminals OUT1, OUT3, and OUT4. Thus, the logic low level signal LO may be inputted to the second input terminals of the first, third, and fourth AND gates 1223B, 1223D, and 1223E. The update signal UPDATE having a logic “high” level may be transmitted from the command/address decoder 450 to the first input terminals of the first to fourth AND gates 1223B-1223E. Accordingly, the second AND gate 1223C may output the logic high level signal HI to the clock terminal of the second latch circuit FF2 while the first, third, and fourth AND gates 1223B, 1223D, and 1223E output the logic low level signal LO to the clock terminals of the first, third, and fourth latch circuits FF1, FF3, and FF4. The second latch circuit FF2 may latch the accumulated addition data DMACC12 outputted from the accumulative adder 1221 in response to the logic high level signal HI outputted from the second AND gate 1223C and may output the latched data of the accumulated addition data DMACC12 to the second input terminal IN2 of the input selector 1224.

Figure 41:
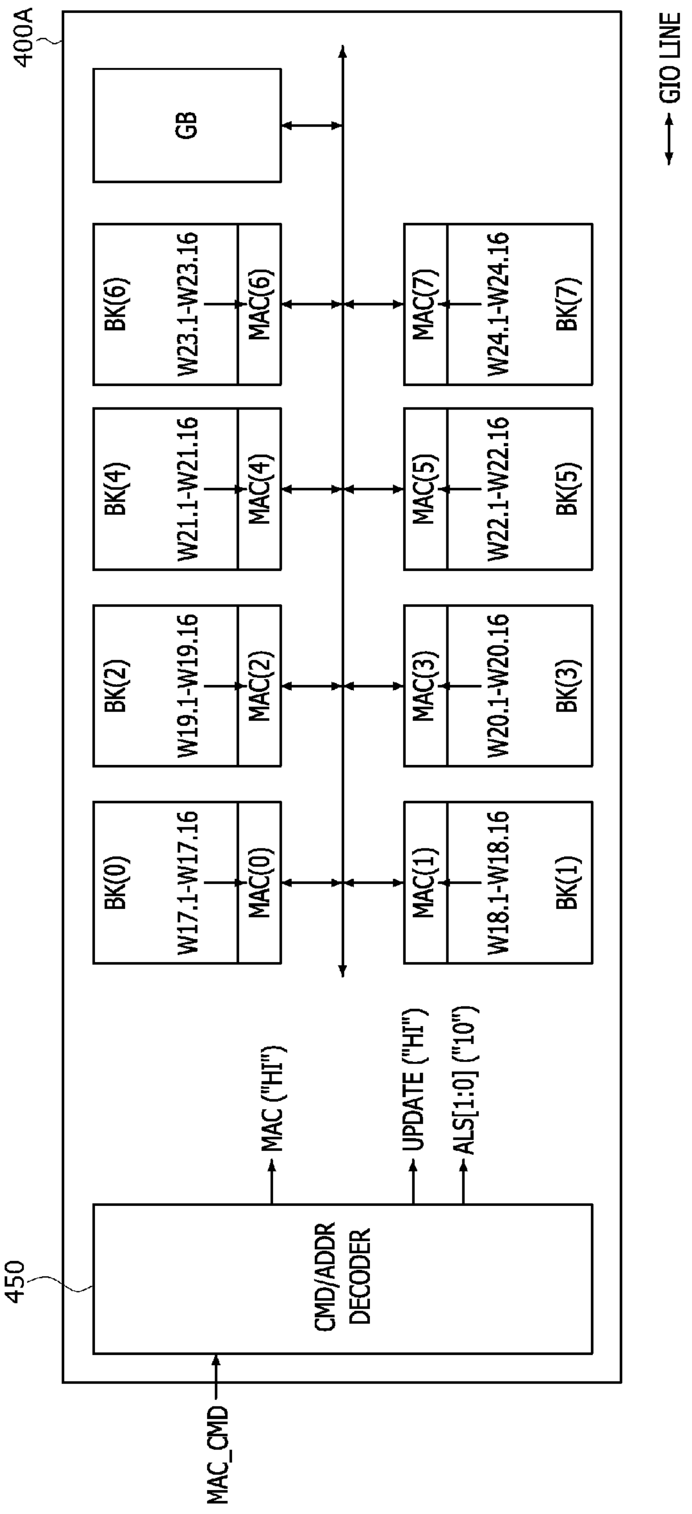
FIG. 41 illustrates a first MAC arithmetic operation performed in units of columns of a third matrix group included in the PIM device illustrated in FIG. 31.

FIG. 41 illustrates a first MAC arithmetic operation of a third matrix group column unit of the PIM device 400A illustrated in FIG. 31. The first MAC arithmetic operation of the third matrix group column unit of the PIM device 400A may be performed by the matrix multiplying calculation of the weight sub-matrix WSM31 and the vector sub-matrix VSM11, as described with reference to FIG. 34. Referring to FIG. 41, when the MAC command MAC_CMD is transmitted to the PIM device 400A, the command/address decoder 450 may generate and output the MAC signal MAC having a logic “high” level, the update signal UPDATE having a logic “high” level, and the accumulation latch selection signal ALS[1:0]. The command/address decoder 450 may output the accumulation latch selection signal ALS[1:0] having a logic level combination of “10”.

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W17.1~W17.16, . . . , and W24.1~W24.16, which are arrayed in respective ones of the first to eight rows of the weight sub-matrix WSM31, from the first to eighth memory banks BK(0)~BK(7), respectively. For example, the first MAC operator MAC(0) may receive the weight data W17.1~W17.16, which are arrayed in the first row of the weight sub-matrix WSM31, from the first memory bank BK(0); and the second MAC operator MAC(1) may receive the weight data W18.1~W18.16, which are arrayed in the second row of the weight sub-matrix WSM31, from the second memory bank BK(1). Similarly, the eighth MAC operator MAC(7) may receive the weight data W24.1~W24.16, which are arrayed in the eighth row of the weight sub-matrix WSM31, from the eighth memory bank BK(7). Meanwhile, the vector data V1~V16 previously transmitted to each of the first to eighth MAC operators MAC(0)~MAC(7) are not changed during the first MAC arithmetic operation of the third matrix group column unit of the PIM device 400A.

Figure 42:
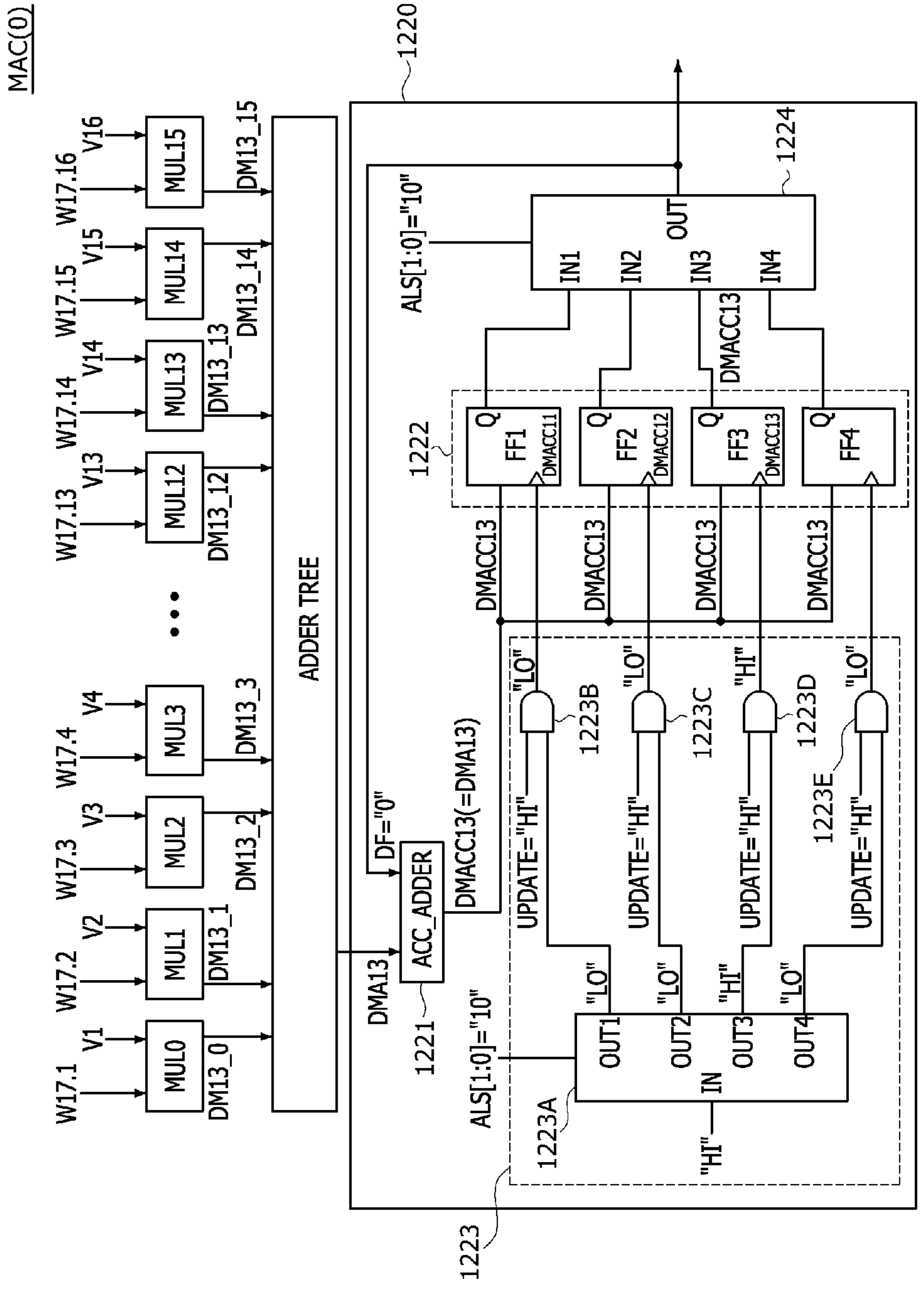
FIG. 42 illustrates an operation of a first MAC operator during the first MAC arithmetic operation illustrated in FIG. 39.

FIG. 42 illustrates an operation performed by the first MAC operator MAC(0) during the first MAC arithmetic operation of the third matrix group column unit of the PIM device 400A illustrated in FIG. 41. The operation of the first MAC operator MAC(0) described hereinafter may be equally applicable to each of the second to eighth MAC operators MAC(1)~MAC(7) except alteration of the weight data. Referring to FIG. 42, the first to sixteenth multipliers MUL0~MUL15 of the first MAC operator MAC(0) may perform multiplying calculations of the weight data W17.1~W17.16 and the vector data V1~V16. The first to sixteenth multipliers MUL0~MUL15 may output first to sixteenth multiplication data DM13_0~DM13_15 generated by the multiplying calculations, respectively. The adder tree may perform adding calculations of the first to sixteenth multiplication data DM13_0~DM13_15 outputted from the first to sixteenth multipliers MUL0~MUL15, thereby generating and outputting addition result data DMA13. The addition result data DMA13 outputted from the adder tree may be transmitted to the accumulative adder 1221 of the accumulator 1220.

The accumulative adder 1221 of the accumulator 1220 may perform an adding calculation of the addition result data DMA13 outputted from the adder tree and the feedback data DF outputted from the input selector 1224, thereby generating and outputting accumulated addition data DMACC13. Because the third latch circuit FF3 of the latch circuit 1222 has an initialized status, the feedback data DF transmitted from the input selector 1224 to the accumulative adder 1221 may have a value of zero. Thus, the accumulated addition data DMACC13 outputted from the accumulative adder 1221 may have the same value as the addition result data DMA13 outputted from the adder tree. The accumulated addition data DMACC13 outputted from the accumulative adder 1221 may be transmitted to each of the input terminals of the first to fourth latch circuits FF1~FF4.

The output selector 1223A of the latch circuit selector 1223 may output a logic high level signal HI through the third output terminal OUT3 in response to the accumulation latch selection signal ALS[1:0] having a logic level combination of "10". Thus, the logic high level signal HI may be inputted to the second input terminal of the third AND gate 1223D. In such a case, the output selector 1223A may output a logic low level signal LO through the first, second, and fourth output terminals OUT1, OUT2, and OUT4. Thus, the logic low level signal LO may be inputted to the second input terminals of the first, second, and fourth AND gates 1223B, 1223C, and 1223E. The update signal UPDATE having a logic "high" level may be transmitted from the command/address decoder 450 to the first input terminals of the first to fourth AND gates 1223B-1223E. Accordingly, the third AND gate 1223D may output the logic high level signal HI to the clock terminal of the third latch circuit FF3 while the first, second, and fourth AND gates 1223B, 1223C, and 1223E output the logic low level signal LO to the clock terminals of the first, second, and fourth latch circuits FF1, FF2, and FF4. The third latch circuit FF3 may latch the accumulated addition data DMACC13 outputted from the accumulative adder 1221 in synchronization with the logic high level signal HI outputted from the third AND gate 1223D and may output the latched data of the accumulated addition data DMACC13 to the third input terminal IN3 of the input selector 1224.

Figure 43:
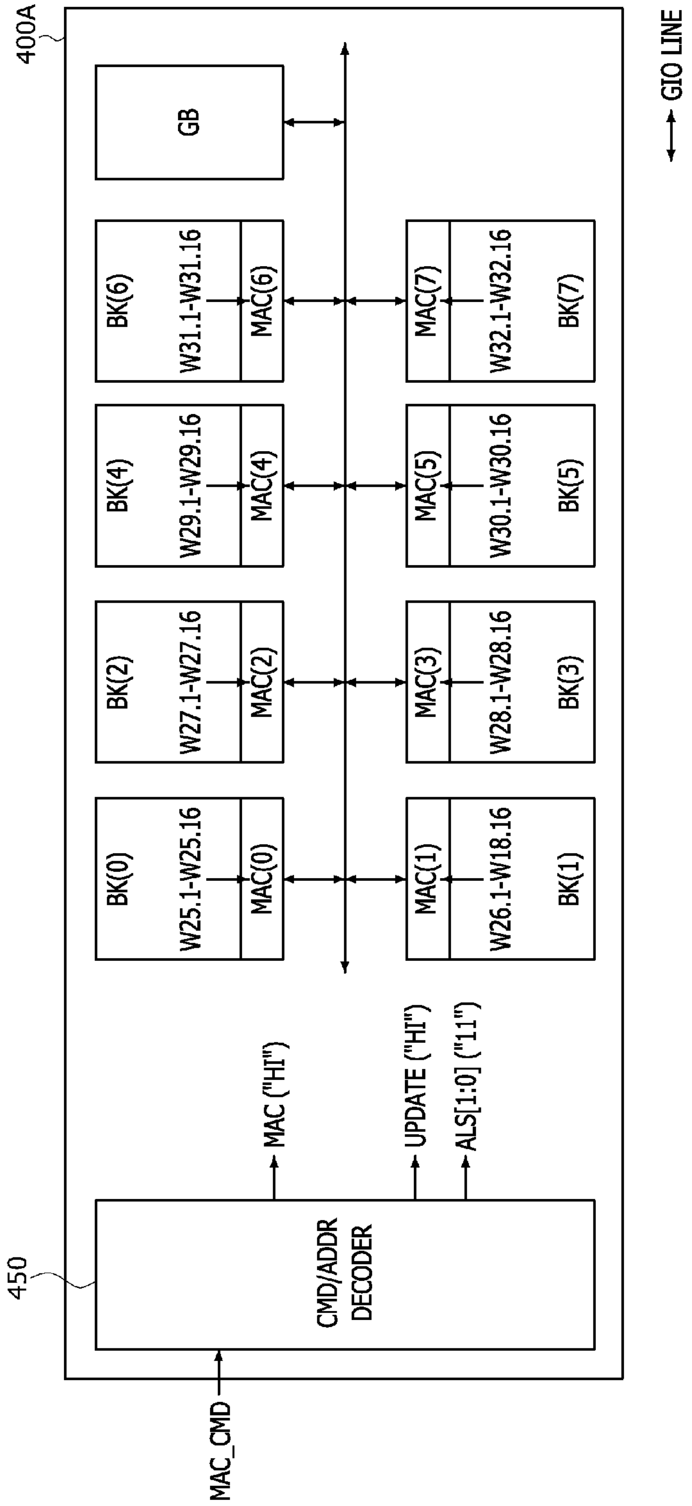
FIG. 43 illustrates a first MAC arithmetic operation performed in units of columns of a fourth matrix group included in the PIM device illustrated in FIG. 31.

FIG. 43 illustrates a first MAC arithmetic operation of a fourth matrix group column unit of the PIM device 400A illustrated in FIG. 31. The first MAC arithmetic operation of the fourth matrix group column unit of the PIM device 400A may be performed by the matrix multiplying calculation of the weight sub-matrix WSM41 and the vector sub-matrix VSM11, as described with reference to FIG. 34. Referring to FIG. 43, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the accumulation latch selection signal ALS[1:0] having a logic level combination of "11".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W25.1~W25.16, . . . , and W32.1~W32.16, which are arrayed in respective ones of the first to eight rows of the weight sub-matrix WSM41, from the first to eighth memory banks BK(0)~BK(7), respectively. For example, the first MAC operator MAC(0) may receive the weight data W25.1~W25.16, which are arrayed in the first row of the weight sub-matrix WSM41, from the first memory bank BK(0); and the second MAC operator MAC(1) may receive the weight data W26.1~W26.16, which are arrayed in the second row of the weight sub-matrix WSM41, from the second memory bank BK(1). Similarly, the eighth MAC operator MAC(7) may receive the weight data W32.1~W32.16, which are arrayed in the eighth row of the weight sub-matrix WSM41, from the eighth memory bank BK(7). Meanwhile, the vector data V1~V16 previously transmitted to each of the first to eighth MAC operators MAC(0)~MAC(7) are not changed during the first MAC arithmetic operation of the fourth matrix group column unit of the PIM device 400A.

Figure 44:
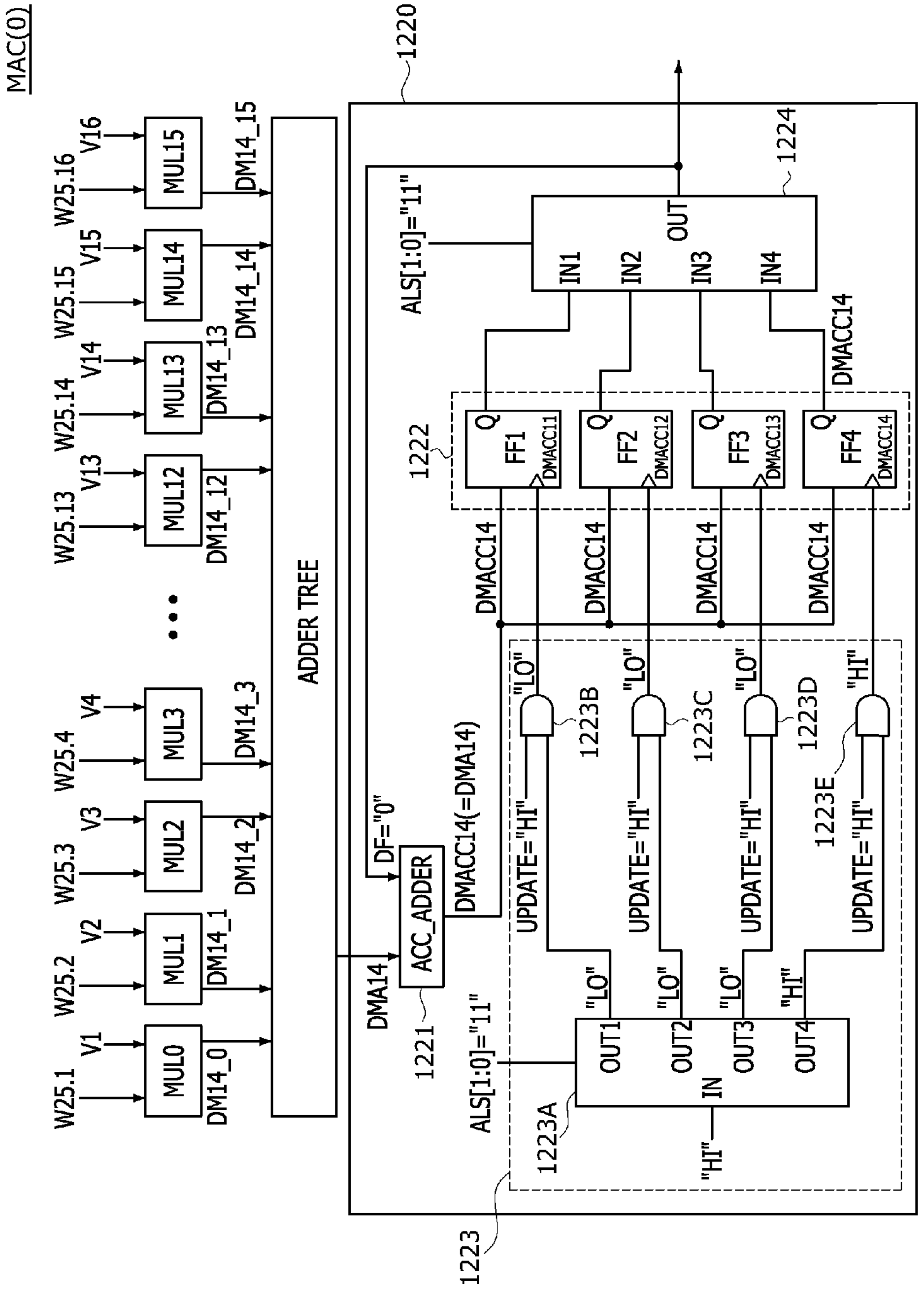
FIG. 44 illustrates an operation of a first MAC operator during the first MAC arithmetic operation illustrated in FIG. 43.

FIG. 44 illustrates an operation performed by the first MAC operator MAC(0) during the first MAC arithmetic operation of the fourth matrix group column unit of the PIM device 400A illustrated in FIG. 43. The operation of the first MAC operator MAC(0) described hereinafter may be equally applicable to each of the second to eighth MAC operators MAC(1)~MAC(7) except alteration of the weight data. Referring to FIG. 44, the first to sixteenth multipliers MUL0~MUL15 of the first MAC operator MAC(0) may perform multiplying calculations of the weight data W25.1~W25.16 and the vector data V1~V16. The first to sixteenth multipliers MUL0~MUL15 may output first to sixteenth multiplication data DM14_0~DM14_15 generated by the multiplying calculations, respectively. The adder tree may perform adding calculations of the first to sixteenth multiplication data DM14_0~DM14_15 outputted from the first to sixteenth multipliers MUL0~MUL15, thereby generating and outputting addition result data DMA14. The addition result data DMA14 outputted from the adder tree may be transmitted to the accumulative adder 1221 of the accumulator 1220.

The accumulative adder 1221 of the accumulator 1220 may perform an adding calculation of the addition result data DMA14 outputted from the adder tree and the feedback data DF outputted from the input selector 1224, thereby generating and outputting accumulated addition data DMACC14. Because the fourth latch circuit FF4 of the latch circuit 1222 has an initialized status, the feedback data DF transmitted from the input selector 1224 to the accumulative adder 1221 may have a value of zero. Thus, the accumulated addition data DMACC14 outputted from the accumulative adder 1221 may have the same value as the addition result data DMA14 outputted from the adder tree. The accumulated addition data DMACC14 outputted from the accumulative adder 1221 may be transmitted to each of the input terminals of the first to fourth latch circuits FF1~FF4.

The output selector 1223A of the latch circuit selector 1223 may output a logic high level signal HI through the fourth output terminal OUT4 in response to the accumulation latch selection signal ALS[1:0] having a logic level combination of "11". Thus, the logic high level signal HI may be inputted to the second input terminal of the fourth AND gate 1223E. In such a case, the output selector 1223A may output a logic low level signal LO through the first, second, and third output terminals OUT1, OUT2, and OUT3. Thus, the logic low level signal LO may be inputted to the second input terminals of the first, second, and third AND gates 1223B, 1223C, and 1223D. The update signal UPDATE having a logic "high" level may be transmitted from the command/address decoder 450 to the first input terminals of the first to fourth AND gates 1223B-1223E. Accordingly, the fourth AND gate 1223E may output the logic high level signal HI to the clock terminal of the fourth latch circuit FF4 while the first, second, and third AND gates 1223B, 1223C, and 1223D output the logic low level signal LO to the clock terminals of the first, second, and third latch circuits FF1, FF2, and FF3. The fourth latch circuit FF4 may latch the accumulated addition data DMACC14 outputted from the accumulative adder 1221 in synchronization with the logic high level signal HI outputted from the fourth AND gate 1223E and may output the latched data of the accumulated addition data DMACC14 to the fourth input terminal IN4 of the input selector 1224.

As described with reference to FIGS. 37 to 44, the first MAC arithmetic operations of the first to fourth matrix group column units of the PIM device 400A may be sequentially performed to complete the first MAC arithmetic operations of the matrix group column unit for the weight sub-matrixes WSM11, WSM21, WSM31, and WSM41 in the first weight matrix group column WMGC1 and the vector sub-matrixes VSM11 in the first vector matrix group row VMGR1. While the first MAC arithmetic operations of the matrix group column unit are performed, only the weight data transmitted to the MAC operators may be changed without any alteration of the vector data transmitted from the global buffer to the MAC operators. As a result of the first MAC arithmetic operations of the matrix group column unit, the accumulated addition data DMACC11 generated by the first MAC arithmetic operation of the first matrix group column unit may be latched in the first latch circuit FF1 of the accumulator 1220 and the accumulated addition data DMACC12 generated by the first MAC arithmetic operation of the second matrix group column unit may be latched in the second latch circuit FF2 of the accumulator 1220. In addition, the accumulated addition data DMACC13 generated by the first MAC arithmetic operation of the third matrix group column unit may be latched in the third latch circuit FF3 of the accumulator 1220, and the accumulated addition data DMACC14 generated by the first MAC arithmetic operation of the fourth matrix group column unit may be latched in the fourth latch circuit FF4 of the accumulator 1220.

Figure 45:
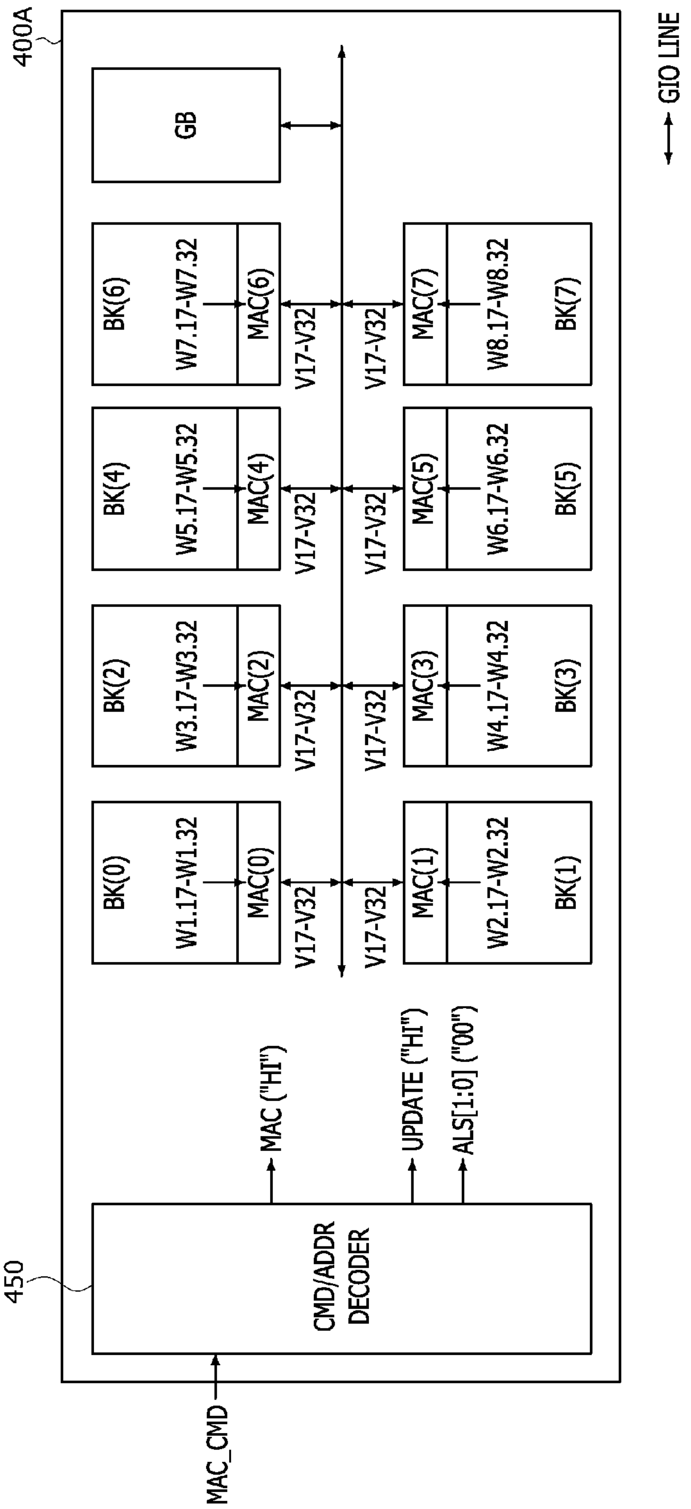
FIG. 45 illustrates a second MAC arithmetic operation performed in units of columns of a first matrix group included in the PIM device illustrated in FIG. 31.

FIG. 45 illustrates a second MAC arithmetic operation of a first matrix group column unit of the PIM device 400A illustrated in FIG. 31. The second MAC arithmetic operation of the first matrix group column unit of the PIM device 400A may be performed by the matrix multiplying calculation of the weight sub-matrix WSM12 and the vector sub-matrix VSM21, as described with reference to FIG. 34. Referring to FIG. 45, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when a certain amount of time elapses from a point in time when the MAC signal MAC having a logic "high" level is outputted. In an embodiment, the certain time may be set as an interval of time from a point in time when the MAC signal MAC having a logic "high" level is outputted from the command/address decoder 450 until a point in time when the accumulative adding calculations are executed by the accumulators of the first to eighth MAC operators MAC(0)~MAC(7). The command/address decoder 450 may output the accumulation latch selection signal ALS[1:0] having a logic level combination of "00".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W1.17~W1.32, . . . , and W8.17~W8.32, which are arrayed in respective ones of the first to eight rows of the weight sub-matrix WSM12, from the first to eighth memory banks BK(0)~BK(7), respectively. For example, the first MAC operator MAC(0) may receive the weight data W1.17~W1.32, which are arrayed in the first row of the weight sub-matrix WSM12, from the first memory bank BK(0); and the second MAC operator MAC(1) may receive the weight data W2.17~W2.32, which are arrayed in the second row of the weight sub-matrix WSM12, from the second memory bank BK(1). Similarly, the eighth MAC operator MAC(7) may receive the weight data W8.17~W8.32, which are arrayed in the eighth row of the weight sub-matrix WSM12, from the eighth memory bank BK(7).

As described with reference to FIG. 34, while the vector data V1~V16 of the vector sub-matrix VSM11 are used for the first MAC arithmetic operations of the first to fourth matrix group column units, the vector data V17~V32 of the vector sub-matrix VSM21 may be used for the second MAC arithmetic operations of the first to fourth matrix group column units. Thus, the vector data V17~V32 of the vector sub-matrix VSM21 have to be transmitted to the first to eighth MAC operators MAC(0)~MAC(7) in order to perform the second MAC arithmetic operation of the first matrix group column unit after the termination of the first MAC arithmetic operations of the first to fourth matrix group column units. Accordingly, in order to perform the second MAC arithmetic operation of the first matrix group column unit, each of the first to eighth MAC operators MAC(0)~MAC(7) may receive the vector data V17~V32 arrayed in the vector sub-matrix VSM21 from the global buffer GB.

Figure 46:
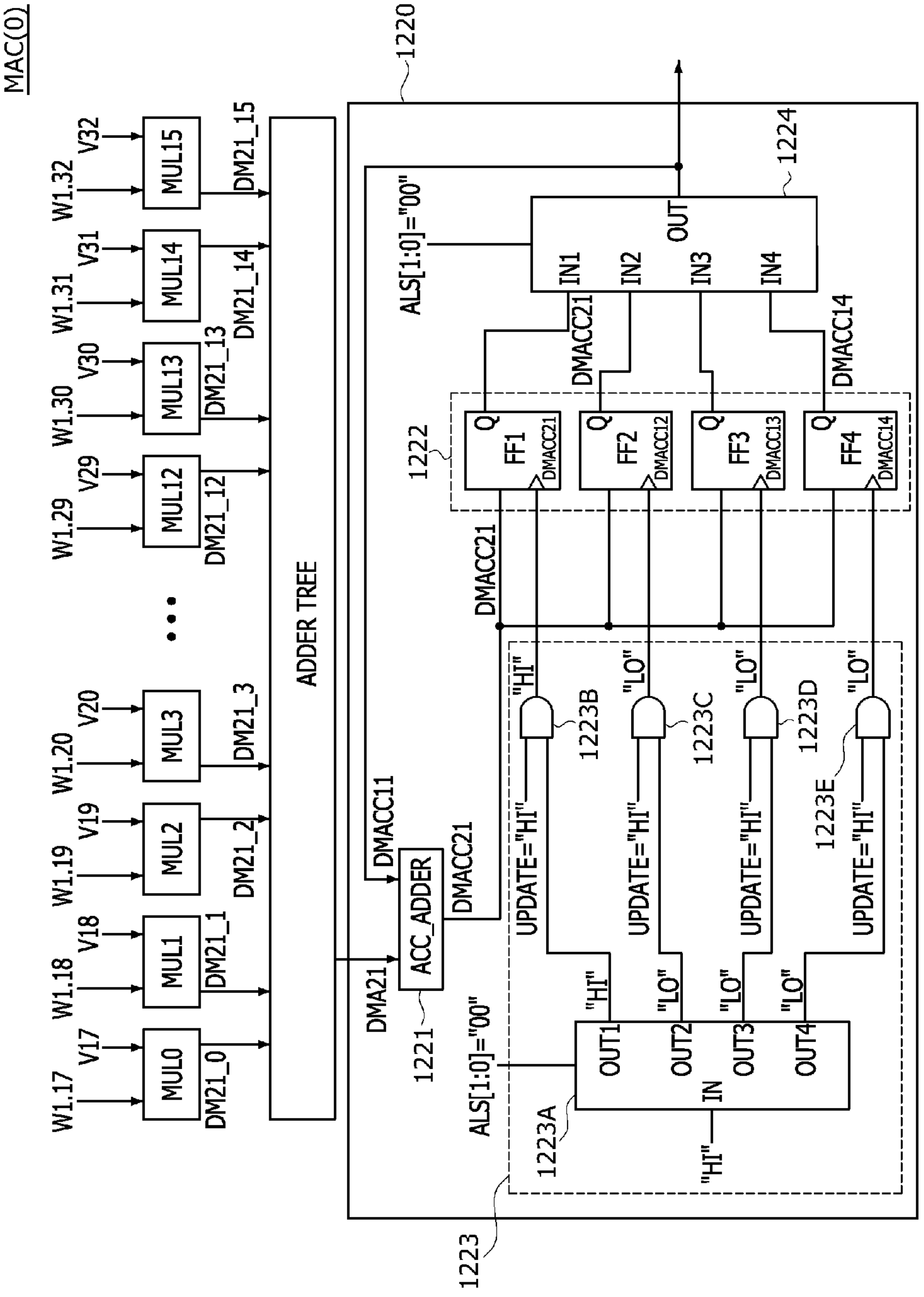
FIG. 46 illustrates an operation of a first MAC operator during the second MAC arithmetic operation illustrated in FIG. 45.

FIG. 46 illustrates an operation performed by the first MAC operator MAC(0) during the second MAC arithmetic operation of the first matrix group column unit of the PIM device 400A illustrated in FIG. 45. The operation of the first MAC operator MAC(0) described hereinafter may be equally applicable to each of the second to eighth MAC operators MAC(1)~MAC(7) except alteration of the weight data. Referring to FIG. 46, the first to sixteenth multipliers MUL0~MUL15 of the first MAC operator MAC(0) may perform multiplying calculations of the weight data W1.17~W1.32 and the vector data V17~V32. The first to sixteenth multipliers MUL0~MUL15 may output first to sixteenth multiplication data DM21_0~DM21_15 generated by the multiplying calculations, respectively. The adder tree may perform adding calculations of the first to sixteenth multiplication data DM21_0~DM21_15 outputted from the first to sixteenth multipliers MUL0~MUL15, thereby generating and outputting addition result data DMA21. The addition result data DMA21 outputted from the adder tree may be transmitted to the accumulative adder 1221 of the accumulator 1220.

The input selector 1224 of the accumulator 1220 may feedback the accumulated addition data DMACC11, which are transmitted from the first latch circuit FF1 to the first input terminal IN1 of the input selector 1224 by the first MAC arithmetic operation of the first matrix group column unit, to the accumulative adder 1221 in response to the accumulation latch selection signal ALS[1:0] having a logic level combination of "00". The accumulative adder 1221 of the accumulator 1220 may perform an adding calculation of the addition result data DMA21 outputted from the adder tree and the accumulated addition data DMACC11 fed back from the input selector 1224, thereby generating and outputting accumulated addition data DMACC21. Thus, the accumulated addition data DMACC21 outputted from the accumulative adder 1221 may correspond to accumulation data that the result data of the second MAC arithmetic operation of the first matrix group column unit are added to the result data of the first MAC arithmetic operation of the first matrix group column unit. The accumulated addition data DMACC21 outputted from the accumulative adder 1221 may be transmitted to each of the input terminals of the first to fourth latch circuits FF1~FF4.

The output selector 1223A of the latch circuit selector 1223 may output a logic high level signal HI through the first output terminal OUT1 in response to the accumulation latch selection signal ALS[1:0] having a logic level combination of "00". Thus, the logic high level signal HI may be inputted to the second input terminal of the first AND gate 12238. In such a case, the output selector 1223A may output a logic low level signal LO through the second, third, and fourth output terminals OUT2, OUT3, and OUT4. Thus, the logic low level signal LO may be inputted to the second input terminals of the second to fourth AND gates 1223C, 1223D, and 1223E. The update signal UPDATE having a logic "high" level may be transmitted from the command/address decoder 450 to the first input terminals of the first to fourth AND gates 1223B-1223E. Accordingly, the first AND gate 1223B may output the logic high level signal HI to the clock terminal of the first latch circuit FF1 while the second to fourth AND gates 1223C-1223E output the logic low level signal LO to the clock terminals of the second to fourth latch circuits FF2, FF3, and FF4. The first latch circuit FF1 may latch the accumulated addition data DMACC21 outputted from the accumulative adder 1221 in synchronization with the logic high level signal HI outputted from the first AND gate 1223B and may output the latched data of the accumulated addition data DMACC21 to the first input terminal IN1 of the input selector 1224.

Figure 47:
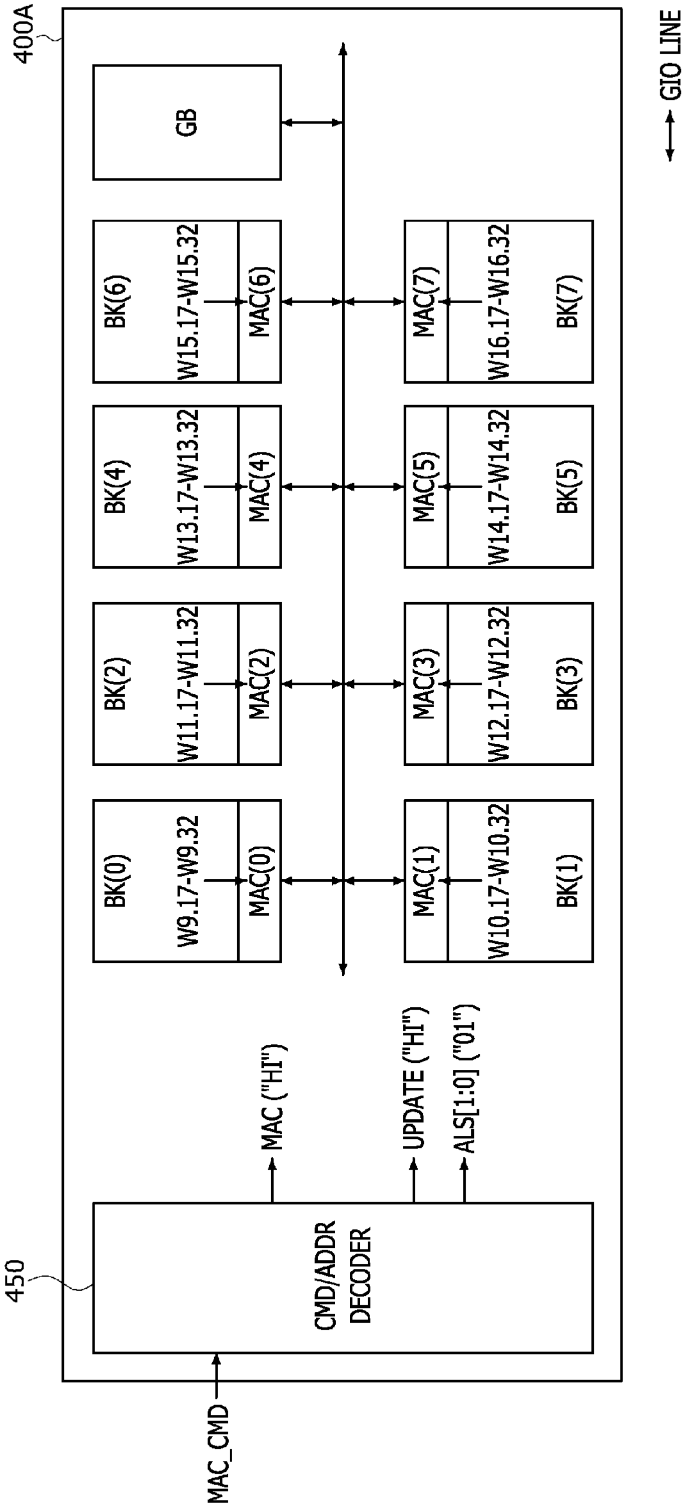
FIG. 47 illustrates a second MAC arithmetic operation performed in units of columns of a second matrix group included in the PIM device illustrated in FIG. 31.

FIG. 47 illustrates a second MAC arithmetic operation of a second matrix group column unit of the PIM device 400A illustrated in FIG. 31. The second MAC arithmetic operation of the second matrix group column unit of the PIM device 400A may be performed by the matrix multiplying calculation of the weight sub-matrix WSM22 and the vector sub-matrix VSM21, as described with reference to FIG. 34. Referring to FIG. 47, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when the certain amount of time elapses from a point in time when the MAC signal MAC having a logic "high" level is outputted. The command/address decoder 450 may output the accumulation latch selection signal ALS[1:0] having a logic level combination of "01".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W9.17~W9.32, . . . , and W16.17~W16.32, which are arrayed in respective ones of the first to eight rows of the weight sub-matrix WSM22, from the first to eighth memory banks BK(0)~BK(7), respectively. For example, the first MAC operator MAC(0) may receive the weight data W9.17~W9.32, which are arrayed in the first row of the weight sub-matrix WSM22, from the first memory bank BK(0); and the second MAC operator MAC(1) may receive the weight data W10.17~W10.32, which are arrayed in the second row of the weight sub-matrix WSM22, from the second memory bank BK(1). Similarly, the eighth MAC operator MAC(7) may receive the weight data W16.17~W16.32, which are arrayed in the eighth row of the weight sub-matrix WSM22, from the eighth memory bank BK(7). Meanwhile, the vector data V17~V32 previously transmitted to each the first to eighth MAC operators MAC(0)~MAC(7) are not changed during the second MAC arithmetic operation of the second matrix group column unit of the PIM device 400A.

Figure 48:
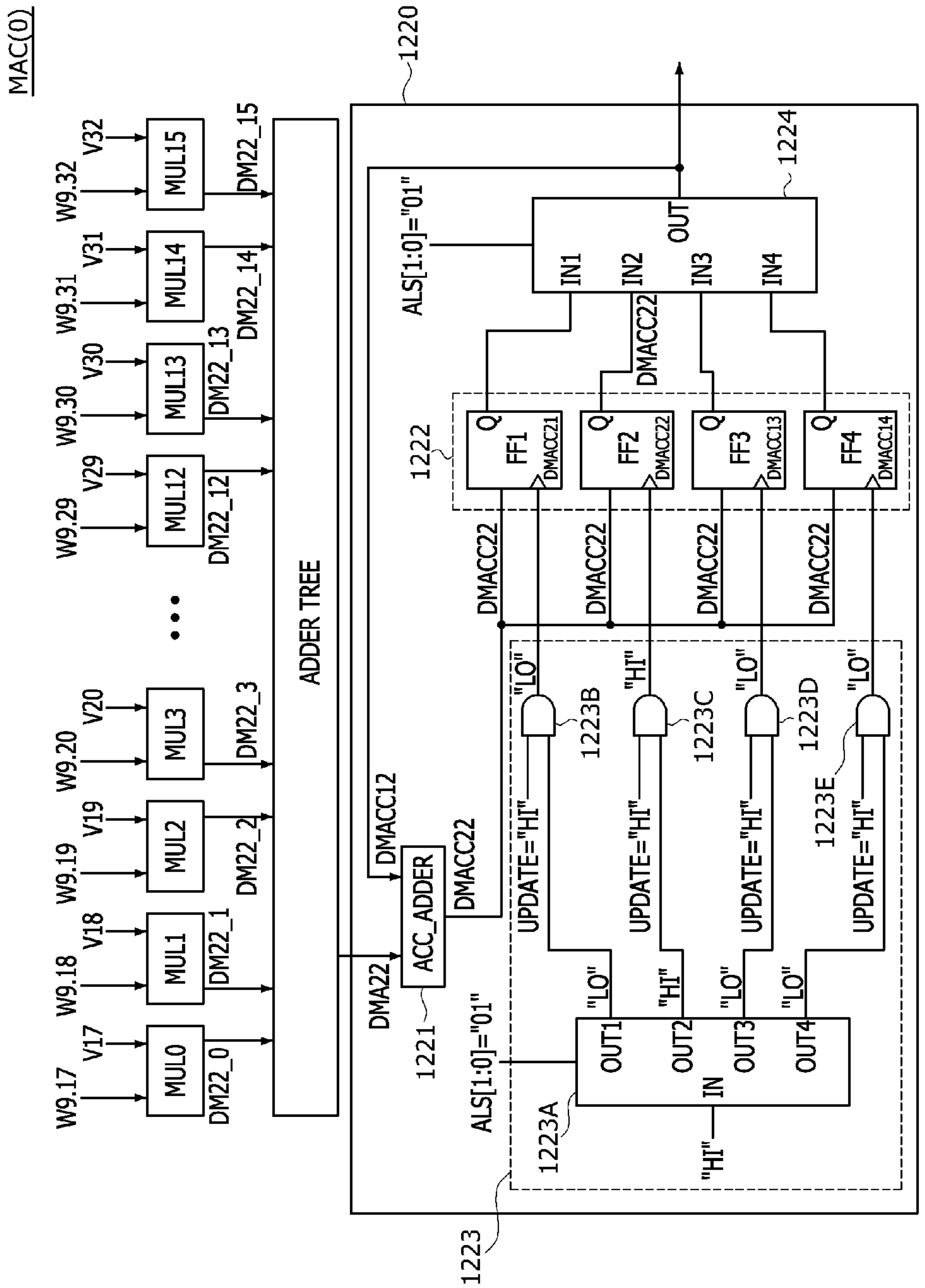
FIG. 48 illustrates an operation of a first MAC operator during the second MAC arithmetic operation illustrated in FIG. 47.

FIG. 48 illustrates an operation performed by the first MAC operator MAC(0) during the second MAC arithmetic operation of the second matrix group column unit of the PIM device 400A illustrated in FIG. 47. The operation of the first MAC operator MAC(0) described hereinafter may be equally applicable to each of the second to eighth MAC operators MAC(1)~MAC(7) except alteration of the weight data. Referring to FIG. 48, the first to sixteenth multipliers MUL0~MUL15 of the first MAC operator MAC(0) may perform multiplying calculations of the weight data W9.17~W9.32 and the vector data V17~V32. The first to sixteenth multipliers MUL0~MUL15 may output first to sixteenth multiplication data DM22_0~DM22_15 generated by the multiplying calculations, respectively. The adder tree may perform adding calculations of the first to sixteenth multiplication data DM22_0~DM22_15 outputted from the first to sixteenth multipliers MUL0~MUL15, thereby generating and outputting addition result data DMA22. The addition result data DMA22 outputted from the adder tree may be transmitted to the accumulative adder 1221 of the accumulator 1220.

The input selector 1224 of the accumulator 1220 may feedback the accumulated addition data DMACC12, which are transmitted from the second latch circuit FF2 to the second input terminal IN2 of the input selector 1224 by the first MAC arithmetic operation of the second matrix group column unit, to the accumulative adder 1221 in response to the accumulation latch selection signal ALS[1:0] having a logic level combination of "01". The accumulative adder 1221 of the accumulator 1220 may perform an adding calculation of the addition result data DMA22 outputted from the adder tree and the accumulated addition data DMACC12 fed back from the input selector 1224, thereby generating and outputting accumulated addition data DMACC22. Thus, the accumulated addition data DMACC22 outputted from the accumulative adder 1221 may correspond to accumulation data that the result data of the second MAC arithmetic operation of the second matrix group column unit are added to the result data of the first MAC arithmetic operation of the second matrix group column unit. The accumulated addition data DMACC22 outputted from the accumulative adder 1221 may be transmitted to each of the input terminals of the first to fourth latch circuits FF1~FF4.

The output selector 1223A of the latch circuit selector 1223 may output a logic high level signal HI through the second output terminal OUT2 in response to the accumulation latch selection signal ALS[1:0] having a logic level combination of "01". Thus, the logic high level signal HI may be inputted to the second input terminal of the second AND gate 1223C. In such a case, the output selector 1223A may output a logic low level signal LO through the first, third, and fourth output terminals OUT1, OUT3, and OUT4. Thus, the logic low level signal LO may be inputted to the second input terminals of the first, third, and fourth AND gates 1223B, 1223D, and 1223E. The update signal UPDATE having a logic "high" level may be transmitted from the command/address decoder 450 to the first input terminals of the first to fourth AND gates 1223B-1223E. Accordingly, the second AND gate 1223C may output the logic high level signal HI to the clock terminal of the second latch circuit FF2 while the first, third, and fourth AND gates 1223B, 1223D, and 1223E output the logic low level signal LO to the clock terminals of the first, third, and fourth latch circuits FF1, FF3, and FF4. The second latch circuit FF2 may latch the accumulated addition data DMACC22 outputted from the accumulative adder 1221 in synchronization with the logic high level signal HI outputted from the second AND gate 1223C and may output the latched data of the accumulated addition data DMACC22 to the second input terminal IN2 of the input selector 1224.

Figure 49:
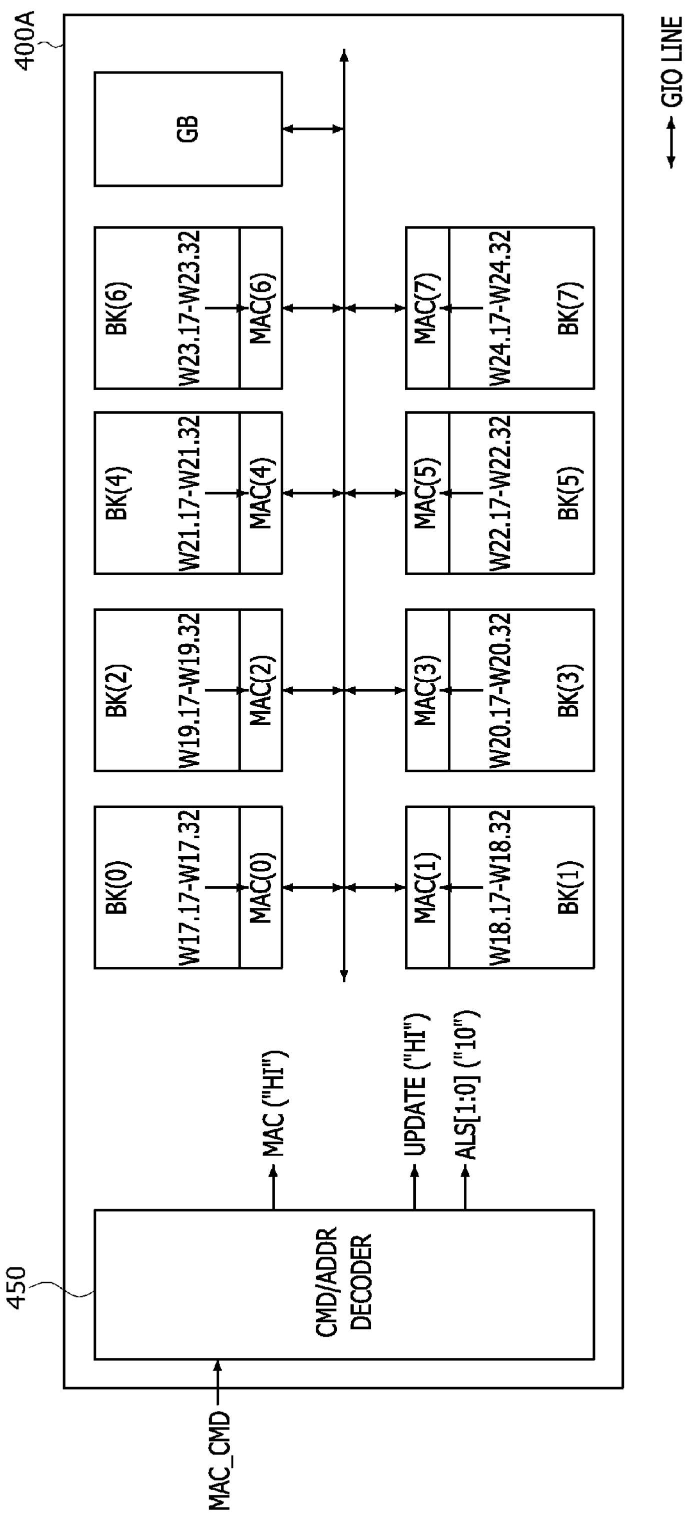
FIG. 49 illustrates a second MAC arithmetic operation performed in units of columns of a third matrix group included in the PIM device illustrated in FIG. 31.

FIG. 49 illustrates a second MAC arithmetic operation of a third matrix group column unit of the PIM device 400A illustrated in FIG. 31. The second MAC arithmetic operation of the third matrix group column unit of the PIM device 400A may be performed by the matrix multiplying calculation of the weight sub-matrix WSM32 and the vector sub-matrix VSM21, as described with reference to FIG. 34. Referring to FIG. 49, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when the certain amount of time elapses from a point in time when the MAC signal MAC having a logic "high" level is outputted. The command/address decoder 450 may output the accumulation latch selection signal ALS[1:0] having a logic level combination of "10".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W17.17~W17.32, . . . , and W24.17~W24.32, which are arrayed in respective ones of the first to eight rows of the weight sub-matrix WSM32, from the first to eighth memory banks BK(0)~BK(7), respectively. For example, the first MAC operator MAC(0) may receive the weight data W17.17~W17.32, which are arrayed in the first row of the weight sub-matrix WSM32, from the first memory bank BK(0); and the second MAC operator MAC(1) may receive the weight data W18.17~W18.32, which are arrayed in the second row of the weight sub-matrix WSM32, from the second memory bank BK(1). Similarly, the eighth MAC operator MAC(7) may receive the weight data W24.17~W24.32, which are arrayed in the eighth row of the weight sub-matrix WSM32, from the eighth memory bank BK(7). Meanwhile, the vector data V17~V32 previously transmitted to each the first to eighth MAC operators MAC(0)~MAC(7) are not changed during the second MAC arithmetic operation of the third matrix group column unit of the PIM device 400A.

Figure 50:
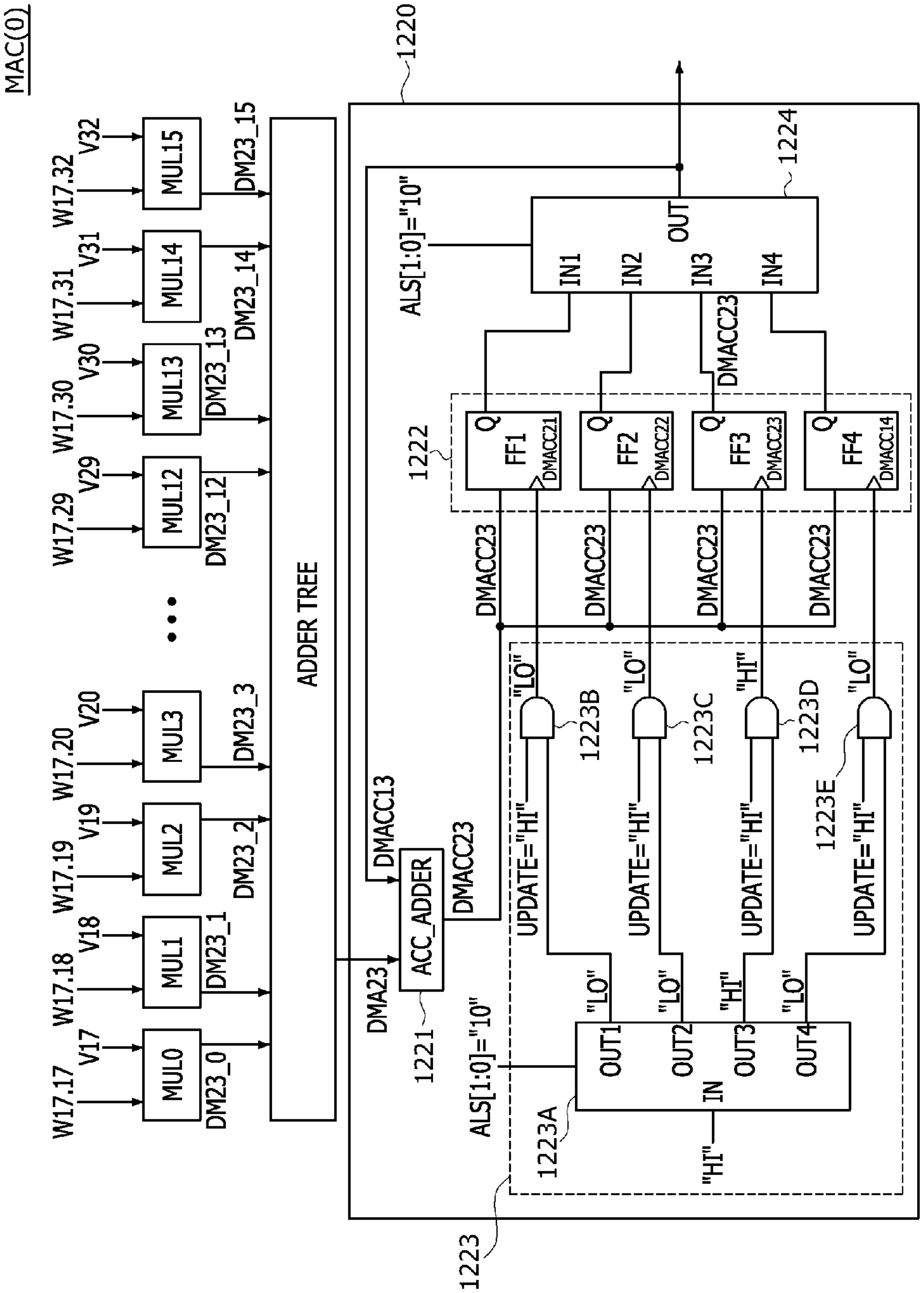
FIG. 50 illustrates an operation of a first MAC operator during the second MAC arithmetic operation illustrated in FIG. 49.

FIG. 50 illustrates an operation performed by the first MAC operator MAC(0) during the second MAC arithmetic operation of the third matrix group column unit of the PIM device 400A illustrated in FIG. 49. The operation of the first MAC operator MAC(0) described hereinafter may be equally applicable to each of the second to eighth MAC operators MAC(1)~MAC(7) except alteration of the weight data. Referring to FIG. 50, the first to sixteenth multipliers MUL0~MUL15 of the first MAC operator MAC(0) may perform multiplying calculations of the weight data W17.17~W17.32 and the vector data V17~V32. The first to sixteenth multipliers MUL0~MUL15 may output first to sixteenth multiplication data DM23_0~DM23_15 generated by the multiplying calculations, respectively. The adder tree may perform adding calculations of the first to sixteenth multiplication data DM23_0~DM23_15 outputted from the first to sixteenth multipliers MUL0~MUL15, thereby generating and outputting addition result data DMA23. The addition result data DMA23 outputted from the adder tree may be transmitted to the accumulative adder 1221 of the accumulator 1220.

The input selector 1224 of the accumulator 1220 may feedback the accumulated addition data DMACC13, which are transmitted from the third latch circuit FF3 to the third input terminal IN3 of the input selector 1224 by the first MAC arithmetic operation of the third matrix group column unit, to the accumulative adder 1221 in response to the accumulation latch selection signal ALS[1:0] having a logic level combination of "10". The accumulative adder 1221 of the accumulator 1220 may perform an adding calculation of the addition result data DMA23 outputted from the adder tree and the accumulated addition data DMACC13 fed back from the input selector 1224, thereby generating and outputting accumulated addition data DMACC23. Thus, the accumulated addition data DMACC23 outputted from the accumulative adder 1221 may correspond to accumulation data that the result data of the second MAC arithmetic operation of the third matrix group column unit are added to the result data of the first MAC arithmetic operation of the third matrix group column unit. The accumulated addition data DMACC23 outputted from the accumulative adder 1221 may be transmitted to each of the input terminals of the first to fourth latch circuits FF1~FF4.

The output selector 1223A of the latch circuit selector 1223 may output a logic high level signal HI through the third output terminal OUT3 in response to the accumulation latch selection signal ALS[1:0] having a logic level combination of "10". Thus, the logic high level signal HI may be inputted to the second input terminal of the third AND gate 1223D. In such a case, the output selector 1223A may output a logic low level signal LO through the first, second, and fourth output terminals OUT1, OUT2, and OUT4. Thus, the logic low level signal LO may be inputted to the second input terminals of the first, second, and fourth AND gates 1223B, 1223C, and 1223E. The update signal UPDATE having a logic "high" level may be transmitted from the command/address decoder 450 to the first input terminals of the first to fourth AND gates 1223B-1223E. Accordingly, the third AND gate 1223D may output the logic high level signal HI to the clock terminal of the third latch circuit FF3 while the first, second, and fourth AND gates 1223B, 1223C, and 1223E output the logic low level signal LO to the clock terminals of the first, second, and fourth latch circuits FF1, FF2, and FF4. The third latch circuit FF3 may latch the accumulated addition data DMACC23 outputted from the accumulative adder 1221 in synchronization with the logic high level signal HI outputted from the third AND gate 1223D and may output the latched data of the accumulated addition data DMACC23 to the third input terminal IN3 of the input selector 1224.

Figure 51:
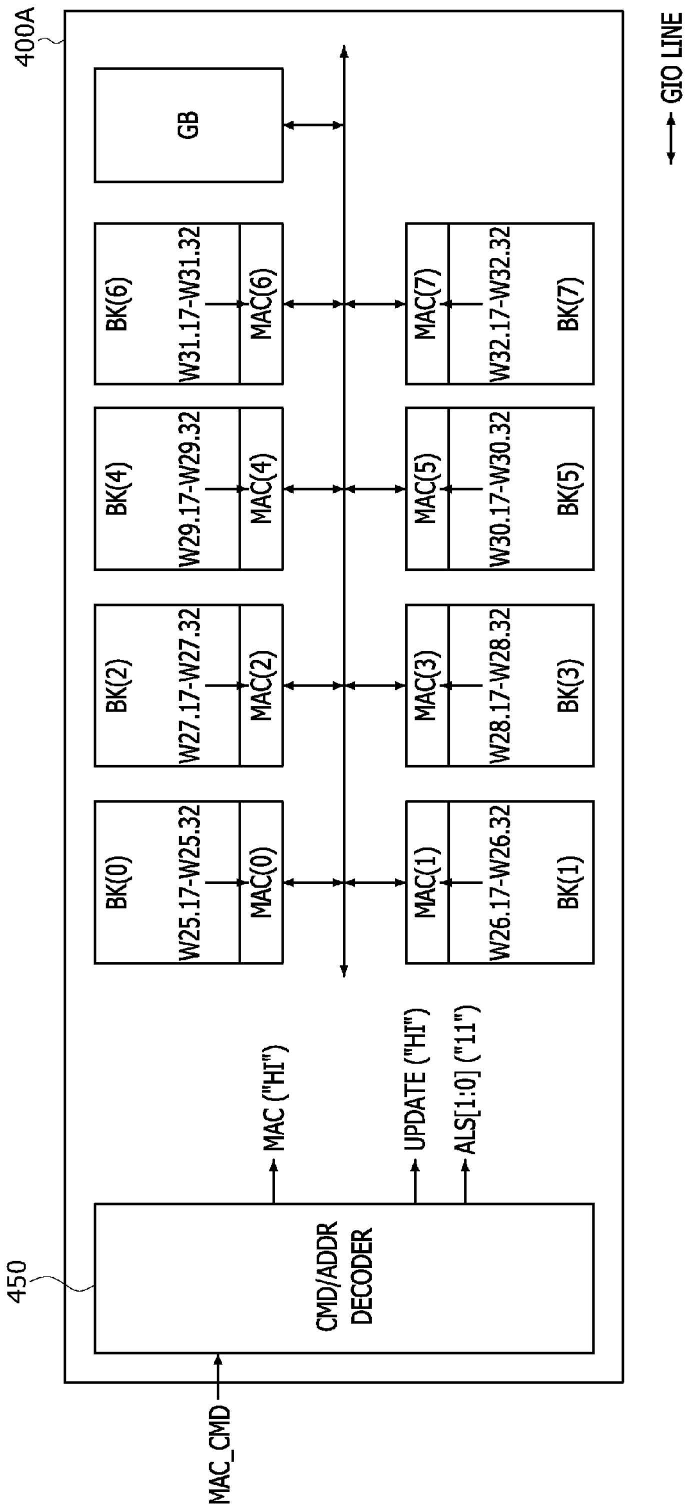
FIG. 51 illustrates a second MAC arithmetic operation performed in units of columns of a fourth matrix group included in the PIM device illustrated in FIG. 31.

FIG. 51 illustrates a second MAC arithmetic operation of a fourth matrix group column unit of the PIM device 400A illustrated in FIG. 31. The second MAC arithmetic operation of the fourth matrix group column unit of the PIM device 400A may be performed by the matrix multiplying calculation of the weight sub-matrix WSM42 and the vector sub-matrix VSM21, as described with reference to FIG. 34. Referring to FIG. 51, when the MAC command MAC_CMD is transmitted to the PIM device 400A, the command/address decoder 450 may generate and output the MAC signal MAC having a logic "high" level, the update signal UPDATE having a logic "high" level, and the accumulation latch selection signal ALS[1:0]. The command/address decoder 450 may output the update signal UPDATE having a logic "high" level at a point in time when the certain amount of time elapses from a point in time when the MAC signal MAC having a logic "high" level is outputted. The command/address decoder 450 may output the accumulation latch selection signal ALS[1:0] having a logic level combination of "11".

Each of the first to eighth MAC operators MAC(0)~MAC(7) may receive the weight data Ws and the vector data Vs in response to the MAC signal MAC outputted from the command/address decoder 450. The first to eighth MAC operators MAC(0)~MAC(7) may receive the weight data W25.17~W25.32, . . . , and W32.17~W32.32, which are arrayed in respective ones of the first to eight rows of the weight sub-matrix WSM42, from the first to eighth memory banks BK(0)~BK(7), respectively. For example, the first MAC operator MAC(0) may receive the weight data W25.17~W25.32, which are arrayed in the first row of the weight sub-matrix WSM42, from the first memory bank BK(0); and the second MAC operator MAC(1) may receive the weight data W26.17~W26.32, which are arrayed in the second row of the weight sub-matrix WSM42, from the second memory bank BK(1). Similarly, the eighth MAC operator MAC(7) may receive the weight data W32.17~W32.32, which are arrayed in the eighth row of the weight sub-matrix WSM42, from the eighth memory bank BK(7). Meanwhile, the vector data V17~V32 previously transmitted to each the first to eighth MAC operators MAC(0)~MAC(7) are not changed during the second MAC arithmetic operation of the fourth matrix group column unit of the PIM device 400A.

Figure 52:
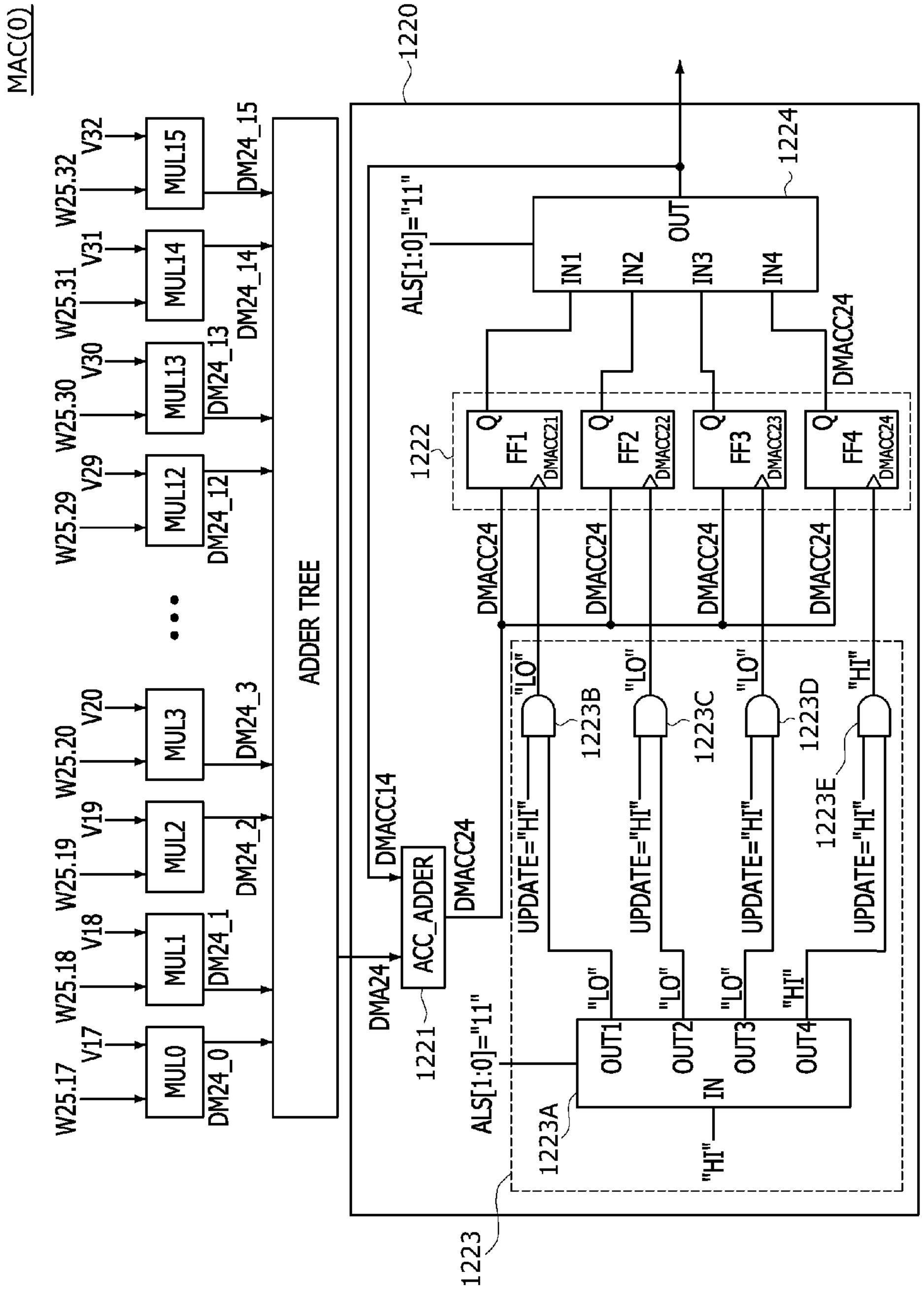
FIG. 52 illustrates an operation of a first MAC operator during the second MAC arithmetic operation illustrated in FIG. 51.

FIG. 52 illustrates an operation performed by the first MAC operator MAC(0) during the second MAC arithmetic operation of the fourth matrix group column unit of the PIM device 400A illustrated in FIG. 51. The operation of the first MAC operator MAC(0) described hereinafter may be equally applicable to each of the second to eighth MAC operators MAC(1)~MAC(7) except alteration of the weight data. Referring to FIG. 52, the first to sixteenth multipliers MUL0~MUL15 of the first MAC operator MAC(0) may perform multiplying calculations of the weight data W25.17~W25.32 and the vector data V17~V32. The first to sixteenth multipliers MUL0~MUL15 may output first to sixteenth multiplication data DM24_0~DM24_15 generated by the multiplying calculations, respectively. The adder tree may perform adding calculations of the first to sixteenth multiplication data DM24_0~DM24_15 outputted from the first to sixteenth multipliers MUL0~MUL15, thereby generating and outputting addition result data DMA24. The addition result data DMA24 outputted from the adder tree may be transmitted to the accumulative adder 1221 of the accumulator 1220.

The input selector 1224 of the accumulator 1220 may feedback the accumulated addition data DMACC14, which are transmitted from the fourth latch circuit FF4 to the fourth input terminal IN4 of the input selector 1224 by the first MAC arithmetic operation of the fourth matrix group column unit, to the accumulative adder 1221 in response to the accumulation latch selection signal ALS[1:0] having a logic level combination of "11". The accumulative adder 1221 of the accumulator 1220 may perform an adding calculation of the addition result data DMA24 outputted from the adder tree and the accumulated addition data DMACC14 fed back from the input selector 1224, thereby generating and outputting accumulated addition data DMACC24. Thus, the accumulated addition data DMACC24 outputted from the accumulative adder 1221 may correspond to accumulation data that the result data of the second MAC arithmetic operation of the fourth matrix group column unit are added to the result data of the first MAC arithmetic operation of the fourth matrix group column unit. The accumulated addition data DMACC24 outputted from the accumulative adder 1221 may be transmitted to each of the input terminals of the first to fourth latch circuits FF1~FF4.

The output selector 1223A of the latch circuit selector 1223 may output a logic high level signal HI through the fourth output terminal OUT4 in response to the accumulation latch selection signal ALS[1:0] having a logic level combination of "11". Thus, the logic high level signal HI may be inputted to the second input terminal of the fourth AND gate 1223E. In such a case, the output selector 1223A may output a logic low level signal LO through the first, second, and third output terminals OUT1, OUT2, and OUT3. Thus, the logic low level signal LO may be inputted to the second input terminals of the first, second, and third AND gates 1223B, 1223C, and 1223D. The update signal UPDATE having a logic "high" level may be transmitted from the command/address decoder 450 to the first input terminals of the first to fourth AND gates 1223B-1223E. Accordingly, the fourth AND gate 1223E may output the logic high level signal HI to the clock terminal of the fourth latch circuit FF4 while the first, second, and third AND gates 1223B, 1223C, and 1223D output the logic low level signal LO to the clock terminals of the first, second, and third latch circuits FF1, FF2, and FF3. The fourth latch circuit FF4 may latch the accumulated addition data DMACC24 outputted from the accumulative adder 1221 in synchronization with the logic high level signal HI outputted from the fourth AND gate 1223E and may output the latched data of the accumulated addition data DMACC24 to the fourth input terminal IN4 of the input selector 1224.

As described with reference to FIGS. 37 to 44, the first MAC operator MAC(0) may perform the first MAC arithmetic operations of the first to fourth matrix group column units for multiplying the weight data W1.1~W1.16 arrayed in the first row of the weight sub-matrix WSM11, the weight data W9.1~W9.16 arrayed in the first row of the weight sub-matrix WSM21, the weight data W17.1~W17.16 arrayed in the first row of the weight sub-matrix WSM31, and the weight data W25.1~W25.16 arrayed in the first row of the weight sub-matrix WSM41 by the vector data V1~V16 arrayed in the vector sub-matrix VSM11 (refer to FIG. 34). In addition, as described with reference to FIGS. 45 to 52, the first MAC operator MAC(0) may perform the second MAC arithmetic operations of the first to fourth matrix group column units for multiplying the weight data W1.17~W1.32 arrayed in the first row of the weight sub-matrix WSM12, the weight data W9.17~W9.32 arrayed in the first row of the weight sub-matrix WSM22, the weight data W17.17~W17.32 arrayed in the first row of the weight sub-matrix WSM32, and the weight data W25.17~W25.32 arrayed in the first row of the weight sub-matrix WSM42 by the vector data V17~V32 arrayed in the vector sub-matrix VSM21 (refer to FIG. 34). Accordingly, the MAC arithmetic operation (i.e., the matrix multiplying calculation) for the weight matrix and the vector matrix illustrated in FIG. 32 may be completed by the first MAC arithmetic operations of the matrix group column unit and the second MAC arithmetic operations of the matrix group column unit.

Figure 53:
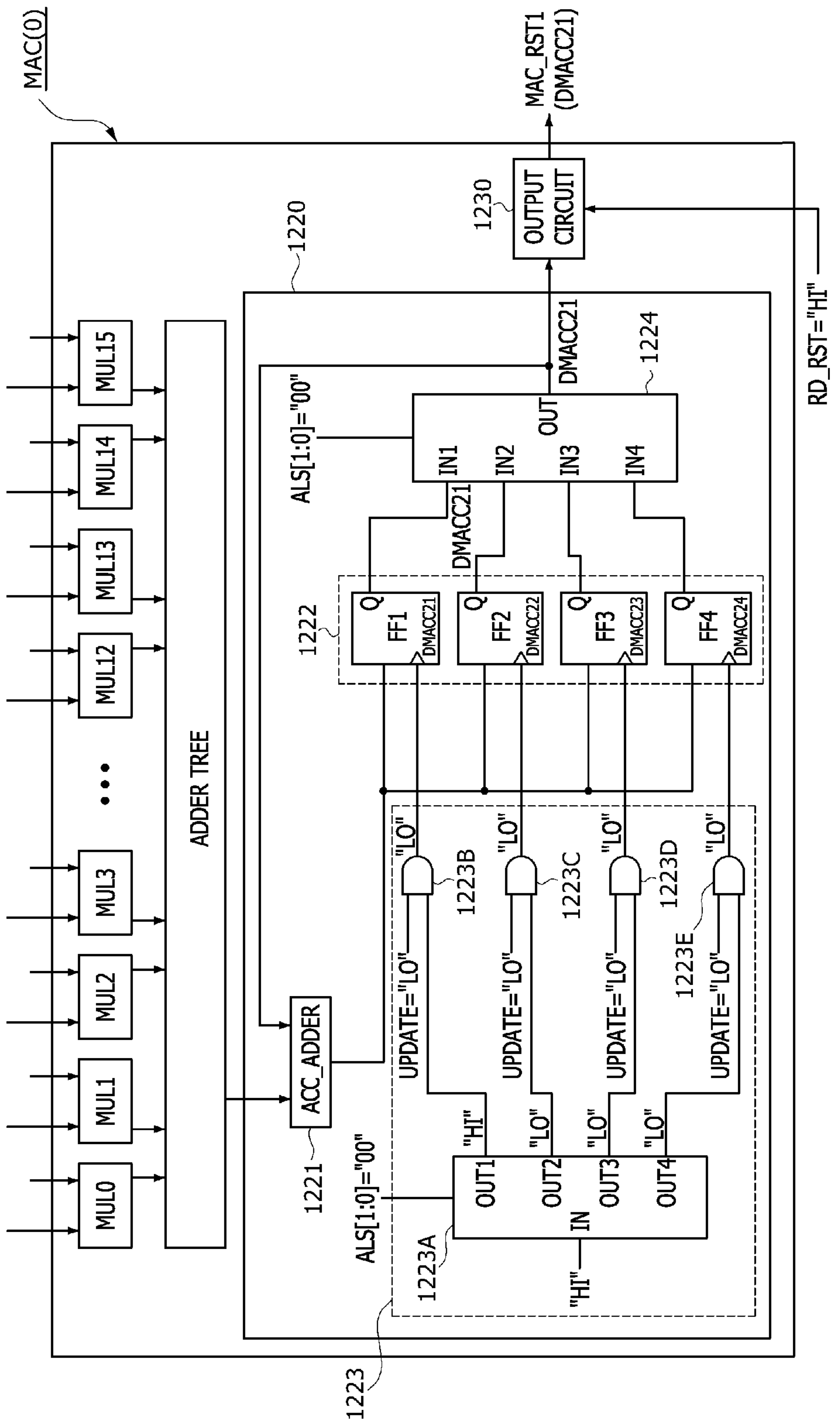
FIG. 53 illustrates an operation for outputting MAC result data from a first MAC operator included in the PIM device illustrated in FIG. 31.

FIG. 53 illustrates an operation for outputting MAC result data MAC_RST1 from the first MAC operator MAC(0) included in the PIM device 400A illustrated in FIG. 31. The MAC result data MAC_RST1 corresponding to the element arrayed in the first row of the result matrix illustrated in FIG. 32 may be the accumulated addition data DMACC21 which are obtained by the matrix multiplying calculation of the weigh data W1.1~W1.32 arrayed in the first row of the weight matrix in FIG. 32 and the vector data V1~V32 arrayed in the vector matrix in FIG. 32. The output operation of the MAC result data MAC_RST1 may be performed after the accumulated addition data DMACC21 are transmitted from the first latch circuit FF1 to the first input terminal IN1 of the input selector 1224 by the second MAC arithmetic operation of the first matrix group column unit described with reference to FIG. 46.

Referring to FIG. 53, in order to control the output operation of the MAC result data MAC_RST1, the command/address decoder 450 may output the result read signal RD_RST having a logic "high" level and the accumulation latch selection signal ALS[1:0] having a logic level combination of "00". The input selector 1224 may output the accumulated addition data DMACC21, which are inputted to the first input terminal IN1, through the output terminal OUT in response to the accumulation latch selection signal ALS[1:0] having a logic level combination of "00". The accumulated addition data DMACC21 outputted from the input selector 1224 may be transmitted to the output circuit 1230. The output circuit 1230 may output the accumulated addition data DMACC21 as the MAC result data MAC_RST1 in response to the result read signal RD_RST having a logic "high" level which is outputted from the command/address decoder 450.

The output process of the MAC result data MAC_RST1 may be equally applicable to each of output processes of the remaining MAC result data MAC_RST9, MAC_RST17, and MAC_RST25. In such case, in order to output the accumulated addition data DMACC22 as the MAC result data MAC_RST9 corresponding to the element arrayed in the ninth row of the result matrix illustrated in FIG. 32, the command/address decoder 450 may output the result read signal RD_RST having a logic "high" level and the accumulation latch selection signal ALS[1:0] having a logic level combination of "01". In addition, in order to output the accumulated addition data DMACC23 as the MAC result data MAC_RST17 corresponding to the element arrayed in the $17^{th}$ row of the result matrix illustrated in FIG. 32, the command/address decoder 450 may output the result read signal RD_RST having a logic "high" level and the accumulation latch selection signal ALS[1:0] having a logic level combination of "10". Furthermore, in order to output the accumulated addition data DMACC24 as the MAC result data MAC_RST25 corresponding to the element arrayed in the $25^{th}$ row of the result matrix illustrated in FIG. 32, the command/address decoder 450 may output the result read signal RD_RST having a logic "high" level and the accumulation latch selection signal ALS[1:0] having a logic level combination of "11".

While the MAC result data MAC_RST are read out of the first MAC operator MAC(0), both of the MAC signal MAC and the update signal UPDATE delayed by the certain time from the MAC signal MAC may maintain a logic "low(LO)" level. Thus, the first to fourth AND gates 1223B, 1223C, 1223D, and 1223E may output logic low level signals LO which are transmitted to respective ones of the clock terminals of the first to fourth latch circuits FF1~FF4. Accordingly, while the MAC result data MAC_RST1 are outputted from the first MAC operator MAC(0), no latch operation is performed by the first to fourth latch circuits FF1~FF4.

Figure 54:
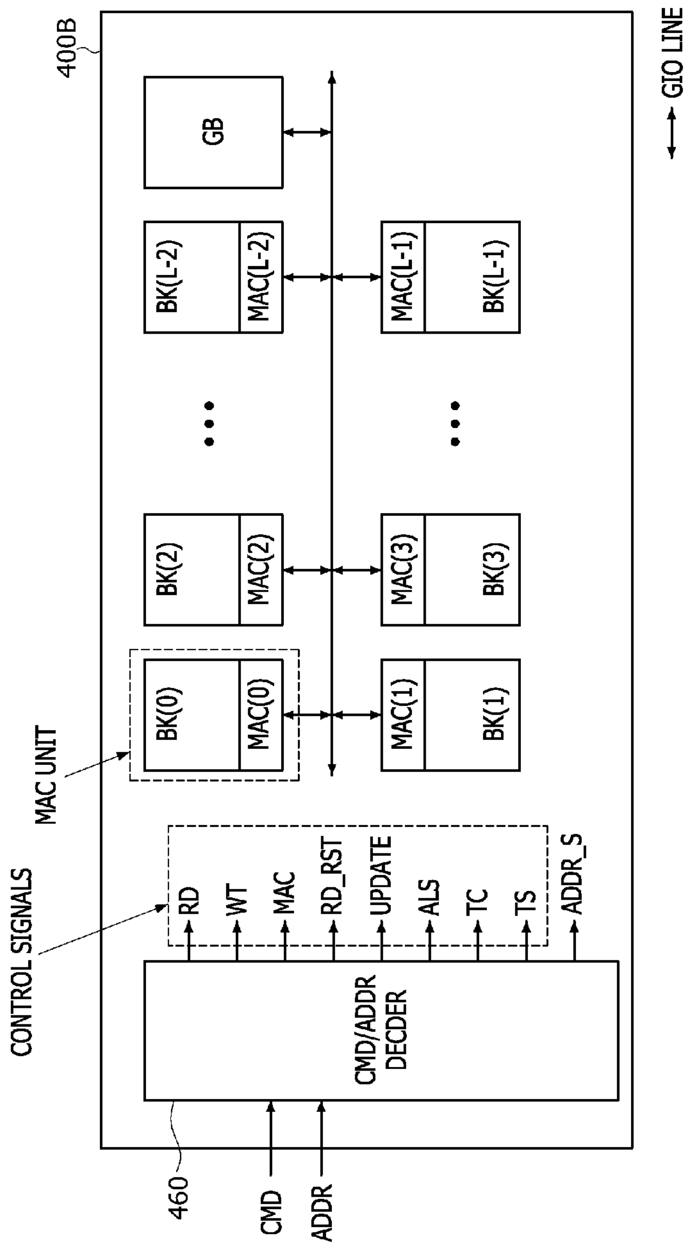
FIG. 54 is a block diagram illustrating a PIM device according to another embodiment of the present disclosure.

FIG. 54 is a block diagram illustrating a PIM device 400B according to another embodiment of the present disclosure. Referring to FIG. 54, the PIM device 400B may include "L"-number of memory banks (i.e., first to $L^{th}$ memory banks BK(0)~BK(L−1)), a global buffer GB, "L"-number of MAC operators (i.e., first to $L^{th}$ MAC operators MAC(0)~MAC(L−1)), and a command/address decoder 460 (where, "L" is a natural number which is equal to or greater than two). The memory banks BK(0)~BK(L−1) included in the PIM device 400B may have the same configuration and function as the memory banks BK(0)~BK(L−1) of the PIM device 400A described with reference to FIG. 31, and the global buffer GB of the PIM device 400B may have the same configuration and function as the global buffer GB of the PIM device 400A described with reference to FIG. 31. Each of the first to $L^{th}$ MAC operators MAC(0)~MAC(L−1) included in the PIM device 400B may also have the same configuration and function as each of the first to $L^{th}$ MAC operators MAC(0)~MAC(L−1) of the PIM device 400A described with reference to FIG. 31 except the accumulator. That is, each of the first to $L^{th}$ MAC operators MAC(0)~MAC(L−1) included in the PIM device 400B may be different from each of the first to $L^{th}$ MAC operators MAC(0)~MAC(L−1) included in the PIM device 400A in terms of a configuration of only the accumulator.

The command/address decoder 460 may receive a command CMD and an address ADDR from an external device such as a controller. The command/address decoder 460 may decode the command CMD and the address ADDR to generate and output various control signals RD, WT, MAC, RD_RST, UPDATE, and ALS for controlling operations of the memory banks BK(0)~BK(L−1), the global buffer GB, and the MAC operators MAC(0)~MAC(L−1) as well as generating an address signal ADDR_S, like the command/address decoder 450 described with reference to FIG. 31. In addition, the command/address decoder 460 of the PIM device 400B may further output a temporary copy signal TC and a temporary storage signal TS acting as the control signals. The temporary copy signal TC may control an operation of a first input selector (2224A of FIG. 56) disposed in an accumulator (2220 of FIG. 56) included in each of the MAC operators MAC(0)~MAC(L−1). The temporary storage signal TS may control an operation of a latch circuit (2222 of FIG. 56) included in each of the MAC operators MAC(0)~MAC(L−1).

Figure 55:
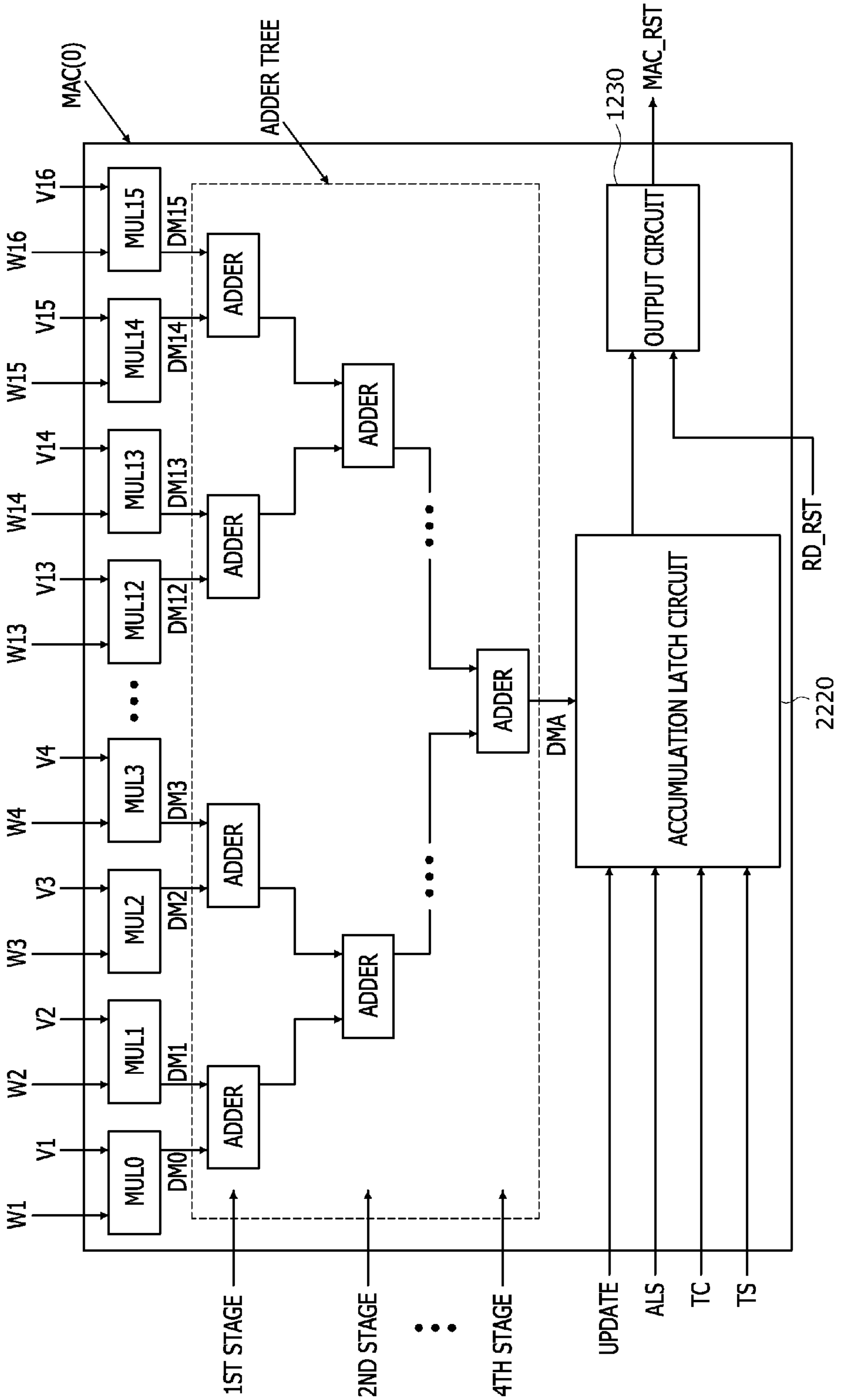
FIG. 55 is a block diagram illustrating an example of a configuration of a first MAC operator included in the PIM device illustrated in FIG. 54.

FIG. 55 is a block diagram illustrating an example of a configuration of the first MAC operator MAC(0) included in the PIM device 400B illustrated in FIG. 54. In FIG. 55, the same reference numerals and symbols as used in FIG. 35 denote the same components. In the present embodiment, the configuration of the first MAC operator MAC(0) may be equally applicable to each of the second to eighth MAC operators MAC(1)~MAC(7). Referring to FIG. 55, the first MAC operator MAC(0) may include a plurality of multipliers (e.g., first to sixteenth multipliers MUL0~MUL15), an adder tree including a plurality of adders, an accumulator 2220, and an output circuit 1230. The first to sixteenth multipliers MUL0~MUL15, the adder tree, and the output circuit 1230 included in the PIM device 400B may have the same configuration as the first to sixteenth multipliers MUL0~MUL15, the adder tree, and the output circuit 1230 included in the PIM device 400A described with reference to FIG. 35. Thus, descriptions of the first to sixteenth multipliers MUL0~MUL15, the adder tree, and the output circuit 1230 included in the PIM device 400B will be omitted hereinafter to avoid duplicate explanation.

The accumulator 2220 may receive the addition result data DMA from the adder tree to perform an accumulative adding calculation. In order to perform the accumulative adding calculation of the accumulator 2220, the accumulator 2220 may include an accumulative adder and a plurality of latch circuits. The accumulative adder may perform an accumulative adding calculation of the addition result data DMA outputted from the adder tree and feedback data outputted from one of the plurality of latch circuits. The plurality of latch circuits may latch output data of the accumulative adder. The latched data of the latch circuits may be selectively fed back to the accumulative adder to be used as the feedback data. In addition, the latched data of the latch circuits may be selectively transmitted to the output circuit 1230. Operations of the latch circuits included in the accumulator 2220 may be controlled by the update signal UPDATE, the accumulation latch selection signal ALS, the temporary copy signal TC, and the temporary storage signal TS which are outputted from the command/address decoder (460 of FIG. 54). The accumulator 2220 will be described in more detail hereinafter with reference to FIG. 56.

Figure 56:
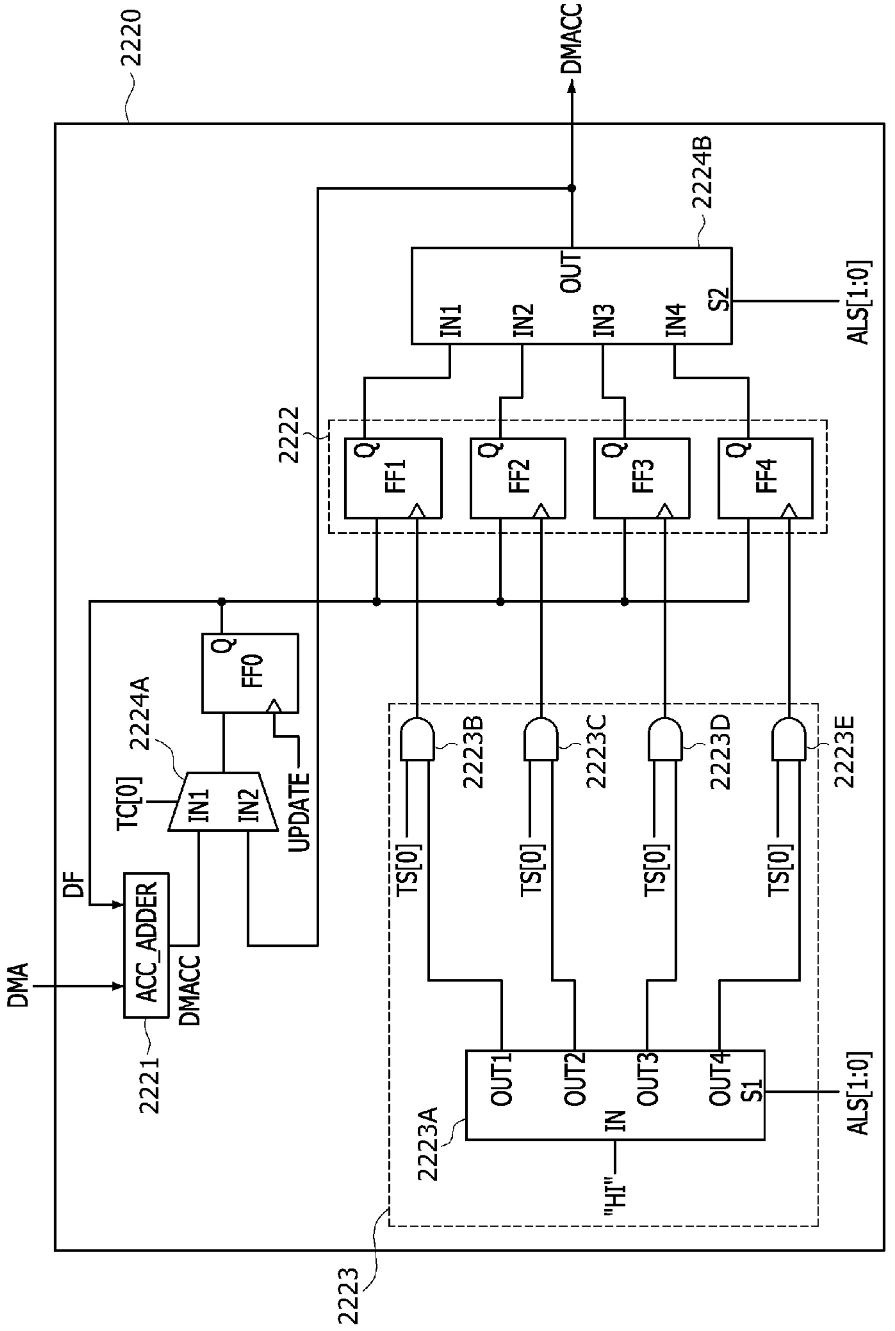
FIG. 56 is a circuit diagram illustrating an example of a configuration of an accumulator included in the first MAC operator illustrated in FIG. 55.

FIG. 56 is a circuit diagram illustrating an example of a configuration of the accumulator 2220 included in the first MAC operator MAC(0) illustrated in FIG. 55. Referring to FIG. 56, the accumulator 2220 may include an accumulative adder 2221, a latch circuit 2222, a latch circuit selector 2223, the first input selector 2224A, a second input selector 2224B, and a temporary latch circuit FF0. The accumulative adder 2221 may have a first input terminal coupled to the adder tree, a second input terminal coupled to an output terminal Q of the temporary latch circuit FF0, and an output terminal coupled to a first input terminal IN1 of the first input selector 2224A. The accumulative adder 2221 may receive the addition result data DMA from the adder tree through the first input terminal and may receive feedback data DF from the temporary latch circuit FF0 through the second input terminal. The accumulative adder 2221 may perform an adding calculation of the addition result data DMA and the feedback data DF to generate and output the addition result as accumulated addition data DMACC through the output terminal. The accumulated addition data DMACC outputted from the accumulative adder 2221 may be transmitted to the first input terminal IN1 of the first input selector 2224A.

The first input selector 2224A may have the first input terminal IN1 coupled to the output terminal of the accumulative adder 2221, a second input terminal IN2 coupled to an output terminal OUT of the second input selector 2224B, a selection control terminal receiving the temporary copy signal TC[0] from the command/address decoder (460 of FIG. 54), and an output terminal coupled to an input terminal of the temporary latch circuit FF0. In an embodiment, the first input selector 2224A may be realized using a 2-to-1 multiplexer. The first input selector 2224A may selectively output the accumulated addition data DMACC inputted to the first input terminal IN1 or the output data of the second input selector 2224B inputted to the second input terminal IN2, in response to the temporary copy signal TC[0]. In an embodiment, when the temporary copy signal TC[0] has a logic "low" level, the first input selector 2224A may selectively output the accumulated addition data DMACC inputted to the first input terminal IN1. To the contrary, when the temporary copy signal TC[0] has a logic "high" level, the first input selector 2224A may selectively output the output data of the second input selector 2224B, which are inputted to the second input terminal IN2. The output data of the first input selector 2224A may be transmitted to the input terminal of the temporary latch circuit FF0.

The temporary latch circuit FF0 may have an input terminal coupled to the output terminal of the first input selector 2224A, a clock terminal receiving the update signal UPDATE from the command/address decoder (460 of FIG. 54), and an output terminal coupled to the second input terminal of the accumulative adder 2221 and all of the input terminals of first to fourth latch circuits FF1~FF4 included in the latch circuit 2222. In an embodiment, the temporary latch circuit FF0 may be realized using a flip-flop having a latch function. The temporary latch circuit FF0 may be synchronized with a rising edge of the update signal UPDATE to latch and output the output data of the first input selector 2224A through the output terminal Q.

The latch circuit 2222 may include the first to fourth the latch circuits FF1~FF4. The number of the latch circuits included in the latch circuit 2222 may be equal to the number of the weight matrix group rows WMGR1~WMGR4 in the weight matrix described with reference to FIG. 34. Each of the first to fourth latch circuits FF1~FF4 may have an input terminal coupled to the output terminal of the temporary latch circuit FF0, a clock terminal respectively coupled to one of first to fourth AND gates 2223B-2223E included in the latch circuit selector 2223, and an output terminal Q respectively coupled to one of first to fourth input terminals IN1~IN4 of the second input selector 2224B. In an embodiment, each of the first to fourth latch circuits FF1~FF4 may be realized using a flip-flop having a latch function. Each of the first to fourth latch circuits FF1~FF4 may be synchronized with a rising edge of a signal inputted to the clock terminal to latch and output the output data of the temporary latch circuit FF0 through the output terminal Q.

The latch circuit selector 2223 may include an output selector 2223A and the first to fourth AND gates 2223B-2223E. The output selector 2223A may have an input terminal IN receiving a logic high level signal HI, a selection control terminal S1 receiving the accumulation latch selection signal ALS[1:0] from the command/address decoder (460 of FIG. 54), and first to fourth output terminals OUT1~OUT4. In an embodiment, the output selector 2223A may be realized using a 1-to-4 demultiplexer. The output selector 2223A may output the logic high level signal HI through one of the first to fourth output terminals OUT1~OUT4 in response to the accumulation latch selection signal ALS[1:0]. In an embodiment, the output selector 2223A may output the logic high level signal HI through the first output terminal OUT1 when the accumulation latch selection signal ALS[1:0] has a logic level combination of "00", and the output selector 2223A may output the logic high level signal HI through the second output terminal OUT2 when the accumulation latch selection signal ALS[1:0] has a logic level combination of "01". Moreover, the output selector 2223A may output the logic high level signal HI through the third output terminal OUT3 when the accumulation latch selection signal ALS[1:0] has a logic level combination of "10", and the output selector 2223A may output the logic high level signal HI through the fourth output terminal OUT4 when the accumulation latch selection signal ALS[1:0] has a logic level combination of "11".

The temporary storage signal TS[0] may be transmitted from the command/address decoder (460 of FIG. 54) to first input terminals of the first to fourth AND gates 2223B-2223E. The first AND gate 2223B may receive the output signal of the output selector 2223A, which is outputted through the first output terminal OUT1 of the output selector 2223A, through a second input terminal of the first AND gate 2223B. An output terminal of the first AND gate 2223B may be coupled to the clock terminal of the first latch circuit FF1 included in the latch circuit 2222. The second AND gate 2223C may receive the output signal of the output selector 2223A, which is outputted through the second output terminal OUT2 of the output selector 2223A, through a second input terminal of the second AND gate 2223C. An output terminal of the second AND gate 2223C may be coupled to the clock terminal of the second latch circuit FF2 included in the latch circuit 2222. The third AND gate 2223D may receive the output signal of the output selector 2223A, which is outputted through the third output terminal OUT3 of the output selector 2223A, through a second input terminal of the third AND gate 2223D. An output terminal of the third AND gate 2223D may be coupled to the clock terminal of the third latch circuit FF3 included in the latch circuit 2222. The fourth AND gate 2223E may receive the output signal of the output selector 2223A, which is outputted through the fourth output terminal OUT4 of the output selector 2223A, through a second input terminal of the fourth AND gate 2223E. An output terminal of the fourth AND gate 2223E may be coupled to the clock terminal of the fourth latch circuit FF4 included in the latch circuit 2222.

The first AND gate 2223B may perform a logical AND operation of the temporary storage signal TS[0] and the output signal outputted through the first output terminal OUT1 of the output selector 2223A to generate a first clock signal. The first clock signal generated by the logical AND operation of the first AND gate 2223B may be transmitted to the clock terminal of the first latch circuit FF1. The second AND gate 2223C may perform a logical AND operation of the temporary storage signal TS[0] and the output signal outputted through the second output terminal OUT2 of the output selector 2223A to generate a second clock signal. The second clock signal generated by the logical AND operation of the second AND gate 2223C may be transmitted to the clock terminal of the second latch circuit FF2. The third AND gate 2223D may perform a logical AND operation of the temporary storage signal TS[0] and the output signal outputted through the third output terminal OUT3 of the output selector 2223A to generate a third clock signal. The third clock signal generated by the logical AND operation of the third AND gate 2223D may be transmitted to the clock terminal of the third latch circuit FF3. The fourth AND gate 2223E may perform a logical AND operation of the temporary storage signal TS[0] and the output signal outputted through the fourth output terminal OUT4 of the output selector 2223A to generate a fourth clock signal. The fourth clock signal generated by the logical AND operation of the fourth AND gate 2223E may be transmitted to the clock terminal of the fourth latch circuit FF4.

The second input selector 2224B may have the first to fourth input terminals IN1~IN4, the output terminal OUT, and a selection control terminal S2. In an embodiment, the second input selector 2224B may be realized using a 4-to-1 multiplexer. The first input terminal IN1 of the second input selector 2224B may be coupled to the output terminal Q of the first latch circuit FF1. The second input terminal IN2 of the second input selector 2224B may be coupled to the output terminal Q of the second latch circuit FF2. The third input terminal IN3 of the second input selector 2224B may be coupled to the output terminal Q of the third latch circuit FF3. The fourth input terminal IN4 of the second input selector 2224B may be coupled to the output terminal Q of the fourth latch circuit FF4. The output terminal OUT of the second input selector 2224B may be coupled to the second input terminal IN2 of the first input selector 2224A. In addition, the output terminal OUT of the second input selector 2224B may also be coupled to the output circuit (1230 of FIG. 55), as described with reference to FIG. 55.

The accumulation latch selection signal ALS[1:0] corresponding to a selection control signal may be inputted to the selection control terminal S2 of the second input selector 2224B. The second input selector 2224B may output the data inputted to one of the first to fourth input terminals IN1~IN4, which is selected by the accumulation latch selection signal ALS[1:0], through the output terminal OUT. In an embodiment, the data inputted to the first input terminal IN1 (i.e., the data outputted from the first latch circuit FF1) may be outputted through the output terminal OUT of the second input selector 22248 when the accumulation latch selection signal ALS[1:0] has a logic level combination of "00", and the data inputted to the second input terminal IN2 (i.e., the data outputted from the second latch circuit FF2) may be outputted through the output terminal OUT of the second input selector 2224B when the accumulation latch selection signal ALS[1:0] has a logic level combination of "01". Moreover, the data inputted to the third input terminal IN3 (i.e., the data outputted from the third latch circuit FF3) may be outputted through the output terminal OUT of the second input selector 22248 when the accumulation latch selection signal ALS[1:0] has a logic level combination of "10", and the data inputted to the fourth input terminal IN4 (i.e., the data outputted from the fourth latch circuit FF4) may be outputted through the output terminal OUT of the second input selector 22248 when the accumulation latch selection signal ALS[1:0] has a logic level combination of "11".

Figure 57:
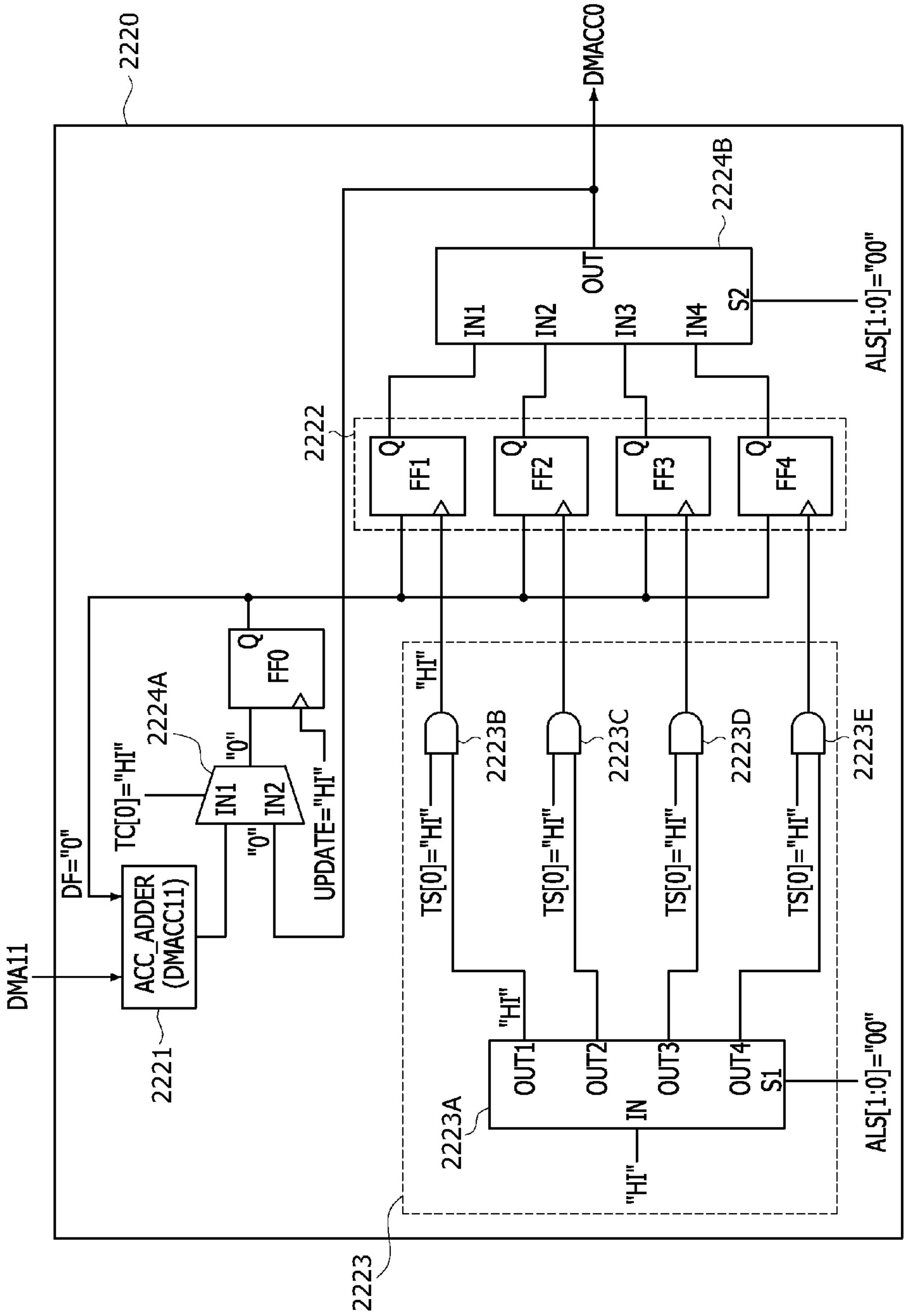
FIG. 57 illustrates an accumulative adding calculation of a first MAC arithmetic operation performed in units of columns of a first matrix group included in the PIM device illustrated in FIG. 54.
Figure 58:
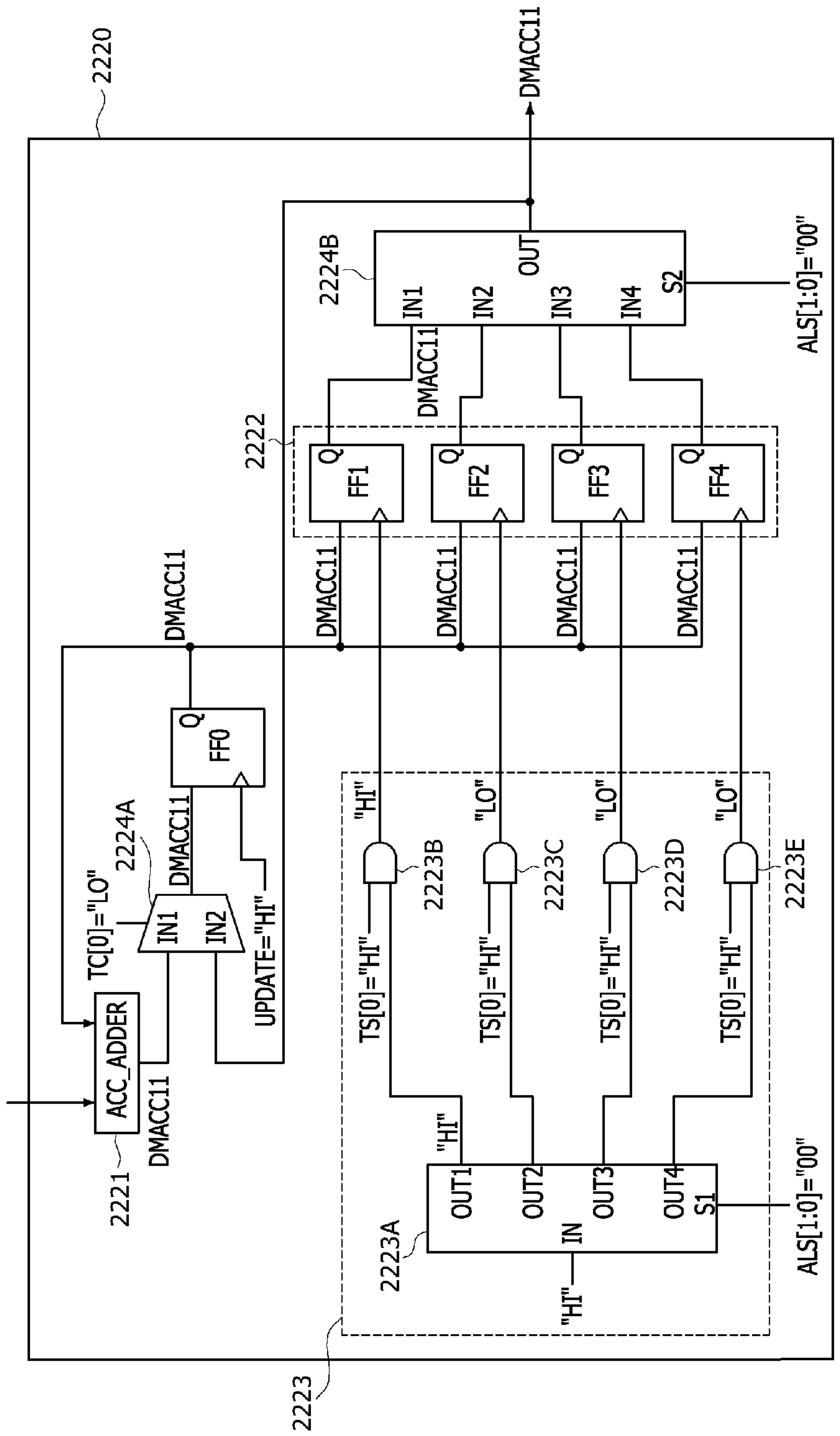
FIG. 58 illustrates a latch operation of a first MAC arithmetic operation performed in units of columns of a first matrix group included in the PIM device illustrated in FIG. 54.

FIGS. 57 and 58 illustrate a first MAC arithmetic operation of a first matrix group column unit of the PIM device 400B illustrated in FIG. 54. Specifically, FIG. 57 illustrates an accumulative adding calculation of the first MAC arithmetic operation of the first matrix group column unit, and FIG. 58 illustrates a latch operation of the first MAC arithmetic operation of the first matrix group column unit. In the present embodiment, the first MAC arithmetic operations of the matrix group column unit may be achieved by sequentially performing the first MAC arithmetic operation of the first matrix group column unit for the weight sub-matrix WSM11 in the first weight matrix group column WMGC1 and the vector sub-matrix VSM11 in the first vector matrix group row VMGR1, the first MAC arithmetic operation of the second matrix group column unit for the weight sub-matrix WSM21 in the first weight matrix group column WMGC1 and the vector sub-matrix VSM11 in the first vector matrix group row VMGR1, the first MAC arithmetic operation of the third matrix group column unit for the weight sub-matrix WSM31 in the first weight matrix group column WMGC1 and the vector sub-matrix VSM11 in the first vector matrix group row VMGR1, and the first MAC arithmetic operation of the fourth matrix group column unit for the weight sub-matrix WSM41 in the first weight matrix group column WMGC1 and the vector sub-matrix VSM11 in the first vector matrix group row VMGR1, as described with reference to FIG. 34.

First, referring to FIG. 57, the accumulative adder 2221 of the accumulator 2220 may receive addition result data DMA11 from the adder tree. A process that the addition result data DMA11 are outputted from the adder tree may be the same as the process described with reference to FIGS. 37 and 38. Prior to the accumulative adding calculation of the accumulative adder 2221, the command/address decoder (460 of FIG. 54) may output the temporary copy signal TC[0] having a logic "high" level, the temporary storage signal TS[0] having a logic "high" level, and the accumulation latch selection signal ALS[1:0] having a logic level combination of "00".

The output selector 2223A may output a logic high level signal HI, which is transmitted to the second input terminal of the first AND gate 22238, through the first output terminal OUT1 in response to the accumulation latch selection signal ALS[1:0] having a logic level combination of "00". Because the temporary storage signal TS[0] having a logic "high" level is inputted to the first input terminal of the first AND gate 2223B, the first AND gate 2223B may output a logic high level signal HI to the clock terminal of the first latch circuit FF1. The first latch circuit FF1 may output an initial value of "0" to the first input terminal IN1 of the second input selector 2224B. The second input selector 2224B may output the data (i.e., the data having a value of "0" outputted from the first latch circuit FF1), which are inputted to the first input terminal IN1 selected by the accumulation latch selection signal ALS[1:0] having a logic level combination of "00", through the output terminal OUT of the second input selector 2224B. The data having a value of "0" outputted from the second input selector 2224B may be transmitted to the second input terminal IN2 of the first input selector 2224A.

The first input selector 2224A may output the data (having a value of "0"), which are inputted to the second input terminal IN2 selected by the temporary copy signal TC[0] having a logic "high" level, to the input terminal of the temporary latch circuit FF0. The temporary latch circuit FF0 may be synchronized with a rising edge of the update signal UPDATE to latch and output the data having a value of "0". The data having a value of "0" outputted from the temporary latch circuit FF0 may be transmitted to the second input terminal of the accumulative adder 2221 to be used as the feedback data DF. When the feedback data DF are outputted from the temporary latch circuit FF0, the command/address decoder (460 of FIG. 54) may change a logic level of the update signal UPDATE from a logic "high" level into a logic "low" level. The accumulative adder 2221 may perform an adding calculation of the addition result data DMA11 inputted to the first input terminal and the feedback data DF having a value of "0" inputted to the second input terminal, thereby generating and outputting accumulated addition data DMACC11. As described with reference to FIG. 38, the accumulated addition data DMACC11 may correspond to data which are generated by a matrix multiplying calculation of the weight data W1.1~W1.16 arrayed in the first row of the weigh sub-matrix WSM11 illustrated in FIG. 34 and the vector data V1~V16 in the vector sub-matrix VSM11 illustrated in FIG. 34.

Next, referring to FIG. 58, when the feedback data DF are transmitted to the accumulative adder 2221, the command/address decoder (460 of FIG. 54) may change a logic level of the temporary copy signal TC[0] from a logic "high" level into a logic "low" level. In addition, the command/address decoder (460 of FIG. 54) may change a logic level of the update signal UPDATE from a logic "low" level into a logic "high" level. The accumulative adder 2221 may output the accumulated addition data DMACC11 to the first input terminal IN1 of the first input selector 2224A. The first input selector 2224A may output the data (i.e., the accumulated addition data DMACC11), which are inputted to the first input terminal IN1 selected by the temporary copy signal TC[0] having a logic "low" level, to the input terminal of the temporary latch circuit FF0. The temporary latch circuit FF0 may be synchronized with a rising edge of the update signal UPDATE to latch and output the accumulated addition data DMACC11. The accumulated addition data DMACC11 outputted from the temporary latch circuit FF0 may be transmitted to the input terminals of the first to fourth latch circuits FF1~FF4.

The output selector 2223A of the latch circuit selector 2223 may output a logic high level signal HI through the first output terminal OUT1 in response to the accumulation latch selection signal ALS[1:0] having a logic level combination of "00". Thus, the logic high level signal HI may be inputted to the second input terminal of the first AND gate 2223B. In such a case, the temporary storage signal TS[0] having a logic "high" level may be transmitted from the command/address decoder 460 to the first input terminals of the first to fourth AND gates 22238-2223E. Thus, while the first AND gate 2223B outputs the logic high level signal HI to the clock terminal of the first latch circuit FF1, the second to fourth AND gates 2223C, 2223D, and 2223E may output the logic low level signals LO to respective clock terminals of the second to fourth latch circuits FF2~FF4. The first latch circuit FF1 may be synchronized with the logic high level signal HI outputted from the first AND gate 2223B to latch and output the accumulated addition data DMACC11, which are outputted from the output terminal Q of the temporary latch circuit FF0, to the first input terminal IN1 of the second input selector 2224B.

Figure 59:
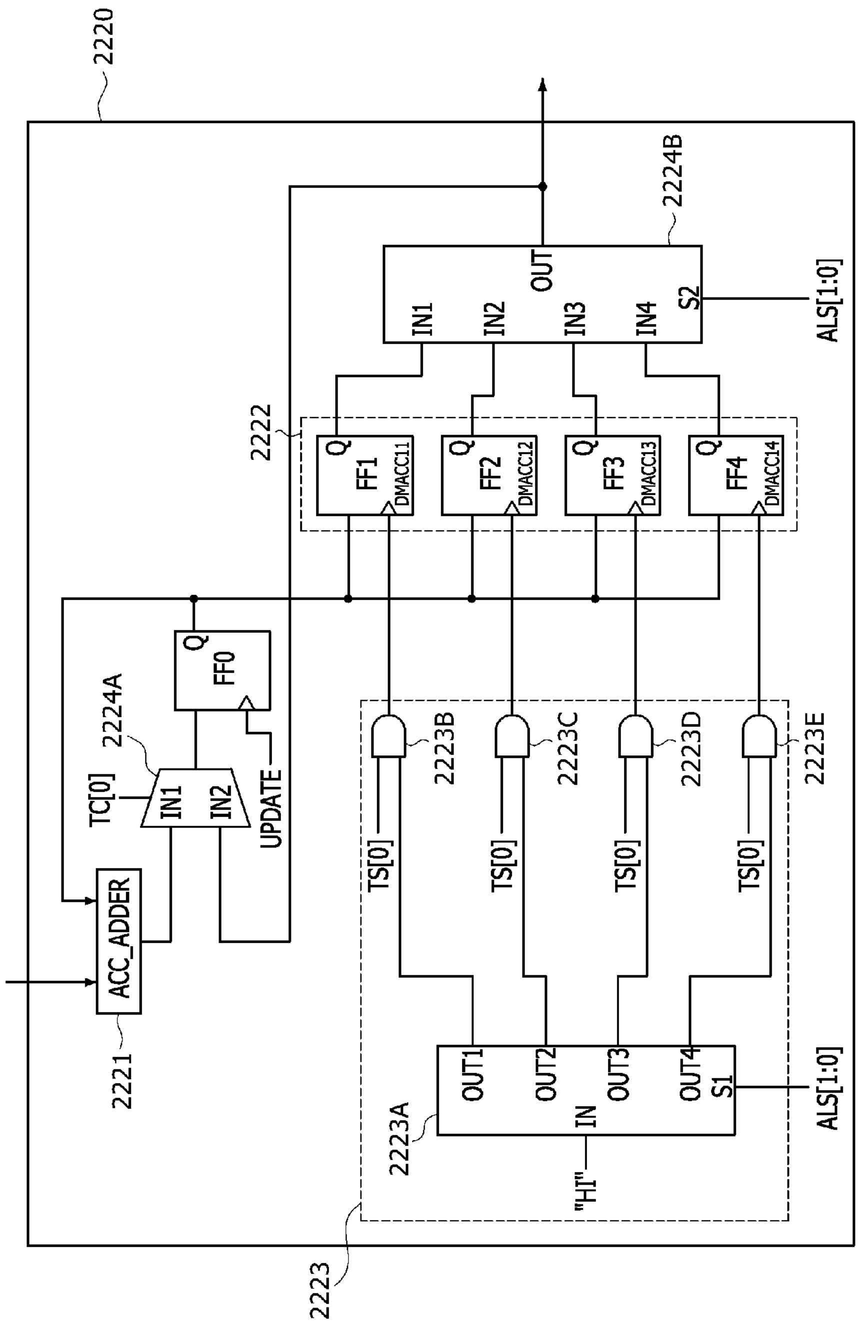
FIG. 59 illustrates a status of an accumulator after termination of first MAC arithmetic operations performed in units of columns of first to fourth matrix groups included in the PIM device of FIG. 54.

FIG. 59 illustrates a status of the accumulator 2220 after termination of the first MAC arithmetic operations of the first to fourth matrix group column units of the PIM device 400B illustrated in FIG. 54. As described with reference to FIGS. 57 and 58, when the first MAC arithmetic operation of the first matrix group column unit terminates, the accumulated addition data DMACC11 may be latched in the first latch circuit FF1. After the first MAC arithmetic operation of the first matrix group column unit terminates, the PIM device 400B may sequentially perform the first MAC arithmetic operations of the second to fourth matrix group column units with alteration of the weight data in the same way as the first MAC arithmetic operation of the first matrix group column unit. Accordingly, the accumulated addition data DMACC12 may be latched in the second latch circuit FF2 by the first MAC arithmetic operation of the second matrix group column unit, and the accumulated addition data DMACC13 may be latched in the third latch circuit FF3 by the first MAC arithmetic operation of the third matrix group column unit. In addition, the accumulated addition data DMACC14 may be latched in the fourth latch circuit FF4 by the first MAC arithmetic operation of the fourth matrix group column unit.

As described with reference to FIGS. 39 to 44, the accumulated addition data DMACC12 may correspond to data which are generated by a matrix multiplying calculation of the weight data W9.1~W9.16 arrayed in the first row of the weigh sub-matrix WSM21 illustrated in FIG. 34 and the vector data V1~V16 in the vector sub-matrix VSM11 illustrated in FIG. 34, and the accumulated addition data DMACC13 may correspond to data which are generated by a matrix multiplying calculation of the weight data W17.1~W17.16 arrayed in the first row of the weigh sub-matrix WSM31 illustrated in FIG. 34 and the vector data V1~V16 in the vector sub-matrix VSM11 illustrated in FIG. 34. Moreover, the accumulated addition data DMACC14 may correspond to data which are generated by a matrix multiplying calculation of the weight data W25.1~W25.16 arrayed in the first row of the weigh sub-matrix WSM41 illustrated in FIG. 34 and the vector data V1~V16 in the vector sub-matrix VSM11 illustrated in FIG. 34.

When the logic high level signal HI is inputted to the clock terminal of the first latch circuit FF1 while the accumulated addition data DMACC11~DMACC14 are latched in the respective first to fourth latch circuits FF1~FF4, the accumulated addition data DMACC11 may be transmitted from the first latch circuit FF1 to the first input terminal IN1 of the second input selector 2224B. In addition, when the logic high level signal HI is inputted to the clock terminal of the second latch circuit FF2 while the accumulated addition data DMACC11~DMACC14 are latched in the respective first to fourth latch circuits FF1~FF4, the accumulated addition data DMACC12 may be transmitted from the second latch circuit FF2 to the second input terminal IN2 of the second input selector 2224B. Moreover, when the logic high level signal HI is inputted to the clock terminal of the third latch circuit FF3 while the accumulated addition data DMACC11~DMACC14 are latched in the respective first to fourth latch circuits FF1~FF4, the accumulated addition data DMACC13 may be transmitted from the third latch circuit FF3 to the third input terminal IN3 of the second input selector 2224B. Furthermore, when the logic high level signal HI is inputted to the clock terminal of the fourth latch circuit FF4 while the accumulated addition data DMACC11~DMACC14 are latched in the respective first to fourth latch circuits FF1~FF4, the accumulated addition data DMACC14 may be transmitted from the fourth latch circuit FF4 to the fourth input terminal IN4 of the second input selector 2224B.

Figure 60:
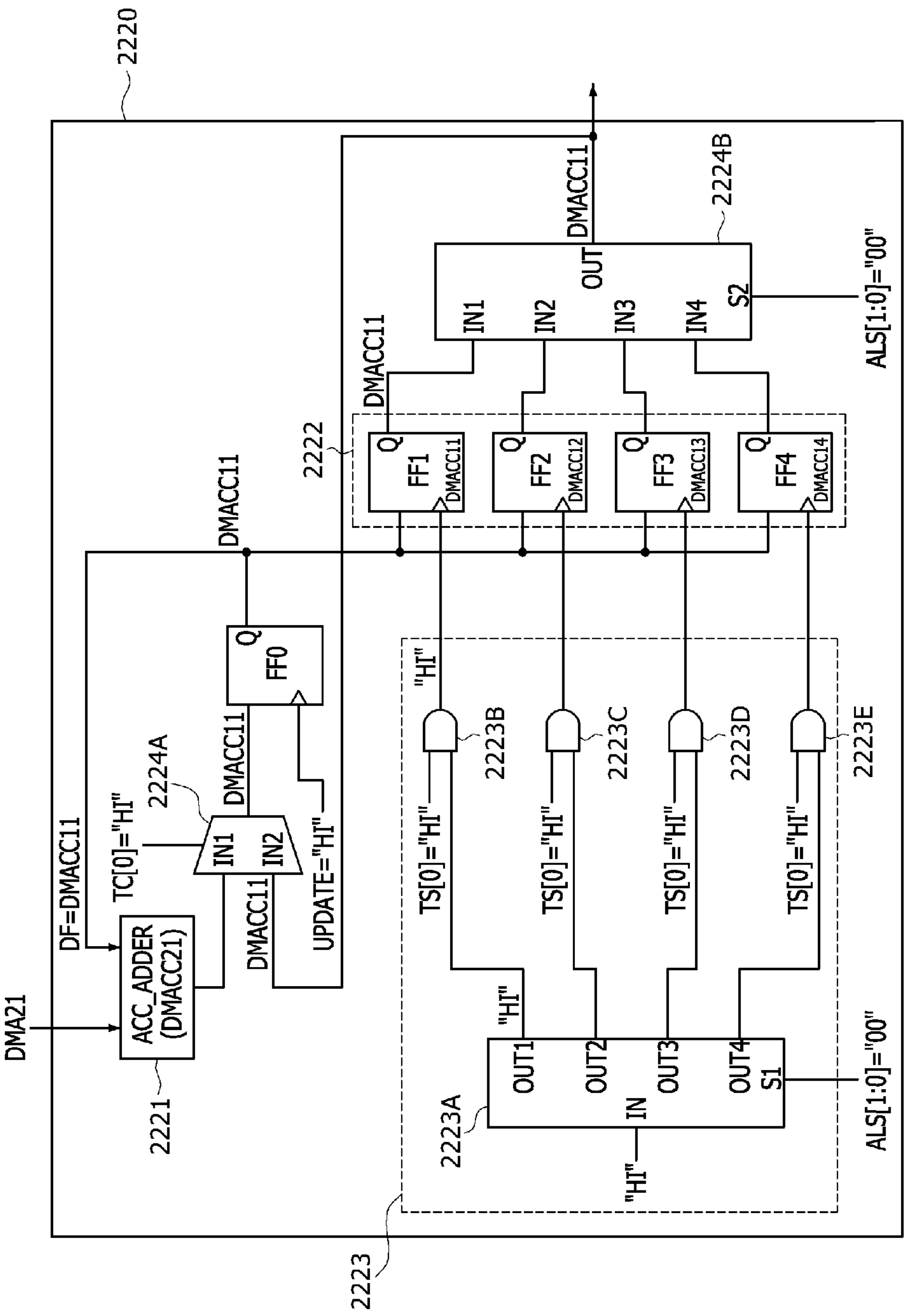
FIG. 60 illustrates an accumulative adding calculation of a second MAC arithmetic operation performed in units of columns of a first matrix group included in the PIM device illustrated in FIG. 54.
Figure 61:
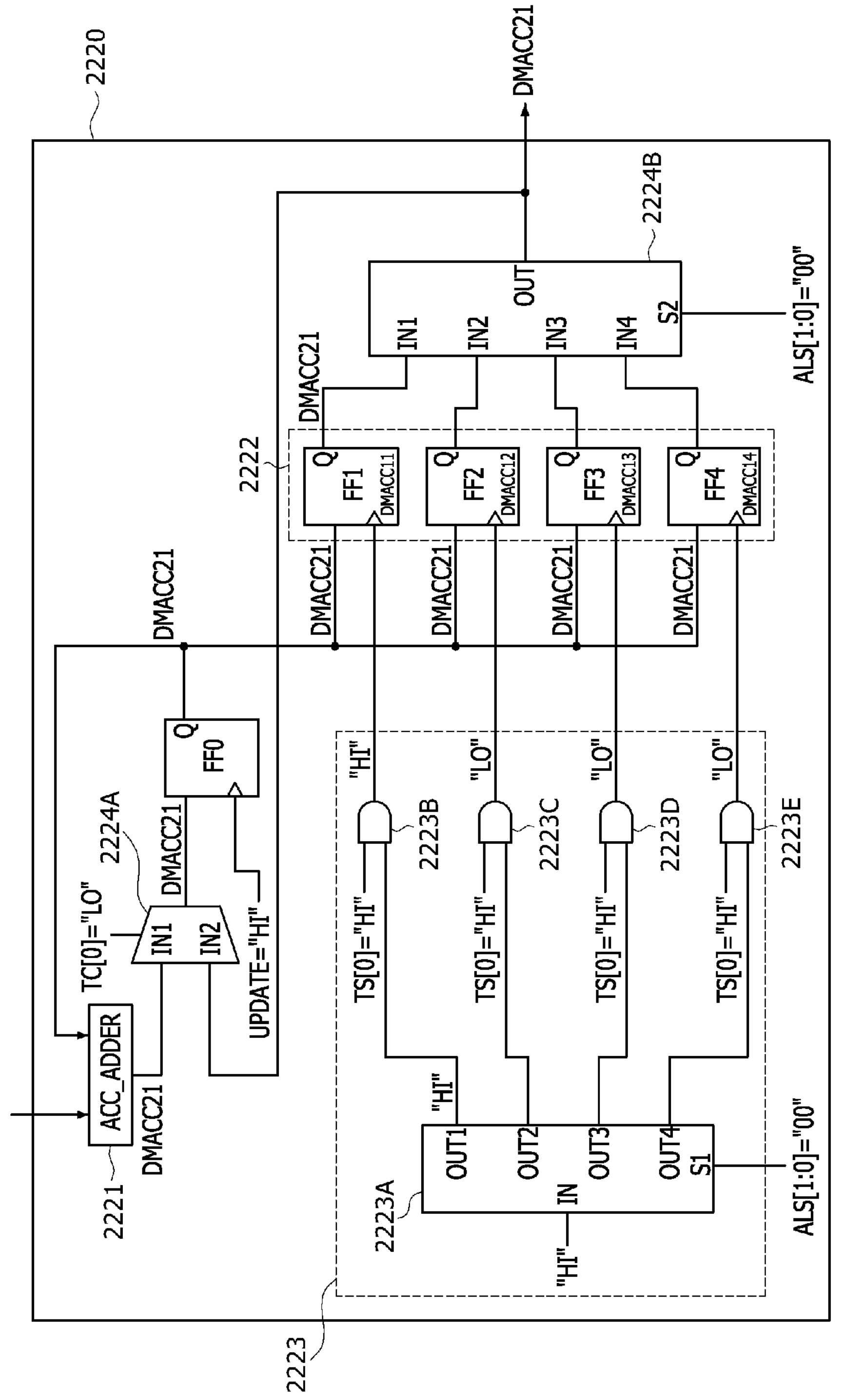
FIG. 61 illustrates a latch operation of a second MAC arithmetic operation performed in units of columns of a first matrix group included in the PIM device illustrated in FIG. 54.

FIGS. 60 and 61 illustrate a second MAC arithmetic operation of the first matrix group column unit of the PIM device 400B illustrated in FIG. 54. Specifically, FIG. 60 illustrates an accumulative adding calculation of the second MAC arithmetic operation of the first matrix group column unit, and FIG. 61 illustrates a latch operation of the second MAC arithmetic operation of the first matrix group column unit. In the present embodiment, the second MAC arithmetic operations of the matrix group column unit in the PIM device 400B may be achieved by sequentially performing the second MAC arithmetic operation of the first matrix group column unit for the weight sub-matrix WSM12 in the second weight matrix group column WMGC2 and the vector sub-matrix VSM21 in the second vector matrix group row VMGR2, the second MAC arithmetic operation of the second matrix group column unit for the weight sub-matrix WSM22 in the second weight matrix group column WMGC2 and the vector sub-matrix VSM21 in the second vector matrix group row VMGR2, the second MAC arithmetic operation of the third matrix group column unit for the weight sub-matrix WSM32 in the second weight matrix group column WMGC2 and the vector sub-matrix VSM21 in the second vector matrix group row VMGR2, and the second MAC arithmetic operation of the fourth matrix group column unit for the weight sub-matrix WSM42 in the second weight matrix group column WMGC2 and the vector sub-matrix VSM21 in the second vector matrix group row VMGR2, as described with reference to FIG. 34.

First, referring to FIG. 60, the accumulative adder 2221 of the accumulator 2220 may receive addition result data DMA21 from the adder tree. A process that the addition result data DMA21 are outputted from the adder tree may be the same as the process described with reference to FIGS. 45 and 46. Prior to the accumulative adding calculation of the accumulative adder 2221, the command/address decoder (460 of FIG. 54) may output the temporary copy signal TC[0] having a logic "high" level, the temporary storage signal TS[0] having a logic "high" level, and the accumulation latch selection signal ALS[1:0] having a logic level combination of "00".

The output selector 2223A may output a logic high level signal HI, which is transmitted to the second input terminal of the first AND gate 2223B, through the first output terminal OUT1 in response to the accumulation latch selection signal ALS[1:0] having a logic level combination of "00". Because the temporary storage signal TS[0] having a logic "high" level is inputted to the first input terminal of the first AND gate 2223B, the first AND gate 2223B may output a logic high level signal HI to the clock terminal of the first latch circuit FF1. The first latch circuit FF1 may output the latched data (i.e., the accumulated addition data DMACC11 which are generated by the first MAC arithmetic operation of the first matrix group column unit) to the first input terminal IN1 of the second input selector 2224B. The second input selector 2224B may output the data (i.e., the accumulated addition data DMACC11 outputted from the first latch circuit FF1), which are inputted to the first input terminal IN1 selected by the accumulation latch selection signal ALS[1:0] having a logic level combination of "00", through the output terminal OUT of the second input selector 22248. The accumulated addition data DMACC11 outputted from the second input selector 22248 may be transmitted to the second input terminal IN2 of the first input selector 2224A.

The first input selector 2224A may output the data (i.e., the accumulated addition data DMACC11), which are inputted to the second input terminal IN2 selected by the temporary copy signal TC[0] having a logic "high" level, to the input terminal of the temporary latch circuit FF0. The temporary latch circuit FF0 may be synchronized with a rising edge of the update signal UPDATE to latch and output the accumulated addition data DMACC11. The accumulated addition data DMACC11 outputted from the temporary latch circuit FF0 may be transmitted to the second input terminal of the accumulative adder 2221 to be used as the feedback data DF. When the accumulated addition data DMACC11 are outputted from the temporary latch circuit FF0, the command/address decoder (460 of FIG. 54) may change a logic level of the update signal UPDATE from a logic "high" level into a logic "low" level. The accumulative adder 2221 may perform an adding calculation of the addition result data DMA21 inputted to the first input terminal and the accumulated addition data DMACC11 (corresponding to the feedback data DF) inputted to the second input terminal, thereby generating and outputting accumulated addition data DMACC21. As described with reference to FIG. 38, the accumulated addition data DMACC21 may correspond to data which are generated by a matrix multiplying calculation of the weight data W1.17~W1.32 arrayed in the first row of the weigh sub-matrix WSM12 illustrated in FIG. 34 and the vector data V17~V32 in the vector sub-matrix VSM21 illustrated in FIG. 34.

Next, referring to FIG. 61, when the feedback data DF are transmitted to the accumulative adder 2221, the command/address decoder (460 of FIG. 54) may change a logic level of the temporary copy signal TC[0] from a logic "high" level into a logic "low" level. In addition, the command/address decoder (460 of FIG. 54) may change a logic level of the update signal UPDATE from a logic "low" level into a logic "high" level. The accumulative adder 2221 may output the accumulated addition data DMACC21 to the first input terminal IN1 of the first input selector 2224A. The first input selector 2224A may output the data (i.e., the accumulated addition data DMACC21), which are inputted to the first input terminal IN1 selected by the temporary copy signal TC[0] having a logic "low" level, to the input terminal of the temporary latch circuit FF0. The temporary latch circuit FF0 may be synchronized with a rising edge of the update signal UPDATE to latch and output the accumulated addition data DMACC21. The accumulated addition data DMACC21 outputted from the temporary latch circuit FF0 may be transmitted to the input terminals of the first to fourth latch circuits FF1~FF4.

The output selector 2223A of the latch circuit selector 2223 may output a logic high level signal HI through the first output terminal OUT1 in response to the accumulation latch selection signal ALS[1:0] having a logic level combination of "00". Thus, the logic high level signal HI may be inputted to the second input terminal of the first AND gate 2223B. In such a case, the temporary storage signal TS[0] having a logic "high" level may be transmitted from the command/address decoder 460 to the first input terminals of the first to fourth AND gates 2223B-2223E. Thus, while the first AND gate 2223B outputs the logic high level signal HI to the clock terminal of the first latch circuit FF1, the second to fourth AND gates 2223C, 2223D, and 2223E may output the logic low level signals LO to respective ones of the clock terminals of the second to fourth latch circuits FF2~FF4. The first latch circuit FF1 may be synchronized with the logic high level signal HI outputted from the first AND gate 2223B to latch and output the accumulated addition data DMACC21, which are outputted from the output terminal Q of the temporary latch circuit FF0, to the first input terminal IN1 of the second input selector 2224B.

Figure 62:
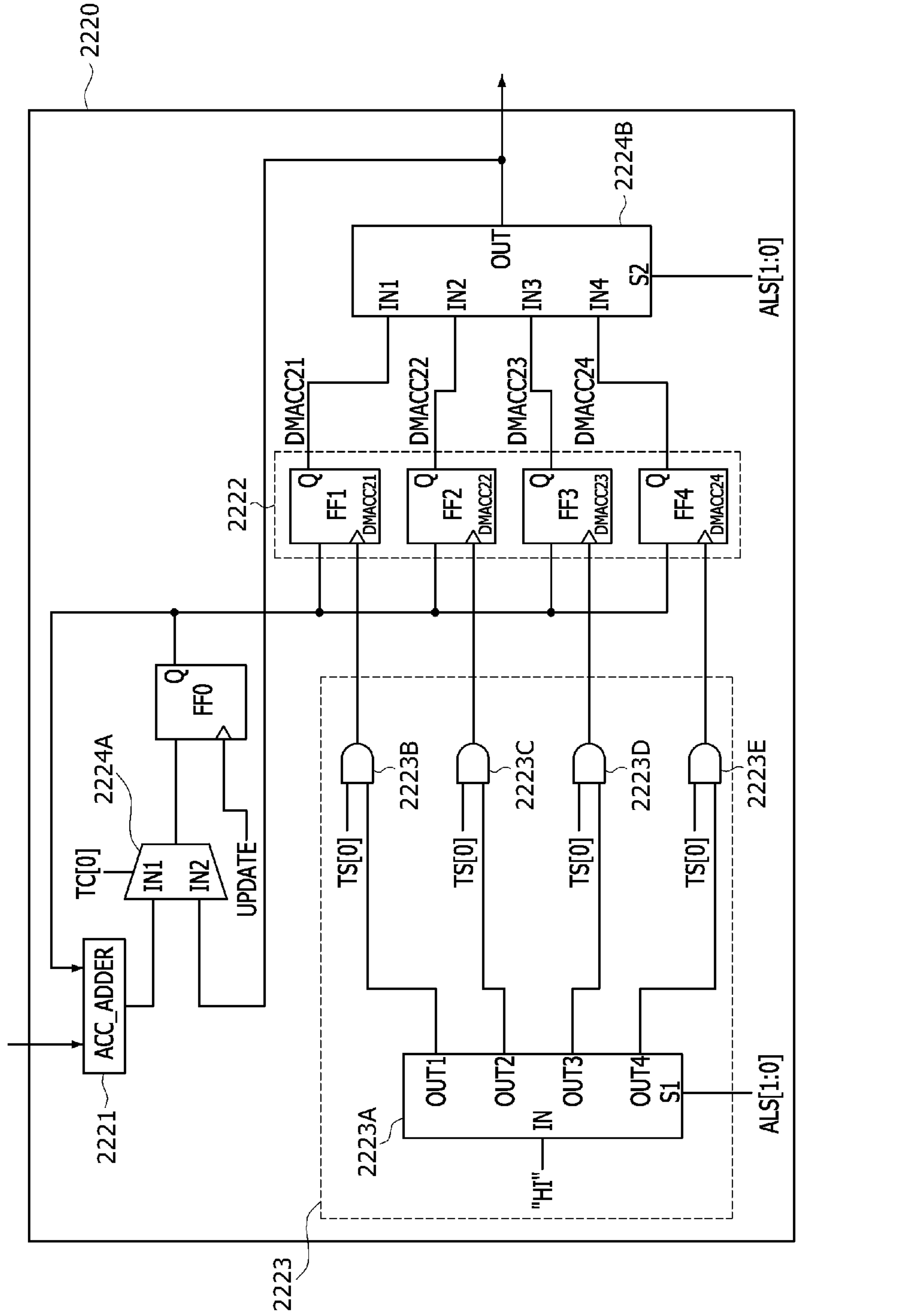
FIG. 62 illustrates a status of an accumulator after termination of second MAC arithmetic operations performed in units of columns of first to fourth matrix groups included in the PIM device of FIG. 54.

FIG. 62 illustrates a status of the accumulator 2220 after termination of the second MAC arithmetic operations of the first to fourth matrix group column units of the PIM device 400B illustrated in FIG. 54. As described with reference to FIGS. 60 and 61, when the second MAC arithmetic operation of the first matrix group column unit terminates, the accumulated addition data DMACC21 may be latched in the first latch circuit FF1. After the second MAC arithmetic operation of the first matrix group column unit terminates, the PIM device 400B may sequentially perform the second MAC arithmetic operations of the second to fourth matrix group column units with alteration of the weight data in the same way as the second MAC arithmetic operation of the first matrix group column unit. Accordingly, the accumulated addition data DMACC22 may be latched in the second latch circuit FF2 by the second MAC arithmetic operation of the second matrix group column unit, and the accumulated addition data DMACC23 may be latched in the third latch circuit FF3 by the second MAC arithmetic operation of the third matrix group column unit. In addition, the accumulated addition data DMACC24 may be latched in the fourth latch circuit FF4 by the second MAC arithmetic operation of the fourth matrix group column unit.

As described with reference to FIGS. 47 to 52, the accumulated addition data DMACC22 may correspond to data which are generated by a matrix multiplying calculation of the weight data W9.17~W9.32 arrayed in the first row of the weigh sub-matrix WSM22 illustrated in FIG. 34 and the vector data V17~V32 in the vector sub-matrix VSM21 illustrated in FIG. 34, and the accumulated addition data DMACC23 may correspond to data which are generated by a matrix multiplying calculation of the weight data W17.17~W17.32 arrayed in the first row of the weigh sub-matrix WSM32 illustrated in FIG. 34 and the vector data V17~V32 in the vector sub-matrix VSM21 illustrated in FIG. 34. Moreover, the accumulated addition data DMACC24 may correspond to data which are generated by a matrix multiplying calculation of the weight data W25.17~W25.32 arrayed in the first row of the weigh sub-matrix WSM42 illustrated in FIG. 34 and the vector data V17~V32 in the vector sub-matrix VSM21 illustrated in FIG. 34.

When the logic high level signal HI is inputted to the clock terminal of the first latch circuit FF1 while the accumulated addition data DMACC21~DMACC24 are latched in respective one of the first to fourth latch circuits FF1~FF4 by the second MAC arithmetic operations of the first to fourth matrix group column units, the accumulated addition data DMACC21 may be transmitted from the first latch circuit FF1 to the first input terminal IN1 of the second input selector 2224B. In addition, when the logic high level signal HI is inputted to the clock terminal of the second latch circuit FF2 while the accumulated addition data DMACC21~DMACC24 are latched in respective one of the first to fourth latch circuits FF1~FF4, the accumulated addition data DMACC22 may be transmitted from the second latch circuit FF2 to the second input terminal IN2 of the second input selector 2224B. Moreover, when the logic high level signal HI is inputted to the clock terminal of the third latch circuit FF3 while the accumulated addition data DMACC21~DMACC24 are latched in respective one of the first to fourth latch circuits FF1~FF4, the accumulated addition data DMACC23 may be transmitted from the third latch circuit FF3 to the third input terminal IN3 of the second input selector 2224B. Furthermore, when the logic high level signal HI is inputted to the clock terminal of the fourth latch circuit FF4 while the accumulated addition data DMACC21~DMACC24 are latched in respective one of the first to fourth latch circuits FF1~FF4, the accumulated addition data DMACC24 may be transmitted from the fourth latch circuit FF4 to the fourth input terminal IN4 of the second input selector 2224B.

Figure 63:
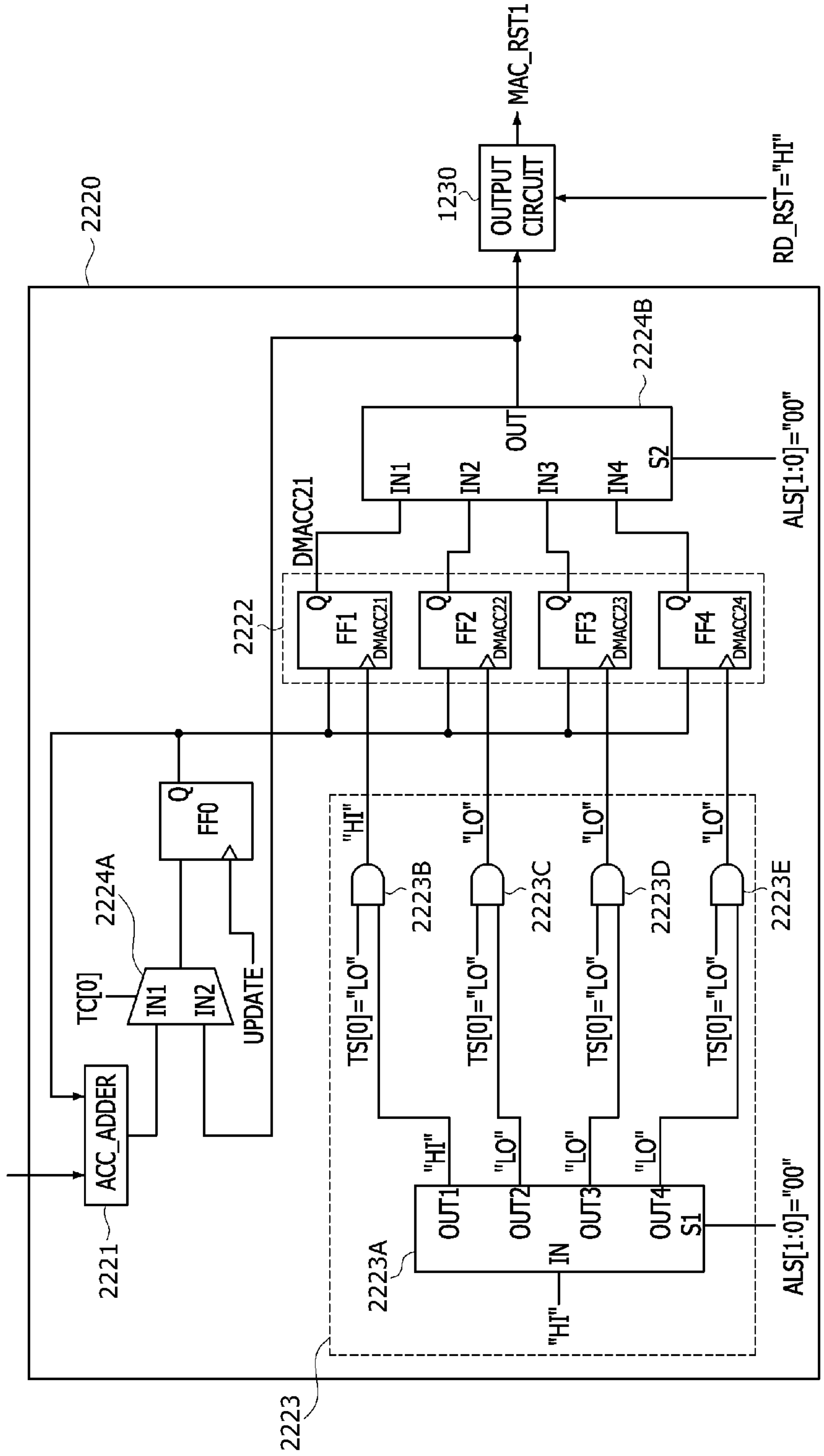
FIG. 63 illustrates an operation for outputting MAC result data from a first MAC operator included in the PIM device illustrated in FIG. 54.

FIG. 63 illustrates an operation for outputting the MAC result data MAC_RST1 from the first MAC operator MAC (0) included in the PIM device 400B illustrated in FIG. 54. Referring to FIG. 63, in order to control the output operation of the MAC result data MAC_RST1, the command/address decoder 460 may output the result read signal RD_RST having a logic "high" level and the accumulation latch selection signal ALS[1:0] having a logic level combination of "00". In addition, the command/address decoder 460 may output the temporary storage signal TS[0] having a logic "high" level. In such a case, a logic high level signal HI may be inputted to the clock terminal of the first latch circuit FF1 by the accumulation latch selection signal ALS[1:0] having a logic level combination of "00" and the temporary storage signal TS[0] having a logic "high" level. The first latch circuit FF1 may be synchronized with the logic high level signal HI to output the accumulated addition data DMACC21 latched in the first latch circuit FF1. The accumulated addition data DMACC21 may be transmitted to the first input terminal IN1 of the second input selector 2224B. The second input selector 2224B may output the accumulated addition data DMACC21, which are inputted to the first input terminal IN1, through the output terminal OUT in response to the accumulation latch selection signal ALS[1:0] having a logic level combination of "00". The accumulated addition data DMACC21 outputted from the second input selector 2224B may be transmitted to the output circuit 1230. The output circuit 1230 may output the accumulated addition data DMACC21 as the MAC result data MAC_RST1 in response to the result read signal RD_RST having a logic "high" level which is outputted from the command/address decoder 460.

Although not shown in the drawings, when the accumulation latch selection signal ALS[1:0] having a logic level combination of "01" is transmitted from the command/address decoder 460 to the output selector 2223A and the second input selector 2224B, the accumulated addition data DMACC22 latched in the second latch circuit FF2 may be transmitted to the second input terminal IN2 of the second input selector 2224B. The accumulated addition data DMACC22 may be outputted through the output terminal OUT of the second input selector 2224B and may be transmitted to the output circuit 1230. The output circuit 1230 may output the accumulated addition data DMACC22 as MAC result data MAC_RST9 in response to the result read signal RD_RST having a logic "high" level. In addition, when the accumulation latch selection signal ALS[1:0] having a logic level combination of "10" is transmitted from the command/address decoder 460 to the output selector 2223A and the second input selector 2224B, the accumulated addition data DMACC23 latched in the third latch circuit FF3 may be transmitted to the third input terminal IN3 of the second input selector 2224B. The accumulated addition data DMACC23 may be outputted through the output terminal OUT of the second input selector 2224B and may be transmitted to the output circuit 1230. The output circuit 1230 may output the accumulated addition data DMACC23 as MAC result data MAC_RST17 in response to the result read signal RD_RST having a logic "high" level. Furthermore, when the accumulation latch selection signal ALS[1:0] having a logic level combination of "11" is transmitted from the command/address decoder 460 to the output selector 2223A and the second input selector 2224B, the accumulated addition data DMACC24 latched in the fourth latch circuit FF4 may be transmitted to the fourth input terminal IN4 of the second input selector 2224B. The accumulated addition data DMACC24 may be outputted through the output terminal OUT of the second input selector 2224B and may be transmitted to the output circuit 1230. The output circuit 1230 may output the accumulated addition data DMACC24 as MAC result data MAC_RST25 in response to the result read signal RD_RST having a logic "high" level.

Figure 64:
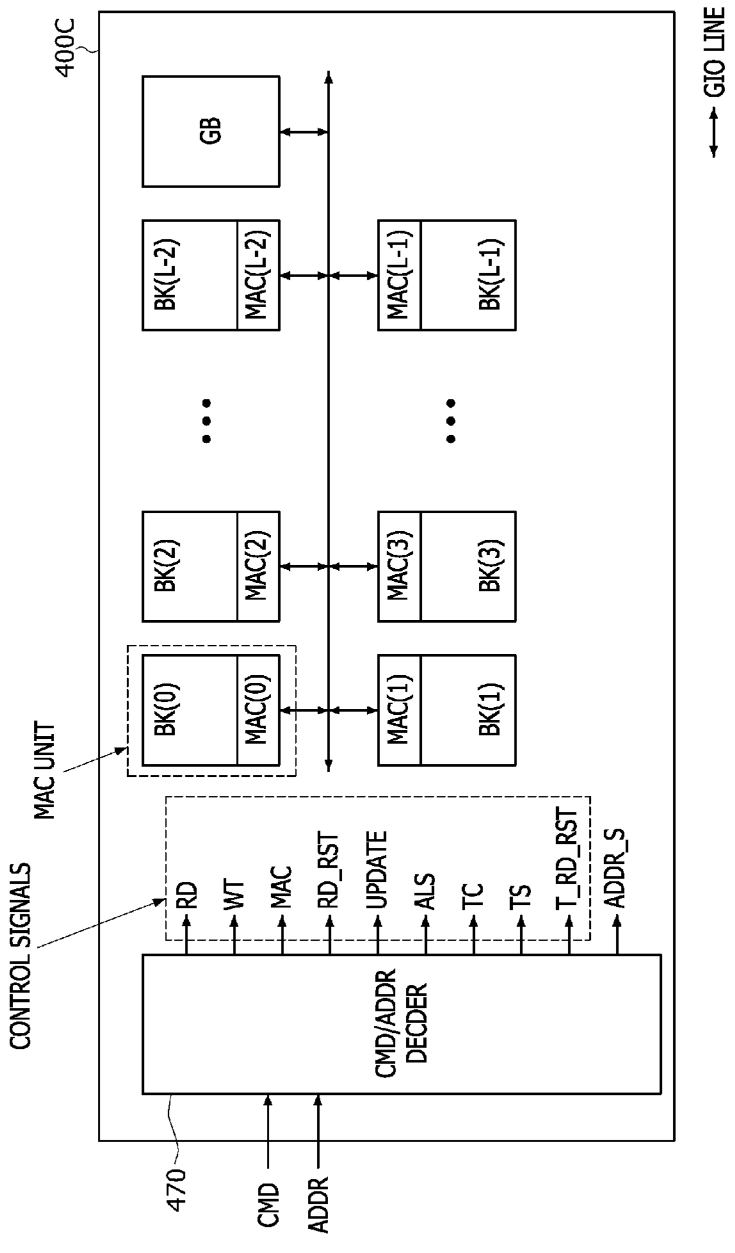
FIG. 64 is a block diagram illustrating a PIM device according to yet another embodiment of the present disclosure.

FIG. 64 is a block diagram illustrating a PIM device 400C according to yet another embodiment of the present disclosure. Referring to FIG. 64, the PIM device 400C may include "L"-number of memory banks (i.e., first to $L^{th}$ memory banks BK(0)~BK(L−1)), a global buffer GB, "L"-number of MAC operators (i.e., first to $L^{th}$ MAC operators MAC(0)~MAC(L−1)), and a command/address decoder 470 (where, "L" is a natural number which is equal to or greater than two). The memory banks BK(0)~BK(L−1) included in the PIM device 400C may have the same configuration and function as the memory banks BK(0)~BK(L−1) of the PIM device 400A described with reference to FIG. 31, and the global buffer GB of the PIM device 400C may have the same configuration and function as the global buffer GB of the PIM device 400A described with reference to FIG. 31. Each of the first to $L^{th}$ MAC operators MAC(0)~MAC(L−1) included in the PIM device 400C may also have the same configuration and function as each of the first to $L^{th}$ MAC operators MAC(0)~MAC(L−1) of the PIM device 400A described with reference to FIG. 31 except the accumulator. That is, each of the first to $L^{th}$ MAC operators MAC(0)~MAC(L−1) included in the PIM device 400C may be different from each of the first to $L^{th}$ MAC operators MAC(0)~MAC(L−1) included in the PIM device 400A in terms of a configuration of only the accumulator.

The command/address decoder 470 may receive a command CMD and an address ADDR from an external device such as a controller. The command/address decoder 470 may decode the command CMD and the address ADDR to generate and output various control signals RD, WT, MAC, RD_RST, UPDATE, ALS, TC, TS, and T_RD_RST for controlling operations of the memory banks BK(0)~BK(L−1), the global buffer GB, and the MAC operators MAC(0)~MAC(L−1) as well as generating an address signal ADDR_S. The read signal RD, the write signal WT, the MAC signal MAC, the result read signal RD_RST, the update signal UPDATE, and the accumulation latch selection signal ALS illustrated in FIG. 64 may be the same signals as the read signal RD, the write signal WT, the MAC signal MAC, the result read signal RD_RST, the update signal UPDATE, and the accumulation latch selection signal ALS described with reference to FIG. 31. The temporary copy signal TC and the temporary storage signal TS illustrated in FIG. 64 may be the same signals as the temporary copy signal TC and the temporary storage signal TS described with reference to FIG. 54. The temporary result read signal T_RD_RST among the various control signals RD, WT, MAC, RD_RST, UPDATE, ALS, TC, TS, and T_RD_RST may control an operation of an accumulator included in each of the MAC operators MAC(0)~MAC(L−1) outputting interim result data during the MAC arithmetic operation.

Figure 65:
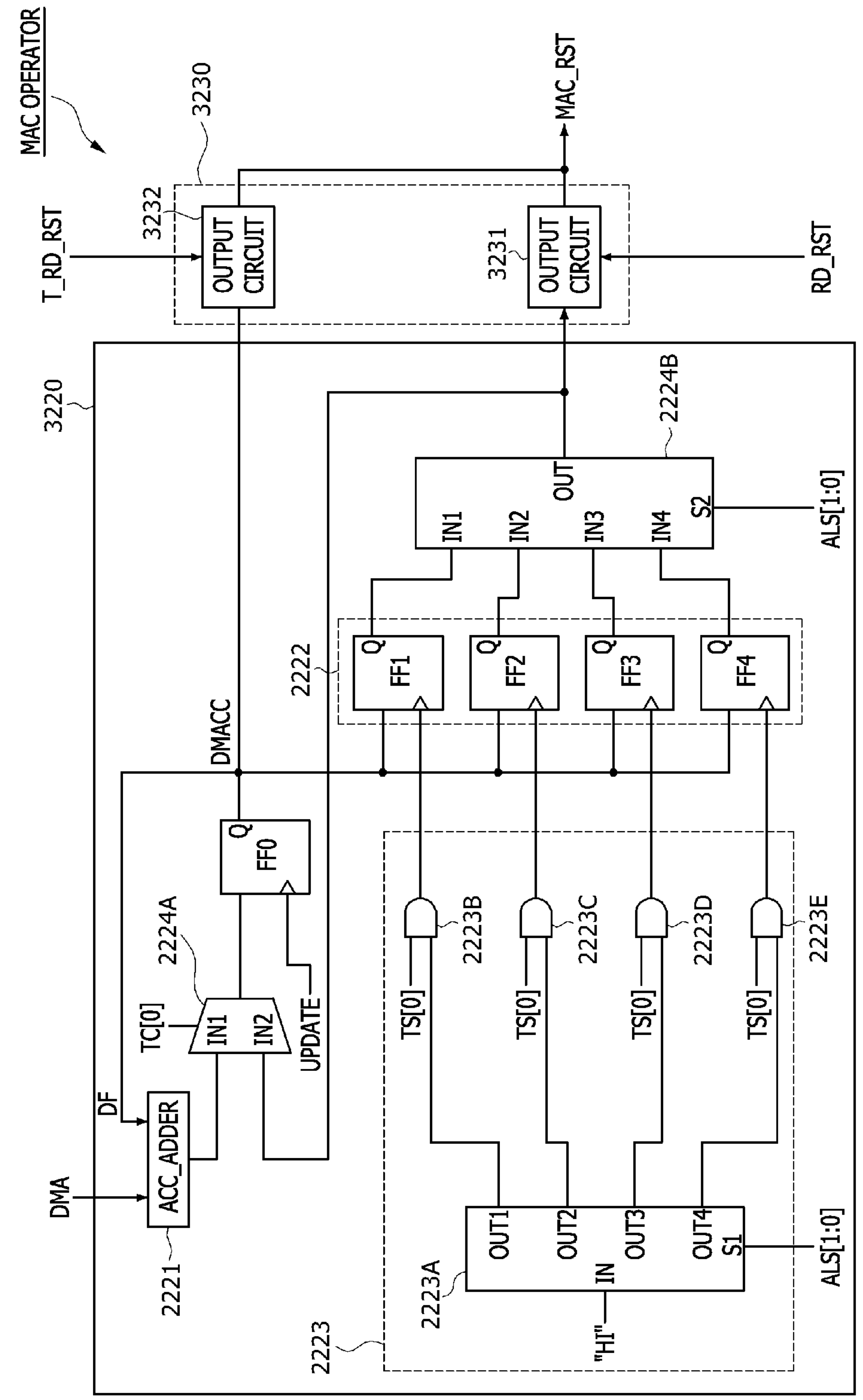
FIG. 65 is a block diagram illustrating an example of a configuration of an accumulator and an output circuit included in each of MAC operators of the PIM device illustrated in FIG. 64.

FIG. 65 is a block diagram illustrating an example of a configuration of an accumulator 3220 and an output circuit 3230 included in each of the MAC operators MAC(0)~MAC(L−1) of the PIM device 400C illustrated in FIG. 64. The accumulator 3220 may have the same configuration as the accumulator 2220 described with reference to FIG. 56 except for an output line of the temporary latch circuit FF0. Thus, in FIG. 65, the same reference numerals and symbols as used in FIG. 56 denote the same components. Accordingly, descriptions of the accumulator 3220 will be omitted or briefly mentioned hereinafter to avoid duplicate explanation. Referring to FIG. 65, each of the MAC operators MAC(0)~MAC(L−1) included in the PIM device 400C may be different from the MAC operator illustrated in FIG. 63 in that the output circuit 3230 includes a first output circuit 3231 and a second output circuit 3232. The first output circuit 3231 of the output circuit 3230 may be the same as the output circuit 1230 described with reference to FIG. 63. The second output circuit 3232 of the output circuit 3230 may have an input terminal coupled to the output terminal of the temporary latch circuit FF0 included in the accumulator 3220 and an output terminal coupled to the output terminal of the first output circuit 3231. The second output circuit 3232 may output the accumulated addition data DMACC, which are outputted from the temporary latch circuit FF0, as MAC result data MAC_RST in response to the temporary result read signal T_RD_RST having a logic "high" level. According to the MAC operator illustrated in FIG. 65, the accumulated addition data DMACC generated prior to termination of the MAC arithmetic operation (i.e., during the MAC arithmetic operation) may be outputted from the MAC operator.

Figure 66:
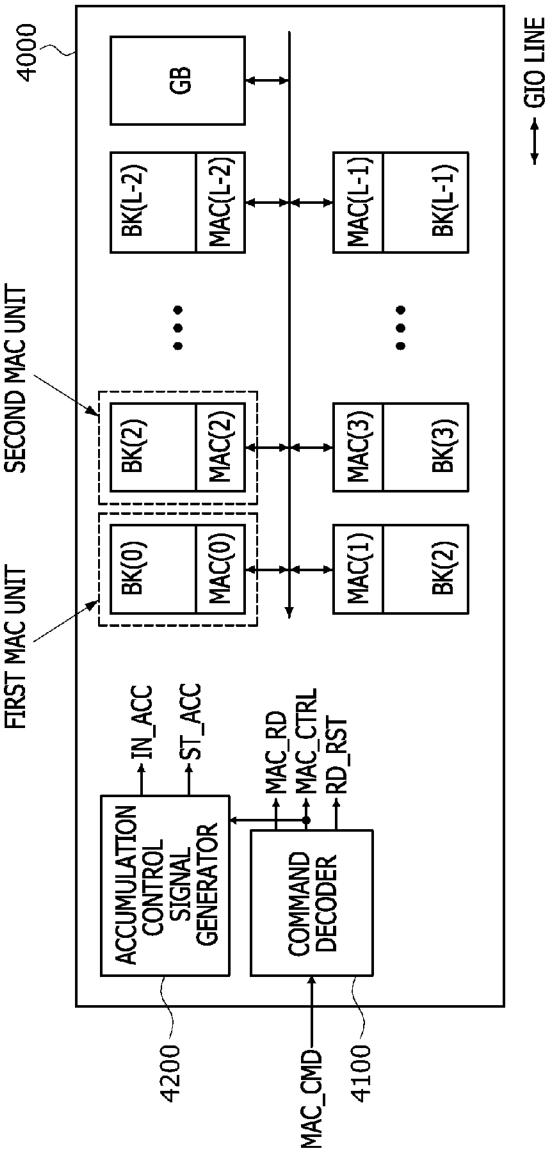
FIG. 66 is a block diagram illustrating a PIM device according to yet another embodiment of the present disclosure.

FIG. 66 is a block diagram illustrating a PIM device 4000 according to yet another embodiment of the present disclosure. Referring to FIG. 66, the PIM device 4000 may include "L"-number of memory banks BK(0)-BK(L−1) ("L" is a natural number of two or more), a global buffer GB, "L"-number of MAC operators MAC(0)-MAC(L−1), a command decoder 4100, and an accumulation control signal generator 4200. In an example, the memory banks BK(0)-

BK(L−1) and the global buffer GB may be a first region and a second region, respectively, which constitute the data storage region 11 of the PIM device 10 of FIG. 1. In an example, the PIM device 4000 may replace the PIM device 400 of the PIM system 1-2, described with reference to FIG. 20.

The memory banks BK(0)-BK(L−1) and the MAC operators MAC(0)-MAC(L−1) may constitute MAC units. That is, one MAC unit may include one memory bank and one MAC operator. As illustrated in the drawing, the first MAC unit may include the first memory bank BK(0) and the first MAC operator MAC(0). The second MAC unit may include the second memory bank BK(1) and the second MAC operator MAC(1). Each of the MAC operators MAC(0)-MAC(L−1) may receive weight data from the memory bank for a MAC operation. For example, the first MAC operator MAC(0) may receive weight data from the first memory bank BK(0). The second MAC operator MAC(1) may receive weight data from the second memory bank BK(1). The global buffer GB may provide vector data to the MAC operators MAC(0)-MAC(L−1) for the MAC operation. To this end, the global buffer GB may receive and store the vector data through a controller before the MAC operation is performed. The global buffer GB may transmit the vector data to the MAC operators MAC(0)-MAC(L−1) through a GIO line. The vector data that is transmitted from the global buffer GB may be respectively input to the MAC operators MAC(0)-MAC(L−1).

The command decoder 4100 may receive a command from an external device, for example, a controller, and may generate and output various control signals. When a MAC command MAC_CMD that requests the MAC operation of the PIM device 4000 is transmitted, the command decoder 4100 may generate a MAC data read control signal MAC_RD and a MAC control signal MAC_CTRL. The command decoder 4100 may transmit the MAC data read control signal MAC_RD to the global buffer GB and the memory banks BK(0)-BK(L−1) and may transmit the MAC control signal MAC_CTRL to the MAC operators MAC(0)-MAC(L−1). In addition, the command decoder 4100 may transmit the MAC control signal MAC_CTRL to the accumulation control signal generator 4200. In an example, the command decoder 4100 may generate a MAC read control signal RD_RST at a certain time point after generating the MAC control signal MAC_CTRL, for example, when the time that is required to generate the MAC result data has elapsed. The command decoder 4100 may transmit the MAC read control signal RD_RST to the MAC operators MAC(0)-MAC(L−1). In another example, the command decoder 4100 may receive a MAC read command (not shown) from a PIM controller and may generate the MAC read control signal RD_RST in response to the MAC read command.

The memory banks BK(0)-BK(L−1) and the global buffer GB may transmit weight data and vector data to the MAC operators MAC(0)-MAC(L−1), respectively, in response to the MAC data read control signal MAC_RD from the command decoder 4100. The MAC operators MAC(0)-MAC(L−1) may perform MAC operations on the weight data and the vector data in response to the MAC control signal MAC_CTRL from the command decoder 4100. The MAC operators MAC(0)-MAC(L−1) may output MAC result data in response to the MAC read control signal RD_RST of a first logic level, for example, a logic "high" level from the command decoder 4100.

Based on the MAC control signal MAC_CTRL that is transmitted from the command decoder 4100, the accumulation control signal generator 4200 may generate a first accumulation control signal IN_ACC and a second accumulation control signal ST_ACC. The accumulation control signal generator 4200 may generate the first accumulation control signal IN_ACC and then may generate the second accumulation control signal ST_ACC after a predetermined time elapses. Each of the first accumulation control signal IN_ACC and the second accumulation control signal ST_ACC may have a plurality of pulses. Each of the first accumulation control signal IN_ACC and the second accumulation control signal ST_ACC may be expressed in a binary stream. The accumulation control signal generator 4200 may transmit the first accumulation control signal IN_ACC and the second accumulation control signal ST_ACC to the MAC operators MAC(0)-MAC(L−1). The first accumulation control signal IN_ACC and the second accumulation control signal ST_ACC may control the accumulation and addition operations of the accumulators of the MAC operators MAC(0)-MAC(L−1).

Figure 67:
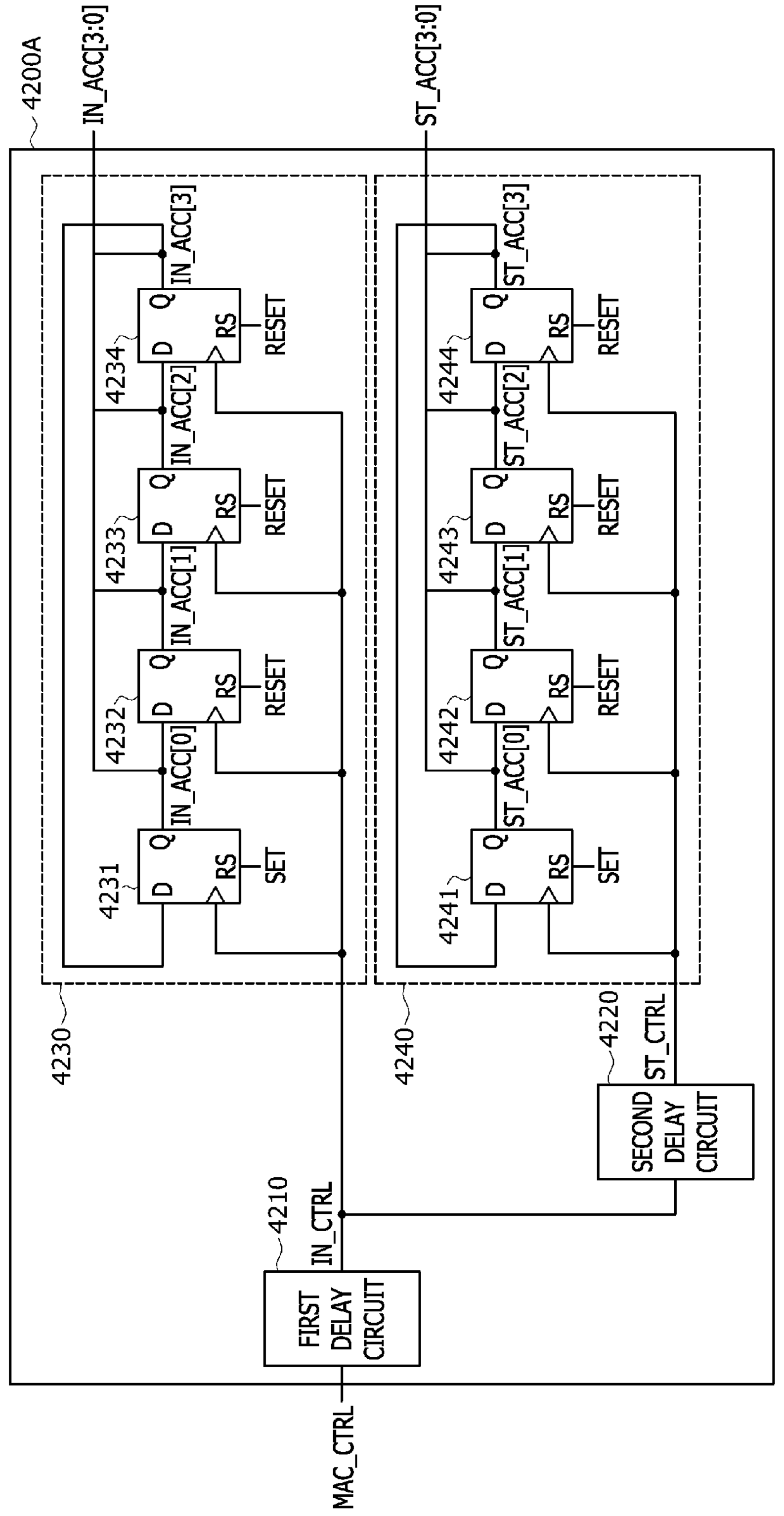
FIG. 67 is a circuit diagram illustrating an example of the configuration of an accumulation control signal generator of the PIM device of FIG. 66.

FIG. 67 is a circuit diagram illustrating an accumulation control signal generator 4200A that corresponds to an example of the accumulation control signal generator 4200 of the PIM device 4000 of FIG. 66. Referring to FIG. 67, the accumulation control signal generator 4200A may include a first delay circuit 4210, a second delay circuit 4220, a first accumulation control signal generation circuit 4230, and a second accumulation control signal generation circuit 4240. The first delay circuit 4210 may receive the MAC control signal MAC_RST that is output from the command decoder (4100 of FIG. 66). The first delay circuit 4210 may generate a first delayed control signal IN_CTRL that is obtained by delaying the MAC control signal MAC_CTRL by a first delay time. The first delay circuit 4210 may transmit the first delayed control signal IN_CTRL to the first accumulation control signal generation circuit 4230 and the second delay circuit 4220. In an example, the first delay time may be set to be equal to or longer than the time period from the time point when the MAC operation is started by the MAC control signal MAC_CTRL in the MAC operators (MAC(0)-MAC(L−1) in FIG. 66) to the time point when multiplication addition data is input to an accumulator. The second delay circuit 4220 may generate a second delayed control signal ST_CTRL that is obtained by delaying the first delayed control signal IN_CTRL by a second delay time. In an example, the second delay time may be set to be equal to or longer than the time period from the time point when the multiplication addition data is input to the accumulation adder of the accumulator of each of the MAC operators (MAC(0)-MAC(L−1) in FIG. 66) to the time point when the accumulation data is output from the accumulation adder. The second delay circuit 4220 may transmit second delayed control signal ST_CTRL to the second accumulation control signal generation circuit 4240.

The first accumulation control signal generation circuit 4230 may include a plurality of, for example, four first flip-flops 4231-4234. The number of the first flip-flops may be determined according to the number of bits of the first accumulation control signal IN_ACC that is generated by the first accumulation control signal generation circuit 4230. In various examples of the present disclosure, it is assumed that the first accumulation control signal IN_ACC is composed of 4 bits. The first flip-flops 4231-4234 may be disposed in such a way that the output terminal Q of the first flip-flop that is disposed at the preceding position is directly coupled to the input terminal D of the first flip-flop that is disposed at the next position. That is, the first flip-flops 4231-4234 may be disposed in a serial input and parallel output (SIPO) structure. Accordingly, the output terminal Q of the first flip-flop 4231 that is disposed at the first position may be coupled to the input terminal D of the first flip-flop 4232 that is disposed at the second position. The output terminal Q of the first flip-flop 4232 that is disposed at the second position may be coupled to the input terminal D of the first flip-flop 4233 that is disposed at the third position. The output terminal Q of the first flip-flop 4233 that is disposed at the third position may be coupled to the input terminal D of the first flip-flop 4234 that is disposed at the last position, that is, the fourth position. The output terminal Q of the first flip-flop 4234 that is disposed at the fourth position may be coupled to the input terminal D of the first flip-flop 4231 that is disposed at the first position.

The first flip-flops 4231-4234 may respectively receive the first delayed control signal IN_CTRL that is output from the first delay circuit 4210 through clock terminals. Accordingly, a signal input operation and a signal output operation in each of the first flip-flops 4231-4234 may be performed in synchronization with the pulse (i.e., a logic "high" signal or data "1") of the first delayed control signal IN_CTRL. The first flip-flop 4231 that is disposed at the first position may be initialized to a set state SET through a reset/set terminal RS. Each of the first flip-flops 4232-4234 that are disposed at the second to fourth positions may be initialized to a reset state RESET through a reset/set terminal RS. Accordingly, in synchronization with the first pulse of the first delayed control signal IN_CTRL, the first flip-flop 4231 that is disposed at the first position may output "1" (or a logic "high" signal), and the first flip-flops 4232-4234 that are disposed in the second to fourth positions may output "0" (or logic "low" signals).

The first flip-flops 4231-4234 may respectively output the bit values of the first accumulation control signal IN_ACC [3:0]. The first flip-flop 4231 that is disposed at the first position may output the first bit value IN_ACC[0], which is the least significant bit value, among the four bit values of the first accumulation control signal IN_ACC[3:0]. The first flip-flop 4232 that is disposed at the second position may output the second bit value IN_ACC[1], among the four bit values of the first accumulation control signal IN_ACC[3:0]. The first flip-flop 4233 that is disposed at the third position may output the third bit value IN_ACC[2], among the four bit values of the first accumulation control signal IN_ACC [3:0]. In addition, the first flip-flop 4234 that is disposed at the fourth position may output the fourth bit value IN_ACC [3], which is the most significant bit value, among the four bit values of the first accumulation control signal IN_ACC [3:0].

The second accumulation control signal generation circuit 4240 may include a plurality of, for example, four second flip-clops 4241-4244. The number of the second flip-flops may be determined according to the number of bits of the second accumulation control signal ST_ACC that is generated by the second accumulation control signal generation circuit 4240. In various examples of the present disclosure, the number of bits of the second accumulation control signal ST_ACC may be the same as the number of bits of the first accumulation control signal IN_ACC. Because the first accumulation control signal IN_ACC is composed of 4 bits, the second accumulation control signal ST_ACC may also be composed of 4 bits. Like the first flip-flops 4231-4234, the second flip-flops 4241-4244 may be disposed in a serial input and parallel output (SIPO) structure in which the output terminal Q of the second flip-flop that is disposed at the preceding position is directly coupled to the input terminal D of the second flip-flop that is disposed at the next position. Accordingly, the output terminal Q of the second flip-flop 4241 that is disposed at the first position may be coupled to the input terminal D of the second flip-flop 4242 that is disposed at the second position. The output terminal Q of the second flip-flop 4242 that is disposed at the second position may be coupled to the input terminal D of the second flip-flop 4243 that is disposed at the third position. The output terminal Q of the second flip-flop 4233 that is disposed at the third position may be coupled to the input terminal D of the second flip-flop 4244 that is disposed at the last position, that is, the fourth position. The output terminal Q of the second flip-flop 4244 that is disposed at the fourth position may be coupled to the input terminal D of the second flip-flop 4241 that is disposed at the first position.

The second flip-flops 4241-4244 may respectively receive the second delayed control signal ST_CTRL that is output from the second delay circuit 4220 through clock terminals. Accordingly, a signal input operation and a signal output operation in the second flip-flops 4241-4244 may be performed in synchronization with the pulse (i.e., a logic "high" signal or data "1") of the second delayed control signal ST_CTRL. The second flip-flop 4241 that is disposed at the first position may be initialized to a set state SET through a reset/set terminal RS. Each of the second flip-flops 4242-4244 that are disposed at the second to fourth positions may be initialized to a reset state RESET through the reset/set terminal RS. Accordingly, in synchronization with the first pulse of the second delayed control signal ST_CTRL, the second flip-flop 4241 that is disposed at the first position may output "1" (or a logic "high" signal), and the second flip-flops 4242-4244 that are disposed in the second to fourth positions may output "0" (or logic "low" signals).

The second flip-flops 4241-4244 may respectively output the bit values of the second accumulation control signal ST_ACC[3:0]. The second flip-flop 4241 that is disposed at the first position may output the first bit value ST_ACC[0], which is the least significant bit value, among the four bit values of the second accumulation control signal ST_ACC [3:0]. The second flip-flop 4242 that is disposed at the second position may output the second bit value ST_ACC [1], among the four bit values of the second accumulation control signal ST_ACC[3:0]. The second flip-flop 4243 that is disposed at the third position may output the third bit value ST_ACC[2], among the four bit values of the second accumulation control signal ST_ACC[3:0]. In addition, the second flip-flop 4244 that is disposed at the fourth position may output the fourth bit value ST_ACC[3], which is the most significant bit value, among the four bit values of the second accumulation control signal ST_ACC[3:0].

Figure 68:
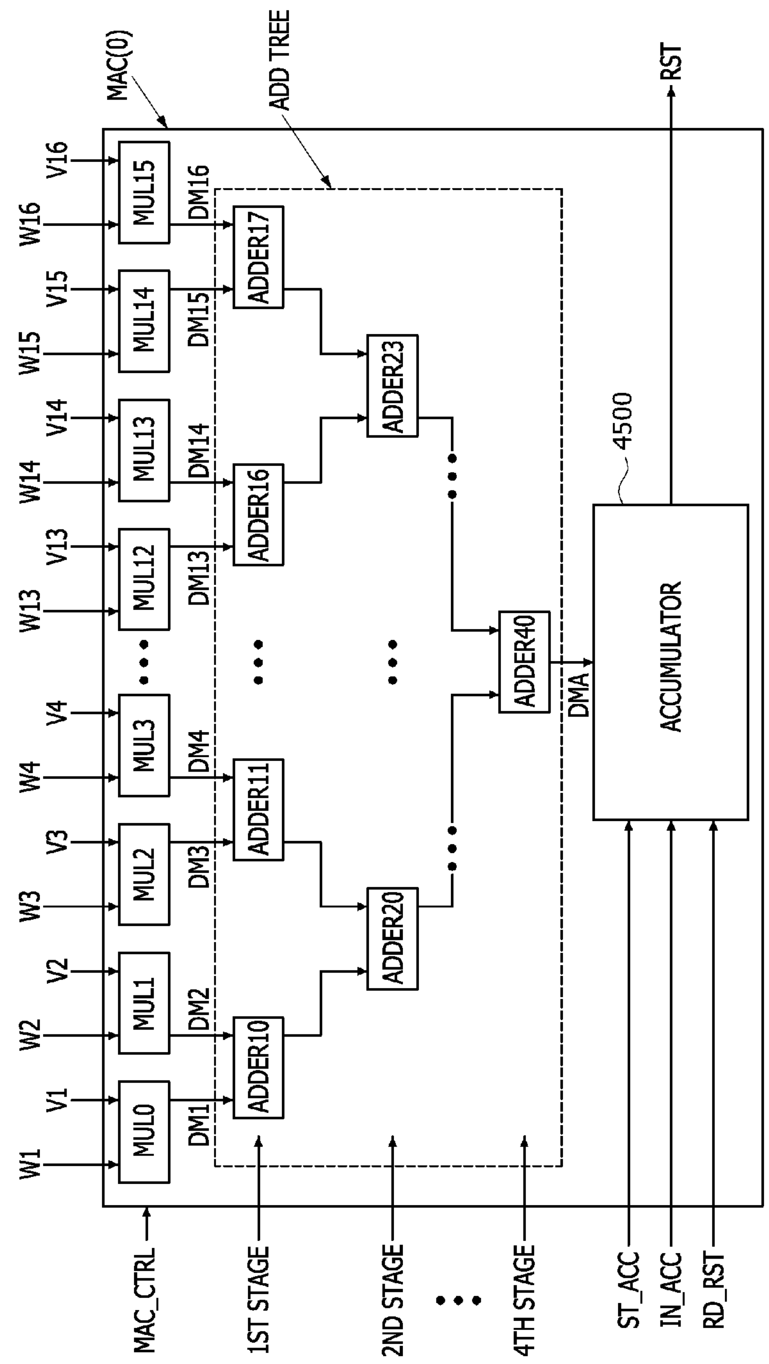
FIG. 68 is a block diagram illustrating an example of the configuration of a first MAC operator of the PIM device of FIG. 66.

FIG. 68 is a block diagram illustrating an example of the configuration of the first MAC operator MAC(0) of the PIM device 4000 of FIG. 66. The description of the first MAC operator MAC(0) below may be equally applied to the remaining MAC operators (MAC(1)-MAC(L−1) of FIG. 66). Referring to FIG. 68, the first MAC operator MAC(0) may include a plurality of, for example, sixteen multipliers MUL(0)-MUL(15), an adder tree that includes a plurality of adders ADDER10-ADDER17, ADDER20-ADDER23, and ADDER40, and an accumulator 4500. The multipliers MUL (0)-MUL(15) may receive the first to sixteenth weight data W1-W16, respectively, from the first memory bank BK(0). In addition, the multipliers MUL(0)-MUL(15) may receive the first to sixteenth vector data V1-V16, respectively, from the global buffer GB. The multipliers MUL(0)-MUL(15) may perform multiplication operations on the first to sixteenth weight data W1-W16 and the first to sixteenth vector data V1-V16 to output first to sixteenth multiplication data DM1-DM16, respectively. For example, the first multiplier MUL(0) may perform a multiplication operation on the first weight data W1 and the first vector data V1 to generate the first multiplication data DM1. The second multiplier MUL1 may perform a multiplication operation on the second weight data W2 and the second vector data V2 to generate the second multiplication data DM2. The remaining multipliers MUL2-MUL15 may also perform multiplication operations in the same manner as the first multiplier MUL(0) to output third to sixteenth multiplication data DM3-DM16, respectively.

The adder tree may be configured by arranging a plurality of adders ADDER10-ADDER17, ADDER20-ADDER23, and ADDER40 in a hierarchical structure, such as a tree structure. As illustrated in FIG. 68, eight adders ADDER10-ADDER17 may be disposed in the first stage at the top of the adder tree. Four adders ADDER20-ADDER23 may be disposed in the second stage of the next lower level in the adder tree. In addition, one adder ADDER40 may be disposed in the fourth stage at the lowest level of the adder tree. Each of the adders ADDER10-ADDER17 of the first stage may perform an addition operation on the multiplication data DMs that are transmitted from two multipliers, among the first to sixteenth multipliers MUL0-MUL15, and may output the data that is generated as a result of the addition operation. For example, the first adder ADDER10 of the first stage may perform an addition operation on the first multiplication data DM1 from the first multiplier MUL0 and the second multiplication data DM2 from the second multiplier MUL1 and may output addition result data. Each of the adders ADDER20-ADDER23 of the second stage may perform an addition operation on the addition result data that is output from two adders, among the adders ADDER10-ADDER17 of the first stage, and may output the data that is generated as a result of the addition operation. In the same manner, the adder ADDER40 of the fourth stage may perform an addition operation on the addition result data that is input from the two adders of the third stage and may output the data that is generated as a result of the addition operation as multiplication addition data DMA.

The accumulator 4500 may receive the multiplication addition data DMA that is output from the adder tree to perform an accumulative addition operation. The accumulator 4500 may receive the first accumulation control signal IN_ACC and the second accumulation control signal ST_ACC from the accumulation control signal generator (4200 of FIG. 66). In addition, the accumulator 4500 may receive the MAC read control signal RD_RST from the command decoder (4100 of FIG. 66). The accumulator 4500 may perform an accumulative addition operation in response to the first accumulation control signal IN_ACC and the second accumulation control signal ST_ACC. In addition, the accumulator 4500 may output MAC result data in response to the MAC read control signal RD_RST of a logic "high" level.

Figure 69:
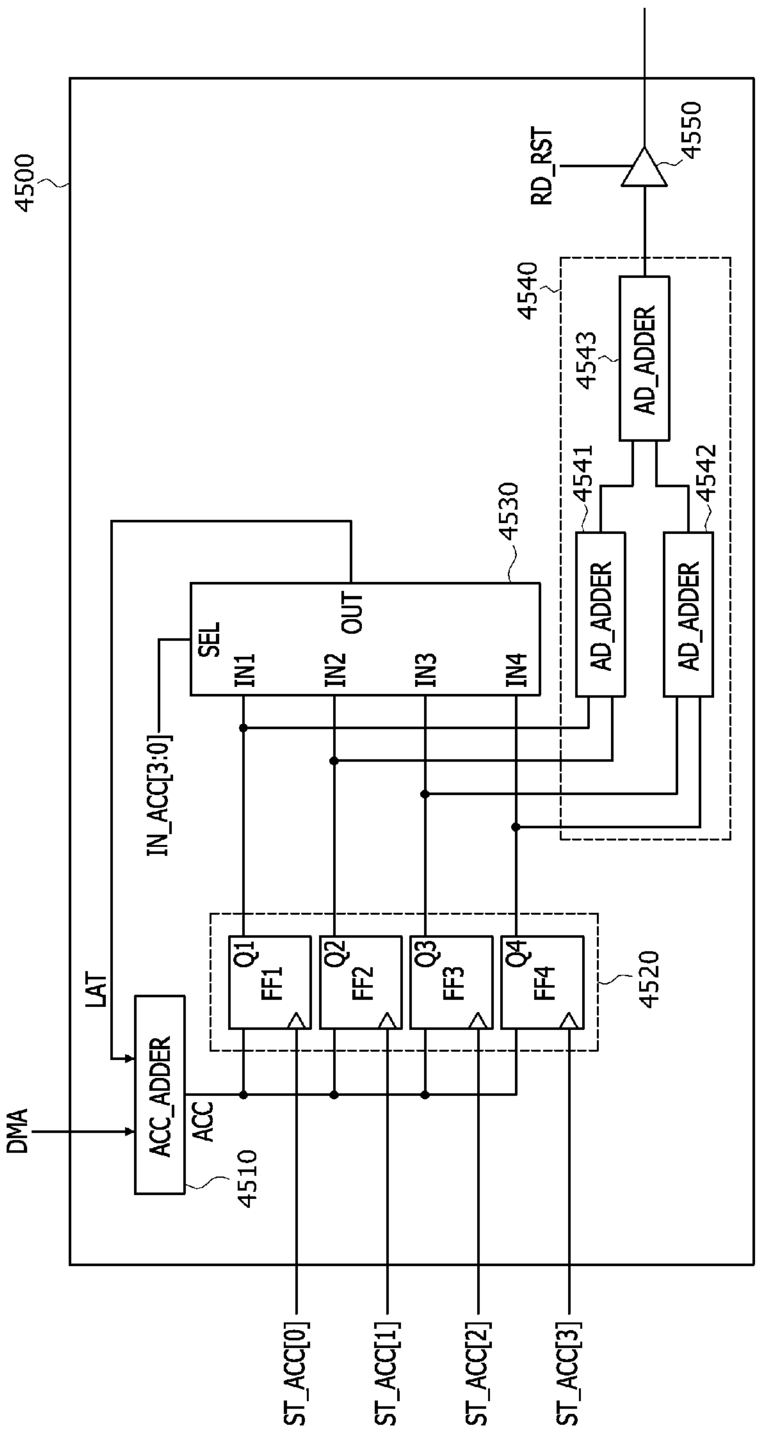
FIG. 69 is a block diagram illustrating an example of the configuration of an accumulator of the first MAC operator of FIG. 68.

FIG. 69 is a block diagram illustrating an example of an accumulator 4500 of the first MAC operator MAC(0) of FIG. 68. Referring to FIG. 69, the accumulator 4500 may include an accumulation adder (ACC_ADDER) 4510, a latch circuit 4520, a selector 4530, an additional addition circuit 4540, and an output buffer 4550. The accumulation adder 4510 may have a first input terminal, a second input terminal, and an output terminal. The accumulation adder 4510 may receive the multiplication addition data DMA that is output from the adder tree through the first input terminal. The accumulation adder 4510 may receive latch data LAT that is output from the selector 4530 through the second input terminal. The accumulation adder 4510 may perform an accumulative addition operation on the multiplication addition data DMA and the latch data LAT to generate accumulation data ACC. The accumulation adder 4510 may output accumulation data ACC through the output terminal. The accumulation adder 4510 may transmit the accumulation data ACC to the latch circuit 4520.

The latch circuit 4520 may include a plurality of latch devices, for example, flip-flops. The number of flip-flops that constitute the latch circuit 4520 may be variously set. The number of flip-flops that constitute the latch circuit 4520 may be equal to the number of bits of the first accumulation control signal IN_ACC (the same as the number of bits of the second accumulation control signal ST_ACC). As each of the first accumulation control signal IN_ACC and the second accumulation control signal ST_ACC consists of 4 bits, the latch circuit 4520 may include first to fourth flip-flops FF1-FF4. The first to fourth flip-flops FF1-FF4 may be disposed independently of each other, and thus, the input or output of one flip-flop might not affect the input or output of the other flip-flops.

The first to fourth flip-flops FF1-FF4 may respectively receive the accumulation data ACC that is output from the accumulation adder 4510 through input terminals. The first to fourth flip-flops FF1-FF4 may receive the second accumulation control signal ST_ACC[3:0] that is output from the second accumulation control signal generation circuit (4240 of FIG. 67) of the second accumulation control signal generator (4200A of FIG. 67) through clock terminals. Specifically, the first flip-flop FF1 may receive the first bit value ST_ACC[0], which is the least significant bit value of the second accumulation control signal ST_ACC[3:0], through the clock terminals. The second flip-flop FF2 may receive the second bit value ST_ACC[1] of the second accumulation control signal ST_ACC[3:0] through the clock terminal. The third flip-flop FF3 may receive the third bit value ST_ACC[2] of the second accumulation control signal ST_ACC[3:0] through the clock terminal. In addition, the fourth flip-flop FF4 may receive the fourth bit value ST_ACC[3], which is the most significant bit value of the second accumulation control signal ST_ACC[3:0], through the clock terminal.

The first flip-flop FF1 may be synchronized with the pulse (i.e., a logic "high" signal or data "1") of the first bit value ST_ACC[0] of the second accumulation control signal ST_ACC[3:0] to latch the accumulation data ACC that is transmitted from the accumulation adder 4510 and to output the latched accumulation data ACC through an output terminal Q1. The second flip-flop FF2 may be synchronized with the pulse (i.e., a logic "high" signal or data "1") of the second bit value ST_ACC[1] of the second accumulation control signal ST_ACC[3:0] to latch the accumulation data ACC that is transmitted from the accumulation adder 4510 and to output the latched accumulation data ACC through an output terminal Q2. The third flip-flop FF3 may be synchronized with the pulse (i.e., a logic "high" signal or data "1") of the third bit value ST_ACC[2] of the second accumulation control signal ST_ACC[3:0] to latch the accumulation data ACC that is transmitted from the accumulation adder 4510 and to output the latched accumulation data ACC through an output terminal Q3. In addition, the fourth flip-flop FF4 may be synchronized with the pulse (i.e., a logic "high" signal or data "1") of the fourth bit value ST_ACC[3] of the second accumulation control signal ST_ACC[3:0] to latch the accumulation data ACC that is transmitted from the accumulation adder 4510 and to output the latched accumulation data ACC through an output terminal Q4.

The selector 4530 may include first to fourth input terminals IN1-IN4, a selection terminal SEL, and an output terminal OUT. The first to fourth input terminals IN1-IN4 of the selector 4530 may be coupled to the first to fourth flip-flops FF1-FF4, respectively. The first input terminal IN1 of the selector 4530 may be coupled to the output terminal Q1 of the first flip-flop FF1. The second input terminal IN2 of the selector 4530 may be coupled to the output terminal Q2 of the second flip-flop FF2. The third input terminal IN3 of the selector 4530 may be coupled to the output terminal Q3 of the third flip-flop FF3. In addition, the fourth input terminal IN4 of the selector 4530 may be coupled to the output terminal Q4 of the fourth flip-flop FF4.

The selector 4530 may receive the first accumulation control signal IN_ACC[3:0] through the selection terminal SEL. The output terminal OUT of the selector 4530 may be coupled to the second input terminal of the accumulation adder 4510. The selector 4530 may output the data of the input terminal, among the first to fourth input terminals IN1-IN4, selected by the bit values of the first accumulation control signal IN_ACC[3:0], to the accumulation adder 4510 through the output terminal OUT. In an example, when the first accumulation control signal IN_ACC[3:0] of "0001" is transmitted to the selection terminal SEL, the selector 4530 may output the data of the first input terminal IN1. When the first accumulation control signal IN_ACC[3:0] of "0010" is transmitted to the selection terminal SEL, the selector 4530 may output the data of the second input terminal IN2. When the first accumulation control signal IN_ACC[3:0] of "0100" is transmitted to the selection terminal SEL, the selector 4530 may output the data of the third input terminal IN3. When the first accumulation control signal IN_ACC[3:0] of "1000" is transmitted to the selection terminal SEL, the selector 4530 may output the data of the fourth input terminal IN4.

The additional addition circuit 4540 may include a plurality of, for example, first to third additional adders (AD_ADDERs) 4541-4543 that are disposed in an adder tree structure. As shown in FIG. 69, the first and second additional adders 4541 and 4542 may be disposed at the first stage, and the third additional adder 4543 may be disposed at the second stage. The first input terminal and the second input terminal of the first additional adder 4541 of the first stage may be coupled to the output terminal Q1 of the first flip-flop FF1 and the output terminal Q2 of the second flip-flop FF2 of the latch circuit 4520, respectively. The first input terminal and the second input terminal of the second additional adder 4542 of the first stage may be coupled to the output terminal Q3 of the third flip-flop FF3 and the output terminal Q4 of the fourth flip-flop FF4 of the latch circuit 4520, respectively. The first input terminal and the second input terminal of the third additional adder 4543 of the second stage may be coupled to the output terminal of the first additional adder 4541 and the output terminal of the second additional adder 4542 of the first stage, respectively. The output terminal of the third additional adder 4543 of the second stage may be coupled to an input terminal of the output buffer 4550.

The first additional adder 4541 of the first stage may perform an addition operation on the data that is output from the first flip-flop FF1 and the second flip-flop FF2 of the latch circuit 4520. The second additional adder 4542 of the first stage may perform an addition operation on the data that is output from the third flip-flop FF3 and the fourth flip-flop FF4 of the latch circuit 4520. The third additional adder 4543 of the second stage may perform an addition operation on the data that is output from the first and second flip-flops FF1 and FF2. Accordingly, the third additional adder 4543 of the second stage may output the result data that is obtained by adding all data that is output from the first to fourth flip-flops FF1-FF4 of the latch circuit 4520.

The output buffer 4550 may include the input terminal, an enable terminal, and an output terminal. In an example, the output buffer 4550 may be configured with a 3-state buffer. The output buffer 4550 may receive the MAC read control signal RD_RST through the enable terminal. The input terminal of the output buffer 4550 may be coupled to the output terminal of the third additional adder 4543 of the last stage, i.e., the second stage of the additional addition circuit 4540. The output terminal of the output buffer 4550 may be coupled to the output line of the accumulator 4500. Although the output buffer 4550 is disposed inside the accumulator 4500 in this example, this is only an example, and the output buffer 4550 may be disposed separately from the accumulator 4500 in the first MAC operator MAC(0) in another example. The output buffer 4550 may output or might not output the data that is received through the input terminal, through the output terminal according to the logic level of the MAC read control signal RD_RST that is received through the enable terminal. In an example, when the logic level of the MAC read control signal RD_RST is a logic "high" level (or data "1"), the output buffer 4550 may output the data that is input to the input terminal, through the output terminal. On the other hand, when the logic level of the MAC read control signal RD_RST is a logic "low" level (or data "0"), the output buffer 4550 might not output the data that is input to the input terminal.

Figure 70:
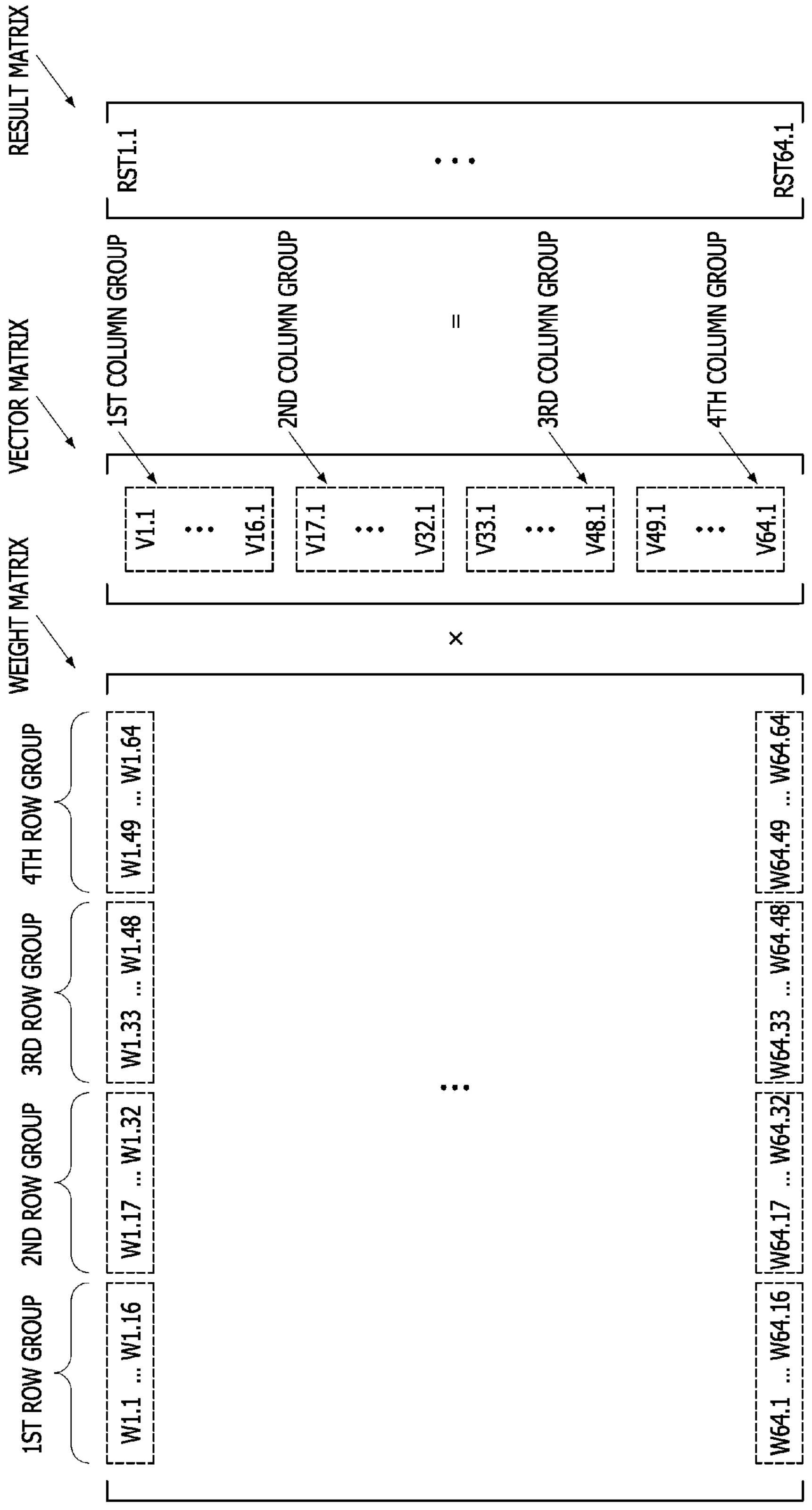
FIG. 70 is a diagram illustrating an example of a matrix multiplication operation performed in the PIM device of FIG. 66.

FIG. 70 is a diagram illustrating an example of the matrix multiplication operation performed in the PIM device 4000 of FIG. 66. Referring to FIG. 70. the matrix multiplication operation may be performed on a weight matrix and a vector matrix, and a result matrix may be generated as a result of the matrix multiplication operation. Each of the elements W1.1-W64.64 of the weight matrix may constitute the weight data. Each of the elements V1.1-V64.1 of the vector matrix may constitute the vector data. Each of the elements RST1.1-RST64.1 of the result matrix may constitute the MAC result data. Although the case in which the weight matrix is composed of 64 rows and 64 columns is exemplified in this example, this is only an example, and the size of the weight matrix may be set in various ways. The vector matrix may have the same number of rows as the number of columns of the weight matrix and one column. The result matrix may have the same number of rows as the number of rows of the weight matrix and one column.

As shown in FIG. 70, 64 pieces of weight data may be disposed in a row of the weight matrix. The first row of the weight matrix may include weight data W1.1-W1.64 of the first column to the $64^{th}$ column. The $64^{th}$ row of the weight matrix may include weight data W64.1-W64.64 of the first column to the $64^{th}$ column. The first column of the vector matrix may include vector data V1.1-V64.1 of the first row to the $64^{th}$ row. The first column of the result matrix may include MAC result data RST1.1-RST64.1 of the first row to the $64^{th}$ row. The matrix multiplication operation on the weight data of one row of the weight matrix and the vector data of the vector matrix may be performed by one MAC operator. For example, the matrix multiplication operation on the weight data W1.1-W1.64 of the first row of the weight matrix and the vector data V1.1-V64.1 may be performed by the first MAC operator (MAC(0) of FIG. 66). Similarly, the matrix multiplication operation on the weight data W64.1-W64.64 of the $64^{th}$ row of the weight matrix and the vector data V1.1-V64.1 may be performed by the $64^{th}$ MAC operator. That is, when the PIM device 4000 has 64 MAC operators ("L"=64 in FIG. 66), the matrix multiplication operations on the weight data of each of 64 rows of the weight matrix and the vector data may be simultaneously performed in the 64 MAC operators. Hereinafter, the matrix multiplication operations on the weight data W1.1-W1.64 of the first row of the weight matrix and the vector data V1.1V64.1 that are performed by the first MAC operator (MAC(0) of FIGS. 66 and 68) will be mainly described.

The matrix multiplication operation on the weight data W1.1-W1.64 of the first row of the weight matrix and the vector data V1.1-V64.1 may be performed by being divided into a plurality of MAC operations according to the operation capacity of the first MAC operator (MAC(0) in FIG. 68). For example, when each of the weight data W1.1-W1.64 of the first row has a size of 16 bits and the number of bits that can be processed by the multipliers (MUL0-MUL15 in FIG. 68) constituting the first MAC operator (MAC(0) in FIG. 68) is 256 bits, the number of pieces of the weight data processed through one MAC operation may be 16. Accordingly, the matrix multiplication operation on the 64 weight data W1.1-W1.64 and the vector data V1.1-V64.1 may be completed by performing four MAC operations.

In general, the first MAC operation, among the four MAC operations, may be performed through the first matrix multiplication operation and the first accumulation operation on the weight data W1.1-W1.16 of the first to 16$^{th}$ columns of the first row (hereinafter, referred to as "first row group") and the vector data V1.1-V16.1 of the first to 16$^{th}$ rows of the first column (hereinafter, referred to as "first column group"). As a result of the first MAC operation, the first accumulation data that is the same as the first multiplication addition data that is generated by the first matrix multiplication operation may be generated. The second MAC operation may be performed through the second matrix multiplication operation and the second accumulation operation on the weight data W1.17-W1.32 of the 17$^{th}$ to 32$^{nd}$ columns of the first row (hereinafter, referred to as "second row group") and the vector data V17.1-V32.1 of the 17$^{th}$ to 32$^{nd}$ rows of the first column (hereinafter, referred to as "second column group"). As a result of the second MAC operation, the second accumulation data that is obtained by adding the first accumulation data to the second multiplication addition data that is generated by the second matrix multiplication operation may be generated. The third MAC operation may be performed through the third matrix multiplication operation and the third accumulation operation on the weight data W1.33-W1.48 of the 33$^{rd}$ to 48$^{th}$ columns of the first row (hereinafter, referred to as "third row group") and the vector data V33.1-V48.1 of the 33$^{rd}$ to 48$^{th}$ rows of the first column (hereinafter, referred to as "third column group"). As a result of the third MAC operation, the third accumulation data that is obtained by adding the second accumulation data to the third multiplication addition data that is generated by the third matrix multiplication operation may be generated. In addition, the last fourth MAC operation may be performed through the fourth matrix multiplication operation and the fourth accumulation operation on the weight data W1.49-W1.64 of the 49$^{th}$ to 64$^{th}$ columns of the first row (hereinafter, referred to as "fourth row group") and the vector data V49.1-V64.1 of the 49$^{th}$ to 64$^{th}$ rows of the first column (hereinafter, referred to as "fourth column group"). As a result of the third MAC operation, the fourth accumulation data that is obtained by adding the second accumulation data to the fourth multiplication addition data that is generated by the fourth matrix multiplication operation may be generated. The fourth accumulation data that is generated as the result of the fourth MAC operation may be the matrix multiplication result of the first row of the weight matrix and the first column of the vector matrix and may constitute the first MAC result data MAC_RST of the first row and first column of the result matrix.

As such, the matrix multiplication operation for the first row of the weight matrix and the first column of the vector matrix may be performed through four MAC operations. Each of the MAC operations may include one matrix multiplication operation and one accumulative addition operation for one row group and one column group. That is, the matrix multiplication operation on the first row of the weight matrix and the first column of the vector matrix may be performed through four matrix multiplication operations and four accumulative addition operations. When each of the weight data and vector data has a floating-point format, the accumulation adder (4510 in FIG. 69) that constitutes the accumulator (4500 in FIGS. 68 and 69) of the first MAC operator (MAC(0) in FIG. 68) may be configured with a floating-point adder. In this case, due to the long operation time in the floating-point adder, the time point at which the latch data (LAT of FIG. 69) is transmitted to the accumulation adder (4510 of FIG. 69) may be delayed from the time point at which the multiplication addition data DMA is transmitted to the accumulation adder 4510, and thus, the accumulative addition operation might not be normally performed. Accordingly, in various examples of the present disclosure, the latch circuit 4520 in the accumulator (4500 in FIG. 69) may be configured with the first to fourth flip-flops FF1-FF4 that operate independently of each other, and "0" is input as the latch data (LAT in FIG. 69) when the first to fourth accumulative addition operations in the first to fourth MAC operations are performed. Accordingly, the time that is required for the first to fourth accumulative addition operations may be reduced. As a result, the accumulation adder (4510 of FIG. 69) may feed back the latch data (LAT of FIG. 69) to the accumulation adder (4510 of FIG. 69) within a time interval in which the multiplication addition data DMAs are input.

Figure 71:
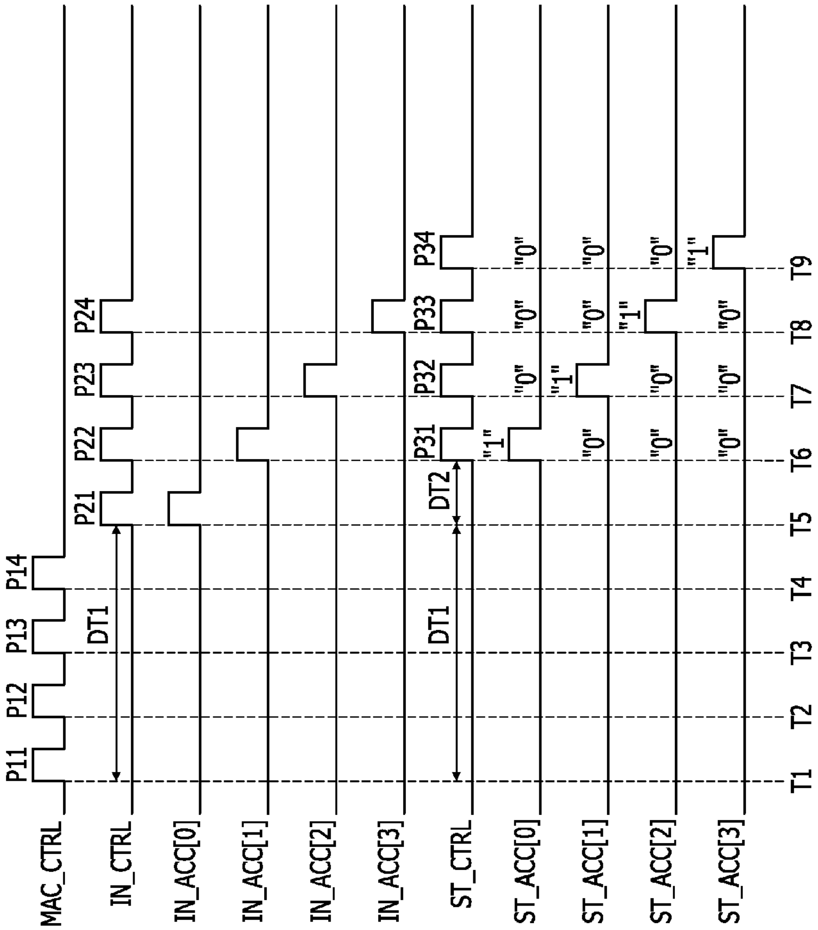
FIG. 71 is a timing diagram illustrating the operation of the accumulation control signal generator of FIG. 67 while the PIM device of FIG. 66 performs the matrix multiplication operation of FIG. 70.

FIG. 71 is a timing diagram illustrating the operation of the accumulation control signal generator 4200A of FIG. 67 while the PIM device 4000 of FIG. 66 is performing the matrix multiplication operation of FIG. 70. FIGS. 72 to 76 are diagrams illustrating the process in which the accumulation control signal generator 4200A of FIG. 67 generates the first accumulation control signal IN_ACC[3:0] and the second accumulation control signal ST_ADD[3:0] according to the MAC control signal while the PIM device 4000 of FIG. 66 is performing the matrix multiplication operation of FIG. 70. First, referring to FIG. 71, together with FIG. 67, in order to perform the first to fourth MAC operations, the command decoder (4100 of FIG. 66) of the PIM device 4000 may generate a MAC control signal MAC_CTRL having first to fourth pulses P11-P14 in response to the first to fourth MAC commands MAC_CMD to transmit the MAC control signal MAC_CTRL to the accumulation control signal generator 4200A. The MAC control signal MAC_CTRL may include the first pulse P11 having a rising edge at the first time point T1, the second pulse P12 having a rising edge at the second time point T2, the third pulse P13 having a rising edge at the third time point T3, and the fourth pulse P14 having a rising edge at the fourth time point T4.

The first delay circuit 4210 of the accumulation control signal generator 4200A may output the first delayed control signal IN_CTRL that is obtained by delaying the MAC control signal MAC_CTRL by the first delay time DT1. The first delayed control signal IN_CTRL may include the first pulse P21 having a rising edge at the fifth time point T5, the second pulse P22 having a rising edge at the sixth time point T6, the third pulse P23 having a rising edge at the seventh time point T7, and the fourth pulse P24 having a rising edge at the eighth time point T8. Here, the fifth time point T5, the sixth time point T6, the seventh time point T7, and the eighth time point T8 may correspond to the time points when the first delay time DT1 has elapsed from the first time point T1, the second time point T2, the third time point T3 and the fourth time point T4, respectively. The second delay circuit 4220 of the accumulation control signal generator 4200A may output the second delayed control signal ST_CTRL that is obtained by delaying the first delayed control signal IN_CTRL by the second delay time DT2. The second delayed control signal ST_CTRL may include the first pulse P31 having a rising edge at the sixth time point T6, the second pulse P32 having a rising edge at the seventh time point T7, the third pulse P33 having a rising edge at the eighth time point T8, and the fourth pulse P34 having a rising edge at the ninth time point T9. Here, the sixth to ninth time points T6-T9 may correspond to the time points that have elapsed by the second delay time DT2 from the fifth to eighth time points T5-T8, respectively.

Figure 72:
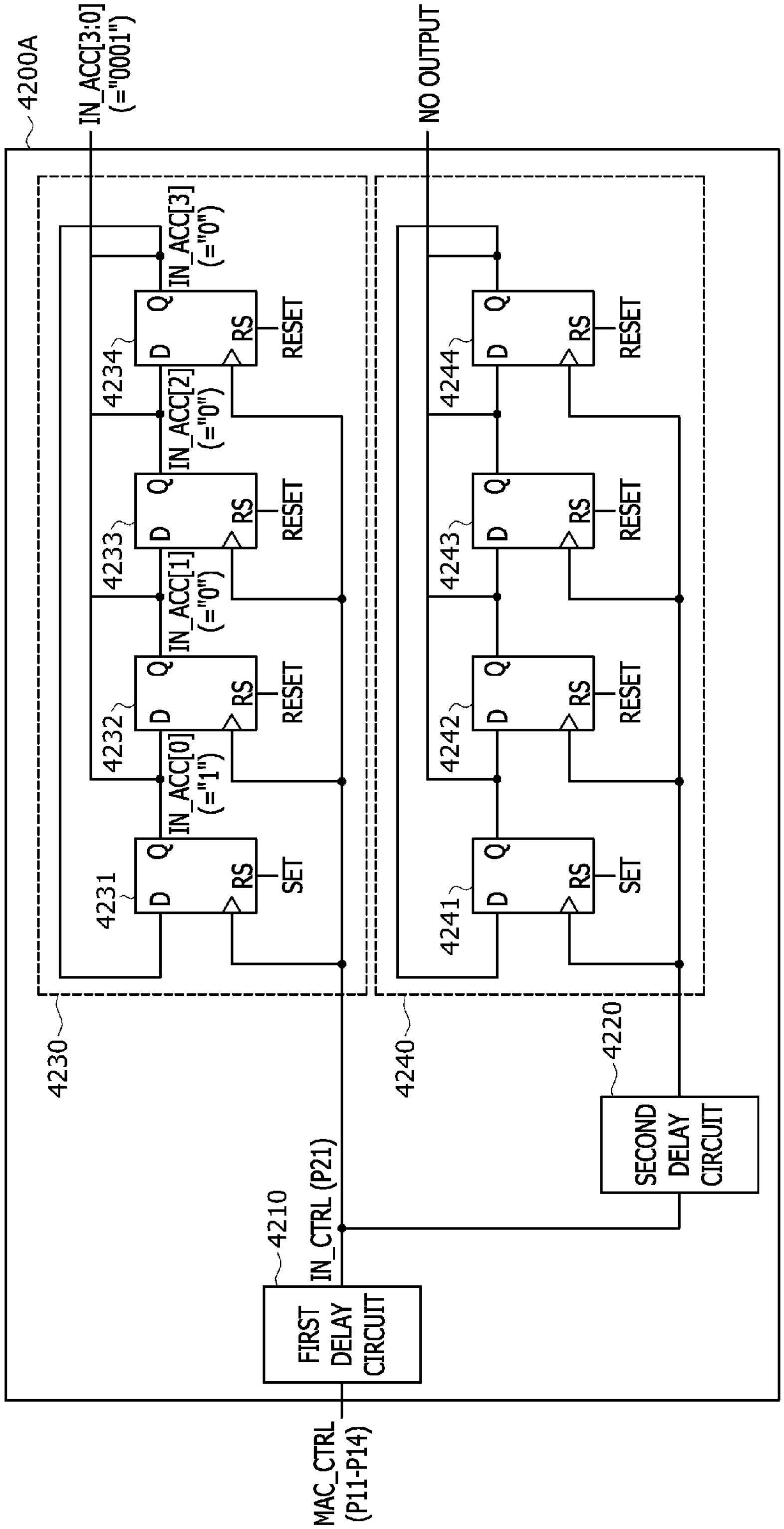
FIGS. 72 to 76 are diagrams illustrating a process in which the accumulation control signal generator of FIG. 67 generates a first accumulation control signal and a second accumulation control signal according to a MAC control signal while the PIM device of FIG. 66 performs the matrix multiplication operation of FIG. 70.

At the fifth time point T5, the first delay circuit 4210 may output the first pulse P21 of the first delayed control signal IN_CTRL. The first accumulation control signal generation circuit 4230 may be synchronized with the first pulse P21 of the first delayed control signal IN_CTRL to output the first accumulation control signal IN_ACC[3:0] of "0001". Specifically, as shown in FIG. 72, at the fifth time point T5, the first pulse P21 of the first delayed control signal IN_CTRL may be transmitted to the clock terminals of the first flip-flops 4231-4234 that are disposed at the first to fourth positions of the first accumulation control signal generation circuit 4230. The first flip-flops 4231-4234 that are disposed at the first to fourth positions of the first accumulation control signal generation circuit 4230 may be synchronized with the first pulse P21 of the first delayed control signal IN_CTRL to respectively output the bit values of the first accumulation control signal IN_ACC[3:0] through the output terminals Q. Because the first flip-flop 4231 that is disposed at the first position is initialized to a set SET state, "1" may be output as the first bit value IN_ACC[0] of the first accumulation control signal IN_ACC[3:0]. Because the first flip-flop 4232 that is disposed at the second position is initialized to a reset RESET state, "0" may be output as the second bit value IN_ACC[1] of the first accumulation control signal IN_ACC[3:0]. Because the first flip-flop 4233 that is disposed at the third position is initialized to a reset state RESET, "0" may be output as the third bit value IN_ACC[2] of the first accumulation control signal IN_ACC[3:0]. Because the first flip-flop 4234 that is disposed at the fourth position is initialized to a reset state RESET, "0" may be output as the fourth bit value IN_ACC[3] of the first accumulation control signal IN_ACC[3:0]. At the fifth time point T5, as the second delayed control signal is not yet output from the second delay circuit 4220, the second accumulation control signal generation circuit 4240 might not output the second accumulation control signal.

Figure 73:
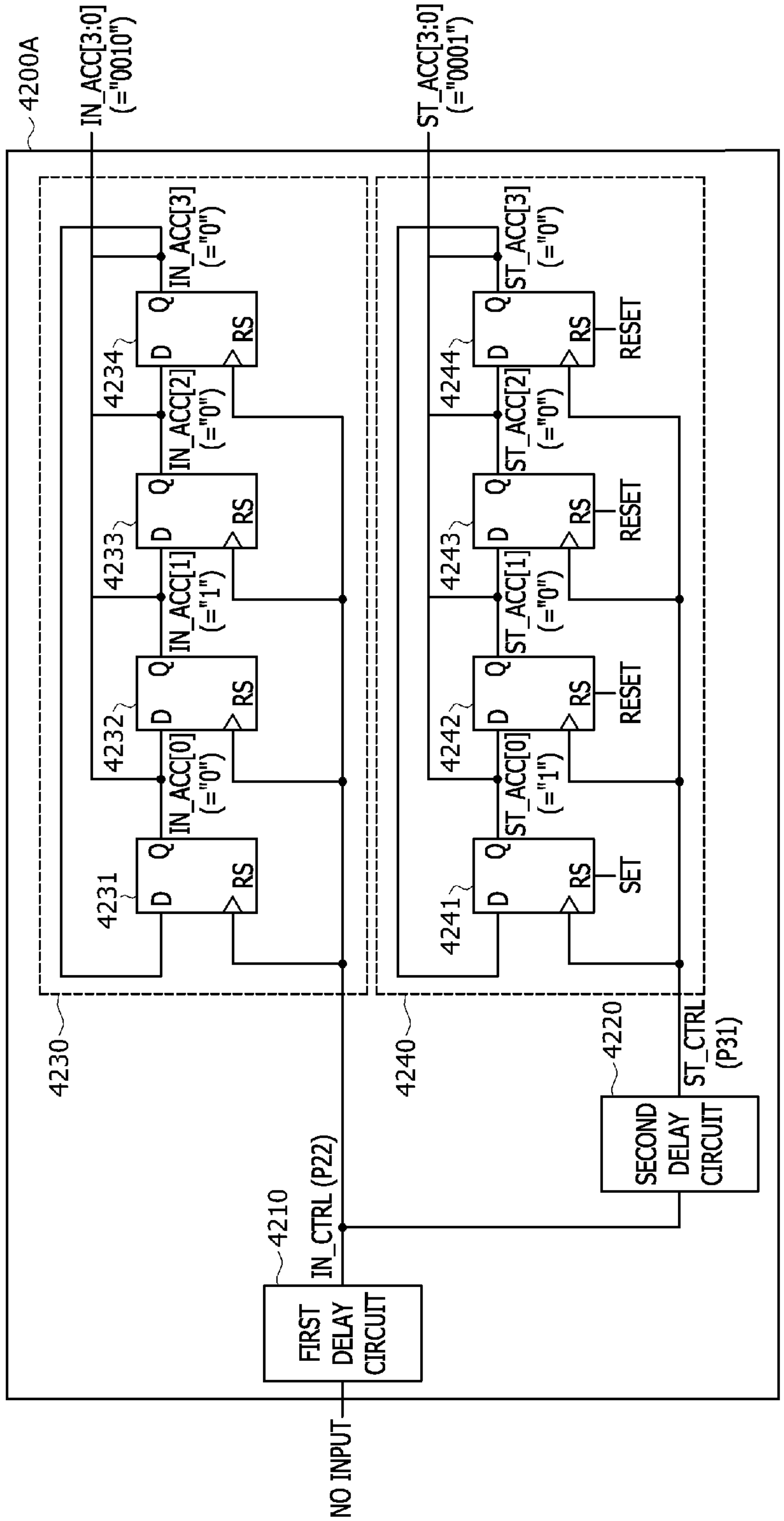

As shown in FIG. 73, at the sixth time point T6, when the second pulse P22 of the first delayed control signal IN_CTRL is output from the first delay circuit 4210, the first flip-flops 4231-4234 that are disposed at the first to fourth positions may be synchronized with the second pulse P22 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC[0] of the first accumulation control signal IN_ACC[3:0]. The first flip-flop 4232 that is disposed at the second position may output "1" that is transmitted from the first flip-flop 4231 that is disposed at the first position as the second bit value IN_ACC[1] of the first accumulation control signal IN_ACC[3:0]. The first flip-flop 4233 that is disposed at the third position may output "0" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "0" that is transmitted from the first flip-flop 4233 that is disposed at the third position as the fourth bit value IN_ACC[3] of the first accumulation control signal IN_ACC[3:0]. That is, at the sixth time point T6, the first accumulation control signal generation circuit 4230 may output "0010" as the first accumulation control signal IN_ACC[3:0].

The sixth time point T6 may be the same as the time point when the second delay time DT2 of the second delay circuit 4220 elapses from the fifth time point T5. Accordingly, at the sixth time point T6, the second delay circuit 4220 may output the first pulse P31 of the second delayed control signal ST_CTRL. The second flip-flops 4241-4244 that are disposed at the first to fourth positions of the second accumulation control signal generation circuit 4240 may be synchronized with the first pulse P31 of the second delayed control signal ST_CTRL that is received through the clock terminals to respectively output the bit values of the second accumulation control signal ST_ACC[3:0] through the output terminals Q. Because the second flip-flop 4211 that is disposed at the first position is initialized to the set SET state, "1" may be output as the first bit value ST_ACC[0] of the second accumulation control signal ST_ACC[3:0]. Because the second flip-flop 4212 that is disposed at the second position is initialized to the reset RESET state, "0" may be output as the second bit value ST_ACC[1] of the second accumulation control signal ST_ACC[3:0]. Because the second flip-flop 4213 that is disposed at the third position is initialized to the reset state RESET, "0" may be output as the third bit value ST_ACC[2] of the second accumulation control signal ST_ACC[3:0]. Because the second flip-flop 4214 that is disposed at the fourth position is initialized to the reset state RESET, "0" may be output as the fourth bit value ST_ACC[3] of the second accumulation control signal ST_ACC[3:0]. That is, the second accumulation control signal generation circuit 4240 may output "0001" as the second accumulation control signal ST_ACC[3:0].

Figure 74:
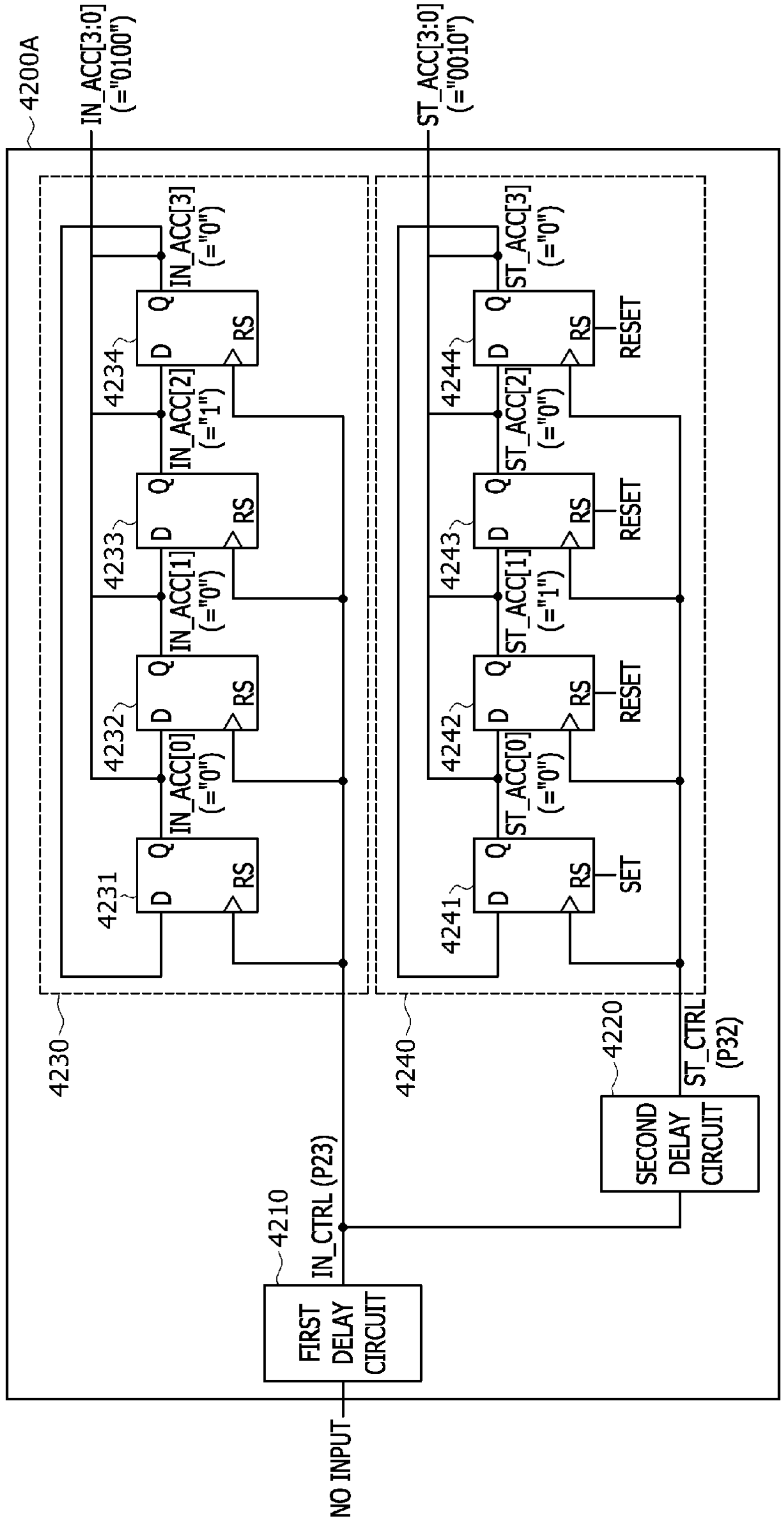

As shown in FIG. 74, at the seventh time point T7, the third pulse P23 of the first delayed control signal IN_CTRL may be output from the first delay circuit 4210, and the second pulse P32 of the second delayed control signal ST_CTRL may be output from the second delay circuit 4220. The first flip-flops 4231-4234 that are disposed at the first to fourth positions of the first accumulation control signal generation circuit 4230 may be synchronized with the third pulse P23 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC[0] of the first accumulation control signal IN_ACC[3:0].

The first flip-flop 4232 that is disposed at the second position may output "0" that is transmitted from the first flip-flop 4231 that is disposed at the first position as the second bit value IN_ACC[1] of the first accumulation control signal IN_ACC[3:0]. The first flip-flop 4233 that is disposed at the third position may output "1" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "0" that is transmitted from the first flip-flop 4233 that is disposed at the third position as the fourth bit value IN_ACC[3] of the first accumulation control signal IN_ACC[3:0]. That is, at the seventh time point T7, the first accumulation control signal generation circuit 4230 may output "0100" as the first accumulation control signal IN_ACC[3:0].

At the seventh time point T7, the second flip-flops 4241-4244 that are disposed at the first to fourth positions may be synchronized with the second pulse P32 of the second delayed control signal ST_CTRL that is received through the clock terminals to respectively output the bit values of the second accumulation control signal ST_ACC[3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "1" that is transmitted from the second flip-flop 4241 that is disposed at the first position as the second bit value ST_ACC[1] of the second accumulation control signal ST_ACC[3:0]. The second flip-flop 4243 that is disposed at the third position may output "0" that is transmitted from the second flip-flop 4242 that is disposed at the second position as the third bit value ST_ACC[2] of the second accumulation control signal ST_ACC[3:0]. The second flip-flop 4244 that is disposed at the fourth position may output "0" that is transmitted from the second flip-flop 4243 that is disposed at the third position as the fourth bit value ST_ACC[3] of the second accumulation control signal ST_ACC[3:0]. That is, at the seventh time point T7, the second accumulation control signal generation circuit 4240 may output "0010" as the second accumulation control signal ST_ACC[3:0].

Figure 75:
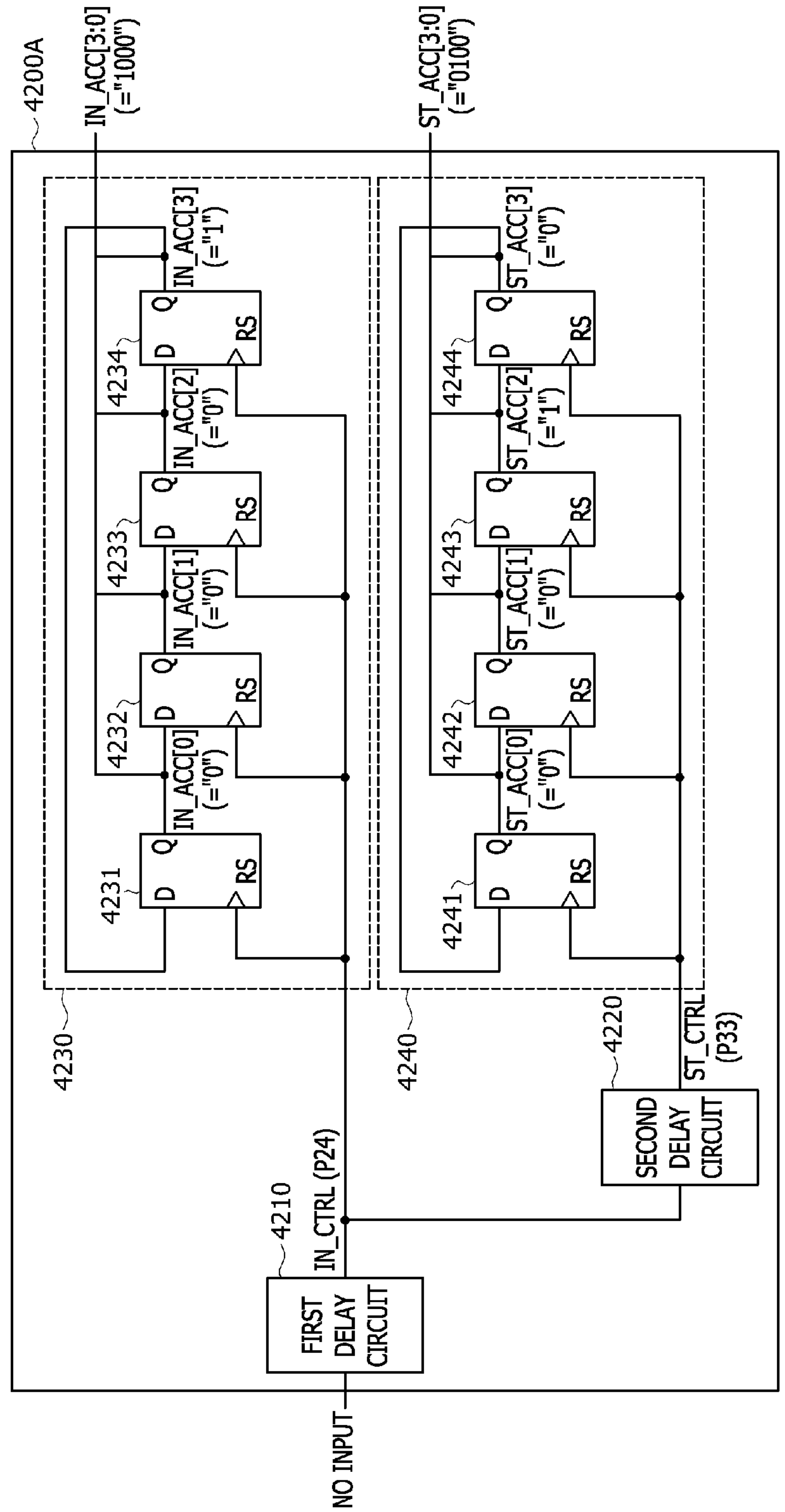

As shown in FIG. 75, at the eighth time point T8, the fourth pulse P24 of the first delayed control signal IN_CTRL may be output from the first delay circuit 4210, and the third pulse P33 of the second delayed control signal ST_CTRL may be output from the second delay circuit 4220. The first flip-flops 4231-4234 that are disposed at the first to fourth positions of the first accumulation control signal generation circuit 4230 may be synchronized with the fourth pulse P24 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC[0] of the first accumulation control signal IN_ACC[3:0]. The first flip-flop 4232 that is disposed at the second position may output "0" that is transmitted from the first flip-flop 4231 that is disposed at the first position as the second bit value IN_ACC[1] of the first accumulation control signal IN_ACC[3:0]. The first flip-flop 4233 that is disposed at the third position may output "0" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "1" that is transmitted from the first flip-flop 4233 that is disposed at the third position as the fourth bit value IN_ACC[3] of the first accumulation control signal IN_ACC[3:0]. That is, at the eighth time point T8, the first accumulation control signal generation circuit 4230 may output "1000" as the first accumulation control signal IN_ACC[3:0].

At the eighth time point T8, the second flip-flops 4241-4244 that are disposed at the first to fourth positions may be synchronized with the third pulse P33 of the second delayed control signal ST_CTRL that is received through the clock terminals to respectively output the bit values of the second accumulation control signal ST_ACC[3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4241 that is disposed at the first position as the second bit value ST_ACC[1] of the second accumulation control signal ST_ACC[3:0]. The second flip-flop 4243 that is disposed at the third position may output "1" that is transmitted from the second flip-flop 4242 that is disposed at the second position as the third bit value ST_ACC[2] of the second accumulation control signal ST_ACC[3:0]. The second flip-flop 4244 that is disposed at the fourth position may output "0" that is transmitted from the second flip-flop 4243 that is disposed at the third position as the fourth bit value ST_ACC[3] of the second accumulation control signal ST_ACC[3:0]. That is, at the eighth time point T8, the second accumulation control signal generation circuit 4240 may output "0100" as the second accumulation control signal ST_ACC[3:0].

Figure 76:
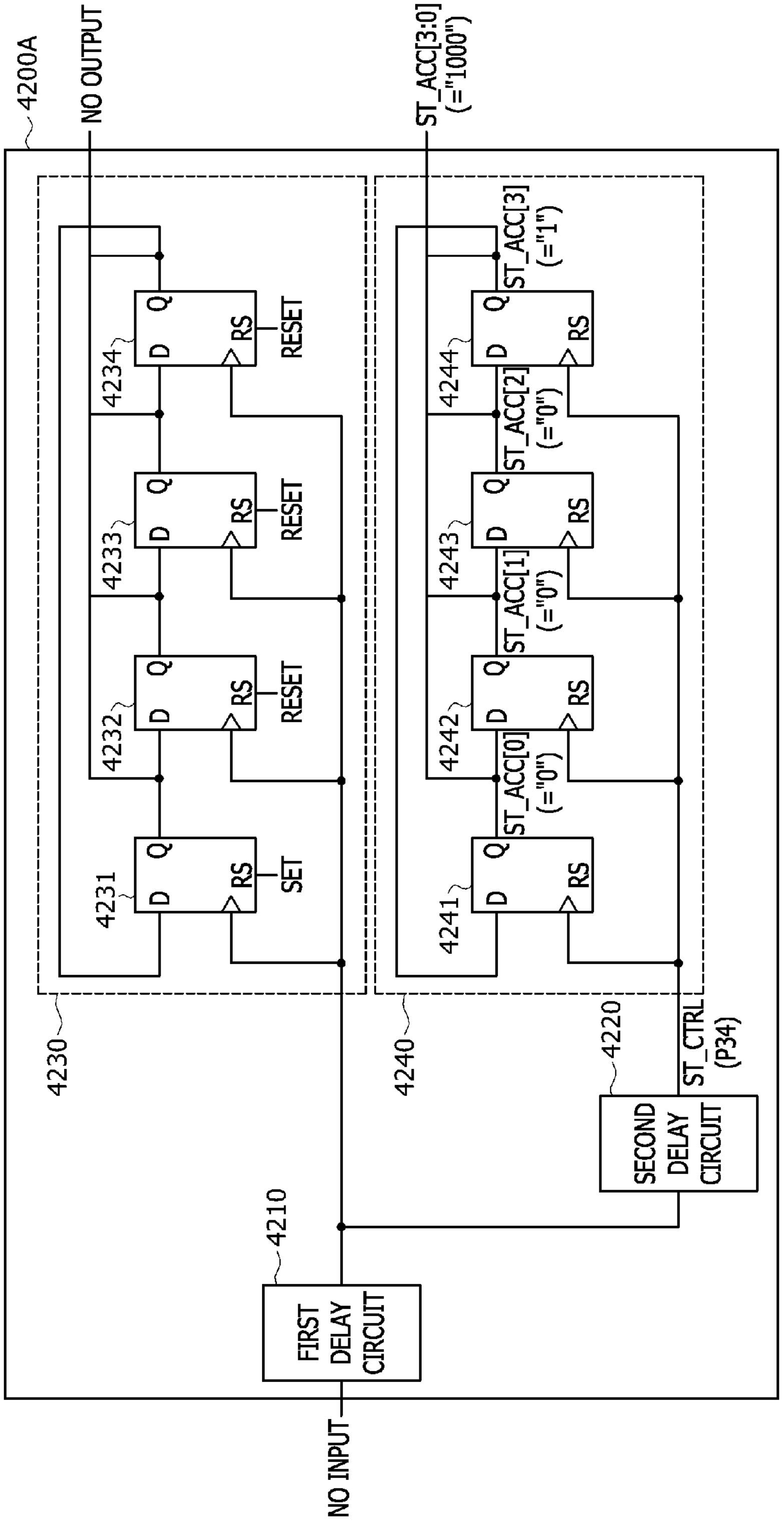
Figure 77:
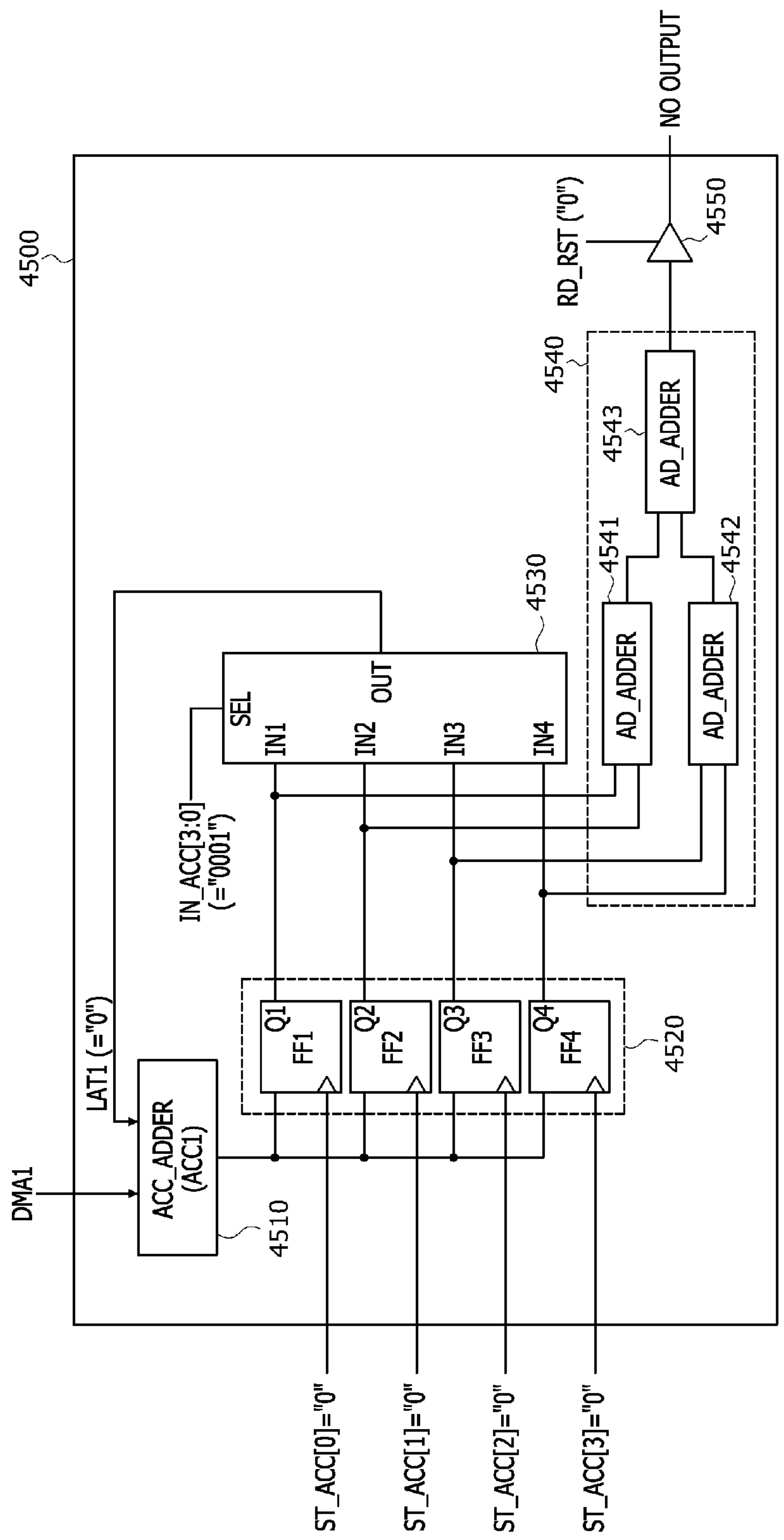
FIGS. 77 to 81 are diagrams illustrating the operations of the accumulator of FIG. 69 while the PIM device of FIG. 66 performs the matrix multiplication operation of FIG. 70.

As shown in FIG. 76, at the ninth time point T9, the first delay circuit 4210 may no longer output the pulses of the first delayed control signal IN_CTRL. Accordingly, the first accumulation control signal generation circuit 4230 might not output the first accumulation control signal IN_ACC[3:0]. In addition, the first flip-flop 4231 that is disposed at the first position may be initialized to the set SET state through a reset/set terminal RS. All of the first flip-flops 4232-4234 that are disposed at the second to fourth positions may be initialized to the reset RESET state through the reset/set terminals RS. At the ninth time point T9, the second delay circuit 4220 may output the fourth pulse P34 of the second delayed control signal ST_CTRL. The flip-flops 4241-4244 that are disposed at the first to fourth positions of the second accumulation control signal generation circuit 4240 may be synchronized with the fourth pulse P34 of the second delayed control signal ST_CTRL that is received through the clock terminals to respectively output the bit values of the second accumulation control signal ST_ACC[3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4241 that is disposed at the first position as the second bit value ST_ACC[1] of the second accumulation control signal ST_ACC[3:0]. The second flip-flop 4243 that is disposed at the third position may output "0" that is transmitted from the second flip-flop 4242 that is disposed at the second position as the third bit value ST_ACC[2] of the second accumulation control signal ST_ACC[3:0]. The second flip-flop 4244 that is disposed at the fourth position may output "1" that is transmitted from the second flip-flop 4243 that is disposed at the third position as the fourth bit value ST_ACC[3] of the second accumulation control signal ST_ACC[3:0]. That is, at the ninth time point T9, the second accumulation control signal generation circuit 4240 may output "1000" as the second accumulation control signal ST_ACC[3:0]. Thereafter, similarly to the first flip-flops 4231-4234, the second flip-flop 4241 that is disposed at the first position may be initialized to the set SET state through the reset/set terminal RS. All of the second flip-flops 4242-4244 that are disposed at the second to fourth positions may be initialized to the reset RESET state through the reset/set terminals RS.

FIGS. 77 to 81 are diagrams illustrating the operation of the accumulator 4500 of FIG. 69 while the PIM device 4000 of FIG. 66 is performing the matrix multiplication operation of FIG. 70. First, referring to FIG. 77, together with FIG. 71, for the first MAC operation, when the first row group of the first row of the weight matrix and the first column group of the vector matrix are transmitted to the first MAC operator MAC(0), the multipliers MUL0-MUL15 may perform multiplication operations on the first row group of the first row of the weight matrix and the first column group of the vector matrix to output multiplication data. The adder tree may perform addition operations on the multiplication data that is output from the multipliers MUL0-MUL15 to generate first multiplication addition data DMA1. The first multiplication addition data DMA1 may be transmitted to the first input terminal of the accumulation adder 4510 of the accumulator 4500. At the fifth time point T5 when the first delay time DT1 elapses from the first time point T1 at which the first pulse P11 of the MAC control signal MAC_CTRL is generated, the first accumulation control signal IN_ACC[3:0] of "0001" may be transmitted to the selection terminal SEL of the selector 4530 of the accumulator 4500. The selector 4530 may transmit "0" that is set in the first input terminal IN1 to the second input terminal of the accumulation adder 4510 through the output terminal OUT, in response to the first accumulation control signal IN_ACC[3:0] of "0001". Accordingly, the accumulation adder 4510 may perform an accumulative addition operation on the first multiplication addition data DMA1 and the first latch data LAT1 of "0" to generate the first accumulation data ACC1. The first accumulation data ACC1 may be the same as the first multiplication addition data DMA1.

Figure 78:
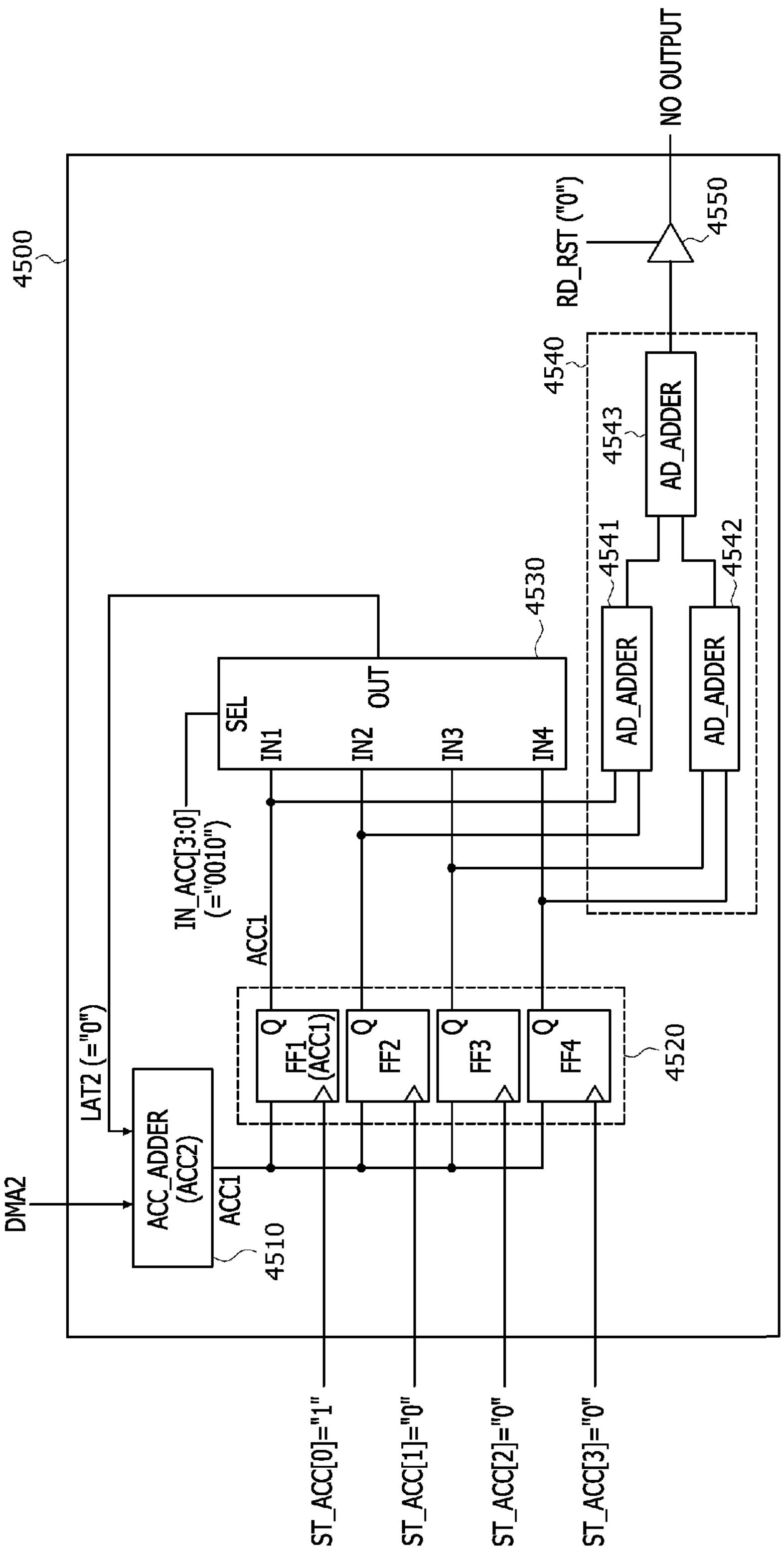

Next, referring to FIG. 78, together with FIG. 71, for the second MAC operation, multiplication operations on the second row group of the first row of the weight matrix and the second column group of the vector matrix may be performed by the multipliers MUL0-MUL15 of the first MAC operator MAC(0). Subsequently, in the adder tree of the first MAC operator MAC(0), an addition operation may be performed on the multiplication data that is output from the multipliers MUL0-MUL15, and the second multiplication addition data DMA2 that is generated as a result of the addition operations may be transmitted to the first input terminal of the accumulation adder 4510 of the accumulator 4500. At the sixth time point T6 at which the second pulse P22 of the first delayed control signal IN_CTRL and the first pulse P31 of the second delayed control signal ST_CTRL are generated, the first accumulation control signal IN_ACC[3:0] of "0010" and the second accumulation control signal ST_ACC[3:0] of "0001" may be transmitted to the selection terminal SEL of the selector 4530 and the clock terminals of the first to fourth flip-flops FF1-FF4, respectively. The selector 4530 may transmit "0" that is set in the second input terminal IN2 as the second latch data LAT2 to the second input terminal of the accumulation adder 4510 through the output terminal OUT in response to the first accumulation control signal IN_ACC[3:0] of "0010". Accordingly, at the sixth time point T6, the accumulation adder 4510 may perform an accumulative addition operation on the second multiplication addition data DMA2 and the second latch data LAT2 of "0" to generate the second accumulation data ACC2. The second accumulation data ACC2 may be the same as the second multiplication addition data DMA2.

Meanwhile, the first accumulation data ACC1 that is output from the accumulation adder 4510 at the sixth time point T6 may be respectively transmitted to the input terminals of the first to fourth flip-flops FF1-FF4 of the latch circuit 4520. Because "1" is transmitted as the first bit value ST_ACC[0] of the second accumulation control signal ST_ACC[3:0] to the clock terminal of the first flip-flop FF1, and "0" is transmitted to the clock terminals of the second to fourth flip-flops FF2-FF4 as the second to fourth bit values ST_ACC[3:1] of the second accumulation control signal ST_ACC[3:0], the first flip-flop FF1 may latch and output the first accumulation data ACC1 from the accumulation adder 4510. The first accumulation data ACC1 that is output from the first flip-flop FF1 may be transmitted to the first input terminal IN1 of the selector 4530 and the first input terminal of the additional adder 4541. The selector 4530 may update the data that is set in the first input terminal IN1 from "0" to the first accumulation data ACC1.

Figure 79:
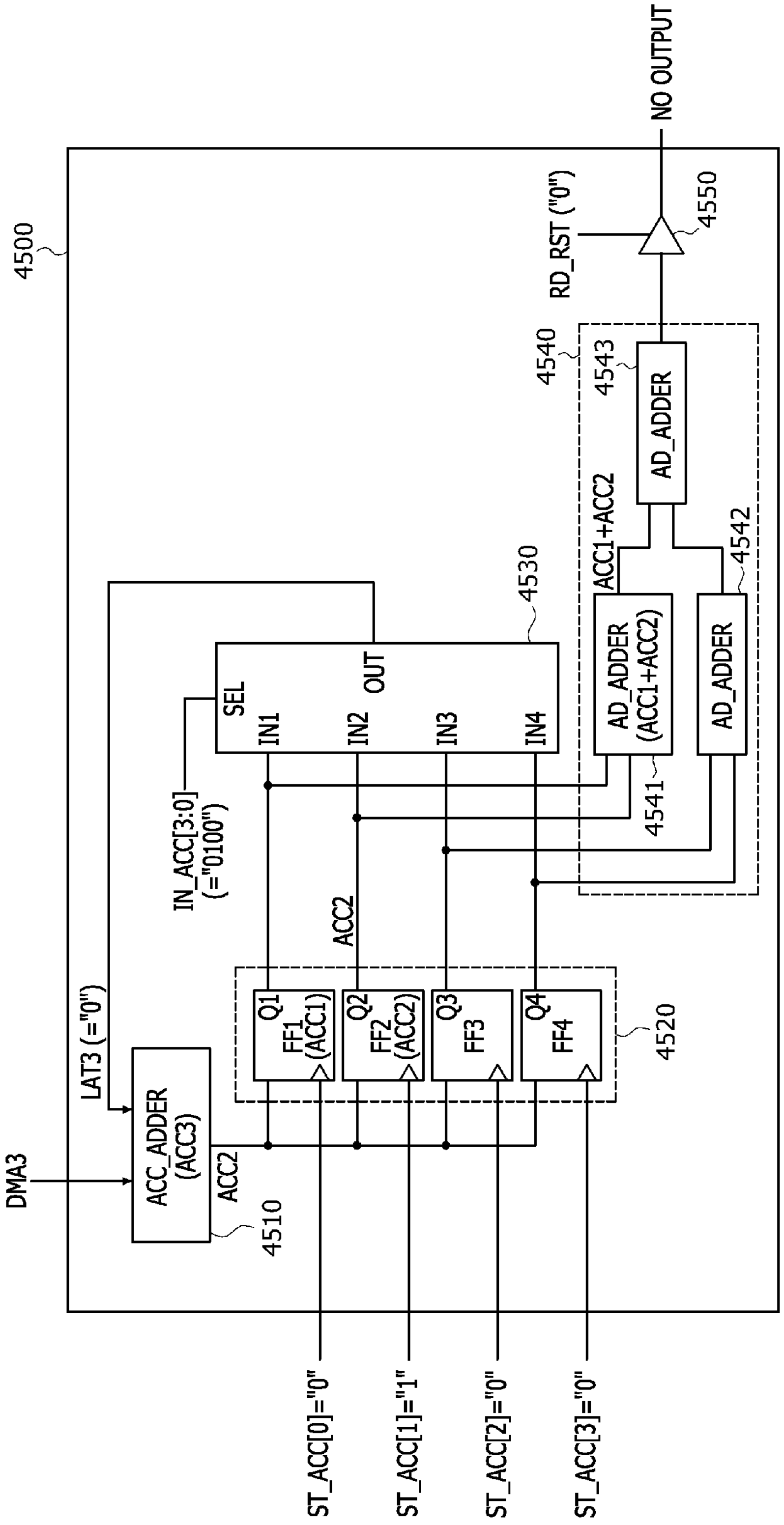

Next, referring to FIG. 79, together with FIG. 71, for the third MAC operation, multiplication operations on the third row group of the first row of the weight matrix and the third column group of the vector matrix may be performed by the multipliers MUL0-MUL15 of the first MAC operator MAC (0). Subsequently, an addition operation may be performed on the multiplication data that is output from the multipliers MUL0-MUL15 in the adder tree of the first MAC operator MAC(0), and the third multiplication addition data DMA3 that is generated as a result of the addition operation may be transmitted to the first input terminal of the accumulation adder 4510 of the accumulator 4500. At the seventh time point T7 at which the third pulse P23 of the first delayed control signal IN_CTRL and the second pulse P32 of the second delayed control signal ST_CTRL are generated, the first accumulation control signal IN_ACC[3:0] of "0100" and the second accumulation control signal ST_ACC[3:0] of "0010" may be transmitted to the selection terminal SEL of the selector 4530 and the clock terminals of the first to fourth flip-flops FF1-FF4, respectively. In response to the first accumulation control signal IN_ACC[3:0] of "0100", the selector 4530 may transmit "0" that is set in the third input terminal IN3 to the second input terminal of the accumulation adder 4510 as the third latch data LAT3 through the output terminal OUT. Accordingly, at the seventh time point T7, the accumulation adder 4510 may perform an accumulative addition operation on the third multiplication addition data DMA3 and "0", which is the third latch data, to generate the third accumulation data ACC3. The third accumulation data ACC3 may be the same as the third multiplication addition data DMA3.

Meanwhile, the second accumulation data ACC2 that is output from the accumulation adder 4510 at the seventh time point T7 may be respectively transmitted to the input terminals of the first to fourth flip-flops FF1-FF4 of the latch circuit 4520. Because "1" is transmitted to the clock terminal of the second flip-flop FF2 as the second bit value ST_ACC[1] of the second accumulation control signal ST_ACC[3:0], and "0" is transmitted to the clock terminals of the first, third, and fourth flip-flops FF1, FF3, and FF3 as the first bit value ST_ACC[0], the third bit value ST_ACC[2], and the fourth bit value ST_ACC[3] of the second accumulation control signal ST_ACC[3:0], respectively, the second flip-flop FF2 may latch and output the second accumulation data ACC2 from the accumulation adder 4510. The second accumulation data ACC2 that is output from the second flip-flop FF2 may be transmitted to the second input terminal IN2 of the selector 4530 and the second input terminal of the additional adder 4541 of the additional addition circuit 4540. The selector 4530 may update the data that is set in the second input terminal IN2 from "0" to the second accumulation data ACC2. The additional adder 4541 may perform an addition operation on the first accumulation data ACC1 and the second accumulation data ACC2 to generate the result data of "ACC1+ACC2". The additional adder 4541 may transmit the result data of "ACC1+ACC2" to the additional adder 4543.

Figure 80:
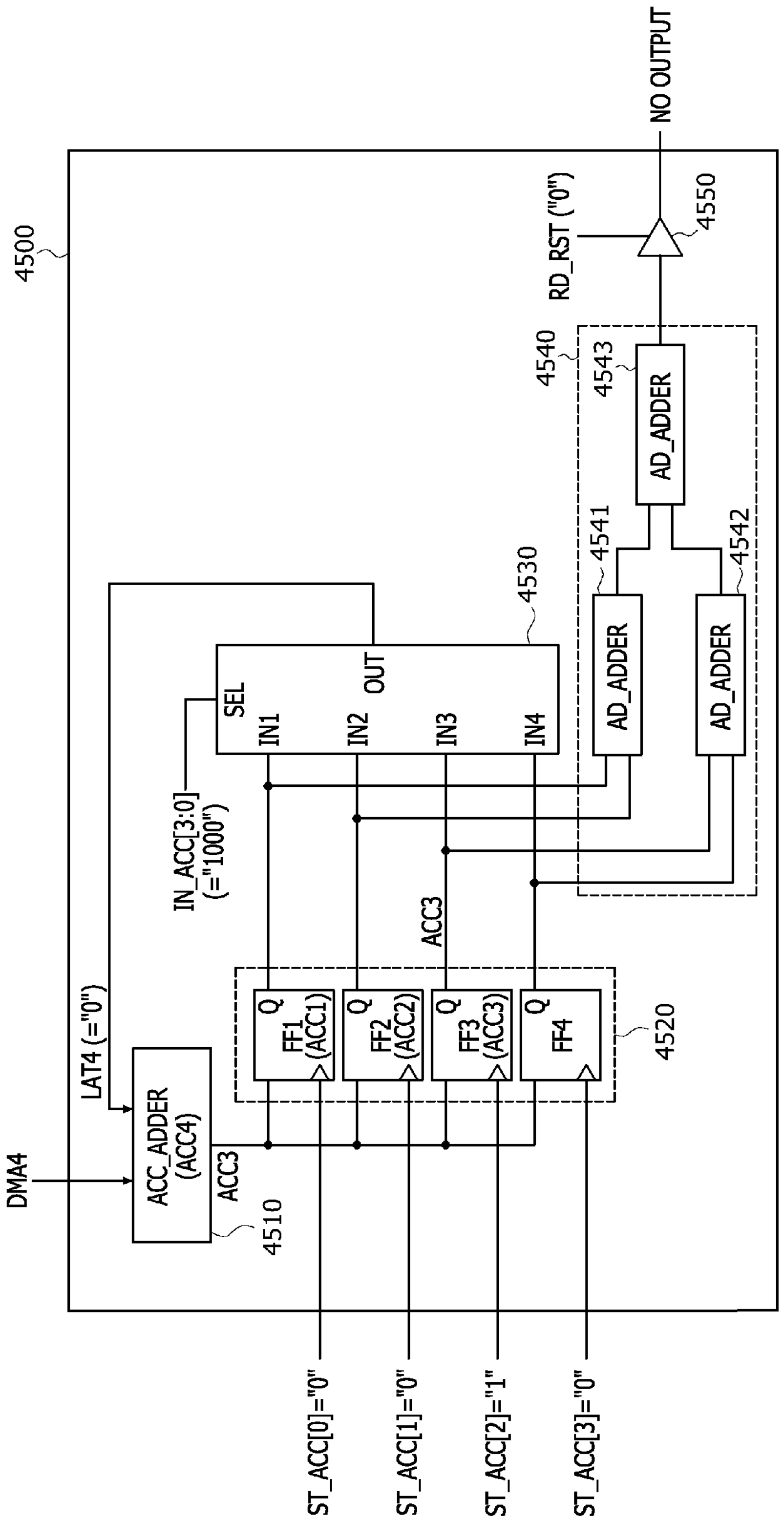

Referring to FIG. 80, together with FIG. 71, for the fourth MAC operation, multiplication operations on the fourth row group of the first row of the weight matrix and the fourth column group of the vector matrix may be performed by the multipliers MUL0-MUL15 of the first MAC operator MAC (0). Subsequently, an addition operation may be performed on the multiplication data that is output from the multipliers MUL0-MUL15 in the adder tree of the first MAC operator MAC(0), and the fourth multiplication addition data DMA4 that is generated as a result of the addition operation may be transmitted to the first input terminal of the accumulation adder 4510 of the accumulator 4500. At the eighth time point T8 at which the fourth pulse P24 of the first delayed control signal IN_CTRL and the third pulse P33 of the second delayed control signal ST_CTRL are generated, the first accumulation control signal IN_ACC[3:0] of "1000" and the second accumulation control signal ST_ACC[3:0] of 0100" may be transmitted to the selection terminal SEL of the selector 4530 and the clock terminals of the first to fourth flip-flops FF1-FF4. The selector 4530 may transmit "0" that is set in the fourth input terminal IN4 to the second input terminal of the accumulation adder 4510 as the fourth latch data LAT4 through the output terminal OUT, in response to the first accumulation control signal IN_ACC[3:0] of "1000". Accordingly, at the eighth time point T8, the accumulation adder 4510 may perform an accumulative addition operation on the fourth multiplication addition data DMA4 and the fourth latch data LAT4, which is "0", to generate the fourth accumulation data ACC4. The fourth accumulation data ACC4 may be the same as the fourth multiplication addition data DMA4.

Meanwhile, at the eighth time point T8, the third accumulation data ACC3 that is output from the accumulative adder 4510 may be respectively transmitted to the first to fourth flip-flops FF1-FF4 of the latch circuit 4520. Because "1" is transmitted to the clock terminal of the third flip-flop FF3 as the third bit value ST_ACC[2] of the second accumulation control signal ST_ACC[3:0], and "0" is transmitted to the clock terminals of the first, second, and fourth flip-flops FF1, FF2, and FF4 as the first bit value ST_ACC [0], the second bit value ST_ACC[1], and the fourth bit value ST_ACC[3] of the second accumulation control signal ST_ACC[3:0], respectively, the third flip-flop FF3 may latch and output the third accumulation data ACC3 from the accumulation adder 4510. The third accumulation data ACC3 that is output from the third flip-flop FF3 may be transmitted to the third input terminal IN3 of the selector 4530 and the first input terminal of the additional adder 4542 of the additional addition circuit 4540. The selector 4530 may update the data that is set in the third input terminal IN3 from "0" to the third accumulation data ACC3.

Figure 81:
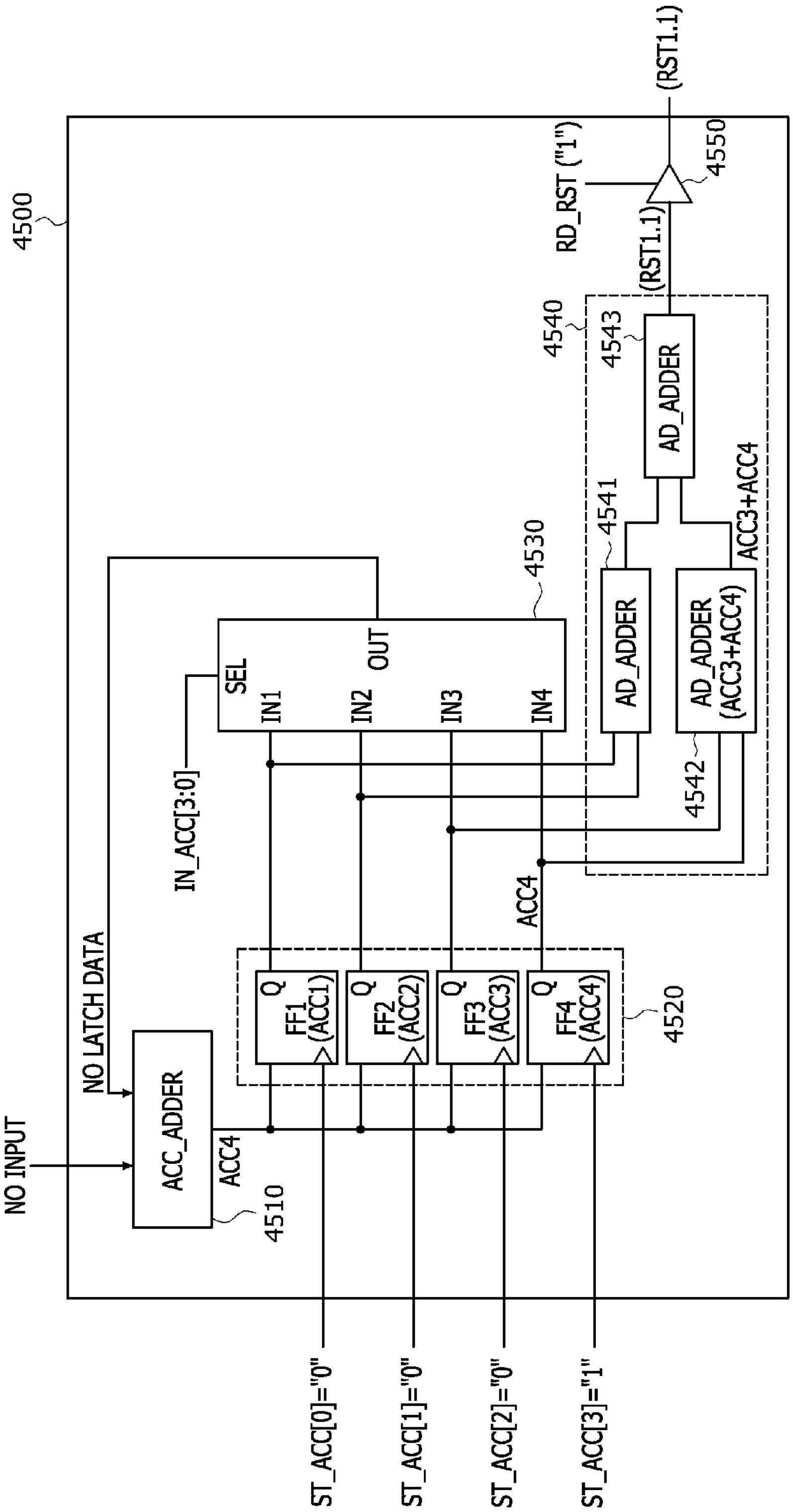

Next, referring to FIG. 81, together with FIG. 71, at the ninth time point T9 at which the fourth pulse P34 of the second delayed control signal ST_CTRL is generated, the fourth accumulation data ACC4 that is output from the accumulation adder 4510 may be respectively transmitted to the input terminals of the first to fourth flip-flops FF1-FF4 of the latch circuit 4520. Because "1" is transmitted to the clock terminal of the fourth flip-flop FF4 as the fourth bit value ST_ACC[3] of the second accumulation control signal ST_ACC[3:0], and "0" is transmitted to the clock terminals of the first to third flip-flops FF1-FF3 as the first to third bit values ST_ACC[2:0] of the second accumulation control signal ST_ACC[3:0], respectively, the fourth flip-flop FF4 may latch and output the fourth accumulation data ACC4 from the accumulation adder 4510. The fourth accumulation data ACC4 that is output from the fourth flip-flop FF4 may be transmitted to the fourth input terminal IN4 of the selector 4530 and the second input terminal of the additional adder 4542 of the additional addition circuit 4540. The selector 4530 may update the data that is set in the fourth input terminal IN4 from "0" to the fourth accumulation data ACC4. The additional adder 4542 may perform an addition operation on the third accumulation data ACC3 and the fourth accumulation data ACC4 to generate the result data of "ACC3+ACC4". The additional adder 4542 may transmit the result data of "ACC3+ACC4" to the additional adder 4543. The additional adder 4543 may perform an addition operation on the result data of "ACC1+ACC2" and the result data of "ACC3+ACC4" that are transmitted from the additional adders 4541 and 4542, respectively, to output the result data of "ACC1+ACC2+ACC3+ACC4" as MAC result data RST1.1. The MAC result data RST1.1 may be transmitted to the input terminal of the output buffer 4550. The output buffer 4550 may output the MAC result data RST1.1 through an output terminal in response to the MAC read control signal RD_RST of "1" (i.e., logic "high" level) that is received through the enable terminal.

Figure 82:
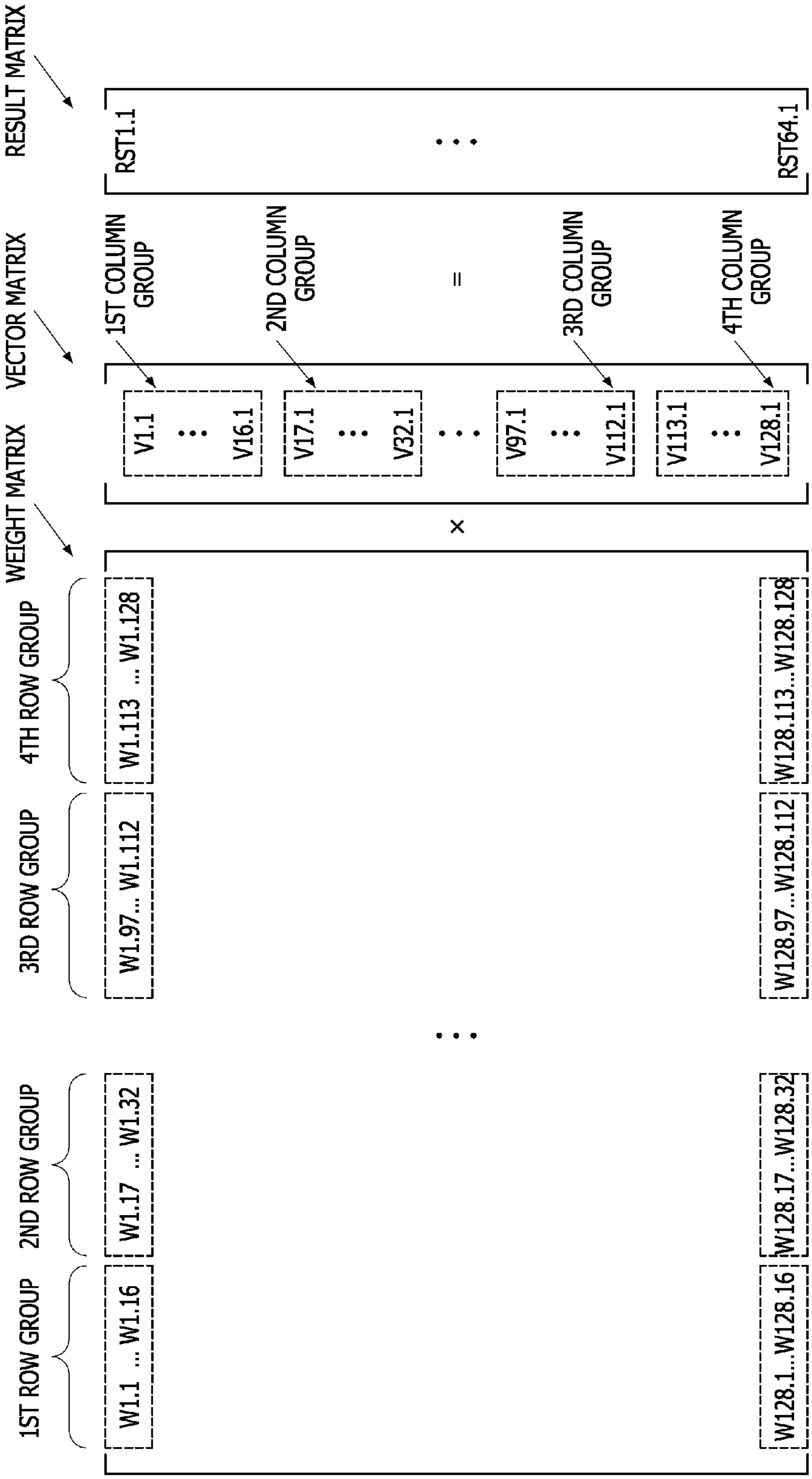
FIG. 82 is a diagram illustrating another example of the matrix multiplication operation performed in the PIM device of FIG. 66.

FIG. 82 is a diagram illustrating another example of the MAC operation performed in the PIM device 4000 of FIG. 66. Referring to FIG. 82, a weight matrix may have a size of 128 rows and 128 columns. Each of a vector matrix and a result matrix may have a size of 128 rows and one column. Each row of 128 rows of the weight matrix may include first to eighth row groups. As described with reference to FIG. 70, one row group may include 16 pieces of weight data. As illustrated in FIG. 82, the weight data W1.1-W1.16 of the first row and the first to sixteenth columns of the weight matrix may constitute the first row group of the first row. The weight data W1.17-W1.32 of the first row and the $17^{th}$ to $32^{nd}$ columns of the weight matrix may constitute the second row group of the first row. The weight data W1.97-W1.112 of the first row and $97^{th}$ to $112^{th}$ columns of the weight matrix may constitute the seventh row group of the first row. The weight data W1.113-W1.128 of the first row and $113^{th}$ to $128^{th}$ columns of the weight matrix may constitute the eighth row group of the first row. Similarly, the weight data W128.1-W128.16 of the $128^{th}$ row and the first to sixteenth columns of the weight matrix may constitute the first row group of the $128^{th}$ row. The weight data W128.17-W128.32 of the $128^{th}$ row and $17^{th}$ to $32^{nd}$ columns of the weight matrix may constitute the second row group of the $128^{th}$ row. The weight data W128.97-W128.112 of the $128^{th}$ row and $97^{th}$ to $112^{th}$ columns of the weight matrix may constitute the seventh row group of the $128^{th}$ row. The weight data W128.113-W128.128 of the $128^{th}$ row and $113^{th}$ to $128^{th}$ columns of the weight matrix may constitute the eighth row group of the 128$^{th}$ row. The vector data V1.1-V16.1 of the first to sixteenth rows and the first column of the vector matrix may constitute the first column group. The vector data V17.1-V32.1 of the 17$^{th}$ to 32$^{nd}$ rows and the first column of the vector matrix may constitute the second column group. The vector data V97.1-V112.1 of the 97$^{th}$ to 112$^{th}$ rows and the first column of the vector matrix may constitute the seventh column group. The vector data V113.1 to V128.1 of the 113$^{th}$ to 128$^{th}$ rows and the first column of the vector matrix may constitute the eighth column group.

As described with reference to FIG. 70, when each of the weight data W1.1-W1.128 of the first row has a size of 16 bits, and the number of bits that can be processed by the multipliers (MUL0-MUL15 in FIG. 68) constituting the first MAC operator (MAC(0) in FIG. 68) is 256 bits, the number of pieces of the weight data that may be processed through one MAC operation may be 16. Accordingly, the matrix multiplication operations on the 128 weight data W1.1-W1.128 and vector data V1.1-V128.1 may be completed by performing eight MAC operations. Among the eight MAC operations, the first to fourth MAC operations may be performed in the same manner as described with reference to FIG. 70. Accordingly, in the process of performing the first to fourth MAC operations, all of the first to fourth latch data LAT1-LAT4 that are used in the addition operations in the accumulation adder (4510 of FIG. 69) of the accumulator (4500 of FIG. 69) may become "0".

The fifth MAC operation, among the eight MAC operations, may be performed through the fifth matrix multiplication operation and the fifth accumulation operation for the fifth row group of the first row and the fifth column group. As a result of the fifth MAC operation, the fifth accumulation data may be generated by adding the first accumulation data to the fifth multiplication addition data that is generated by the fifth matrix multiplication operation. The sixth MAC operation may be performed through the sixth matrix multiplication operation and the sixth accumulation operation for the sixth row group of the first row and the sixth column group. As a result of the sixth MAC operation, the sixth accumulation data may be generated by adding the second accumulation data to the sixth multiplication addition data that is generated by the sixth matrix multiplication operation. The seventh MAC operation may be performed through the seventh matrix multiplication operation and the seventh accumulation operation for the seventh row group of the first row and the seventh column group. As a result of the seventh MAC operation, the seventh accumulation data may be generated by adding the third accumulation data to the seventh multiplication addition data that is generated by the seventh matrix multiplication operation. In addition, the last eighth MAC operation may be performed through the eighth matrix multiplication operation and the eighth accumulation addition operation for the eighth row group of the first row and the eighth column group. As a result of the eighth MAC operation, the eighth accumulation data may be generated by adding the fourth accumulation data to the eighth multiplication addition data that is generated by the eighth matrix multiplication operation. The MAC result data RST1.1, which is a matrix multiplication result for the first row of the weight matrix and the first column of the vector matrix, may include the result data that is obtained by adding all of the fifth to eighth accumulation data.

In the process of performing the fifth to eighth MAC operations in this way, the fifth to eighth latch data LAT5-LAT8 that are used for the addition operations in the accumulation adder 4510 of the accumulator (4500 in FIG. 69) might not be the accumulation data that is output from the accumulation adder 4510 in the process of the immediately preceding MAC operation, but may be the first to fourth accumulation data that are already latched in the first to fourth flip-flops FF1-FF4. For example, the fifth latch data in the fifth MAC operation may include the first accumulation data rather than the fourth accumulation data that is generated by the accumulation adder 4510 in the immediately preceding fourth MAC operation. Accordingly, even before the fourth accumulation data is output from the accumulation adder 4510, the fifth latch data may also be transmitted at the time point when the fifth multiplication addition data is transmitted to the accumulation adder 4510. The sixth latch data in the sixth MAC operation may include the second accumulation data rather than the fifth accumulation data that is generated by the accumulation adder 4510 in the fifth MAC operation. Accordingly, even before the fifth accumulation data is output from the accumulation adder 4510, the sixth latch data may also be transmitted at the time point when the sixth multiplication addition data is transmitted to the accumulation adder 4510. The seventh latch data in the seventh MAC operation may include the third accumulation data rather than the sixth accumulation data that is generated by the accumulation adder 4510 in the sixth MAC operation. Accordingly, even before the sixth accumulation data is output from the accumulation adder 4510, the seventh latch data may also be transmitted at the time point when the seventh multiplication addition data is transmitted to the accumulation adder 4510. The eighth latch data in the eighth MAC operation may include the fourth accumulation data rather than the seventh accumulation data that is generated by the accumulation adder 4510 in the seventh MAC operation. Accordingly, even before the seventh accumulation data is output from the accumulation adder 4510, the eighth latch data may also be transmitted at the time point when the eighth multiplication addition data is transmitted to the accumulation adder 4510.

Figure 83:
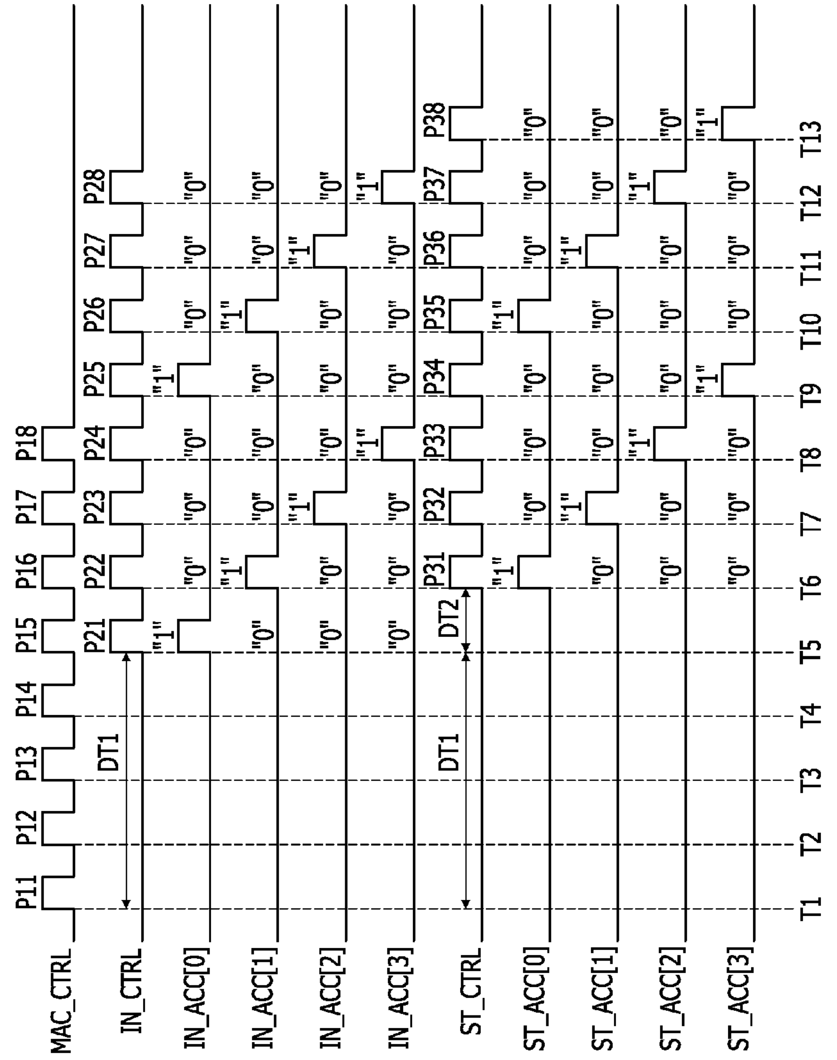
FIG. 83 is a timing diagram illustrating the operation of the accumulation control signal generator of FIG. 67 while the PIM device of FIG. 66 performs the matrix multiplication operation of FIG. 82.

FIG. 83 is a timing diagram illustrating the operation of the accumulation control signal generator 4200A of FIG. 67 while the PIM device 4000 of FIG. 66 is performing the matrix multiplication operation of FIG. 82. FIGS. 84 to 88 are diagrams illustrating a process in which the accumulation control signal generator 4200A of FIG. 67 generates the first accumulation control signal IN_ACC[3:0] and the second accumulation control signal ST_ACC[3:0] according to a MAC control signal while the PIM device 4000 of FIG. 66 is performing the matrix multiplication operation of FIG. 82. Referring to FIG. 83, together with FIGS. 67 and 82, in order to perform the first to eighth MAC operations, the command decoder (4100 of FIG. 66) of the PIM device 4000 may generate a MAC control signal MAC_CTRL that has first to eighth pulses P11-P18 in response to the first to eighth MAC commands MAC_CMD to transmit the MAC control signal MAC_CTRL to the accumulation control signal generator 4200A.

The MAC control signal MAC_CTRL may have the first pulse P11 that has a rising edge at the first time point T1, the second pulse P12 that has a rising edge at the second time point T2, the third pulse P13 that has a rising edge at the third time point T3, the fourth pulse P14 that has a rising edge at the fourth time point T4, the fifth pulse P15 that has a rising edge at the fifth time point T5, the sixth pulse P16 that has a rising edge at the sixth time point T6, the seventh pulse P17 that has a rising edge at the seventh time point T7, and the eighth pulse P18 that has a rising edge at the eighth time point T8.

The first delay circuit 4210 of the accumulation control signal generator 4200A may output the first delayed control signal IN_CTRL by delaying the MAC control signal MAC_CTRL by the first delay time DT1. The first delayed control signal IN_CTRL may have the first pulse P21 that has a rising edge at the fifth time point T5, the second pulse P22 that has a rising edge at the sixth time point T6, the third pulse P23 that has a rising edge at the seventh time point T7, the fourth pulse P24 that has a rising edge at the eighth time point T8, the fifth pulse P25 that has a rising edge at the ninth time point T9, the sixth pulse P26 that has a rising edge at the tenth time point T10, the seventh pulse P27 that has a rising edge at the eleventh time point T11, and the eighth pulse P28 that has a rising edge at the twelfth time point T12. Here, the fifth to twelfth time points T5-T12 may correspond to the time points when the first delay time DT1 has elapsed from the first to eighth time points T1-T8, respectively.

The second delay circuit 4220 of the accumulation control signal generator 4200A may output the second delayed control signal ST_CTRL by delaying the first delayed control signal IN_CTRL by the second delay time DT2. The second delayed control signal ST_CTRL may have the first pulse P31 that has a rising edge at the sixth time point T6, the second pulse P32 that has a rising edge at the seventh time point T7, the third pulse P33 that has a rising edge at the eighth time point T8, the fourth pulse P34 that has a rising edge at the ninth time point T9, the fifth pulse P35 that has a rising edge at the tenth time point T10, the sixth pulse P36 that has a rising edge at the eleventh time point T11, the seventh pulse P37 that has a rising edge at the twelfth time point T12, and the eighth pulse P38 that has a rising edge at the thirteenth time point T13. Here, the sixth to thirteenth time points T6-T13 may correspond to the time points when the second delay time DT2 has elapsed from the fifth to twelfth time points T5-T12, respectively. The operations of the accumulation control signal generator 4200A from the first time point T1 to the eighth time point T8 may be the same as described with reference to FIGS. 71 to 75, and the redundant description thereof will be omitted below.

Figure 84:
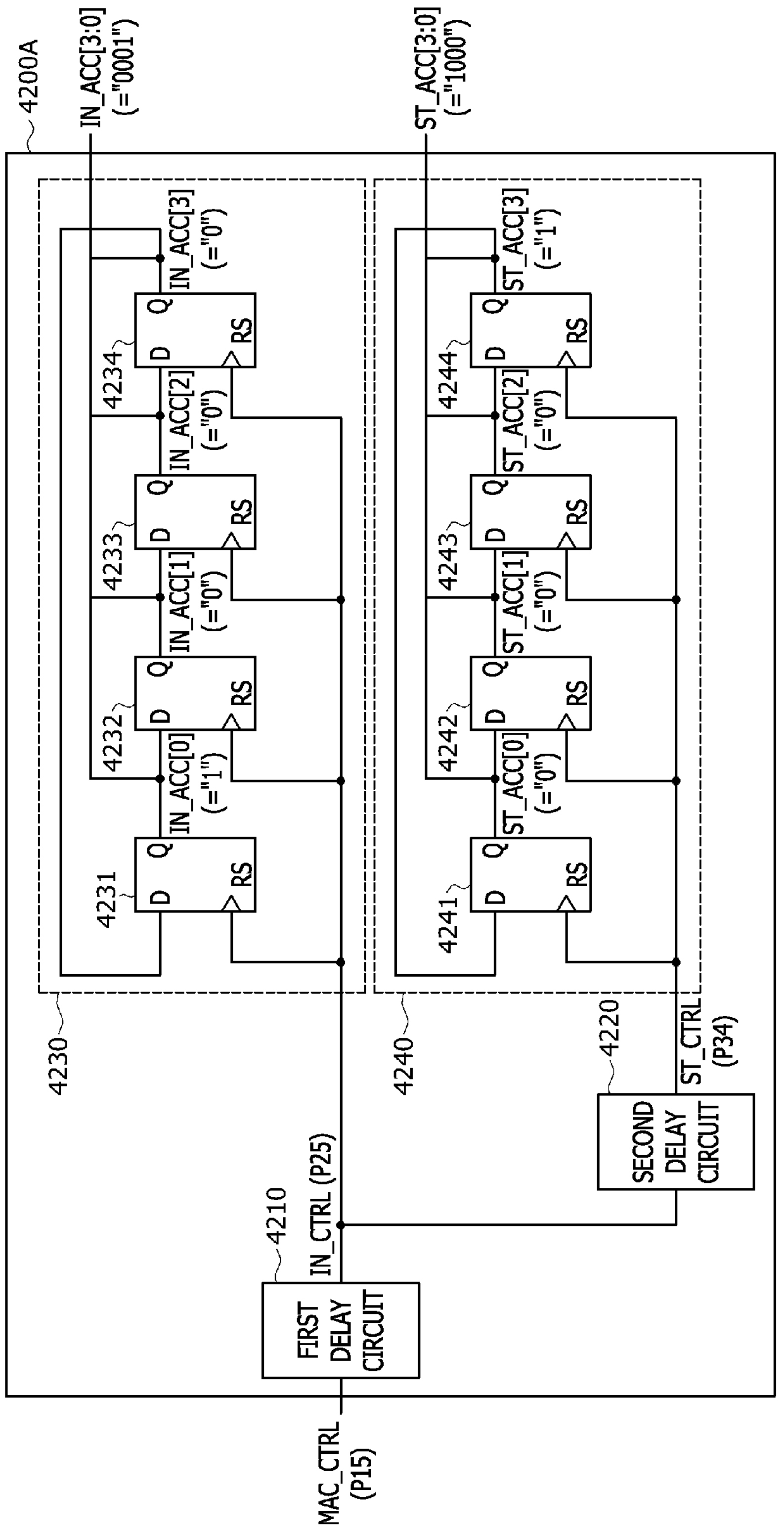
FIGS. 84 to 88 are diagrams illustrating a process in which the accumulation control signal generator of FIG. 67 generates a first accumulation control signal and a second accumulation control signal according to a MAC control signal while the PIM device of FIG. 66 performs the matrix multiplication operation of FIG. 82.

At the ninth time point T9, the first delay circuit 4210 may output the fifth pulse P25 of the first delayed control signal IN_CTRL. The first accumulation control signal generation circuit 4230 may be synchronized with the fifth pulse P25 of the first delayed control signal IN_CTRL to output the first accumulation control signal IN_ACC[3:0] of "0001". At the ninth time point T9, the second delay circuit 4220 may output the fourth pulse P34 of the second delayed control signal ST_CTRL. The second accumulation control signal generation circuit 4240 may be synchronized with the fourth pulse P34 of the second delayed control signal ST_CTRL to output the second accumulation control signal ST_ACC[3:0] of "1000". Specifically, as shown in FIG. 84, at the ninth time point T9, the fifth pulse P25 of the first delayed control signal IN_CTRL may be transmitted to the clock terminals of the first flip-flops 4231-4234 that are disposed at the first to fourth positions of the first accumulation control signal generation circuit 4230. The first flip-flops 4231-4234 that are disposed at the first to fourth positions of the first accumulation control signal generation circuit 4230 may be synchronized with the fifth pulse P25 of the first delayed control signal IN_CTRL to respectively output the bit values of the first accumulation control signal IN_ACC[3:0] through the output terminals Q. The first flip-flop 4231 that is disposed at the first position may output "1" that is transmitted from the first flip-flop 4234 that is disposed at the fourth position as the first bit value IN_ACC[0] of the first accumulation control signal IN_ACC[3:0]. The first flip-flop 4232 that is disposed at the second position may output "0" that is transmitted from the first flip-flop 4231 that is disposed at the first position as the second bit value IN_ACC[1] of the first accumulation control signal IN_ACC [3:0]. The first flip-flop 4233 that is disposed at the third position may output "0" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "0" that is transmitted from the third flip-flop 4233 that is disposed at the third position as the fourth bit value IN_ACC[3] of the first accumulation control signal IN_ACC[3:0]. That is, at the ninth time point T9, the first accumulation control signal generation circuit 4230 may output "1000" as the first accumulation control signal IN_ACC[3:0].

Meanwhile, the second delay circuit 4220 may output the fourth pulse P34 of the second delayed control signal ST_CTRL at the ninth time point T9. The second flip-flops 4241-4244 that are disposed at the first to fourth positions of the second accumulation control signal generation circuit 4240 may be synchronized with the fourth pulse P34 of the second delayed control signal ST_CTRL that is received through the clock terminal of the second accumulation control signal ST_ACC[3:0] to respectively output the bit values of the second accumulation control signal ST_ACC [3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4241 that is disposed at the first position as the second bit value ST_ACC[1] of the second accumulation control signal ST_ACC[3:0]. The second flip-flop 4243 that is disposed at the third position may output "0" that is transmitted from the second flip-flop 4242 that is disposed at the second position as the third bit value ST_ACC[2] of the second accumulation control signal ST_ACC[3:0]. The second flip-flop 4234 that is disposed at the fourth position may output "1" that is transmitted from the second flip-flop 4233 that is disposed at the third position as the fourth bit value ST_ACC3] of the second accumulation control signal ST_ACC[3:0]. That is, at the ninth time pint T9, the second accumulation control signal generation circuit 4240 may output "1000" as the second accumulation control signal ST_ACC[3:0].

Figure 85:
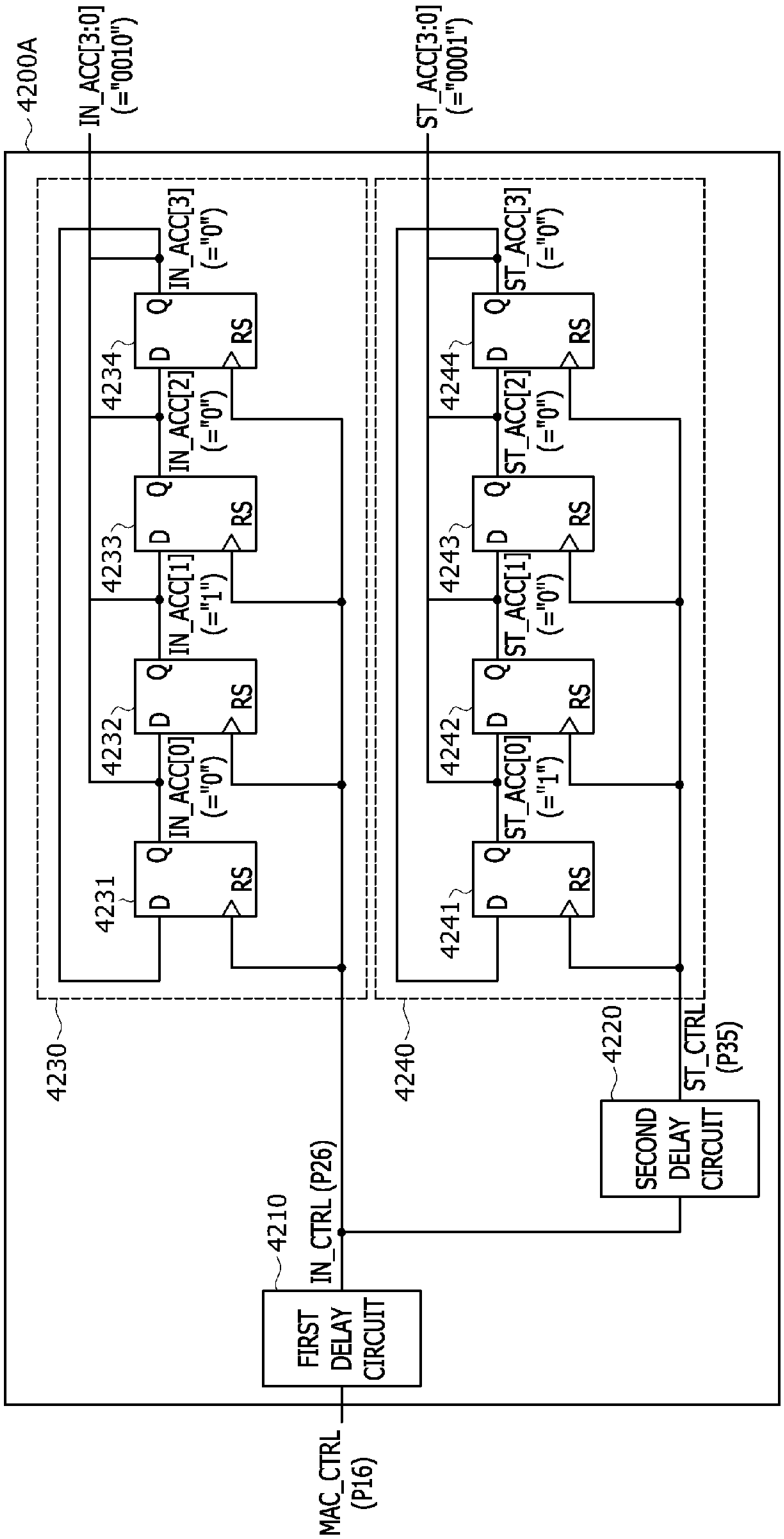

Referring to FIG. 85, when the sixth pulse P26 of the first delayed control signal IN_CTRL is generated at the tenth time point T10, the first flip-flops 4231-4234 that are disposed at the first to fourth positions may be synchronized with the sixth pulse P26 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC[0] of the first accumulation control signal IN_ACC[3:0]. The first flip-flop 4232 that is disposed at the second position may output "1" that is transmitted from the first flip-flop 4231 that is disposed at the first position as the second bit value IN_ACC[1] of the first accumulation control signal IN_ACC[3:0]. The first flip-flop 4233 that is disposed at the third position may output "0" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "0" that is transmitted from the first flip-flop 4233 that is disposed at the third position as the fourth bit value IN_ACC [3] of the first accumulation control signal IN_ACC[3:0]. That is, at the tenth time point T10, the first accumulation control signal generation circuit 4230 may output "0010" as the first accumulation control signal IN_ACC[3:0].

At the tenth time point T10, the second delay circuit 4220 may output the fifth pulse P35 of the second delayed control signal ST_CTRL. The second flip-flops 4241-4244 that are disposed at the first to fourth positions may be synchronized with the fifth pulse P35 of the second delayed control signal ST_CTRL that is received through the clock terminals to respectively output the bit values of the second accumulation control signal ST_ACC[3:0] through the output terminals Q. The second flip-flop 4241 that is disposed at the first position may output "1" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4231 that is disposed at the first position as the second bit value ST_ACC[1] of the second accumulation control signal ST_ACC[3:0]. The second flip-flop 4243 that is disposed at the third position may output "0" that is transmitted from the second flip-flop 4232 that is disposed at the second position as the third bit value ST_ACC[2] of the second accumulation control signal ST_ACC[3:0]. The second flip-flop 4244 that is disposed at the fourth position may output "0" that is transmitted from the second flip-flop 4243 that is disposed at the third position as the fourth bit value ST_ACC[3] of the second accumulation control signal ST_ACC[3:0]. That is, at the tenth time point T10, the second accumulation control signal generation circuit 4240 may output "0001" as the second accumulation control signal ST_ACC[3:0].

Figure 86:
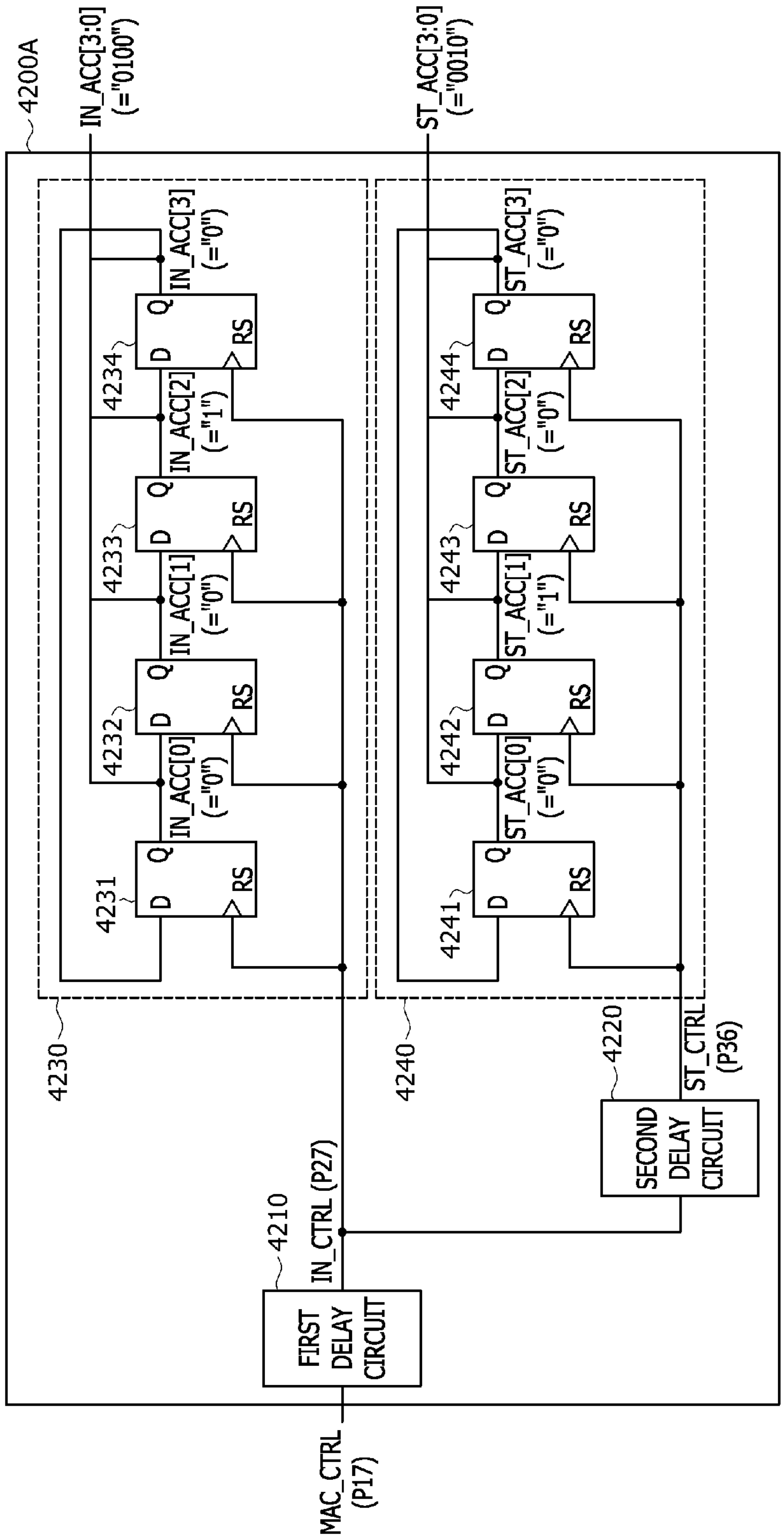

Referring to FIG. 86, at the eleventh time point T11, the seventh pulse P27 of the first delayed control signal IN_CTRL may be output from the first delay circuit 4210, and the sixth pulse P36 of the second delayed control signal ST_CTRL may be output from the second delay circuit 4220. The flip-flops 4231-4234 that are disposed at the first to fourth positions of the first accumulation control signal generation circuit 4230 may be synchronized with the seventh pulse P27 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC [0] of the first accumulation control signal IN_ACC[3:0]. The first flip-flop 4232 that is disposed at the second position may output "0" that is transmitted from the first flip-flop 4231 that is disposed at the first position as the second bit value IN_ACC[1] of the first accumulation control signal IN_ACC[3:0]. The first flip-flop 4233 that is disposed at the third position may output "1" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "0" that is transmitted from the first flip-flop 4243 that is disposed at the third position as the fourth bit value IN_ACC[3] of the first accumulation control signal IN_ACC[3:0]. That is, at the eleventh time point T11, the first accumulation control signal generation circuit 4230 may output "0100" as the first accumulation control signal IN_ACC[3:0].

At the eleventh time point T11, the second flip-flops 4241-4244 that are disposed at the first to fourth positions of the second accumulation control signal generation circuit 4240 may be synchronized with the sixth pulse P36 of the second delayed control signal ST_CTRL that is received through the clock terminals to respectively output the bit values of the second accumulation control signal ST_ACC [3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "1" that is transmitted from the second flip-flop 4231 that is disposed at the first position as the second bit value ST_ACC[1] of the second accumulation control signal ST_ACC[3:0]. The second flip-flop 4243 that is disposed at the third position may output "0" that is transmitted from the second flip-flop 4232 that is disposed at the second position as the third bit value ST_ACC[2] of the second accumulation control signal ST_ACC[3:0]. The second flip-flop 4244 that is disposed at the fourth position may output "0" that is transmitted from the second flip-flop 4243 that is disposed at the third position as the fourth bit value ST_ACC[3] of the second accumulation control signal ST_ACC[3:0]. That is, at the eleventh time point T11, the second accumulation control signal generation circuit 4240 may output "0010" as the second accumulation control signal ST_ACC[3:0].

Figure 87:
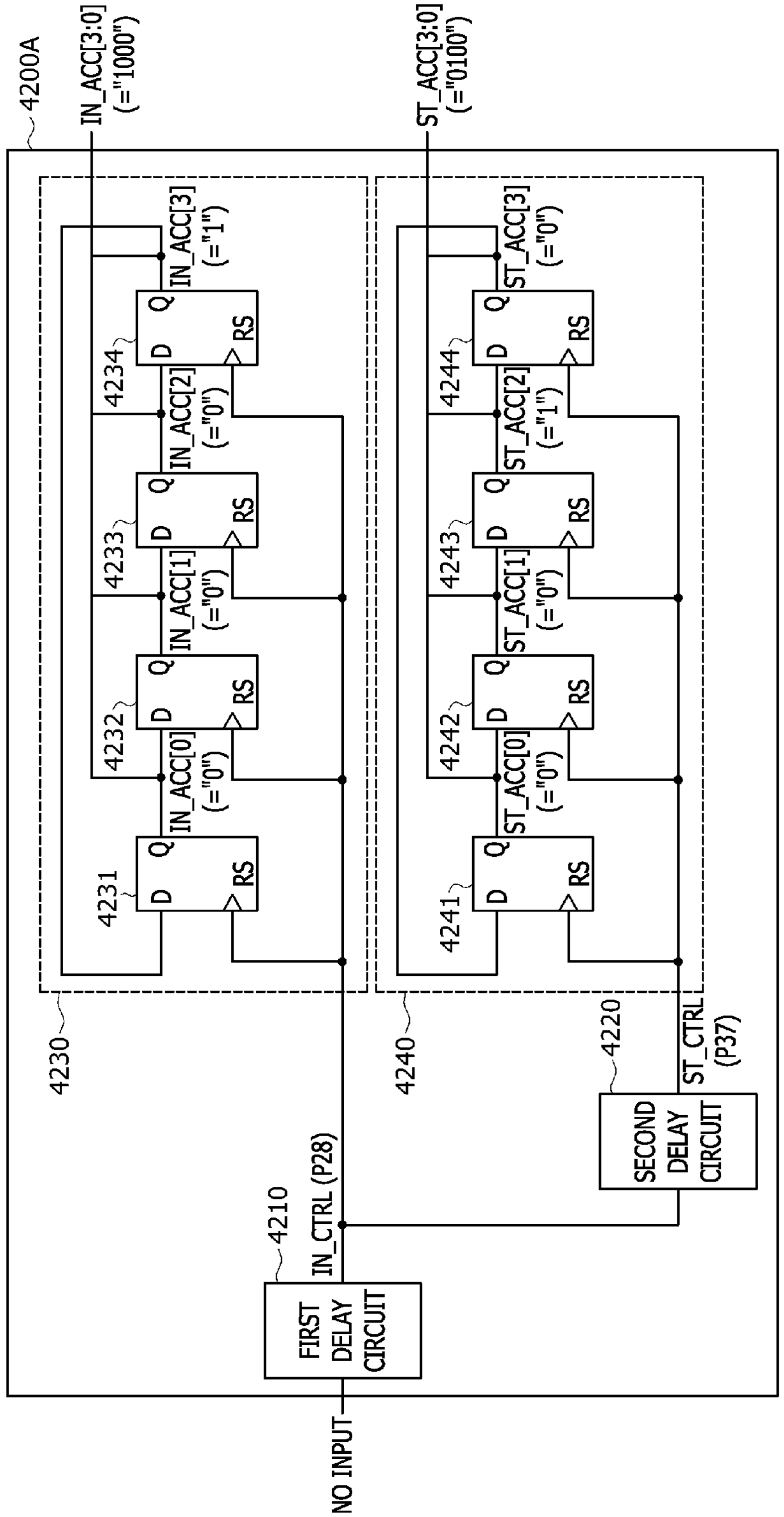

Referring to FIG. 87, at the twelfth time point T12, the eighth pulse P28 of the first delayed control signal IN_CTRL may be output from the first delay circuit 4210, and the seventh pulse P37 of the second delayed control signal ST_CTRL may be output from the second delay circuit 4220. The flip-flops 4231-4234 that are disposed at the first to fourth positions of the first accumulation control signal generation circuit 4230 may be synchronized with the eighth pulse P28 of the first delayed control signal IN_CTRL that is received through the clock terminals to respectively output the bit values of the first accumulation control signal IN_ACC[3:0] through the output terminals Q. The first flip-flop 4231 that is disposed at the first position may output "0" that is transmitted from the first flip-flop 4234 that is disposed at the fourth position as the first bit value IN_ACC [0] of the first accumulation control signal IN_ACC[3:0]. The first flip-flop 4232 that is disposed at the second position may output "0" that is transmitted from the first flip-flop 4231 that is disposed at the first position as the second bit value IN_ACC[1] of the first accumulation control signal IN_ACC[3:0]. The first flip-flop 4233 that is disposed at the third position may output "0" that is transmitted from the first flip-flop 4232 that is disposed at the second position as the third bit value IN_ACC[2] of the first accumulation control signal IN_ACC[3:0]. The first flip-flop 4234 that is disposed at the fourth position may output "1" that is transmitted from the first flip-flop 4243 that is disposed at the third position as the fourth bit value IN_ACC[3] of the first accumulation control signal IN_ACC[3:0]. That is, at the twelfth time point T12, the first accumulation control signal generation circuit 4230 may output "1000" as the first accumulation control signal IN_ACC[3:0].

At the twelfth time point T12, the second flip-flops 4241-4244 that are disposed at the first to fourth positions of the second accumulation control signal generation circuit 4240 may be synchronized with the seventh pulse P37 of the second delayed control signal ST_CTRL that is received through the clock terminals to respectively output the bit values of the second accumulation control signal ST_ACC [3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4231 that is disposed at the first position as the second bit value ST_ACC[1] of the second accumulation control signal ST_ACC[3:0]. The second flip-flop 4243 that is disposed at the third position may output "1" that is transmitted from the second flip-flop 4232 that is disposed at the second position as the third bit value ST_ACC[2] of the second accumulation control signal ST_ACC[3:0]. The second flip-flop 4244 that is disposed at the fourth position may output "0" that is transmitted from the second flip-flop 4243 that is disposed at the third position as the fourth bit value ST_ACC[3] of the second accumulation control signal ST_ACC[3:0]. That is, at the twelfth time point T12, the second accumulation control signal generation circuit 4240 may output "0100" as the second accumulation control signal ST_ACC[3:0].

Figure 88:
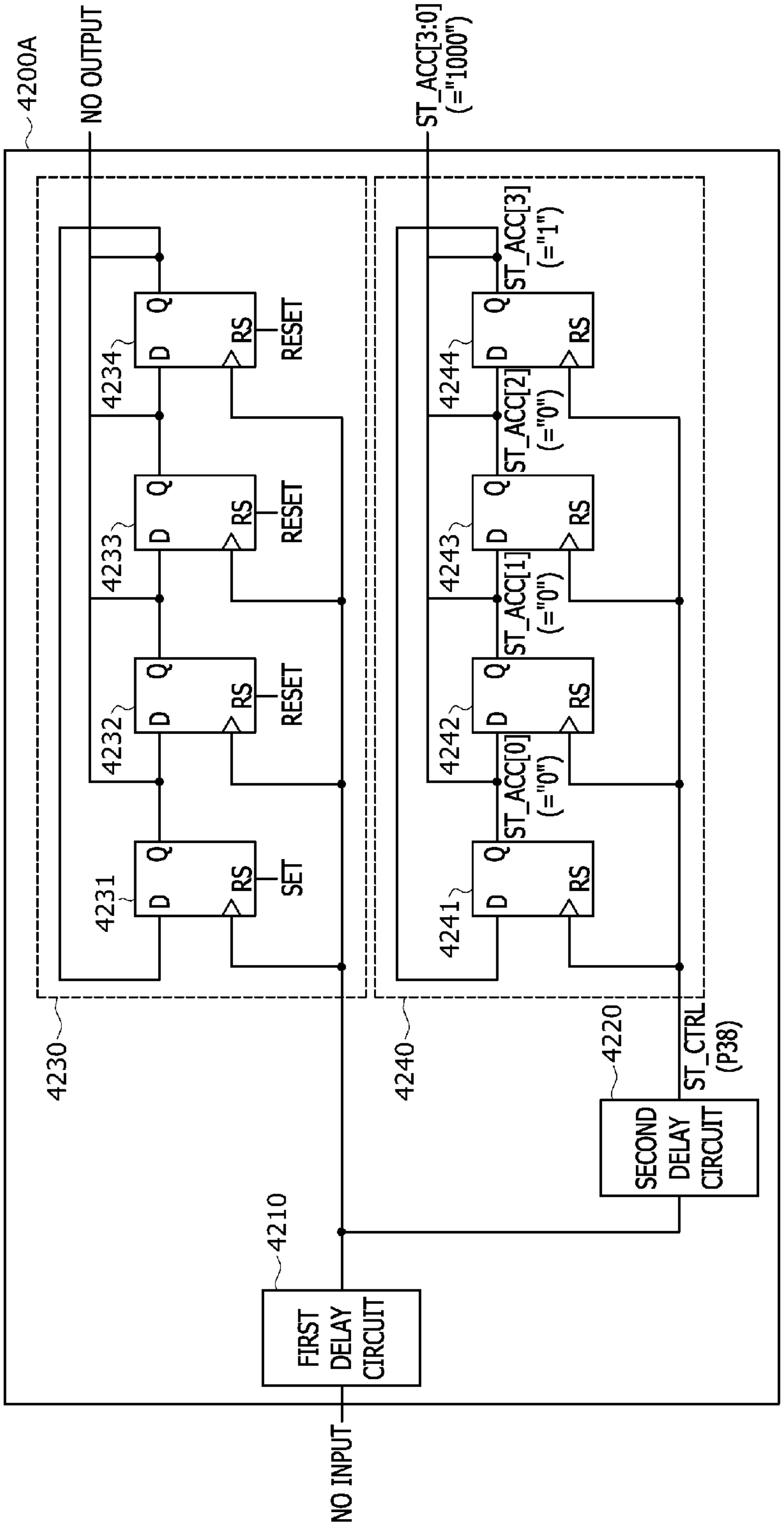

Referring to FIG. 88, at the thirteenth time point T13, the pulse of the first delayed control signal IN_CTRL might not be output from the first delay circuit 4210, while the eighth pulse P37 of the second delayed control signal ST_CTRL is being output from the second delay circuit 4220. Because the pulse of the first delayed control signal IN_CTRL may be no longer transmitted to the clock terminals of the first flip-flops 4231-4234 that are disposed at the first to fourth positions of the first accumulation control signal generation circuit 4230, the first accumulation control signal may be no longer output from the first accumulation control signal generation circuit 4230. In addition, the first flip-flop 4231 that is disposed at the first position may be initialized to a set SET state through the reset/set terminal RS. All of the first flip-flops 4232-4234 that are disposed in the second to fourth positions may be initialized to the reset RESET state through the reset/set terminal RS.

At the thirteenth time point T13, the second flip-flops 4241-4244 that are disposed in the first to fourth positions of the second accumulation control signal generation circuit 4240 may be synchronized with the eighth pulse P37 of the second delayed control signal ST_CTRL that is received through the clock terminals to respectively output the bit values of the second accumulation control signal ST_ACC [3:0] through the output terminals Q. The second flip-flop 4241 that is disposed at the first position may output "0" that is transmitted from the second flip-flop 4244 that is disposed at the fourth position as the first bit value ST_ACC[0] of the second accumulation control signal ST_ACC[3:0]. The second flip-flop 4242 that is disposed at the second position may output "0" that is transmitted from the second flip-flop 4231 that is disposed at the first position as the second bit value ST_ACC[1] of the second accumulation control signal ST_ACC[3:0]. The second flip-flop 4243 that is disposed at the third position may output "0" that is transmitted from the second flip-flop 4232 that is disposed at the second position as the third bit value ST_ACC[2] of the second accumulation control signal ST_ACC[3:0]. The second flip-flop 4244 that is disposed at the fourth position may output "1" that is transmitted from the second flip-flop 4243 that is disposed at the third position as the fourth bit value ST_ACC[3] of the second accumulation control signal ST_ACC[3:0]. That is, at the thirteenth time point T13, the second accumulation control signal generation circuit 4240 may output "1000" as the second accumulation control signal ST_ACC[3:0].

FIGS. 89 to 93 are diagrams illustrating the operations of the accumulator 4500 of FIG. 69 while the PIM device 4000 of FIG. 66 is performing the matrix multiplication operation of FIG. 82. The matrix multiplication operation of FIG. 82 in the PIM device 4000 described with reference to FIGS. 66 to 69 may be performed through the first to eighth MAC operations. The first to fourth MAC operations may be the same as those described with reference to FIGS. 77 to 80, and thus, the overlapping descriptions will be omitted.

Figure 89:
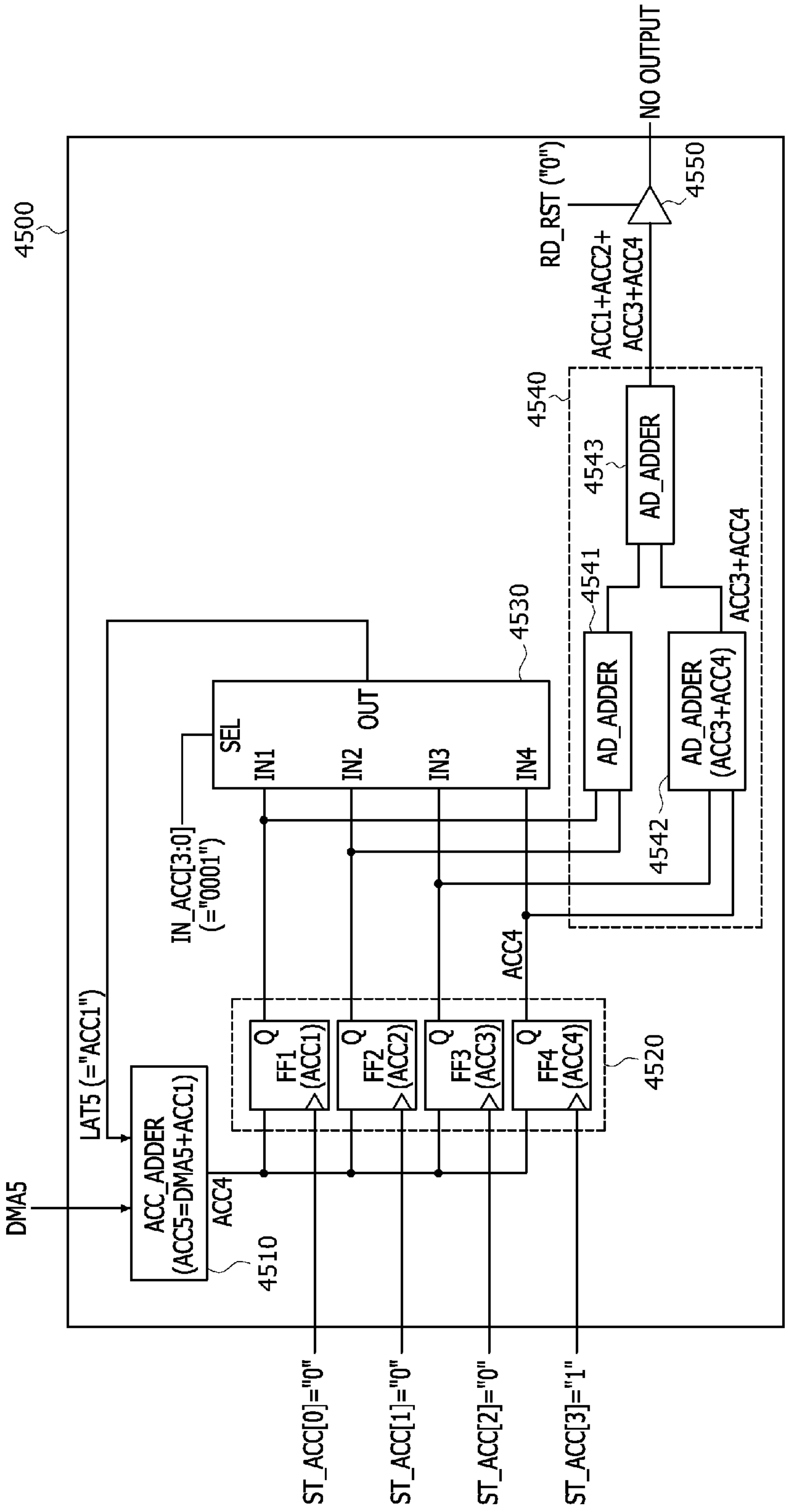
FIGS. 89 to 93 are diagrams illustrating the operations of the accumulator of FIG. 69 while the PIM device of FIG. 66 performs the matrix multiplication operation of FIG. 82.

First, referring to FIG. 89, together with FIG. 82, when the fifth row group of the first row of the weight matrix and the fifth column group of the vector matrix are transmitted to the first MAC operator MAC(0) for the fifth MAC operation, the multipliers MUL0-MUL15 may perform multiplication operations on the fifth row group of the first row and the fifth column group to output multiplication data. The adder tree may perform an addition operation on the multiplication data that is output from the multipliers MUL0-MUL15 to output fifth multiplication addition data DMA5. The fifth multiplication addition data DMA5 may be transmitted to the first input terminal of the accumulation adder 4510. As described with reference to FIG. 84, at the ninth time point T9, the first accumulation control signal IN_ACC [3:0] of "0001" may be transmitted to the selection terminal SEL of the selector 4530 of the accumulator 4500. The selector 4530 may transmit the first accumulation data ACC1, which is the updated data of the first input terminal IN1, as the fifth latch data LAT5 to the second input terminal of the accumulation adder 4510 through the output terminal OUT, in response to the first accumulation control signal IN_ACC[3:0] of "0001". Accordingly, the accumulation adder 4510 may perform an accumulation addition operation on the fifth multiplication addition data DMA5 and the fifth latch data LAT5 (i.e., the first accumulation data ACC1) to generate the fifth accumulation data ACC5.

Meanwhile, as described with reference to FIG. 84, the fourth accumulation data ACC4 that is output from the accumulation adder 4510 at the ninth time point T9 may be respectively transmitted to the input terminals of the first to fourth flip-flops FF1-FF4 of the latch circuit 4520. Because "1" is transmitted as the fourth bit value ST_ACC[3] of the second accumulation control signal ST_ACC[3:0] to the clock terminal of the fourth flip-flop FF4, and "0" is transmitted as the first to third bit values ST_ACC[2:0] of the second accumulation control signal ST_ACC[3:0] to the clock terminals of the first to third flip-flops FF1-FF3, respectively, the fourth flip-flop FF4 may latch the fourth accumulation data ACC4 from the accumulation adder 4510 and may output the fourth accumulation data ACC4. The fourth accumulation data ACC4 that is output from the fourth flip-flop FF4 may be transmitted to the fourth input terminal IN4 of the selector 4530 and the second input terminal of the additional adder 4542 of the additional addition circuit 4540. The selector 4530 may update the data set in the fourth input terminal IN4 from "0" to the fourth accumulation data ACC4.

The additional adder 4542 may perform an addition operation on the third accumulation data ACC3 and the fourth accumulation data ACC4 to generate data "ACC3+ACC4". The additional adder 4542 may transmit the data "ACC3+ACC4" to the additional adder 4543. The additional adder 4543 may add the data "ACC1+ACC2" and the data "ACC3+ACC4", which are received from the additional adders 4541 and 4542, respectively, to transmit the data "ACC1+ACC2+ACC3+ACC4" to the input terminal of the output buffer 4550. The output buffer 4550 might not output the data "ACC1+ACC2+ACC3+ACC4" through the output terminal in response to the MAC read control signal RD_RST of "0" that is received through the enable terminal.

Figure 90:
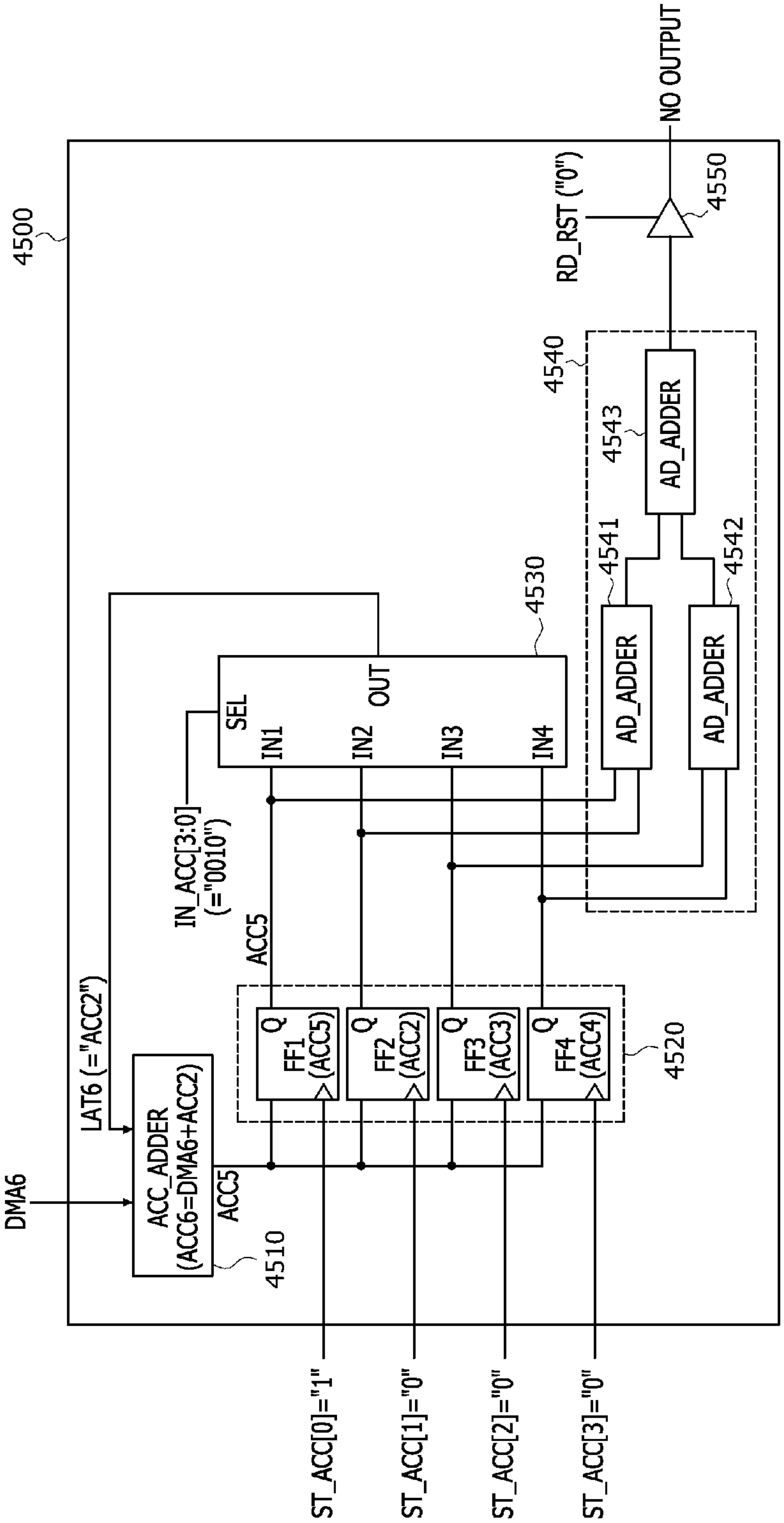

Next, referring to FIG. 90, together with FIG. 82, when the sixth row group of the first row of the weight matrix and the sixth column group of the vector matrix are transmitted to the first MAC operator MAC(0) for the sixth MAC operation, the multipliers MUL0-MUL15 may perform multiplication operations on the sixth row group of the first row and the sixth column group to output multiplication data. The adder tree may perform an addition operation on the multiplication data that is output from the multipliers MUL0-MUL15 to output the sixth multiplication addition data DMA6. The sixth multiplication addition data DMA6 may be transmitted to the first input terminal of the accumulation adder 4510 of the accumulator 4500. As described with reference to FIG. 84, at the tenth time point T10, the first accumulation control signal IN_ACC[3:0] of "0010" may be transmitted to the selection terminal SEL of the selector 4530 of the accumulator 4500. In response to the first accumulation control signal IN_ACC[3:0] of "0010", the selector 4530 may transmit the second accumulation data ACC2, which is the updated data of the second input terminal IN2, as the sixth latch data LAT6 to the second input terminal of the accumulation adder 4510 through the output terminal OUT. Accordingly, the accumulation adder 4510 may perform an accumulative addition operation on the sixth multiplication addition data DMA6 and the sixth latch data LAT6 (i.e., the second accumulation data ACC2) to generate the sixth accumulation data ACC6.

Meanwhile, as described with reference to FIG. 84, at the tenth time point T10, the fifth accumulation data ACC5 that is output from the accumulation adder 4510 may be respectively transmitted to the input terminals of the first to fourth flip-flops FF1-FF4 of the latch circuit 4520. Because "1" is transmitted as the first bit value ST_ACC[0] of the second accumulation control signal ST_ACC[3:0] to the clock terminal of the first flip-flop FF1, and "0" is transmitted as the second to fourth bit values ST_ACC[3:1] of the second accumulation control signal ST_ACC[3:0] to the clock terminals of the second to fourth flip-flops FF2-FF4, respectively, the first flip-flop FF1 may latch the fifth accumulation data ACC5 from the accumulation adder 4510 and may output the fifth accumulation data ACC5. The fifth accumulation data ACC5 that is output from the first flip-flop FF1 may be transmitted to the first input terminal IN1 of the selector 4530 and the first input terminal of the additional adder 4541 of the addition circuit 4540. The selector 4530 may update the data that is set in the first input terminal IN1 from the first accumulation data ACC1 to the fifth accumulation data ACC5.

Figure 91:
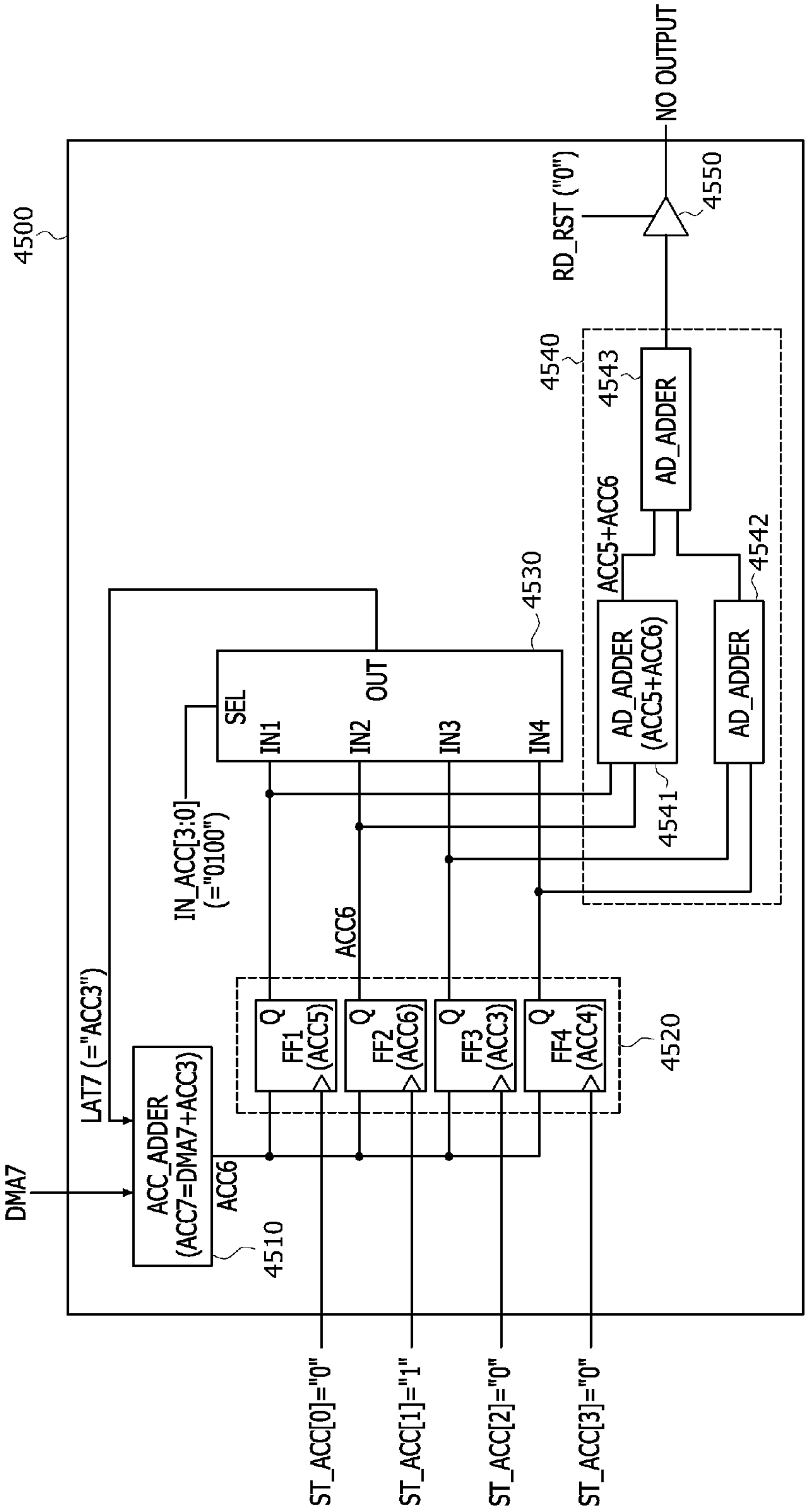

Next, referring to FIG. 91, together with FIG. 82, when the seventh row group of the first row of the weight matrix and the seventh column group of the vector matrix are transmitted to the first MAC operator MAC(0) for the seventh MAC operation, the multipliers MUL0-MUL15 may perform multiplication operations on the seventh row group of the first row and the seventh column group to output multiplication data. The adder tree may perform an addition operation on the multiplication data that is output from the multipliers MUL0-MUL15 to output the seventh multiplication addition data DMA7. The seventh multiplication addition data DMA7 may be transmitted to the first input terminal of the accumulation adder 4510 of the accumulator 4500. As described with reference to FIG. 84, at the eleventh time point T11, the first accumulation control signal IN_ACC[3:0] of "0100" may be transmitted to the selection terminal SEL of the selector 4530 of the accumulator 4500. The selector 4530 may transmit the third accumulation data ACC3, which is the updated data of the third input terminal IN3, to the second input terminal of the accumulation adder 4510 as the seventh latch data LAT7 through the output terminal OUT, in response to the first accumulation control signal IN_ACC[3:0] of "0100". Accordingly, the accumulation adder 4510 may perform an accumulative addition operation on the seventh multiplication addition data DMA7 and the seventh latch data LAT7 (i.e., the third accumulation data ACC3) to generate the seventh accumulation data ACC7.

Meanwhile, as described with reference to FIG. 84, at the eleventh time point T11, the sixth accumulation data ACC6 that is output from the accumulation adder 4510 may be respectively transmitted to the input terminals of the first to fourth flip-flops FF1-FF4 of the latch circuit 4520. Because "1" is transmitted as the second bit value ST_ACC[1] of the second accumulation control signal ST_ACC[3:0] to the clock terminal of the second flip-flop FF2, and "0" is transmitted as the first bit value ST_ACC[0], the third bit value ST_ACC[2], and the fourth bit value ST_ACC[3] of the second accumulation control signal ST_ACC[3:0] to the clock terminals of the first, third, and fourth flip-flops FF1, FF3, and FF4, respectively, the second flip-flop FF2 may latch the sixth accumulation data ACC6 from the accumulation adder 4510 and may output the sixth accumulation data ACC6. The sixth accumulation data ACC6 that is output from the second flip-flop FF2 may be transmitted to the second input terminal IN2 of the selector 4530 and the second input terminal of the additional adder 4541 of the additional addition circuit 4540. The selector 4530 may update the data that is set in the second input terminal IN2 from the second accumulation data ACC2 to the sixth accumulation data ACC6. The additional adder 4541 may perform an addition operation on the fifth accumulation data ACC5 and the sixth accumulation data ACC6 to generate data "ACC5+ACC6". The additional adder 4542 may transmit the data "ACC5+ACC6" to the additional adder 4543.

Figure 92:
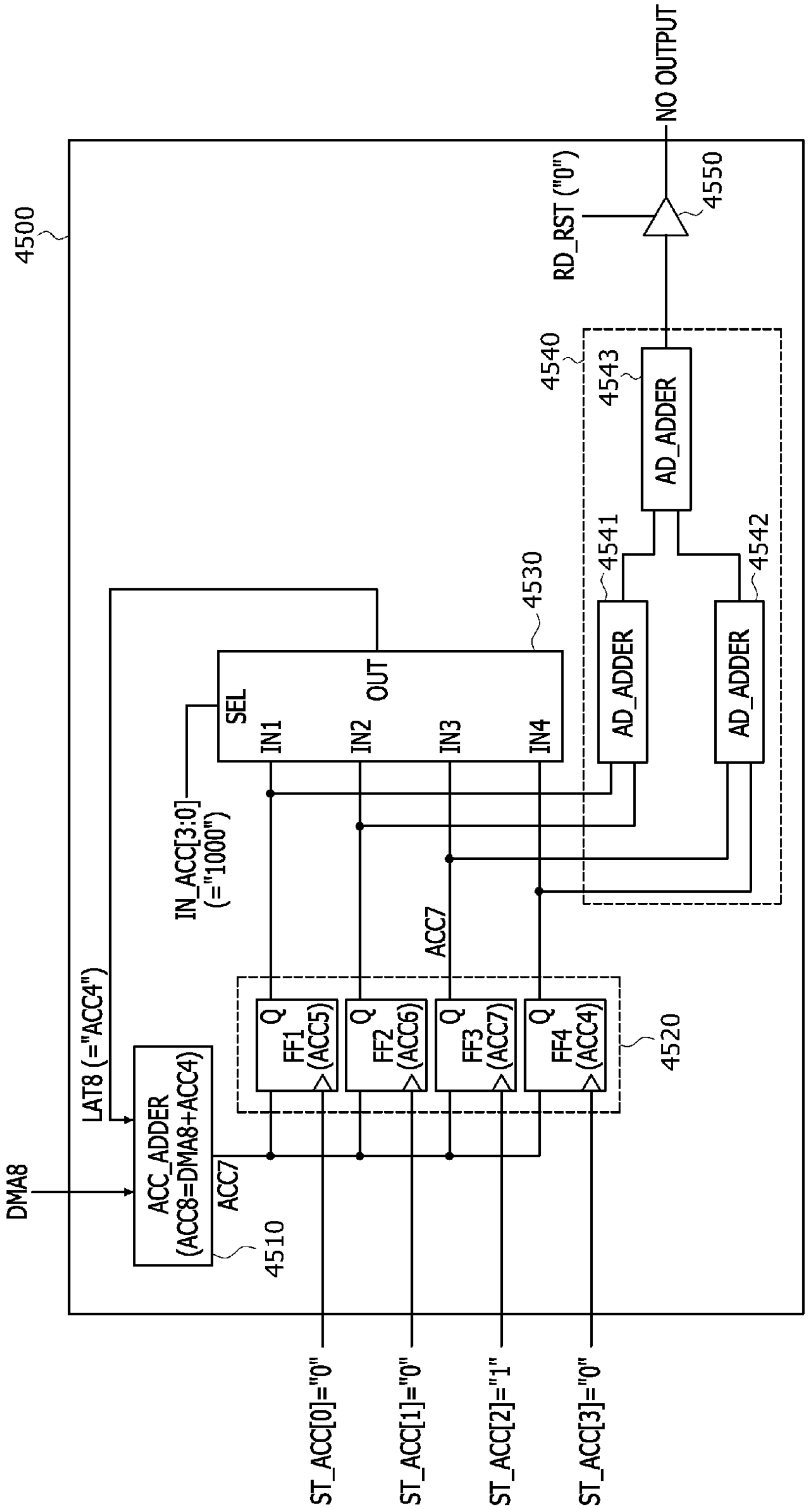

Next, referring to FIG. 92, together with FIG. 82, when the eighth row group of the first row of the weight matrix and the eighth column group of the vector matrix are transmitted to the first MAC operator MAC(0) for the eighth MAC operation, the multipliers MUL0-MUL15 may perform multiplication operations on the eighth row group of the first row and the eighth column group to output multiplication data. The adder tree may perform an addition operation on the multiplication data that is output from the multipliers MUL0-MUL15 to output the eighth multiplication addition data DMA8. The eighth multiplication addition data DMA8 may be transmitted to the first input terminal of the accumulation adder 4510 of the accumulator 4500. As described with reference to FIG. 84, at the twelfth time point T12, the first accumulation control signal IN_ACC[3:0] of "1000" may be transmitted to the selection terminal SEL of the selector 4530 of the accumulator 4500. The selector 4530 may transmit the fourth accumulation data ACC4, which is the updated data of the fourth input terminal IN4, as the eighth latch data LAT8 to the second input terminal of the accumulation adder 4510 through the output terminal OUT, in response to the first accumulation control signal IN_ACC[3:0] of "1000". Accordingly, the accumulation adder 4510 may perform an accumulative addition operation on the eighth multiplication addition data DMA8 and the eighth latch data LAT8 (i.e., the fourth accumulation data ACC4) to generate the eighth accumulation data ACC8.

Meanwhile, as described with reference to FIG. 84, at the twelfth time point T12, the seventh accumulation data ACC7 that is output from the accumulation adder 4510 may be respectively transmitted to input terminals of the first to fourth flip-flops FF1-FF4 of the latch circuit 4520. Because "1" is transmitted as the third bit value ST_ACC[2] of the second accumulation control signal ST_ACC[3:0] to the clock terminal of the third flip-flop FF3, and "0" is transmitted as the first bit value ST_ACC[0], the second bit value ST_ACC[1], and the fourth bit value ST_ACC[3] of the second accumulation control signal ST_ACC[3:0] to the clock terminals of the first, second, and fourth flip-flops FF1, FF2, and FF4, respectively, the third flip-flop FF3 may latch the seventh accumulation data ACC7 from the accumulation adder 4510 and may output the seventh accumulation data ACC7. The seventh accumulation data ACC7 that is output from the third flip-flop FF3 may be transmitted to the third input terminal IN3 of the selector 4530 and the first input terminal of the additional adder 4542 of the additional addition circuit 4540. The selector 4530 may update the data that is set in the third input terminal IN3 from the third accumulation data ACC3 to the seventh accumulation data ACC7.

Figure 93:
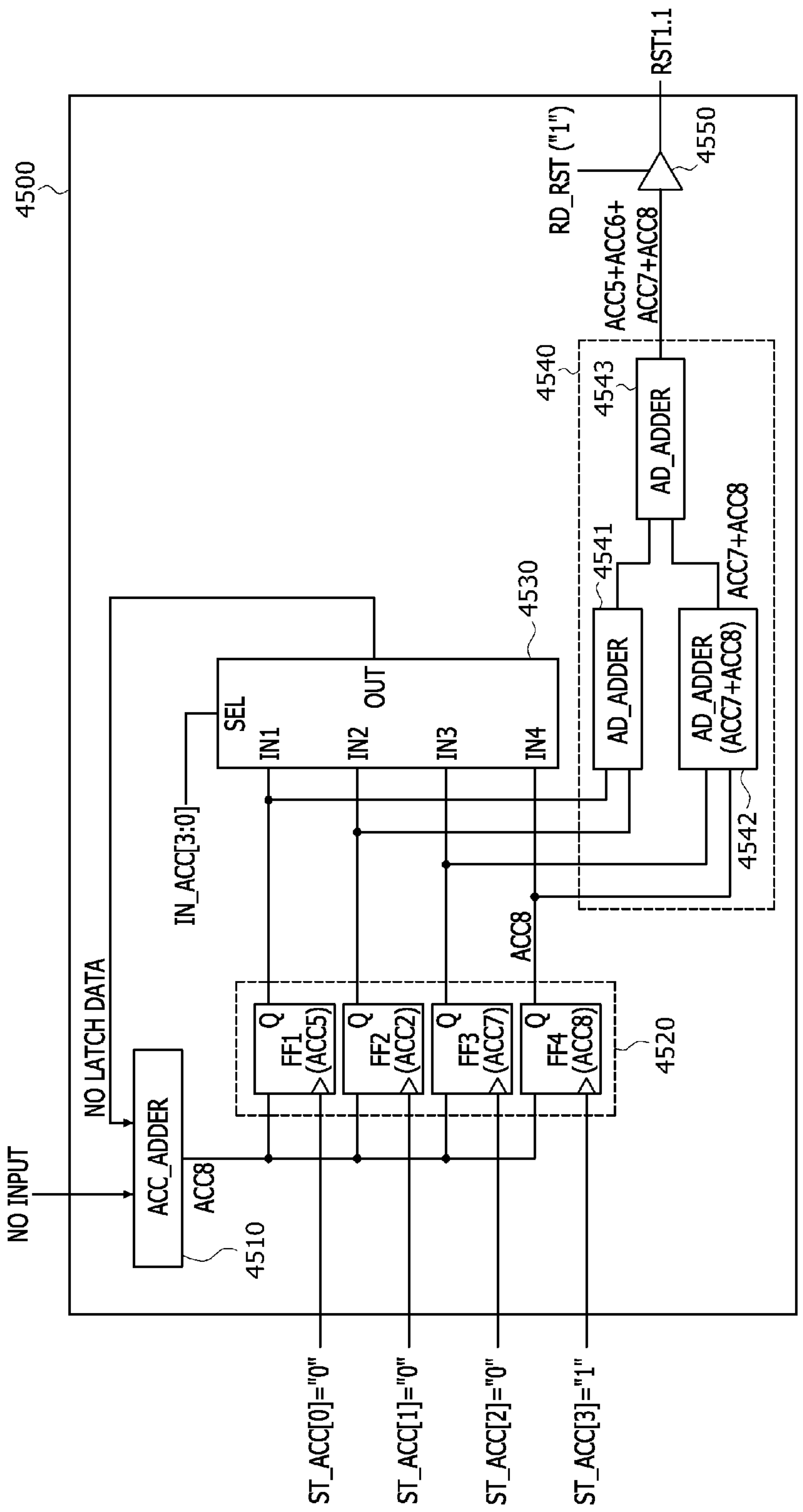

Next, referring to FIG. 93, together with FIG. 82, as described with reference to FIG. 84, at the thirteenth time point T13, the eighth accumulation data ACC8 that is output from the accumulation adder 4510 may be respectively transmitted to the input terminals of the first to fourth flip clops FF1-FF4 of the latch circuit 4520. Because "1" is transmitted as the fourth bit value ST_ACC[3] of the second accumulation control signal ST_ACC[3:0] to the clock terminal of the fourth flip-flop FF4, and "0" is transmitted as the first to third bit values ST_ACC[2:0] of the second accumulation control signal ST_ACC[3:0] to the clock terminals of the first to third flip-flops FF1-FF3, the fourth flip-flop FF4 may latch the eighth accumulation data ACC8 from the accumulation adder 4510 and may output the eighth accumulation data ACC8. The eighth accumulation data ACC8 that is output from the fourth flip-flop FF4 may be transmitted to the fourth input terminal IN4 of the selector 4530 and the second input terminal of the additional adder 4542. The selector 4530 may update the data that is set in the fourth input terminal IN4 from the fourth accumulation data ACC4 to the eighth accumulation data ACC8.

The additional adder 4542 may perform an addition operation on the seventh accumulation data ACC7 and the eighth accumulation data ACC8 to generate data "ACC7+ACC8". The additional adder 4542 may transmit the data "ACC7+ACC8" to the additional adder 4543. The additional adder 4543 may add the data "ACC5+ACC6" and the data "ACC7+ACC8" that are transmitted from the additional adders 4541 and 4542, respectively, to transmit data "ACC5+ACC6+ACC7+ACC8" to the input terminal of the output buffer 4550. The output buffer 4550 may output the data "ACC5+ACC6+ACC7+ACC8" as MAC result data RST1.1 through the output terminal in response to the MAC read control signal RD_RST of "1" that is received through the enable terminal.

Figure 94:
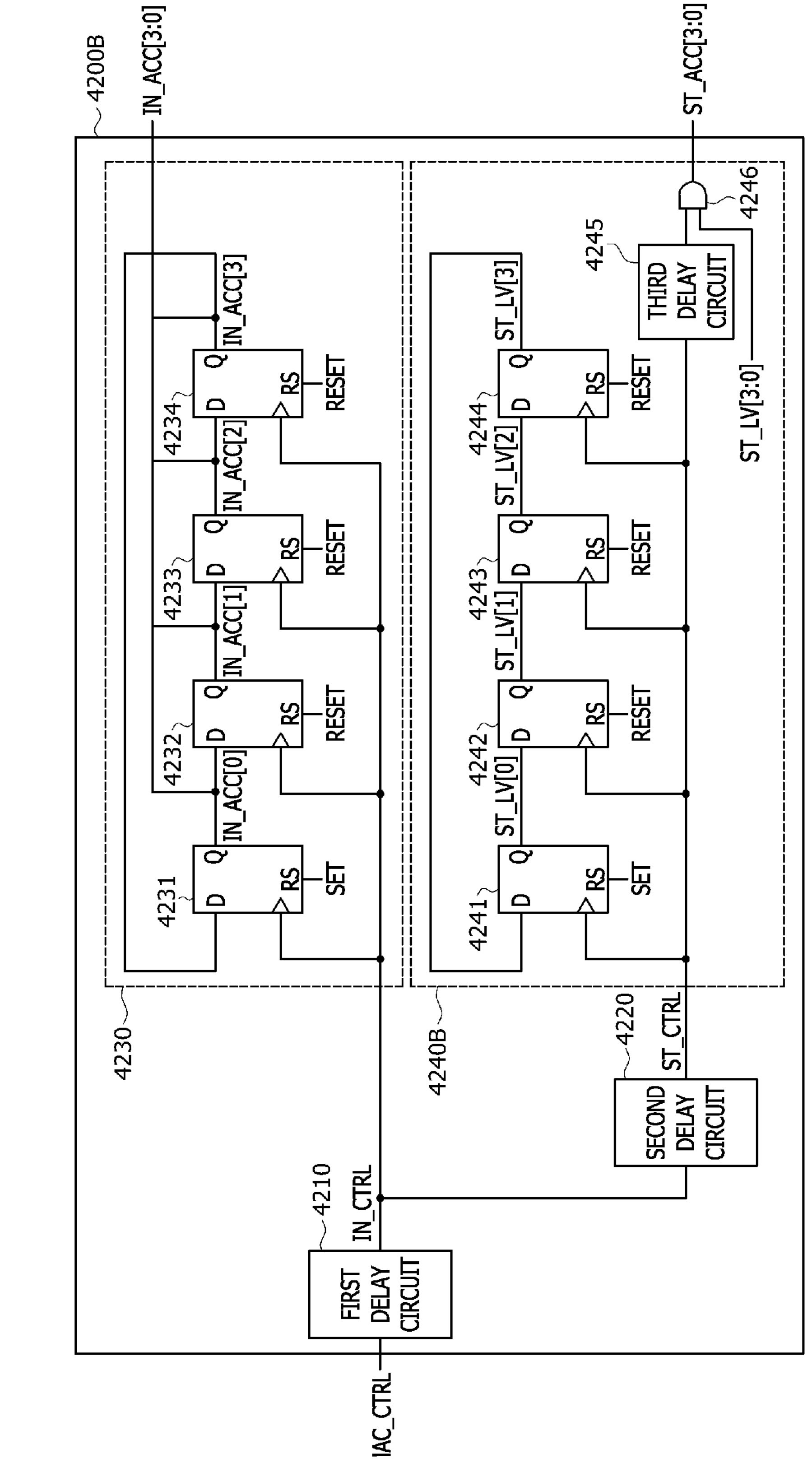
FIG. 94 is a circuit diagram illustrating another example of the configuration of the accumulation control signal generator of the PIM device of FIG. 66.

FIG. 94 is a circuit diagram illustrating an accumulation control signal generator 4200B that corresponds to another example of the accumulation control signal generator 4200 of the PIM device 4000 of FIG. 66. Referring to FIG. 94, the accumulation control signal generator 4200B may include a first delay circuit 4210, a second delay circuit 4220, a first accumulation control signal generation circuit 4230, and a second accumulation control signal generation circuit 4240B. The first delay circuit 4210, the second delay circuit 4220, and the first accumulation control signal generation circuit 4230 may be the same as described with reference to FIG. 67. The second accumulation control signal generation circuit 4240B may include four second flip-flops 4241-4244, a third delay circuit 4245, and a first AND gate 4246. The second flip-flops 4241-4244 of the second accumulation control signal generation circuit 4240B may have the same configurations as the second flip-flops 4241-4244 described with reference to FIG. 67, except for outputting the bit values of the intermediate second accumulation control signal ST_LV[3:0] through the output terminals Q. In an example, the second flip-flop 4241 that is disposed at the first position may output the first bit value ST_LV[0], which is the least significant bit value of the intermediate second accumulation control signal ST_LV[3:0]. The second flip-flop 4242 that is disposed at the second position may output the second bit value ST_LV[1] of the intermediate second accumulation control signal ST_LV[3:0]. The second flip-flop 4243 that is disposed at the third position may output the third bit value ST_LV[2] of the intermediate second accumulation control signal ST_LV[3:0]. In addition, the second flip-flop 4244 that is disposed at the fourth position may output the fourth bit value ST_LV[3], which is the most significant bit value of the intermediate second accumulation control signal ST_LV[3:0]. The intermediate second accumulation control signal ST_LV[3:0] that is output from the second flip-flops 4241-4244 may be transmitted to the first AND gate 4246.

The third delay circuit 4245 may have an input terminal that is coupled to an output terminal of the second delay circuit 4220 and an output terminal that is coupled to a first input terminal of the first AND gate 4246. The third delay circuit 4245 may delay the second delayed control signal ST_CTRL that is received through the input terminal by a third delay time to output the second delayed control signal ST_CTRL through the output terminal. In an example, when the time that is required for the accumulation addition operation in the accumulation adder (4510 of FIG. 69) is longer than the pulse cycle of the MAC control signal MAC_CTRL, the third delay time may be set to the time corresponding to the difference between the time that is required for the accumulation addition operation in the accumulation adder (4510 of FIG. 69) and the pulse cycle of the MAC control signal MAC_CTRL. The first AND gate 4246 may receive the output signal of the third delay circuit 4245 through the first input terminal. The first AND gate 4246 may receive the intermediate second accumulation control signal ST_LV[3:0] from the second flip-flops 4241-4244. The first AND gate 4246 may perform an AND operation on the output signal of the third delay circuit 4245 and the intermediate second accumulation control signal ST_LV[3:0]. The first AND gate 4246 may output the result of the AND operation as the second accumulation control signal ST_ACC[3:0] through an output terminal.

Figure 95:
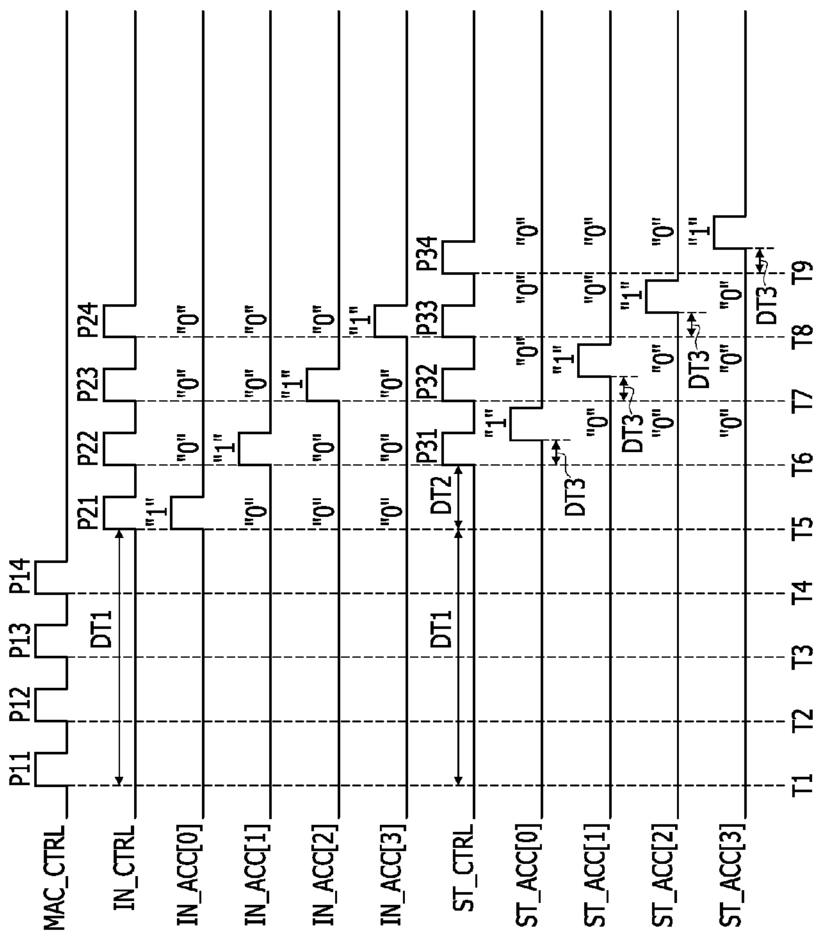
FIG. 95 is a timing diagram illustrating the operation of the accumulation control signal generator of FIG. 94 while the PIM device of FIG. 66 performs the matrix multiplication operation of FIG. 70.

FIG. 95 is a timing diagram illustrating the operation of the accumulation control signal generator 4200B of FIG. 94 while the PIM device 4000 of FIG. 66 is performing the matrix multiplication operation of FIG. 70. Referring to FIG. 95, together with FIG. 94, in order to perform the first to fourth MAC operations, the command decoder (4100 of FIG. 66) of the PIM device 4000 may generate a MAC control signal MAC_CTRL that has first to fourth pulses P11-P14 to transmit the MAC control signal MAC_CTRL to the accumulation control signal generator 4200B in response to first to fourth MAC commands MAC_CMD. The MAC control signal MAC_CTRL may include the first pulse P11 having a rising edge at the first time point T1, the second pulse P12 having a rising edge at the second time point T2, the third pulse P13 having a rising edge at the third time point T3, and the fourth pulse P14 having a rising edge at the fourth time point T4.

The first delay circuit 4210 of the accumulation control signal generator 4200B may output the first delayed control signal IN_CTRL by delaying the MAC control signal MAC_CTRL by a first delay time DT1. The first delayed control signal IN_CTRL may include the first pulse P21 having a rising edge at the fifth time point T5, the second pulse P22 having a rising edge at the sixth time point T6, the third pulse P23 having a rising edge at the seventh time point T7, and the fourth pulse P24 having a rising edge at the eighth time point T8. Here, the fifth time point T5, the sixth time point T6, the seventh time point T7, and the eighth time point T8 may correspond to the time points when the first delay time DT1 has elapsed from the first time point T1, the second time point T2, the third time point T3, and the fourth time point T4, respectively. The second delay circuit 4220 of the accumulation control signal generator 4200B may output the second delayed control signal ST_CTRL by delaying the first delayed control signal IN_CTRL by a second delay time DT2. The second delayed control signal ST_CTRL may include the first pulse P31 having a rising edge at the sixth time point T6, the second pulse P32 having a rising edge at the seventh time point T7, the third pulse P33 having a rising edge at the eighth time point T8, and the fourth pulse P34 having a rising edge at the ninth time point T9. Here, the sixth to ninth time points T6-T9 may correspond to the time points when the second delay time DT2 has elapsed from the fifth to eighth time points T5-T8, respectively.

At the fifth time point at which the first pulse P21 of the first delayed control signal IN_CTRL is generated, the first accumulation control signal generation circuit 4230 may output the first accumulation control signal IN_ACC[3:0] of "0001". This process may be the same as the process described with reference to FIG. 72. Because the fifth time point T5 is before the second delay circuit 4220 outputs the second delayed control signal, the second accumulation control signal generation circuit 4240B might not output data. At the sixth time point T6, the first delay circuit 4210 may output the second pulse P22 of the first delayed control signal IN_CTRL, and the second delay circuit 4220 may output the first pulse P31 of the second delayed control signal ST_CTRL. In the same manner as described with reference to FIG. 73, the first accumulation control signal generation circuit 4230 may output the first accumulation control signal IN_ACC[3:0] of "0010". The second flip-flops 4241-4244 of the second accumulation control signal generation circuit 4240B may generate "0001" as an intermediate second accumulation control signal ST_LV[3:0] to transmit the intermediate second accumulation control signal ST_LV[3:0] to the second input terminal of the first AND gate 4246. At the time point when a third delay time DT3 has elapsed from the sixth time point T6, the first AND gate 4246 of the second accumulation control signal generation circuit 4240B may receive the first pulse P31 of the second delayed control signal ST_CTRL from the third delay circuit 4245 through the first input terminal. The first AND gate 4246 may perform an AND operation on the first pulse P31 of the second delayed control signal ST_CTRL and the intermediate second accumulation control signal ST_LV[3:0] and may output "0001", which is the result of the AND operation, as the second accumulation control signal ST_ACC[3:0]. That is, the second accumulation control signal generation circuit 4240B may output the second accumulation control signal ST_ACC[3:0] of "0001" at the time point at which the third delay time DT3 elapses from the sixth time point T6.

In this way, at the seventh time point T7 at which the third pulse P23 of the first delayed control signal IN_CTRL and the second pulse P32 of the second delayed control signal ST_CTRL are generated, the first accumulation control signal generation circuit 4230 may output the first accumulation control signal IN_ACC[3:0] of "0100". In addition, at the time point at which the third delay time DT3 elapses from the seventh time point T7, the second accumulation control signal generation circuit 4240B may output the second accumulation control signal ST_ACC[3:0] of "0010". At the eighth time point T8 at which the fourth pulse P24 of the first delayed control signal IN_CTRL and the third pulse P33 of the second delayed control signal ST_CTRL are generated, the first accumulation control signal generation circuit 4230 may output the first accumulation control signal IN_ACC[3:0] of "1000". In addition, at the time point when the third delay time DT3 elapses from the eighth time point T8, the second accumulation control signal generation circuit 4240B may output the second accumulation control signal ST_ACC[3:0] of "0010". Finally, at the time point when the third delay time DT3 elapses from the ninth time point T9 at which the fourth pulse P34 of the second delayed control signal ST_CTRL is generated, the second accumulation control signal generation circuit 4240 may output the second accumulation control signal ST_ACC[3:0] of "1000".

When the accumulation control signal generator 4500B according to the present embodiment is applied, the accumulation adder (4510 of FIG. 69) of the accumulator (4500 of FIG. 69) may receive the first latch data LAT1, the second latch data LAT2, the third latch data LAT3, and the fourth latch data LAT4 from the selector (4530 of FIG. 69) at the fifth time point T5, the sixth time point T6, the seventh time point T7, and eighth time point T8, respectively. On the other hand, the latch operation in the latch circuit (4520 in FIG. 69) for the accumulation data ACC that is output from the accumulation adder (4510 in FIG. 69) may be performed at the time points at which the third delay time DT3 elapses from the fifth time point T5, the sixth time point T6, the seventh time point T7, and the eighth time point T8.

Figure 96:
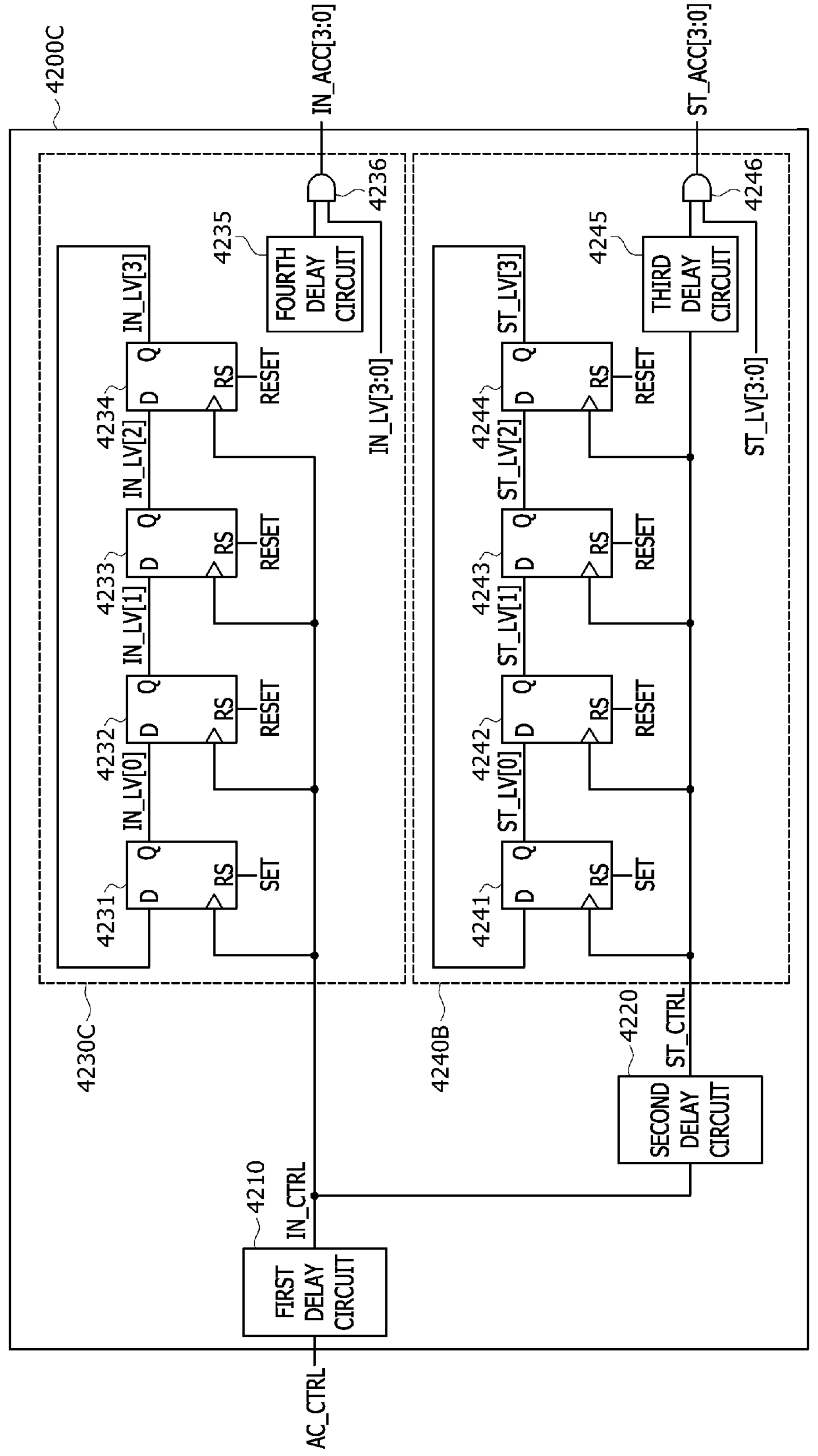
FIG. 96 is a circuit diagram illustrating yet another example of the configuration of the accumulation control signal generator of the PIM device of FIG. 66.

FIG. 96 is a circuit diagram illustrating an accumulation control signal generator 4200C that corresponds to another example of the accumulation control signal generator 4200 of the PIM device 4000 of FIG. 66. Referring to FIG. 96, the accumulation control signal generator 4200C may include a first delay circuit 4210, a second delay circuit 4220, a first accumulation control signal generation circuit 4230C, and a second accumulation control signal generation circuit 4240B. The first delay circuit 4210 and the second delay circuit 4220 may be the same as described with reference to FIG. 67. The first accumulation control signal generation circuit 4230C may include four first flip-flops 4231-4234, a fourth delay circuit 4235, and a second AND gate 4236. The first flip-flops 4231-4234 of the first accumulation control signal generation circuit 4230C may have the same configuration as the first flip-flops of the first accumulation control signal generation circuit 4230 described with reference to FIG. 67, except for outputting the bit values of the intermediate first accumulation control signal IN_LV[3:0] through the output terminals Q. In an example, the first flip-flop 4231 that is disposed at the first position may output the first bit value IN_LV[0], which is the least significant bit value of the intermediate first accumulation control signal IN_LV[3:0]. The first flip-flop 4232 that is disposed at the second position may output the second bit value IN_LV[1] of the intermediate first accumulation control signal IN_LV[3:0]. The first flip-flop 4233 that is disposed at the third position may output the third bit value IN_LV[2] of the intermediate first accumulation control signal IN_LV[3:0]. In addition, the first flip-flop 4234 that is disposed at the fourth position may output the fourth bit value IN_LV[3], which is the most significant bit value of the intermediate first accumulation control signal IN_LV[3:0]. The intermediate first accumulation control signal IN_LV[3:0] that is output from the first flip-flops 4231-4234 may be transmitted to the second AND gate 4236.

The fourth delay circuit 4235 may include an input terminal that is coupled to an output terminal of the first delay circuit 4210 and an output terminal that is coupled to the first input terminal of the second AND gate 4236. The fourth delay circuit 4235 may delay the first delayed control signal IN_CTRL that is received through the input terminal by a fourth delay time to output the first delayed control signal IN_CTRL through the output terminal. In an example, the fourth delay time may be set to be the same as the third delay time of the third delay circuit 4245 of the second accumulation control signal generation circuit 4240B. The second AND gate 4236 may receive the output signal of the fourth delay circuit 4235 through the first input terminal. The second AND gate 4236 may receive the intermediate first accumulation control signal IN_LV[3:0] from the first flip-flops 4231-4234 through the second input terminal. The second AND gate 4236 may perform an AND operation on the output signal of the fourth delay circuit 4235 and the intermediate first accumulation control signal IN_LV[3:0]. In addition, the second AND gate 4236 may output the result of the AND operation as the first accumulation control signal IN_ACC[3:0] through the output terminal.

Figure 97:
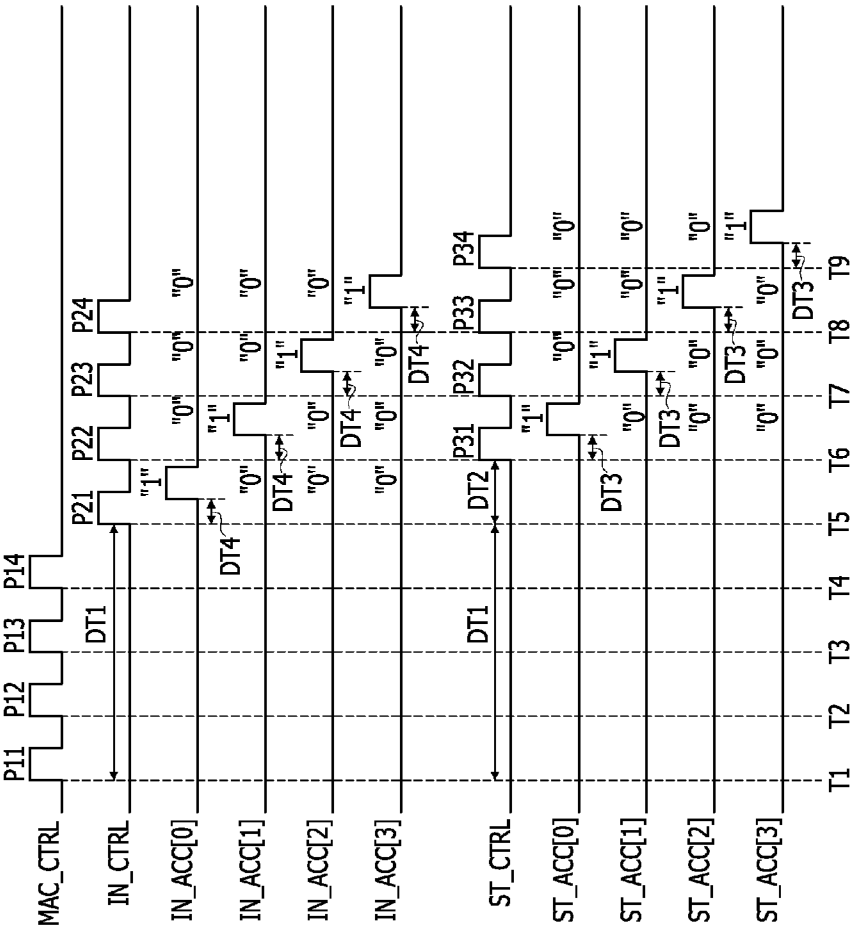
FIG. 97 is a timing diagram illustrating the operation of the accumulation control signal generator of FIG. 96 while the PIM device of FIG. 66 performs the matrix multiplication operation of FIG. 70.

FIG. 97 is a timing diagram illustrating the operation of the accumulation control signal generator 4200C of FIG. 96 while the PIM device 4000 of FIG. 66 is performing the matrix multiplication operation of FIG. 70. Referring to FIG. 97, together with FIG. 96, in order to perform the first to fourth MAC operations, the command decoder (4100 of FIG. 66) may generate a MAC control signal MAC_CTRL that has first to fourth pulses P11-P14 in response to the first to fourth MAC commands MAC_CMD to transmit the MAC control signal MAC_CTRL to the accumulation control signal generator 4200C. The MAC control signal MAC_CTRL may include the first pulse P11 that has a rising edge at the first time point T1, the second pulse P12 that has a rising edge at the second time point T2, the third pulse P13 that has a rising edge at the third time point T3, and the fourth pulse P14 that has a rising edge at the fourth time point T4.

The first delay circuit 4210 of the accumulation control signal generator 4200C may output the first delayed control signal IN_CTRL by delaying the MAC control signal MAC_CTRL by the first delay time DT1. The first delayed control signal IN_CTRL may include the first pulse P21 that has a rising edge at the fifth time point T5, the second pulse P22 that has a rising edge at the sixth time point T6, the third pulse P23 that has a rising edge at the seventh time point T7, and the fourth pulse P24 that has a rising edge at the eighth time point T8. Here, the fifth time point T5, the sixth time point T6, the seventh time point T7, and the eighth time point T8 may correspond to the time points when the first delay time DT1 has elapsed from the first time point T1, the second time point T2, the third time point T3, and the fourth time point T4, respectively. The second delay circuit 4220 of the accumulation control signal generator 4200C may output the second delayed control signal ST_CTRL by delaying the first delayed control signal IN_CTRL by the second delay time DT2. The second delayed control signal ST_CTRL may include the first pulse P31 that has a rising edge at the sixth time point T6, the second pulse P32 that has a rising edge at the seventh time point T7, the third pulse P33 that has a rising edge at the eighth time point T8, and the fourth pulse P34 that has a rising edge at the ninth time point T9. Here, the sixth to ninth time points T6-T9 may correspond to the time points when the second delay time DT2 has elapsed from the fifth to eighth time points T5-T8, respectively.

At the time point that is delayed by a fourth delay time DT4 from the fifth time point T5 at which the first pulse P21 of the first delayed control signal IN_CTRL is generated, the first accumulation control signal generation circuit 4230C may output the first accumulation control signal IN_ACC [3:0] of "0001". This process may be the same as the process described with reference to FIG. 72. Because the time point that is delayed by the fourth delay time DT4 from the fifth time point T5 is before the second delay circuit 4220 outputs the second delayed control signal, the second accumulation control signal generation circuit 4240B might not output data. At the sixth time point T6, the first delay circuit 4210 may output the second pulse P22 of the first delayed control signal IN_CTRL, and the second delay circuit 4220 may output the first pulse P31 of the second delayed control signal ST_CTRL. At the time point that is delayed by the fourth delay time DT4 from the sixth time point T6, the first accumulation control signal generation circuit 4230C may generate "0010" as the intermediate first accumulation control signal IN_LV[3:0] to transmit the intermediate first accumulation control signal IN_LV[3:0] to the second input terminal of the second AND gate 4236. The second AND gate 4236 of the first accumulation control signal generation circuit 4230C may receive the second pulse P22 of the first delayed control signal IN_CTRL from the fourth delay circuit 4235 through the first input terminal. The second AND gate 4236 may perform an AND operation on the second pulse P22 of the first delayed control signal IN_CTRL and the intermediate first accumulation control signal IN_LV[3:0] and may output "0010", which is the result of the AND operation, as the first accumulation control signal IN_ACC[3:0]. At the time point that is delayed by the third delay time DT3 from the sixth time point T6, the second flip-flops 4241-42444 of the second accumulation control signal generation circuit 4240B may generate "0001" as the intermediate second accumulation control signal ST_LV[3:0] to transmit the intermediate second accumulation control signal ST_LV[3:0] to the second input terminal of the first AND gate 4246. The first AND gate 4246 of the second accumulation control signal generation circuit 4240B may receive the first pulse P31 of the second delayed control signal SR_CTRL from the third delay circuit 4245 through the first input terminal. The first AND gate 4246 may perform an AND operation on the first pulse P31 of the second delayed control signal SR_CTRL and the intermediate second accumulation control signal ST_LV[3:0] and may output "0001", which is the result of the AND operation, as the second accumulation control signal ST_ACC[3:0].

In this way, at the time point when the fourth delay time DT4 elapses from the seventh time point T7 at which the third pulse P23 of the first delayed control signal IN_CTRL and the second pulse P32 of the second delayed control signal ST_CTRL are generated, the first accumulation control signal generation circuit 4230 may output the first accumulation control signal IN_ACC[3:0] of "0100". In addition, at the time point at which the third delay time DT3 elapses from the seventh time point T7, the second accumulation control signal generation circuit 4240B may output the second accumulation control signal ST_ACC[3:0] of "0010". At the time point at which the fourth delay time DT4 elapses from the eighth time point T8 at which the fourth pulse P24 of the first delayed control signal IN_CTRL and the third pulse P33 of the second delayed control signal ST_CTRL are generated, the first accumulation control signal generation circuit 4230C may output the first accumulation control signal IN_ACC[3:0] of "1000". In addition, at the time point at which the third delay time DT3 elapses from the eighth time point T8, the second accumulation control signal generation circuit 4240B may output the second accumulation control signal ST_ACC[3:0] of "0100". Finally, at the time point at which the third delay time DT3 elapses from the ninth time point T9 at which the fourth pulse P34 of the second delayed control signal ST_CTRL is generated, the second accumulation control signal generation circuit 4240B may output the second accumulation control signal ST_ACC[3:0] of "1000".

When the accumulation control signal generator 4200C according to the present embodiment is applied, the accumulation adder (4510 of FIG. 69) of the accumulator (4500 of FIG. 69) may receive the first latch data LAT1, the second latch data LAT2, the third latch data LAT3, and the fourth latch data LAT4 from the selector (4530 of FIG. 69) at the time points when the fourth delay time DT4 elapses from the fifth time point T5, the sixth time point T6, the seventh time point T7, and the eighth time point T8, respectively. On the other hand, the latch operation in the latch circuit (4520 in FIG. 69) for the accumulation data ACC that is output from the accumulation adder (4510 in FIG. 69) may be performed at the time points at which the third delay time DT3 elapses from the fifth time point T5, the sixth time point T6, the seventh time point T7, and the eighth time point T8.

Figure 98:
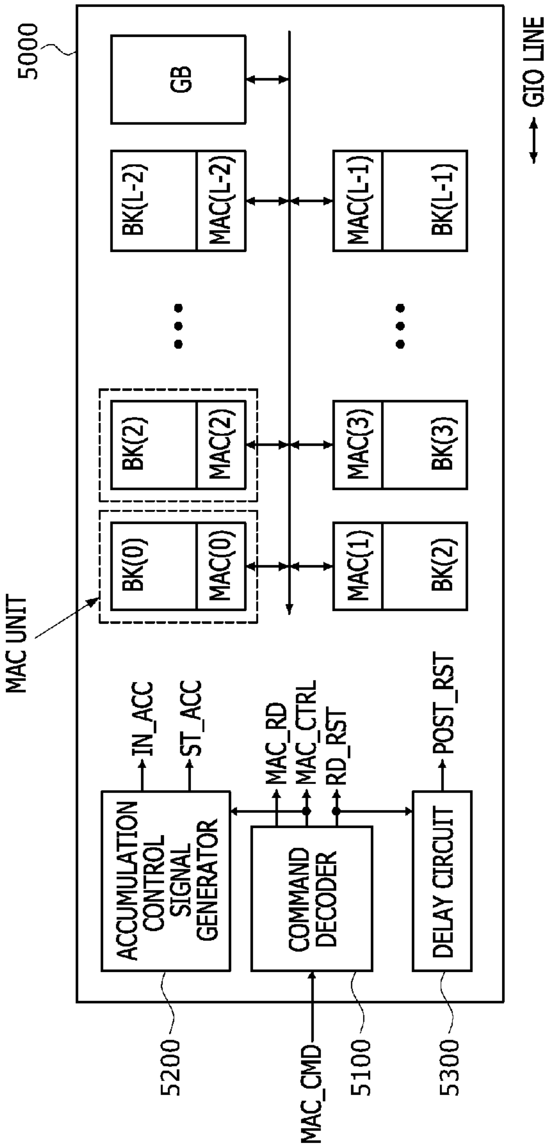
FIG. 98 is a block diagram illustrating a PIM device according to yet another embodiment of the present disclosure.

FIG. 98 is a block diagram illustrating a PIM device 5000 according to another embodiment of the present disclosure. Referring to FIG. 98, the PIM device 5000 may include a command decoder 5100, an accumulation control signal generator 5200, a MAC read control signal delay circuit 5300, a plurality of MAC units, and a global buffer GB. The command decoder 5100 and the accumulation control signal generator 5200 may have the same configurations as the command decoder 4100 and the accumulation control signal generator 4200 of FIG. 66, respectively. The plurality of MAC units may include a plurality of memory banks BK(0)-BK(L−1) and a plurality of MAC operators MAC(0)-MAC(L−1) and may have the same configurations as the plurality of MAC units of FIG. 66. In addition, the global buffer GB may have the same configuration as the global buffer of FIG. 66. The MAC read control signal delay circuit 5300 may receive a MAC read control signal RD_RST that is output from the command decoder 5100. The MAC read control signal delay circuit 5300 may generate a delayed MAC read control signal POST_RST by delaying the MAC read control signal RD_RST for a predetermined time. The MAC read control signal delay circuit 5300 may transmit the delayed MAC read control signal POST_RST to the plurality of MAC operators MAC(0)-MAC(L−1). The time delayed by the MAC read control signal delay circuit 5300 may be set as a time that is required for an additional addition operation in the accumulator that constitutes the MAC operator.

Figure 99:
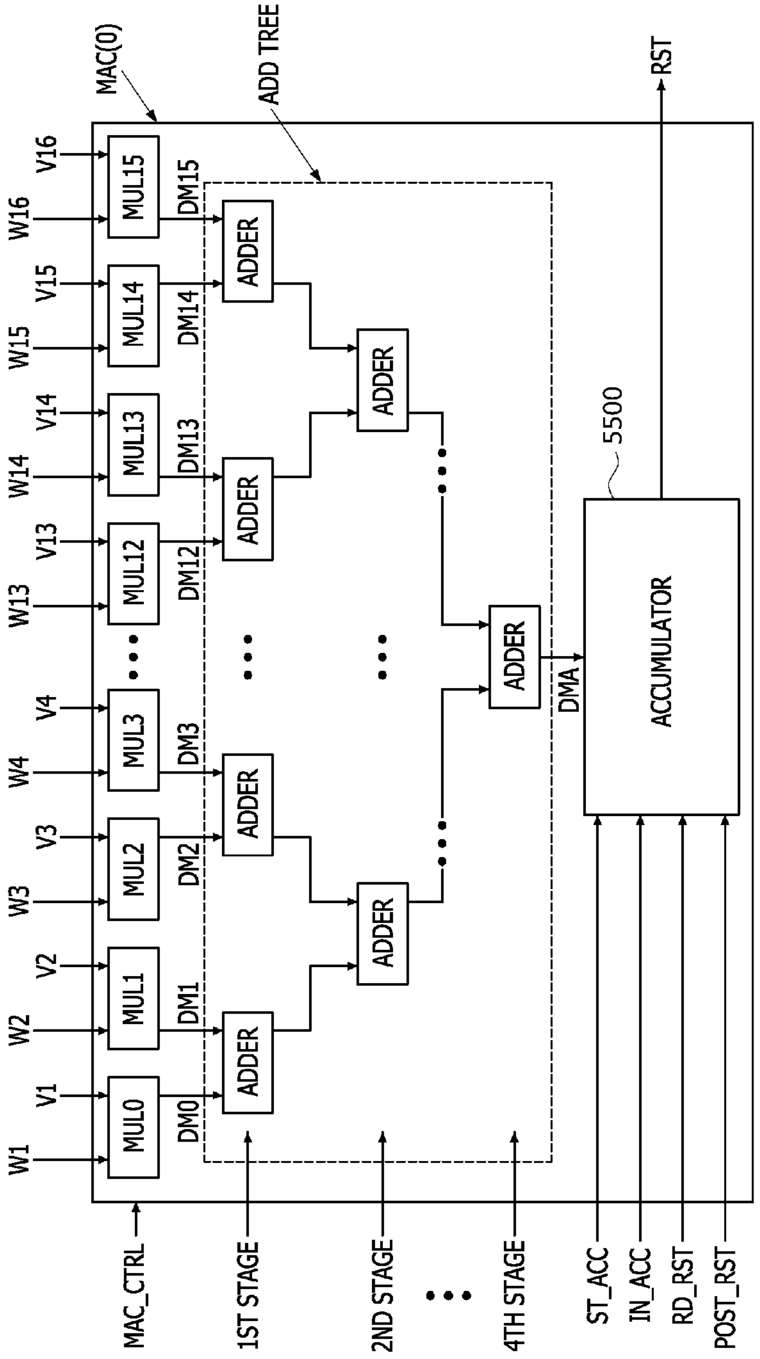
FIG. 99 is a block diagram illustrating an example of the configuration of a first MAC operator of the PIM device of FIG. 98.

FIG. 99 is a block diagram illustrating an example of a configuration of the first MAC operator MAC(0) of the PIM device 5000 of FIG. 98. In FIG. 99, the same reference numerals as those of FIG. 68 denote the same components, and repeated descriptions will be omitted below. Referring to FIG. 99, the accumulator 5500 that constitutes the first MAC operator MAC(0) may receive a first accumulation control signal IN_ACC and a second accumulation control signal ST_ACC that are output from the accumulation control signal generator 5200, a MAC read control signal RD_RST that is output from the command decoder 5100, and a delayed MAC read control signal POST_RST that is output from the MAC read control signal delay circuit 5300. The MAC read control signal RD_RST, the first accumulation control signal IN_ACC, and the second accumulation control signal ST_ACC may control the accumulation addition operation of the accumulator 5500. The MAC read control signal RD_RST and the delayed MAC read control signal POST_RST may control the additional addition operation and the output operation of the accumulator 5500.

Figure 100:
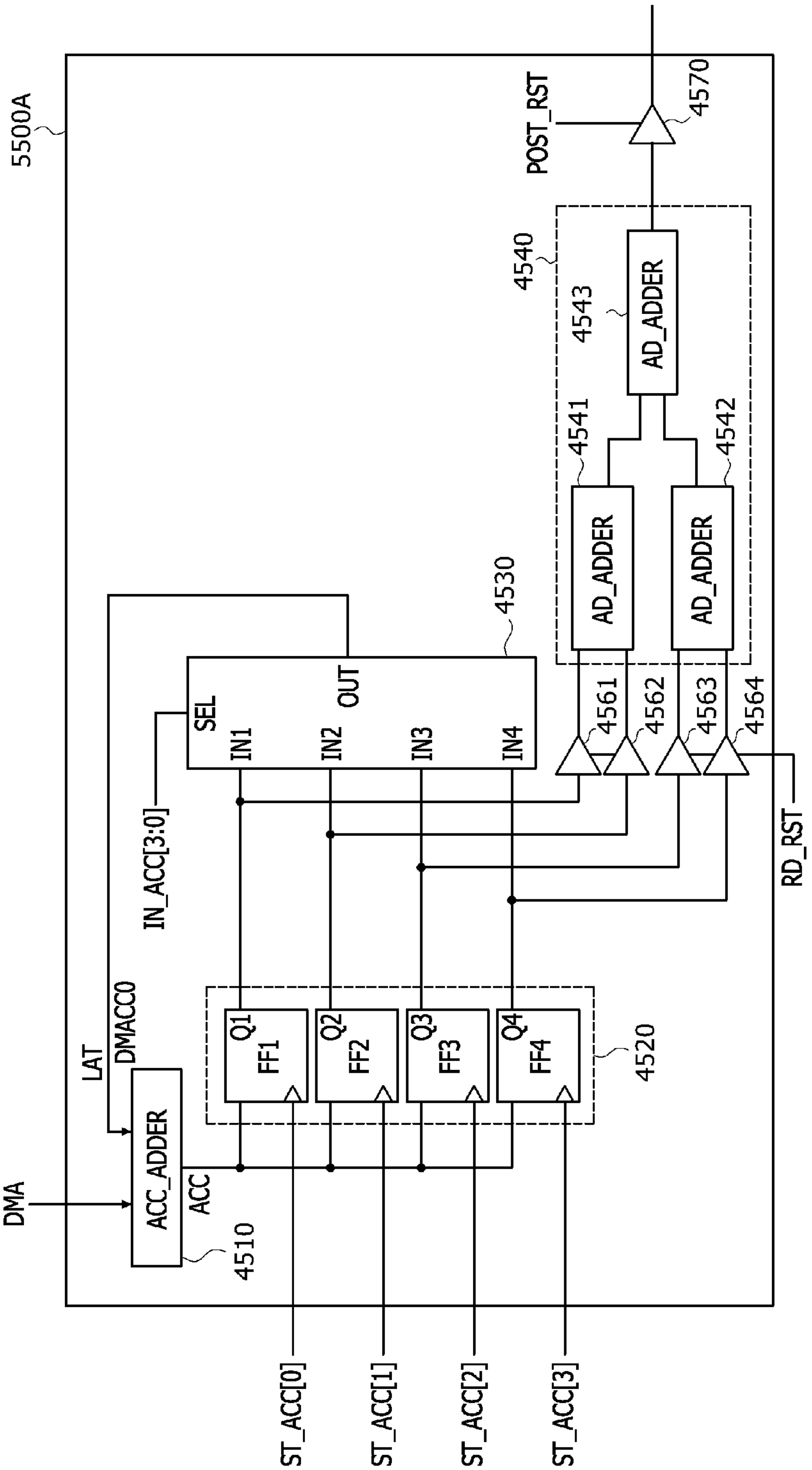
FIG. 100 is a block diagram illustrating an example of the configuration of an accumulator of the first MAC operator of FIG. 99.

FIG. 100 is a block diagram illustrating the configuration of an accumulator 5500A that corresponds to an example of the first MAC operator MAC(0) of FIG. 99. In FIG. 100, the same reference numerals as those of FIG. 69 denote the same components, and repeated descriptions will be omitted below. Referring to FIG. 100, the accumulator 5500A may include first to fourth intermediate buffers 4561-4564 that are disposed between the output terminals Q1-Q4 of first to fourth flip-flops FF1-FF4 of a latch circuit 4520 and an additional addition circuit 4540. Specifically, the first intermediate buffer 4561 may have an input terminal that is coupled to the output terminal Q1 of the first flip-flop FF1 and an output terminal that is coupled to the first input terminal of the additional adder 4541 of the additional addition circuit 4540. The second intermediate buffer 4562 may have an input terminal that is coupled to the output terminal Q2 of the second flip-flop FF2 and an output terminal that is coupled to the second input terminal of the additional adder 4541 of the additional addition circuit 4540. The third intermediate buffer 4563 may have an input terminal that is coupled to the output terminal Q3 of the third flip-flop FF3 and an output terminal that is coupled to the third input terminal of the additional adder 4542 of the additional addition circuit 4540. The fourth intermediate buffer 4564 may have an input terminal that is coupled to the output terminal Q4 of the fourth flip-flop FF4 and an output terminal that is coupled to the fourth input terminal of the additional adder 4542 of the additional addition circuit 4540. Each of the first to fourth intermediate buffers 4561-4564 may have an enable terminal for receiving the MAC read control signal RD_RST in common. In an example, each of the first to fourth intermediate buffers 4561-4564 may be configured with a three-state buffer. An output buffer 4570 may include an input terminal, an output terminal, and an enable terminal. The input terminal of the output buffer 4570 may be coupled to the output terminal of the additional adder 4543 that is disposed at the last stage of the additional addition circuit 4540. The output terminal of the output buffer 4570 may be coupled to the output line of the accumulator 5500A. The enable terminal of the output buffer 4570 may receive the delayed MAC read control signal POST_RST that is output from a MAC read control signal delay circuit (5300 of FIG. 98).

As in this example, when the PIM device 5000 performs the matrix multiplication operation of FIG. 82 in a state in which the first to fourth intermediate buffers 4561-4564 are not disposed in the accumulator 5500A, the additional addition circuit 4540 of the accumulator 5500A may perform an unnecessary additional addition operation. That is, as described with reference to FIG. 89, while the first to fourth MAC operations, among the eight MAC operations, are being performed, the additional addition operation in the additional addition circuit 4540 is continuously performed, but the data "ACC1+ACC2+ACC3+ACC4" that is generated as a result of the additional addition operation might not constitute the MAC result data RST1.1. This is because, in the process of performing the fifth to eighth MAC operations, the first to fourth accumulation data ACC1-ACC4 are used only as the fifth to eighth latch data LAT5-LAT8 and are not directly used to calculate the MAC result data RST1.1. In the case of the accumulator 5500A according to this example, because the transmission of the accumulation data from the latch circuit 4520 to the additional addition circuit 4541 is blocked by the first to fourth intermediate buffers 4561-4564 until the MAC read control signal RD_RST is transmitted, for example, at a logic "high" level (i.e., data "1"), an unnecessary additional addition operation in the additional addition circuit 4540 might not be performed. In an example, the logic level of the MAC read control signal RD_RST may be changed from a logic "low" level to a logic "high" level at the time point at which the accumulation data is output from the latch circuit 4520 in the last MAC operation, among the plurality of MAC operations.

Figure 101:
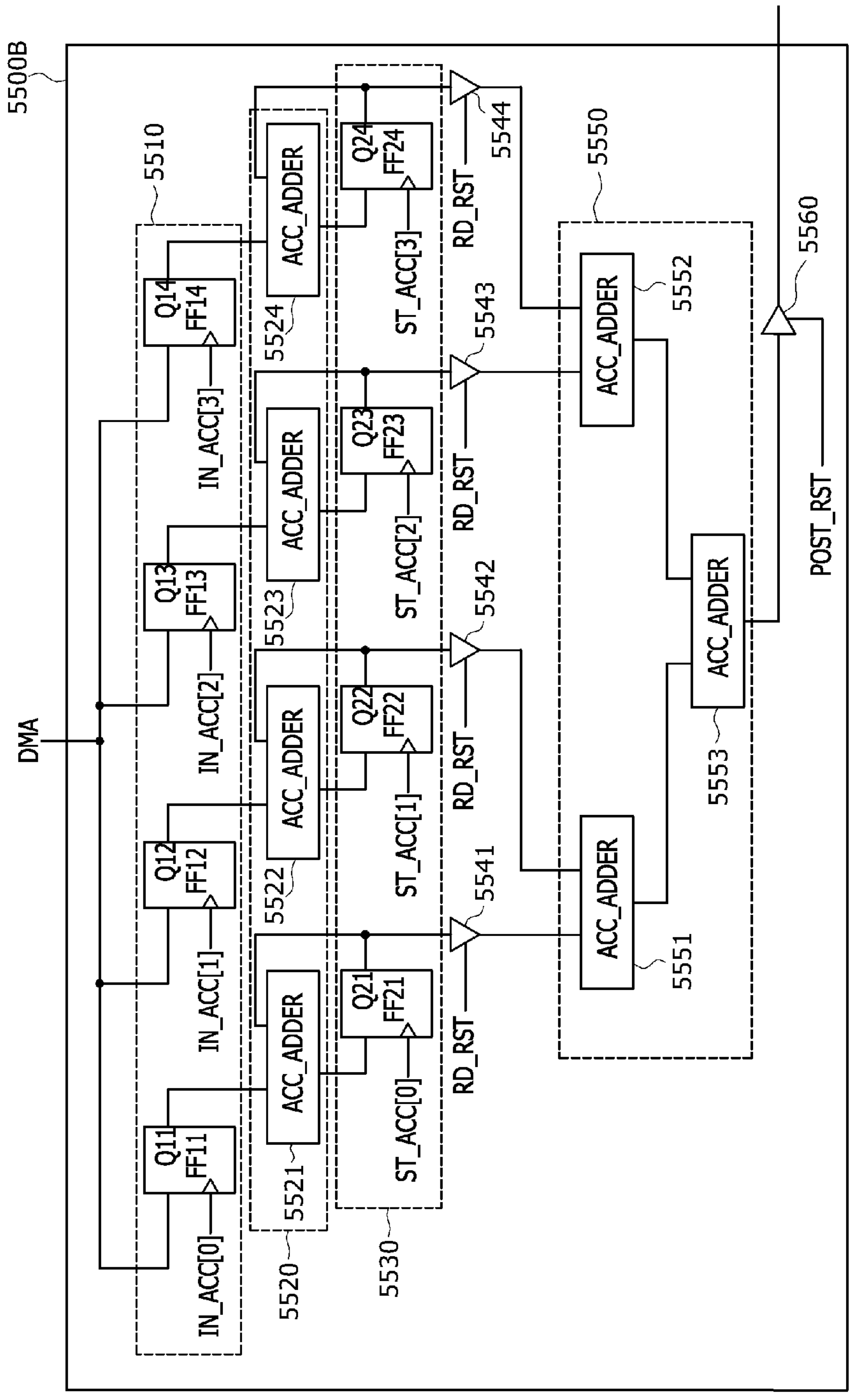
FIG. 101 is a block diagram illustrating another example of the configuration of the accumulator of the first MAC operator of FIG. 99.

FIG. 101 is a block diagram illustrating a configuration of an accumulator 5500B that corresponds to another example of the first MAC operator MAC(0) of FIG. 99. Referring to FIG. 101, the accumulator 5500B may include a first latch circuit 5510, an addition circuit 5520, a second latch circuit 5530, first to fourth intermediate buffers 5541-5544, an additional addition circuit 5550, and an output buffer 5560.

The first latch circuit 5510 may include four first flip-flops FF11-FF14. The first flip-flops FF11-FF14 may receive multiplication addition data DMA that is transmitted from an adder tree in common. The first flip-flops FF11-FF14 may receive a first accumulation control signal IN_ACC[3:0] through clock terminals. Specifically, the first flip-flop FF11 that is disposed at the first position may receive the first bit IN_ACC[0], which is the least significant bit of the first accumulation control signal IN_ACC[3:0] through the clock terminal. The first flip-flop FF12 that is disposed at the second position may receive the second bit IN_ACC[1] of the first accumulation control signal IN_ACC[3:0] through the clock terminal. The first flip-flop FF13 that is disposed at the third position may receive the third bit IN_ACC[2] of the first accumulation control signal IN_ACC[3:0] through the clock terminal. The first flip-flop FF14 that is disposed at the fourth position may receive the fourth bit IN_ACC[3], which is the most significant bit of the first accumulation control signal IN_ACC[3:0] through the clock terminal. The output terminals Q11-Q14 of the first flip-flops FF11-FF14 may be coupled to the addition circuit 5220.

The addition circuit 5220 may include first to fourth adders 5521-5524. The first input terminal of the first adder 5521 may be coupled to the output terminal Q11 of the first flip-flop FF11 that is disposed at the first position. The second input terminal of the first adder 5521 may be coupled to the first feedback line of the second latch circuit 5530. The first input terminal of the second adder 5522 may be coupled to the output terminal Q12 of the first flip-flop FF12 that is disposed at the second position. The second input terminal of the second adder 5522 may be coupled to the second feedback line of the second latch circuit 5530. The first input terminal of the third adder 5523 may be coupled to the output terminal Q13 of the first flip-flop FF13 that is disposed at the third position. The second input terminal of the third adder 5523 may be coupled to the third feedback line of the second latch circuit 5530. The first input terminal of the fourth adder 5524 may be coupled to the output terminal Q14 of the first flip-flop FF14 that is disposed at the fourth position. The second input terminal of the fourth adder 5524 may be coupled to the fourth feedback line of the second latch circuit 5530. The output terminals of the first to fourth adders 5521-5524 may be coupled to the second latch circuit 5530.

The second latch circuit 5530 may include four second flip-flops FF21-FF24. The second flip-flops FF21-FF24 may receive the output data that is output from the first to fourth adders 5521-5524 of the addition circuit 5520. Specifically, the second flip-flop FF21 that is disposed at the first position may receive the output data from the first adder 5521 through an input terminal. The second flip-flop FF22 that is disposed at the second position may receive the output data from the second adder 5522 through an input terminal. The second flip-flop FF23 that is disposed at the third position may receive the output data from the third adder 5523 through an input terminal. The second flip-flop FF24 that is disposed at the fourth position may receive the output data from the fourth adder 5524 through an input terminal. The second flip-flops FF21-FF24 may receive the second accumulation control signal ST_ACC[3:0] through clock terminals. Specifically, the second flip-flop FF21 that is disposed at the first position may receive the first bit ST_ACC[0], which is the least significant bit of the second accumulation control signal ST_ACC[3:0], through the clock terminal. The second flip-flop FF22 that is disposed at the second position may receive the second bit ST_ACC[1] of the second accumulation control signal ST_ACC[3:0] through the clock terminal. The second flip-flop FF23 that is disposed at the third position may receive the third bit ST_ACC[2] of the second accumulation control signal ST_ACC[3:0] through the clock terminal. The second flip-flop FF24 that is disposed at the fourth position may receive the fourth bit ST_ACC[3], which is the most significant bit of the second accumulation control signals ST_ACC[3:0] through the clock terminal. The output terminals Q21-Q24 of the second flip-flops FF21-FF24 may be coupled to the first to fourth feedback lines, respectively.

The first to fourth intermediate buffers 5541-5544 may be disposed between the second latch circuit 5530 and the additional addition circuit 5550. The input terminal of the first intermediate buffer 5541 may be coupled to the second input terminal of the first adder 5521 and the output terminal Q21 of the second flip-flop FF21 that is disposed at the first position through the first feedback line. The input terminal of the second intermediate buffer 5542 may be coupled to the second input terminal of the second adder 5522 and the output terminal Q22 of the second flip-flop FF22 that is disposed at the second position through the second feedback line. The input terminal of the third intermediate buffer 5543 may be coupled to the second input terminal of the third adder 5523 and the output terminal Q23 of the second flip-flop FF23 that is disposed at the third position through the third feedback line. The input terminal of the fourth intermediate buffer 5544 may be coupled to the second input terminal of the fourth adder 5524 and the output terminal Q24 of the second flip-flop FF24 that is disposed at the fourth position through the fourth feedback line. The output terminals of the first to fourth intermediate buffers 5541-5544 may be coupled to the additional addition circuit 5550. The first to fourth intermediate buffers 5541-5544 may receive the MAC read control signal RD_RST through enable terminals in common. The first to fourth intermediate buffers 5541-5544 may transmit the data that is transmitted to the input terminals to the additional addition circuit 5550 in response to the logic level of the MAC read control signal, for example, a logic "high" level.

The additional addition circuit 5550 may be configured by arranging first to third additional adders 5551-5553 in an adder tree structure. The first additional adder 5551 of the first stage may include a first input terminal and a second input terminal that are coupled to the output terminal of the first intermediate buffer 5541 and the output terminal of the second intermediate buffer 5542. The first additional adder 5551 may perform an addition on the data that is output from the first intermediate buffer 5541 and the data that is output from the second intermediate buffer 5542 and may output the data that is generated as a result of the addition operation through the output terminal. The second additional adder 5552 of the first stage may include a first input terminal and a second input terminal that are coupled to the output terminal of the third intermediate buffer 5543 and the output terminal of the fourth intermediate buffer 5544. The second additional adder 5552 may perform an addition on the data that is output from the third intermediate buffer 5543 and the data that is output from the fourth intermediate buffer 5544 and may output the data that is generated as a result of the addition operation through the output terminal. The third additional adder 5553 of the second stage may include a first input terminal and a second input terminal that are coupled to the output terminal of the first additional adder 5551 and the output terminal of the second additional adder 5552. The third additional adder 5553 may perform an addition on the data that is output from the first additional adder 5551 and the data that is output from the second additional adder 5552 and may output the data that is generated as a result of the addition operation through the output terminal. The output terminal of the third additional adder 5553 may be coupled to the output buffer 5560.

The output buffer 5560 may have an input terminal, an output terminal, and an enable terminal. In an example, the output buffer 5560 may be configured with a three-state buffer. The input terminal of the output buffer 5560 may be coupled to the output terminal of the last additional adder, that is, the third additional adder 5553 that is disposed at the second stage. The output terminal of the output buffer 5560 may be coupled to the output line of the accumulator 5500B. The enable terminal of the output buffer 5560 may receive the delayed MAC read control signal POST_RST that is output from the MAC read control signal delay circuit (5300 of FIG. 98). When the delayed MAC read control signal POST_RST of a logic "low" level is transmitted to the enable terminal, the output buffer 5560 might not output data through the output terminal. On the other hand, when the delayed MAC read control signal POST_RST of a logic "high" level is received through the enable terminal, the output buffer 5560 may output the output data of the third additional adder 5553, which is received through the input terminal, through the output terminal.

FIGS. 102 to 111 are diagrams illustrating the operations of the accumulator 5500B of FIG. 101 while the PIM device 5000 of FIG. 98 is performing the matrix multiplication operation of FIG. 82. The matrix multiplication operations of FIG. 82 in the PIM device 5000 may be performed through first to eighth MAC operations. While the PIM device 5000 is performing the first to eighth MAC operations, the command decoder 5100 may repeat the generation and output of MAC data read control signal MAC_RD and MAC control signal MAC_CTRL, eight times. The memory banks BK(0)-BK(L−1) and the global buffer GB may transmit weight data and vector data to the MAC operators MAC(0)-MAC(L−1), respectively, in response to the MAC data read control signal MAC_RD. The MAC operators MAC(0)-MAC(L−1) may perform the MAC operations on the weight data and the vector data in response to the MAC control signal MAC_CTRL. The command decoder 5100 may generate the MAC read control signal RD_RST of a logic "high" level at a time point when the last MAC operation, that is, the accumulative addition operation of the eighth MAC operation is finished. The MAC operators MAC(0)-MAC(L−1) may generate the MAC result data in response to the MAC read control signal RD_RST of a logic "high" level.

The accumulation control signal generator 5200 may generate the first accumulation control signal IN_ACC and the second accumulation control signal ST_ACC whenever the MAC control signal MAC_CTRL is transmitted from the command decoder 5100. The accumulator 5500B may perform the first latch operation and the second latch operation in response to the first accumulation control signal IN_ACC and the second accumulation control signal ST_ACC. The MAC read control signal delay circuit 5300 may delay the MAC read control signal RD_RST that is output from the command decoder 5100 to generate a delayed MAC read control signal POST_RST. The accumulator 5500B may perform an additional addition operation in response to the MAC read control signal RD_RST of "1" (or a logic "high" level). The accumulator 5500B may output the MAC result data RST1.1 in response to the delayed MAC read control signal POST_RST of "1" (or a logic "high" level).

Figure 102:
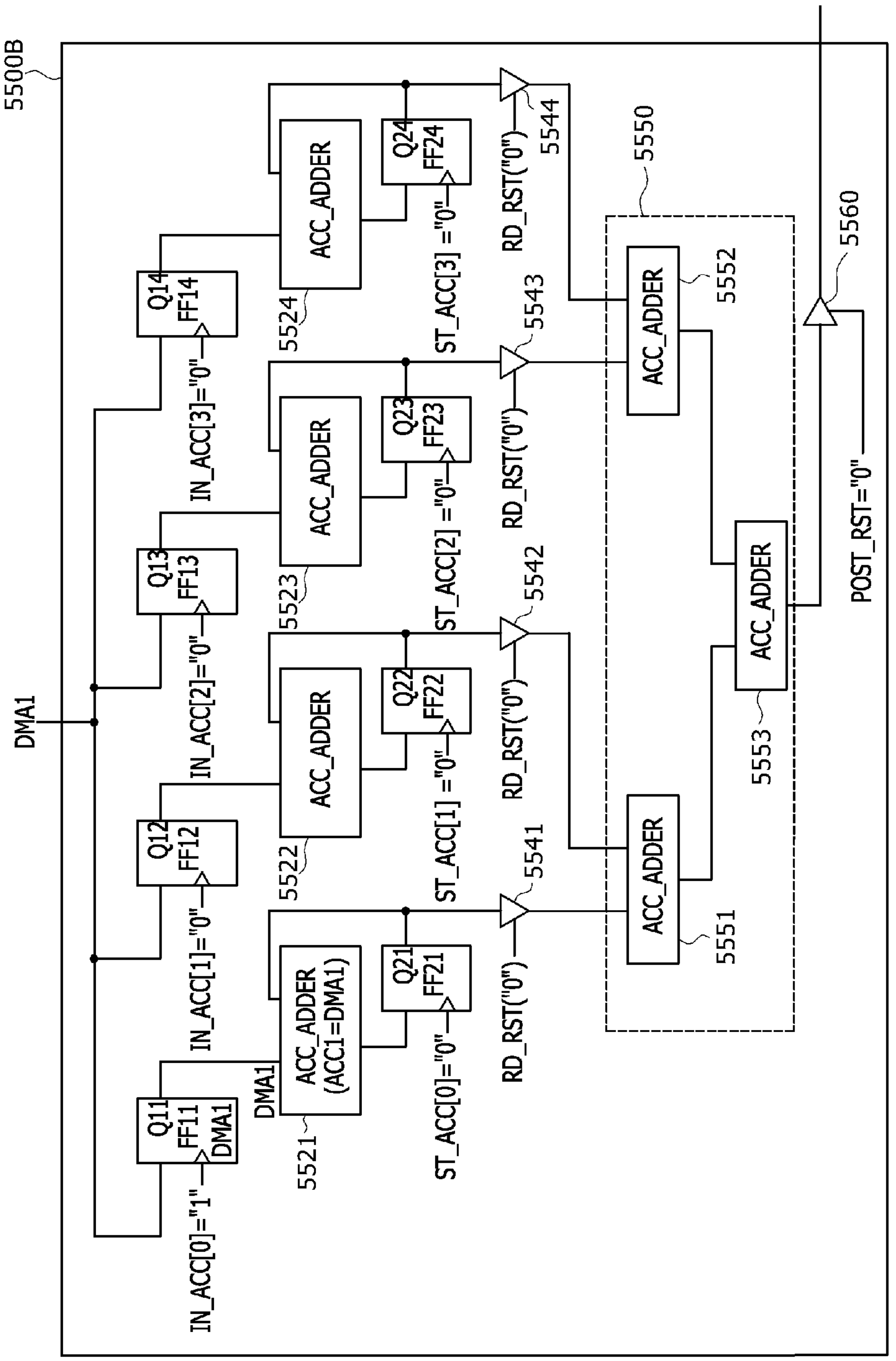
FIGS. 102 to 111 are diagrams illustrating the operations of the accumulator of FIG. 101 while the PIM device of FIG. 98 performs the matrix multiplication operation of FIG. 82.

Referring to FIG. 102, when the first row group of the first row of the weight matrix and the first column group of the vector matrix are transmitted to the first MAC operator MAC(0) for the first MAC operation, the multipliers MUL0-MUL15 may perform multiplication operations on the first row group of the first row and the first column group to output multiplication data. The adder tree may perform an addition operation on the multiplication data that is output from the multipliers MUL0-MUL15 to output the first multiplication addition data DMA1. The first multiplication addition data DMA1 may be transmitted to the input terminals of the first flip-flops FF11-FF14 of the accumulator 5500B. As described with reference to FIG. 84, at the fifth time point T5, the first accumulation control signal IN_ACC[3:0] of "0001" may be transmitted to the clock terminals of the first flip-flops FF11-FF14 of the accumulator 5500B. The first bit value IN_ACC[0] "1" of the first accumulation control signal IN_ACC[3:0] may be transmitted to the clock terminal of the first flip-flop FF11 that is disposed at the first position, and "0" may be transmitted to the clock terminals of the remaining first flip-flops FF12-FF14. Accordingly, the first flip-flop FF11 that is disposed at the first position may latch the first multiplication addition data DMA1 that is received through the input terminal and may transmit the first multiplication addition data DMA1 to the first input terminal of the first adder 5521 through the output terminal Q11. The first adder 5521 may generate the first accumulation data ACC1 that is the same as the first multiplication addition data DMA1.

Figure 103:
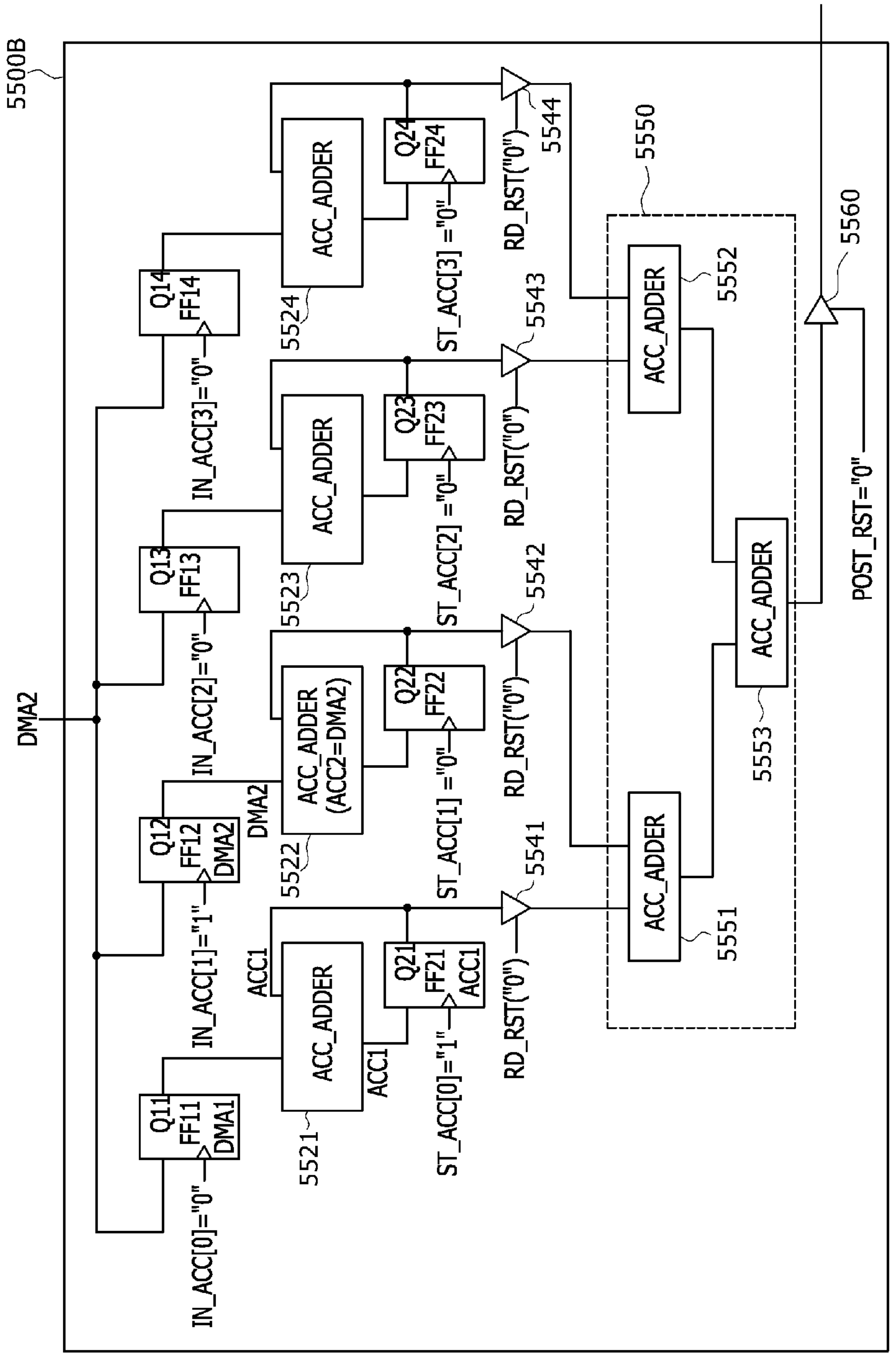

Referring to FIG. 103, for the second MAC operation, the second multiplication addition data DMA2 may be generated through multiplication operations on the second row group of the first row of the weight matrix and the second column group of the vector matrix and an addition operation on the result data of the multiplication operations and may be transmitted to the input terminals of the first flip-flops FF11-FF14 of the accumulator 5500B. As described with reference to FIG. 84, at the sixth time point T6, the first accumulation control signal IN_ACC[3:0] of "0010" may be transmitted to the clock terminals of the first flip-flops FF11-FF14 of the accumulator 5500B. Then, the second accumulation control signal ST_ACC[3:0] of "0001" may be transmitted to the clock terminals of the second flip-flops FF21-FF24 of the accumulator 5500B. The first adder 5521 may transmit the first accumulation data ACC1 that is generated through the first MAC operation process to the input terminal of the second flip-flop FF21 that is disposed in the first position. The second bit value IN_ACC[1] "1" of the first accumulation control signal IN_ACC[3:0] may be transmitted to the clock terminal of the first flip-flop FF12 that is disposed at the second position, among the first flip-flops FF11-FF14, and "0" may be transmitted to the clock terminals of the remaining first flip-flops FF11, FF13, and FF14. Accordingly, the first flip-flop FF12 that is disposed at the second position may latch the second multiplication addition data DMA2 that is received through the input terminal to transmit the second multiplication addition data DMA2 to the first input terminal of the second adder 5522 through the output terminal Q12. The second adder 5522 may generate the second accumulation data ACC2 that is the same as the second multiplication addition data DMA2. The first bit value ST_ACC[0] "1" of the second accumulation control signal ST_ACC[3:0] may be transmitted to the clock terminal of the second flip-flop FF21 that is disposed at the first position, among the second flip-flops FF21-FF24, and "0" may be transmitted to the clock terminals of the remaining second flip-flops FF22-FF24. Accordingly, the second flip-flop FF21 that is disposed at the first position may latch the first accumulation data ACC1 that is received through the input terminal to transmit the first accumulation data ACC1 to the first input terminal of the first adder 5521 through the output terminal Q21.

Figure 104:
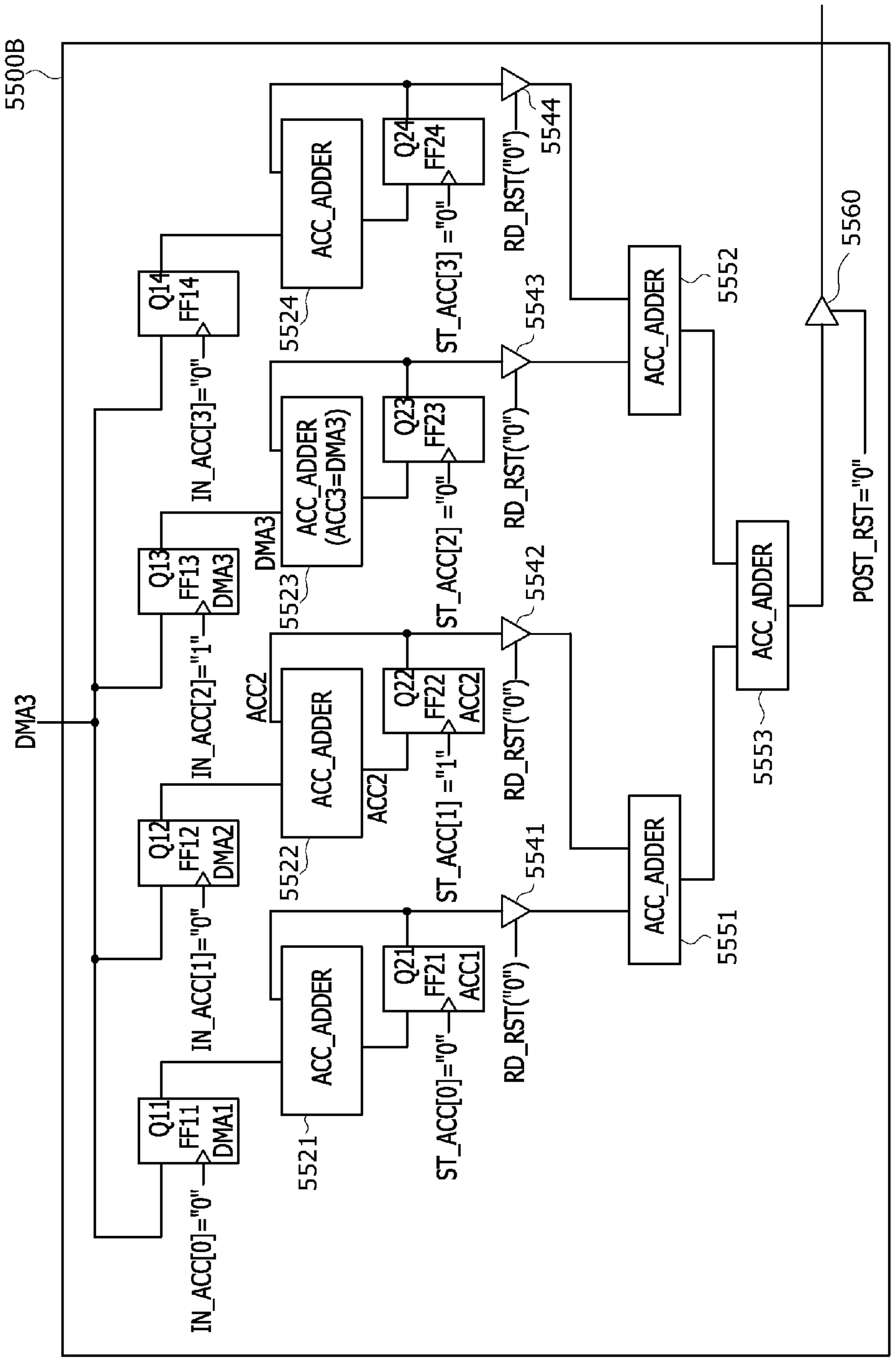

Referring to FIG. 104, for the third MAC operation, the third multiplication addition data DMA3 may be generated through multiplication operations on the third row group of the first row of the weight matrix and the third column group of the vector matrix and an addition operation on the result data of the multiplication operations and may be transmitted to the input terminals of the first flip-flops FF11-FF14 of the accumulator 5500B. As described with reference to FIG. 84, at the seventh time point T7, the first accumulation control signal IN_ACC[3:0] of "0100" may be transmitted to the clock terminals of the first flip-flops FF11-FF14 of the accumulator 5500B. Then, the second accumulation control signal ST_ACC[3:0] of "0010" may be transmitted to the clock terminals of the second flip-flops FF21-FF24 of the accumulator 5500B. The second adder 5522 may transmit the second accumulation data ACC2 that is generated in the second MAC operation process to the input terminal of the second flip-flop FF22 that is disposed in the second position. The third bit value IN_ACC[2] "1" of the first accumulation control signal IN_ACC[3:0] may be transmitted to the clock terminal of the first flip-flop FF13 that is disposed at the third position, among the first flip-flops FF11-FF14, and "0" may be transmitted to the clock terminals of the remaining first flip-flops FF11, FF12, and FF14. Accordingly, the first flip-flop FF13 that is disposed at the third position may latch the third multiplication addition data DMA3 that is received through the input terminal to transmit the third multiplication addition data DMA3 to the first input terminal of the third adder 5523 through the output terminal Q13. The third adder 5523 may generate the third accumulation data ACC3 that is the same as the third multiplication addition data DMA3. The second bit value ST_ACC[1] "1" of the second accumulation control signal ST_ACC[3:0] may be transmitted to the clock terminal of the second flip-flop FF22 that is disposed at the second position, among the second flip-flops FF21-FF24, and "0" may be transmitted to the clock terminals of the remaining second flip-flops FF21, FF23, and FF24. Accordingly, the second flip-flop FF22 that is disposed at the second position may latch the second accumulation data ACC2 that is received through the input terminal to transmit the second accumulation data ACC2 to the second input terminal of the second adder 5522 through the output terminal Q22.

Figure 105:
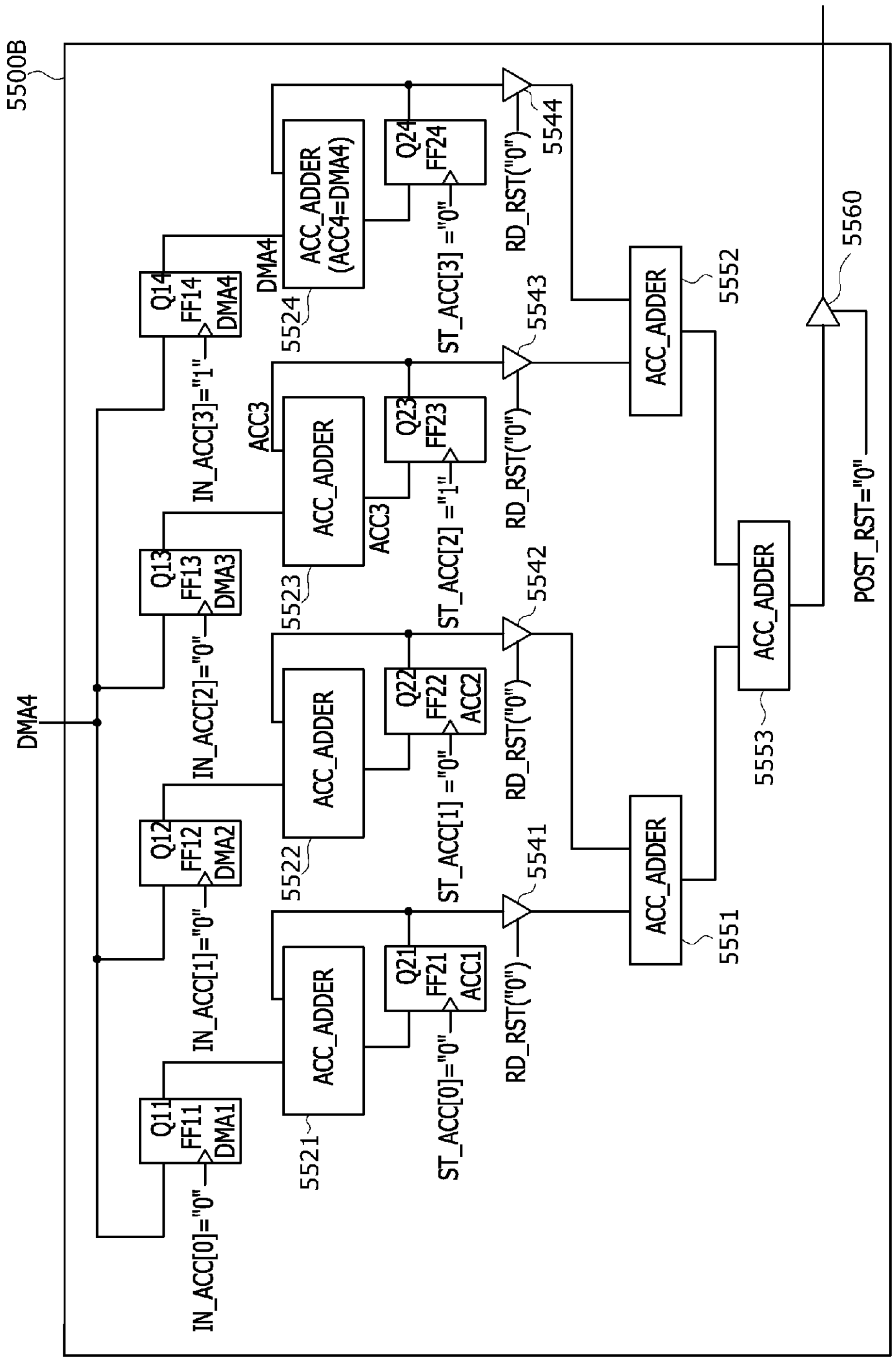

Referring to FIG. 105, for the fourth MAC operation, the fourth multiplication addition data DMA4 may be generated through multiplication operations on the fourth row group of the first row of the weight matrix and the fourth column group of the vector matrix and an addition operation on the result data of the multiplication operations and may be transmitted to the input terminals of the first flip-flops FF11-FF14 of the accumulator 5500B. As described with reference to FIG. 84, at the eighth time point T8, the first accumulation control signal IN_ACC[3:0] of "0100" may be transmitted to the clock terminals of the first flip-flops FF11-FF14 of the accumulator 5500B. Then, the second accumulation control signal ST_ACC[3:0] of "0010" may be transmitted to the clock terminals of the second flip-flops FF21-FF24 of the accumulator 5500B. The third adder 5523 may transmit the third accumulation data ACC3 that is generated in the third MAC operation process to the input terminal of the second flip-flop FF23 that is disposed in the third position. The fourth bit value IN_ACC[3] "1" of the first accumulation control signal IN_ACC[3:0] may be transmitted to the clock terminal of the first flip-flop FF14 that is disposed at the fourth position, among the first flip-flops FF11-FF14, and "0" may be transmitted to the clock terminals of the remaining first flip-flops FF11-FF13. Accordingly, the first flip-flop FF14 that is disposed at the fourth position may latch the fourth multiplication addition data DMA4 that is received through the input terminal to transmit the fourth multiplication addition data DMA4 to the first input terminal of the fourth adder 5524 through the output terminal Q13. The fourth adder 5524 may generate the fourth accumulation data ACC4 that is the same as the fourth multiplication addition data DMA4. The third bit value ST_ACC[2] "1" of the second accumulation control signal ST_ACC[3:0] may be transmitted to the clock terminal of the second flip-flop FF22 that is disposed at the third position, among the second flip-flops FF21-FF24, and "0" may be transmitted to the clock terminals of the remaining second flip-flops FF21, FF22, and FF24. Accordingly, the second flip-flop FF23 that is disposed at the third position may latch the third accumulation data ACC3 that is received through the input terminal to transmit the third accumulation data ACC3 to the second input terminal of the third adder 5523 through the output terminal Q23.

Figure 106:
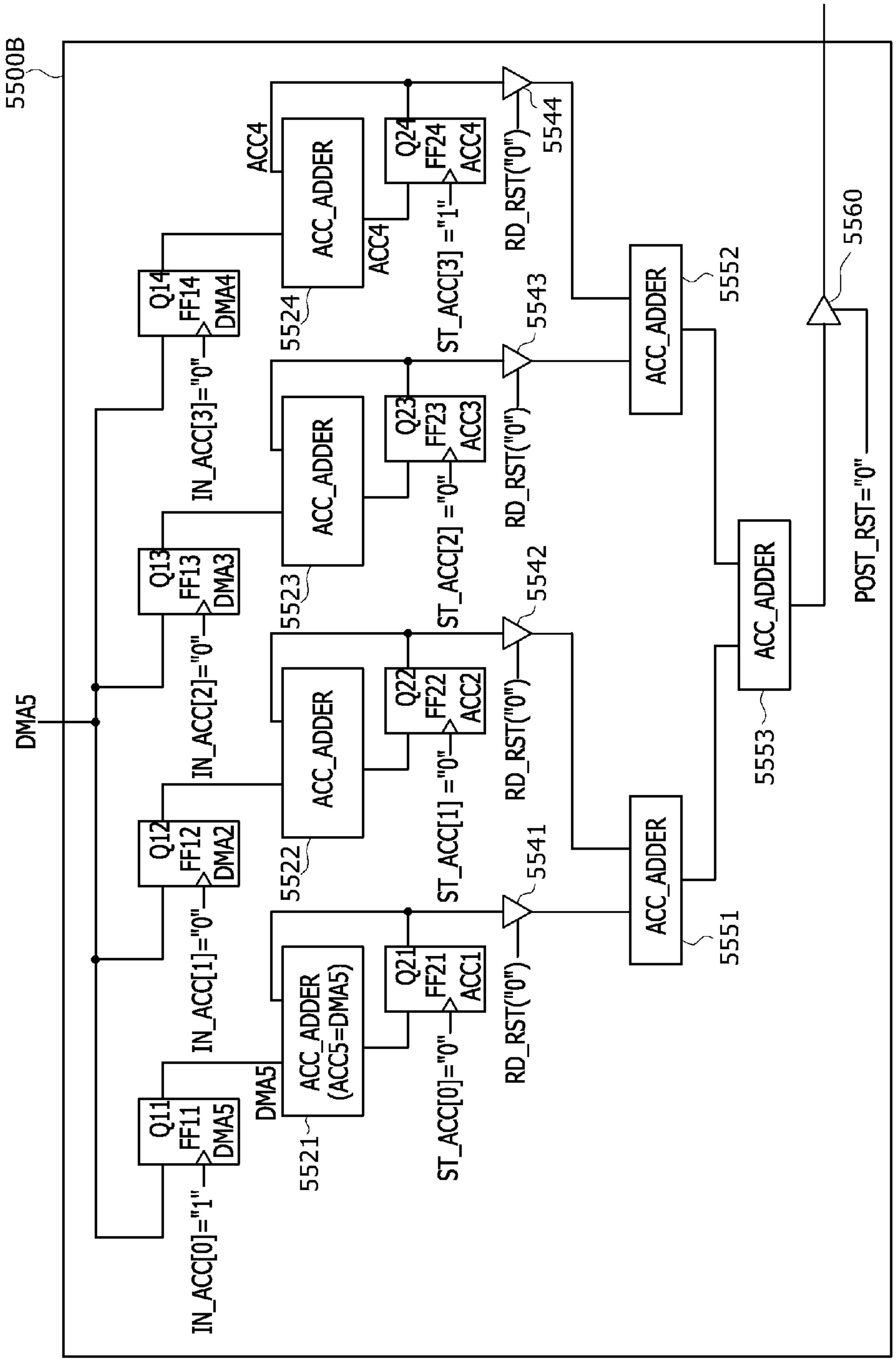

Referring to FIG. 106, for the fifth MAC operation, the fifth multiplication addition data DMA5 may be generated through multiplication operations on the fifth row group of the first row of the weight matrix and the fifth column group of the vector matrix and an addition operation on the result data of the multiplication operations and may be transmitted to the input terminals of the first flip-flops FF11-FF14 of the accumulator 5500B. As described with reference to FIG. 84, at the ninth time point T9, the first accumulation control signal IN_ACC[3:0] of "0001" may be transmitted to the clock terminals of the first flip-flops FF11-FF14 of the accumulator 5500B. Then, the second accumulation control signal ST_ACC[3:0] of "1000" may be transmitted to the clock terminals of the second flip-flops FF21-FF24 of the accumulator 5500B. The fourth adder 5524 may transmit the fourth accumulation data ACC4 that is generated in the fourth MAC operation process to the input terminal of the second flip-flop FF24 that is disposed in the fourth position. The first bit value IN_ACC[0] "1" of the first accumulation control signal IN_ACC[3:0] may be transmitted to the clock terminal of the first flip-flop FF11 that is disposed at the first position, among the first flip-flops FF11-FF14, and "0" may be transmitted to the clock terminals of the remaining first flip-flops FF12-FF14. Accordingly, the first flip-flop FF11 that is disposed at the first position may latch the fifth multiplication addition data DMA5 that is received through the input terminal to transmit the fifth multiplication addition data DMA5 to the first input terminal of the first adder 5521 through the output terminal Q11. The first adder 5521 may perform an addition operation on the first accumulation data ACC1 that is input through the second input terminal of the first adder 5521 in the second MAC operation and the fifth multiplication addition data DMA5 to generate the fifth accumulation data ACC5. Because the first accumulation data ACC1 is the same as the first multiplication addition data DMA1, the fifth accumulation data ACC5 may become to "first multiplication addition data DMA1+fifth multiplication addition data DMA5". The fourth bit value ST_ACC [3] "1" of the second accumulation control signal ST_ACC [3:0] may be transmitted to the clock terminal of the second flip-flop FF24 that is disposed at the fourth position, among the second flip-flops FF21-FF24, and "0" may be transmitted to the clock terminals of the remaining second flip-flops FF21-FF23. Accordingly, the second flip-flop FF24 that is disposed at the fourth position may latch the fourth accumulation data ACC4 that is received through the input terminal to transmit the fourth accumulation data ACC4 to the second input terminal of the fourth adder 5524 through the output terminal Q24.

Figure 107:
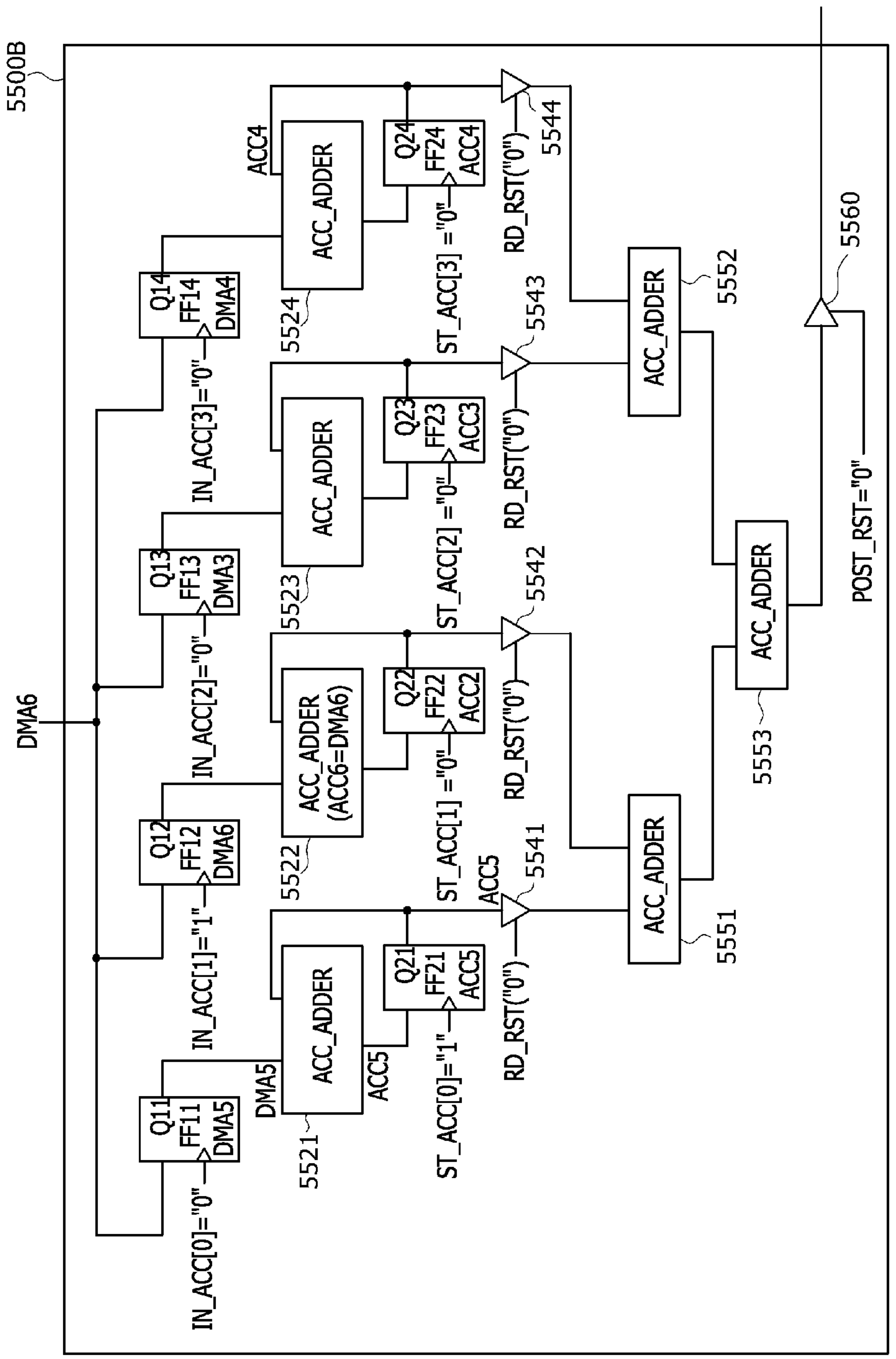

Referring to FIG. 107, for the sixth MAC operation, the sixth multiplication addition data DMA6 may be generated through multiplication operations on the sixth row group of the first row of the weight matrix and the sixth column group of the vector matrix and an addition operation on the result data of the multiplication operations and may be transmitted to the input terminals of the first flip-flops FF11-FF14 of the accumulator 5500B. As described with reference to FIG. 84, at the tenth time point T10, the first accumulation control signal IN_ACC[3:0] of "0010" may be transmitted to the clock terminals of the first flip-flops FF11-FF14 of the accumulator 5500B. Then, the second accumulation control signal ST_ACC[3:0] of "0001" may be transmitted to the clock terminals of the second flip-flops FF21-FF24 of the accumulator 5500B. The first adder 5521 may transmit the fifth accumulation data ACC5 that is generated in the fifth MAC operation process to the input terminal of the second flip-flop FF21 that is disposed in the first position.

The second bit value IN_ACC[0] "1" of the first accumulation control signal IN_ACC[3:0] may be transmitted to the clock terminal of the first flip-flop FF12 that is disposed at the second position, among the first flip-flops FF11-FF14, and "0" may be transmitted to the clock terminals of the remaining first flip-flops FF1, FF13, and FF14. Accordingly, the first flip-flop FF12 that is disposed at the second position may latch the sixth multiplication addition data DMA6 that is received through the input terminal to transmit the sixth multiplication addition data DMA6 to the first input terminal of the second adder 5522 through the output terminal Q12. The second adder 5522 may perform an addition operation on the second accumulation data ACC1 that is input to the second input terminal of the second adder 5522 in the third MAC operation and the sixth multiplication addition data DMA6 to generate the sixth accumulation data ACC6. Because the second accumulation data ACC2 is the same as the second multiplication addition data DMA2, the sixth accumulation data ACC6 may become to "second multiplication addition data DMA2+sixth multiplication addition data DMA6".

The first bit value ST_ACC[0] "1" of the second accumulation control signal ST_ACC[3:0] may be transmitted to the clock terminal of the second flip-flop FF21 that is disposed at the first position, among the second flip-flops FF21-FF24, and "0" may be transmitted to the clock terminals of the remaining second flip-flops FF22-FF24. Accordingly, the second flip-flop FF21 that is disposed at the first position may latch the fifth accumulation data ACC5 that is received through the input terminal to transmit the fifth accumulation data ACC5 to the input terminal of the first intermediate buffer 5541 through the output terminal Q21. A MAC read control signal RD_RST of "0" may be transmitted to the enable terminal of the first intermediate buffer 5541, and accordingly, the fifth accumulation data ACC5 might not be output from the first intermediate buffer 5541.

Figure 108:
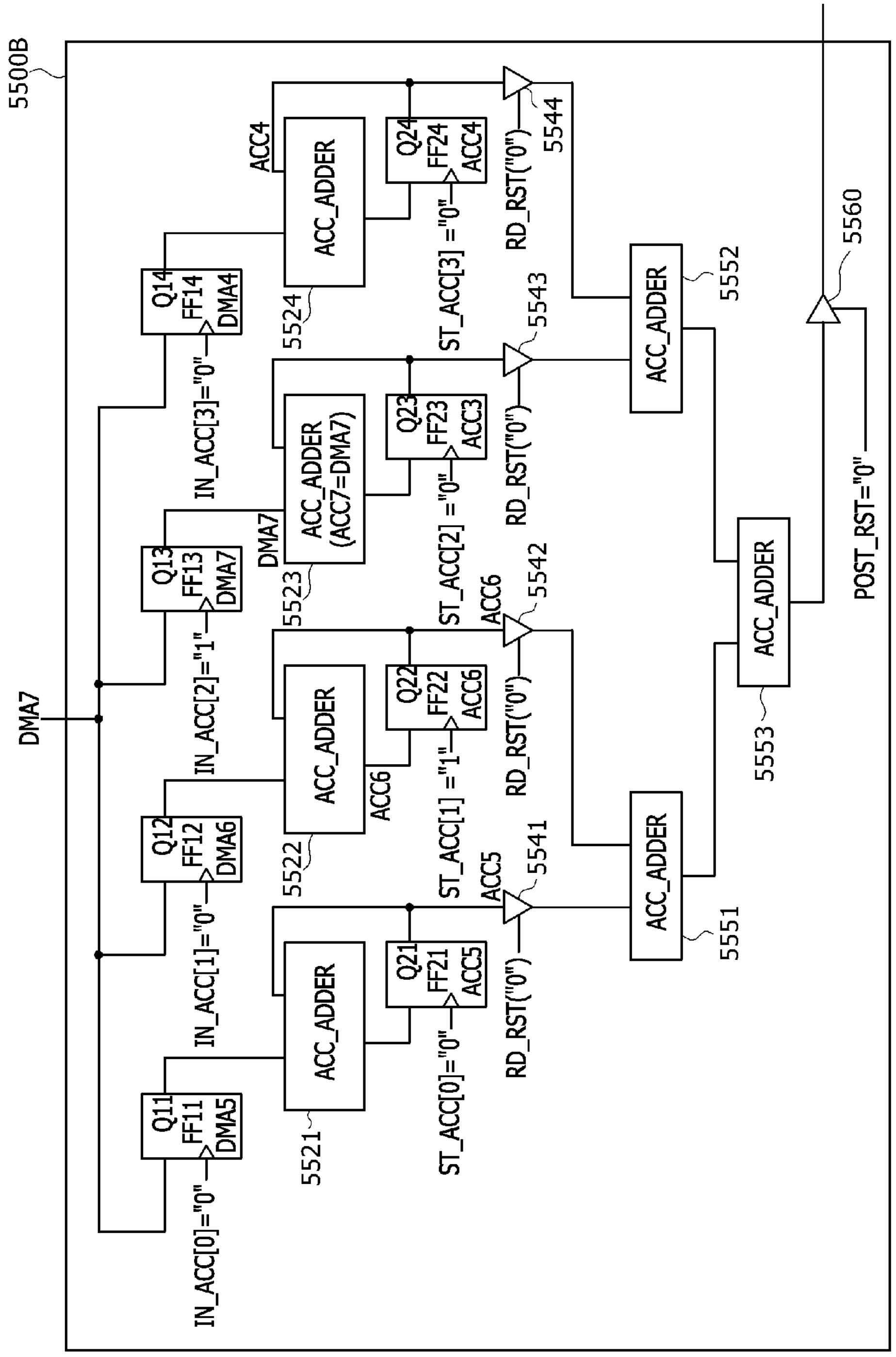

Referring to FIG. 108, for the seventh MAC operation, the seventh multiplication addition data DMA7 may be generated through multiplication operations on the seventh row group of the first row of the weight matrix and the seventh column group of the vector matrix and an addition operation on the result data of the multiplication operations and may be transmitted to the input terminals of the first flip-flops FF11-FF14 of the accumulator 5500B. As described with reference to FIG. 84, at the eleventh time point T11, the first accumulation control signal IN_ACC[3:0] of "0100" may be transmitted to the clock terminals of the first flip-flops FF11-FF14 of the accumulator 5500B. Then, the second accumulation control signal ST_ACC[3:0] of "0010" may be transmitted to the clock terminals of the second flip-flops FF21-FF24 of the accumulator 5500B. The second adder 5522 may transmit the sixth accumulation data ACC6 that is generated in the sixth MAC operation process to the input terminal of the second flip-flop FF22 that is disposed in the second position.

The third bit value IN_ACC[2] "1" of the first accumulation control signal IN_ACC[3:0] may be transmitted to the clock terminal of the first flip-flop FF13 that is disposed at the third position, among the first flip-flops FF11-FF14, and "0" may be transmitted to the clock terminals of the remaining first flip-flops FF1, FF12, and FF14. Accordingly, the first flip-flop FF13 that is disposed at the third position may latch the seventh multiplication addition data DMA7 that is received through the input terminal to transmit the seventh multiplication addition data DMA7 to the first input terminal of the third adder 5523. The third adder 5523 may perform an addition operation on the third accumulation data ACC3 that is input through the second input terminal of the third adder 5523 in the fourth MAC operation process and the seventh multiplication addition data DMA7 to generate the seventh accumulation data ACC7. Because the third accumulation data ACC3 is the same as the third multiplication addition data DMA3, the seventh accumulation data ACC7 may become to "third multiplication addition data DMA3+seventh multiplication addition data DMA7".

The second bit value ST_ACC[1] "1" of the second accumulation control signal ST_ACC[3:0] may be transmitted to the clock terminal of the second flip-flop FF22 that is disposed at the second position, among the second flip-flops FF21-FF24, and "0" may be transmitted to the clock terminals nals of the remaining second flip-flops FF21, FF23, and FF24. Accordingly, the second flip-flop FF22 that is disposed at the second position may latch the sixth accumulation data ACC6 that is input through the input terminal and may transmit the sixth accumulation data ACC6 to the input terminal of the second intermediate buffer 5542 through the output terminal Q22. A MAC read control signal RD_RST of "0" may be transmitted to the enable terminal of the second intermediate buffer 5542, and accordingly, the sixth accumulation data ACC6 might not be output from the second intermediate buffer 5542.

Figure 109:
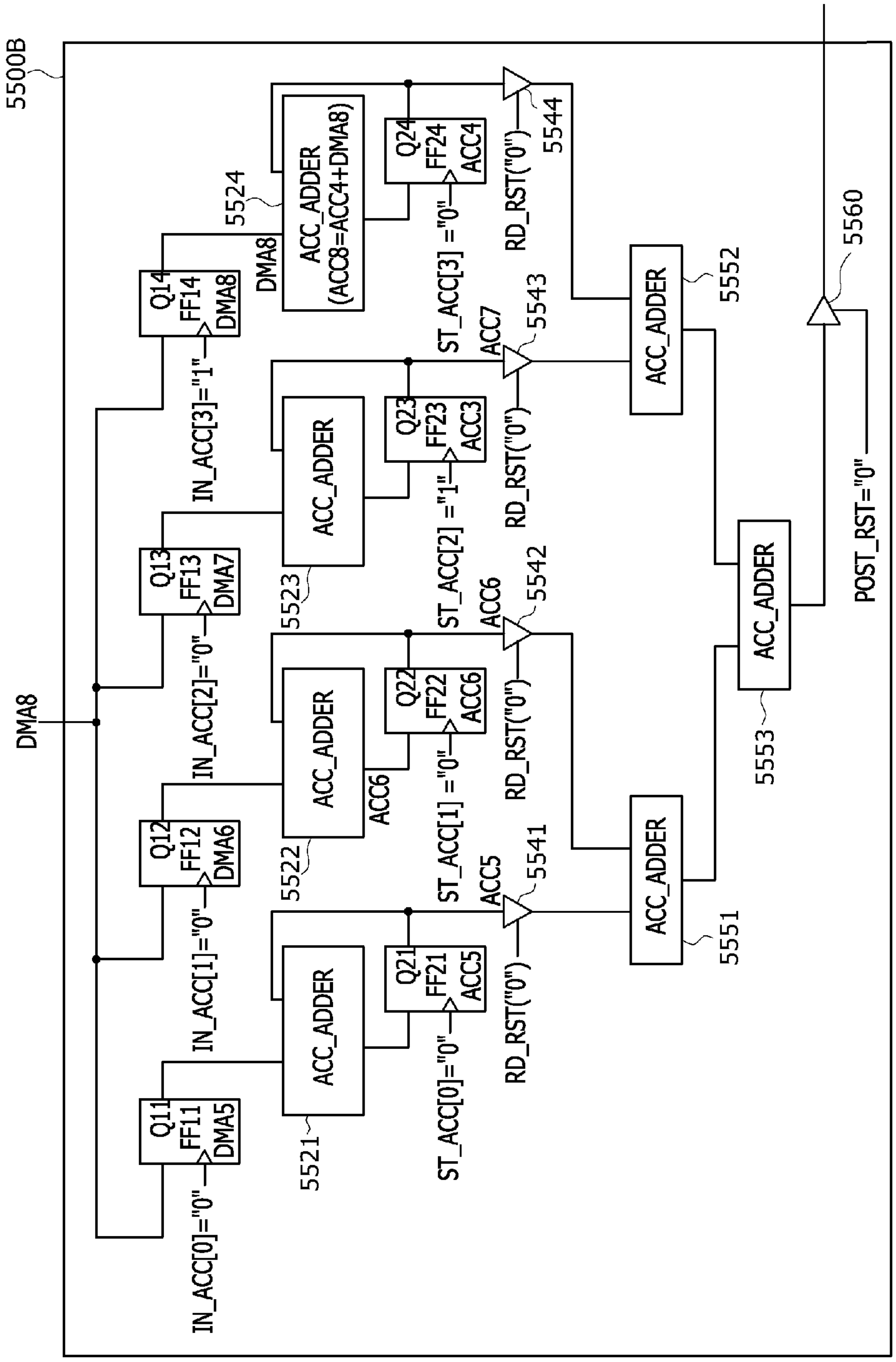

Referring to FIG. 109, for the eighth MAC operation, the eighth multiplication addition data DMA8 may be generated through multiplication operations on the eighth row group of the first row of the weight matrix and the eighth column group of the vector matrix and an addition operation on the result data of the multiplication operations and may be transmitted to the input terminals of the first flip-flops FF11-FF14 of the accumulator 5500B. As described with reference to FIG. 84, at the twelfth time point T12, the first accumulation control signal IN_ACC[3:0] of "1000" may be transmitted to the clock terminals of the first flip-flops FF11-FF14 of the accumulator 5500B. Then, the second accumulation control signal ST_ACC[3:0] of "0100" may be transmitted to the clock terminals of the second flip-flops FF21-FF24 of the accumulator 5500B. The third adder 5523 may transmit the seventh accumulation data ACC7 that is generated in the seventh MAC operation process to the input terminal of the second flip-flop FF23 that is disposed at the third position.

The fourth bit value IN_ACC[3] "1" of the first accumulation control signal IN_ACC[3:0] may be transmitted to the clock terminal of the first flip-flop FF14 that is disposed at the fourth position, among the first flip-flops FF11-FF14, and "0" may be transmitted to the clock terminals of the remaining first flip-flops FF1-FF13. Accordingly, the first flip-flop FF14 that is disposed at the fourth position may latch the eighth multiplication addition data DMA8 that is input through the input terminal and may transmit the eighth multiplication addition data DMA8 to the first input terminal of the fourth adder 5524 through the output terminal Q14. The fourth adder 5524 may perform an addition operation on the fourth accumulation data ACC4 that is input through the second input terminal of the fourth adder 5524 in the fifth MAC operation process and the eighth multiplication addition data DMA8 to generate the eighth accumulation data ACC8. Because the fourth accumulation data ACC4 is the same as the fourth multiplication addition data DMA4, the eighth accumulation data ACC8 may become to "fourth multiplication addition data DMA4+eighth multiplication addition data DMA8".

The third bit value ST_ACC[2] "1" of the second accumulation control signal ST_ACC[3:0] may be transmitted to the clock terminal of the second flip-flop FF23 that is disposed at the third position, among the second flip-flops FF21-FF24, and "0" may be transmitted to the clock terminals of the remaining second flip-flops FF21, FF22, and FF24. Accordingly, the second flip-flop FF23 that is disposed at the third position may latch the seventh accumulation data ACC7 that is input through the input terminal and may transmit the seventh accumulation data ACC7 to the input terminal of the third intermediate buffer 5543 through the output terminal Q23. A MAC read control signal RD_RST of "0" may be transmitted to the enable terminal of the third intermediate buffer 5543, and accordingly, the seventh accumulation data ACC7 might not be output from the third intermediate buffer 5543.

Figure 110:
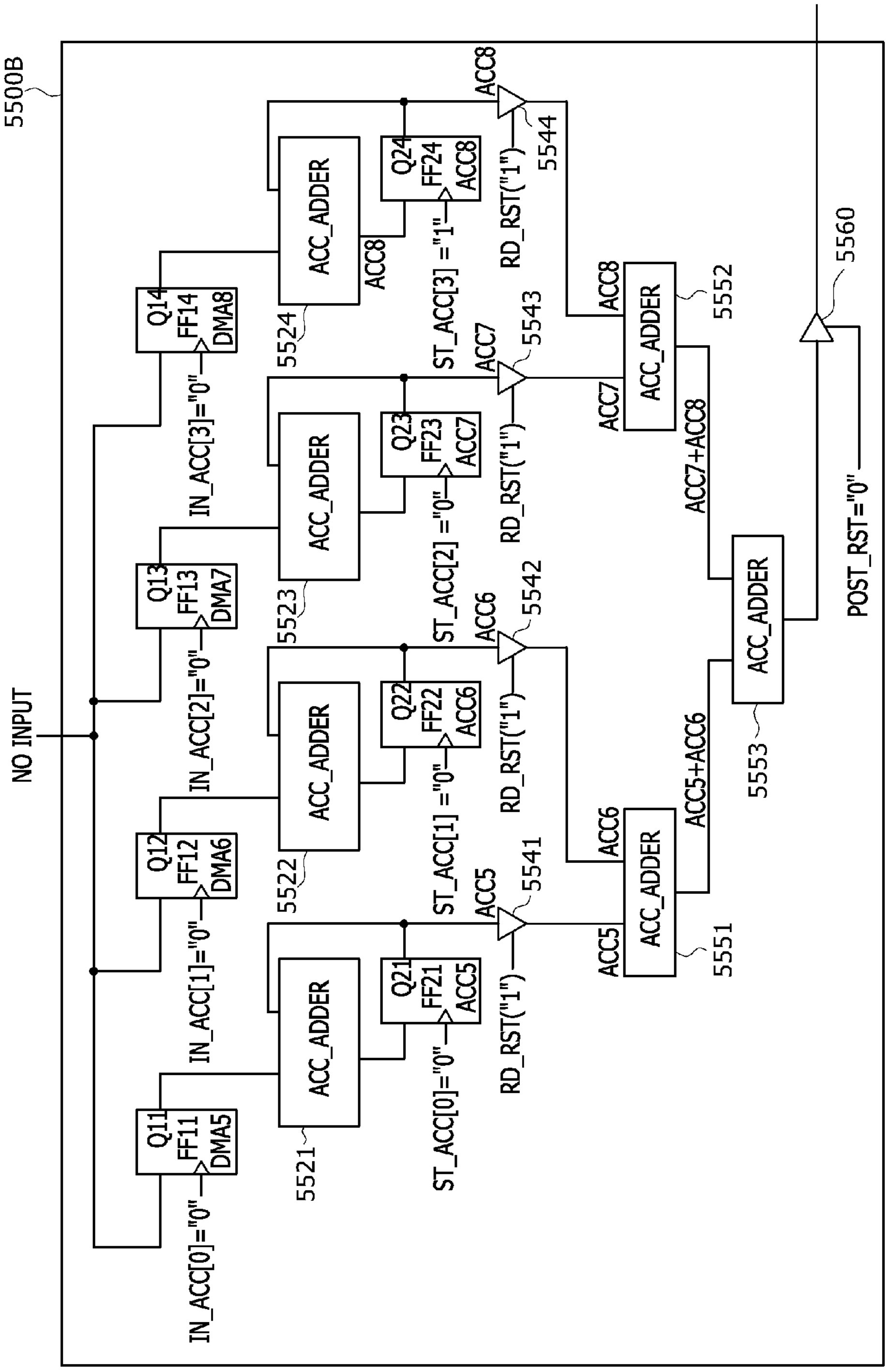

Referring to FIG. 110, at the thirteenth time point T13, the second accumulation control signal ST_ACC[3:0] of "1000" may be transmitted to the clock terminals of the second flip-flops FF21-FF24 of the accumulator 5500B. The fourth adder 5524 may transmit the eighth accumulation data ACC8 that is generated in the eighth MAC operation process to the input terminal of the second flip-flop FF24 that is disposed at the fourth position. The fourth bit value ST_ACC[3] "1" of the second accumulation control signal ST_ACC[3:0] may be transmitted to the clock terminal of the second flip-flop FF24 that is disposed at the fourth position, among the second flip-flops FF21-FF24, and "0" may be transmitted to the clock terminals of the remaining second flip-flops FF21-FF23. Accordingly, the second flip-flop FF24 that is disposed at the fourth position may latch the eighth accumulation data ACC8 that is input through the input terminal and may transmit the eighth accumulation data ACC8 to the input terminal of the fourth intermediate buffer 5544 through the output terminal Q24.

The logic level of the MAC read control signal RD_RST that is transmitted to the enable terminals of the first to fourth intermediate buffers 5541-5544 may be changed from "0" (i.e., a logic "low" level) to "1" (i.e., a logic "high" level), and accordingly, the first to fourth intermediate buffers 5541-5544 may output the fifth to eighth accumulation data ACC5-ACC8, respectively. The fifth accumulation data ACC5 and the sixth accumulation data ACC6 that are output from the first intermediate buffer 5541 and the second intermediate buffer 5542 may be transmitted to the first input terminal and the second input terminal of the first additional adder 5551, respectively. The seventh accumulation data ACC7 and the eighth accumulation data ACC8 that are output from the third intermediate buffer 5543 and the fourth intermediate buffer 5544 may be transmitted to the first input terminal and the second input terminal of the second additional adder 5552, respectively. The first additional adder 5551 may perform an addition operation on the fifth accumulation data ACC5 and the sixth accumulation data ACC6 to output data "ACC5+ACC6". The second additional adder 5552 may perform an addition operation on the seventh accumulation data ACC7 and the eighth accumulation data ACC8 to output data "ACC7+ACC8".

Figure 111:
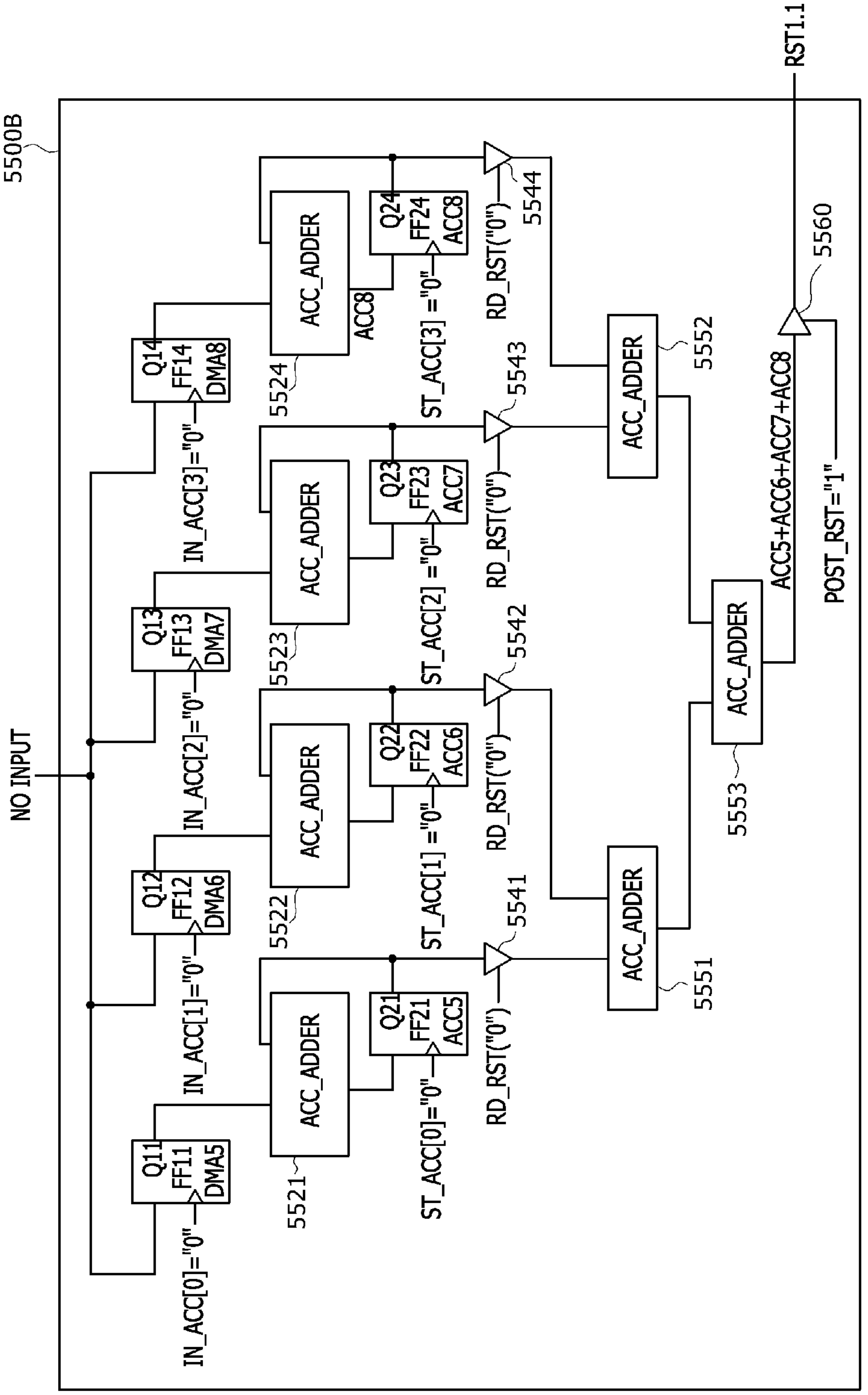

Referring to FIG. 111, the third additional adder 5553 may receive the data "ACC5+ACC6" and the data "ACC7+ACC8" from the first additional adder 5551 and the second additional adder 5552 through first input terminal and the second input terminal, respectively. The third adder 5553 may perform an addition operation on the data "ACC5+ACC6" and the data "ACC7+ACC8" to output data "ACC5+ACC6+ACC7+ACC8". The third adder 5553 may transmit the data "ACC5+ACC6+ACC7+ACC8" to the input terminal of the output buffer 5560. The output buffer 5560 may receive the delayed MAC read control signal POST_RST of "1" (i.e., a logic "high" level) through an enable terminal. The output buffer 5560 may output the data "ACC5+ACC6+ACC7+ACC8" as the MAC result data RST1.1 through an output terminal in response to the delayed MAC read control signal POST_RST of "1" (i.e., a logic "high" level).

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An accumulator comprising:

an accumulation adder configured to perform an accumulative addition operation on input data and latch data that are input through a first input terminal and a second input terminal, respectively, to generate accumulation data; and a latch circuit, including a plurality of flip-flops disposed in parallel between an output terminal of the accumulation adder and the second input terminal of the accumulation adder, each of the plurality of flip-flops configured to receive the accumulation data and latch and output the accumulation data as the latch data, wherein one of the latch data that is output from each of the plurality of flip-flops is selected to feed back to the accumulation adder based on a first accumulation control signal;

wherein each of the plurality of flip-flops is configured to receive a corresponding bit value of a second accumulation control signal through clock terminals of the plurality of flip-flops;

wherein a first flip-flop, among the plurality of flip-flops, is selected based on the second accumulation control signal; and wherein the latch circuit is configured to latch the accumulation data in the first flip-flop.

2. The accumulator of claim 1, wherein the plurality of flip-flops are disposed independently of each other such that the input or output of one flip-flop does not affect the input or output of other flip-flops.

3. The accumulator of claim 1, further comprising a selector including a plurality of input terminals, a selection terminal, and an output terminal, wherein the plurality of input terminals of the selector are respectively coupled to output terminals of the plurality of flip-flops, wherein the selection terminal of the selector receives the first accumulation control signal, and wherein the output terminal of the selector is coupled to the second input terminal of the accumulation adder.

4. The accumulator of claim 3, wherein the plurality of input terminals of the selector are initially set to a value of 0.

5. The accumulator of claim 4, wherein the selector is configured to output data through the output terminal, the data being set in the input terminal, among the plurality of input terminals, selected by the first accumulation control signal.

6. The accumulator of claim 1, further comprising an additional addition circuit configured to add latch data that is output from the plurality of flip-flops.

7. The accumulator of claim 6, wherein the additional addition circuit includes a plurality of additional adders disposed in an adder tree structure.

8. The accumulator of claim 7, wherein each additional adder of a first stage, among the plurality of additional adders, includes input terminals that are coupled to output terminals of two flip-flops, among the plurality of flip-flops.

9. The accumulator of claim 8, further comprising an output buffer configured to output data output from an additional adder of a last stage, among the plurality of additional adders, as multiplying-and-accumulating (MAC) result data, in response to receiving a first logic level of a MAC read control signal.

10. The accumulator of claim 8, further comprising a plurality of intermediate buffers disposed between the input terminals of the additional adders of the first stage of the adder tree and the output terminals of the plurality of flip-flops.

11. The accumulator of claim 10, wherein the plurality of intermediate buffers are configured to transmit the latch data that is output from the plurality of flip-flops to the input terminals of the additional adders of the first stage in response to receiving the first logic level of the MAC read control signal.

12. The accumulator of claim 10, further comprising an output buffer configured to output data that is output from an additional adder of a last stage as MAC result data in response to receiving a first logic level of a delayed MAC read control signal that is generated by delaying the MAC read control signal.

13. An accumulator comprising:

a plurality of first flip-flops configured to receive input data;

a plurality of adders configured to receive output data from a corresponding one of the plurality of first flip-flops and configured to perform addition operations;

a plurality of second flip-flops configured to receive output data from the plurality of adders;

a plurality of intermediate buffers configured to output output data from the plurality of second flip-flops in response to receiving a first logic level of a MAC read control signal;

an additional addition circuit configured to add the output data from the plurality of intermediate buffers to output addition data; and an output buffer configured to output the addition data that is output from the additional addition circuit as multiplying-and-accumulating (MAC) result data in response to receiving a first logic level of a delayed MAC read control signal that is generated by delaying the MAC read control signal.

14. The accumulator of claim 13, wherein the plurality of adders are configured to perform addition operations on data that is output from the plurality of first flip-flops and data that is fed back from the plurality of second flip-flops.

15. The accumulator of claim 13, wherein the plurality of first flip-flops are configured to sequentially latch and output the input data from the first flip-flop at a first position to the first flip-flop at a last position, respectively, in response to receiving a first accumulation control signal.

16. The accumulator of claim 15, wherein the plurality of first flip-flops respectively receive bit values of the first accumulation control signal through clock terminals.

17. The accumulator of claim 13, wherein the plurality of second flip-flops are configured to sequentially latch and output the output data from the adders, respectively, from the second flip-flops at a first position to the second flip-flops at a last position, in response to a second accumulation control signal.

18. The accumulator of claim 17, wherein the plurality of second flip-flops respectively receive bit values of the second accumulation control signal through clock terminals.

19. The accumulator of claim 13, wherein the additional addition circuit includes a plurality of additional adders that are disposed in an adder tree structure.

20. The accumulator of claim 19, wherein the additional adders of a first stage of the adder tree structure receive output data from two intermediate buffers, among the plurality of intermediate buffers, and wherein the additional adder of a last stage of the adder tree structure transmits output data to the output buffer.

* * * * *